(12) United States Patent
Michlin et al.

(10) Patent No.: US 6,615,006 B2
(45) Date of Patent: **\*Sep. 2, 2003**

(54) ELECTRICAL CONTACT DEVICE FOR A DEVELOPER ROLLER

(75) Inventors: Steven Bruce Michlin, 5310 Bentley, #105, West Bloomfield, MI (US) 48322; Charles Harold Whittern, Hudson, MI (US)

(73) Assignee: Steven Bruce Michlin, West Bloomfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/781,744

(22) Filed: Feb. 12, 2001

(65) Prior Publication Data

US 2001/0041079 A1 Nov. 15, 2001

Related U.S. Application Data

(63) Continuation-in-part of application No. 09/613,145, filed on Jul. 10, 2000, now Pat. No. 6,321,048, which is a continuation-in-part of application No. 09/109,309, filed on Jun. 30, 1998, now Pat. No. 6,131,261.

(51) Int. Cl.[7] ........................ G03G 15/00; G03G 15/08
(52) U.S. Cl. ........................ 399/90; 399/103; 399/111
(58) Field of Search ........................ 399/90, 111, 119, 399/103, 104, 106

(56) References Cited

U.S. PATENT DOCUMENTS

| | | | | |
|---|---|---|---|---|
| 4,400,082 A | * | 8/1983 | Kiba | 399/102 |
| 4,602,862 A | * | 7/1986 | Wyble | 399/225 |
| 5,293,199 A | * | 3/1994 | Saito et al. | 399/103 |
| 5,634,175 A | * | 5/1997 | Michlin et al. | 399/90 |
| 5,648,838 A | * | 7/1997 | Michlin et al. | 399/119 |
| 5,799,712 A | * | 9/1998 | Kelly et al. | 141/287 |
| 6,070,028 A | * | 5/2000 | Odagawa et al. | 399/104 |
| 6,115,566 A | * | 9/2000 | Ohara et al. | 399/103 |
| 6,215,969 B1 | * | 4/2001 | Nomura et al. | 399/111 |

\* cited by examiner

*Primary Examiner*—Sophia S. Chen

(57) ABSTRACT

Electrical contact devices for supplying a bias voltage to a developer roller and a primary charge roller of a toner cartridge used in an image forming system. The electricity may be communicated through electrical contact devices with or without modular inserts, using spring wires, flat springs, coil springs, unicorn springs, endfelt seals that also act as bias voltage contacts, magnetic seals that also act as bias voltage contacts, insulator spacers that also act as bias voltage contacts, scraper devices that also act as bias voltage contacts, and two legged spring contacts. Also, improved endfelts may be made using a combination of foam that has been flocked or with a surface of fibers that simulates a velvet surface and even a conductive flocking where the endfelt seal may act both as a seal and also an electrical contact. Also, magnetic seals which are hard and previously spaced a fixed distance from the developer roller may be flocked to allow the developer roller to come closer where the flock surface will act softly to protect the surface of the developer roller. Also, the developer roller may be directly flocked near the ends, where the endfelts would set the spacing between the developer roller and the photoreceptor, instead of using prior art insulator spacers or insulator bushings to set the spacing therebetween.

70 Claims, 80 Drawing Sheets

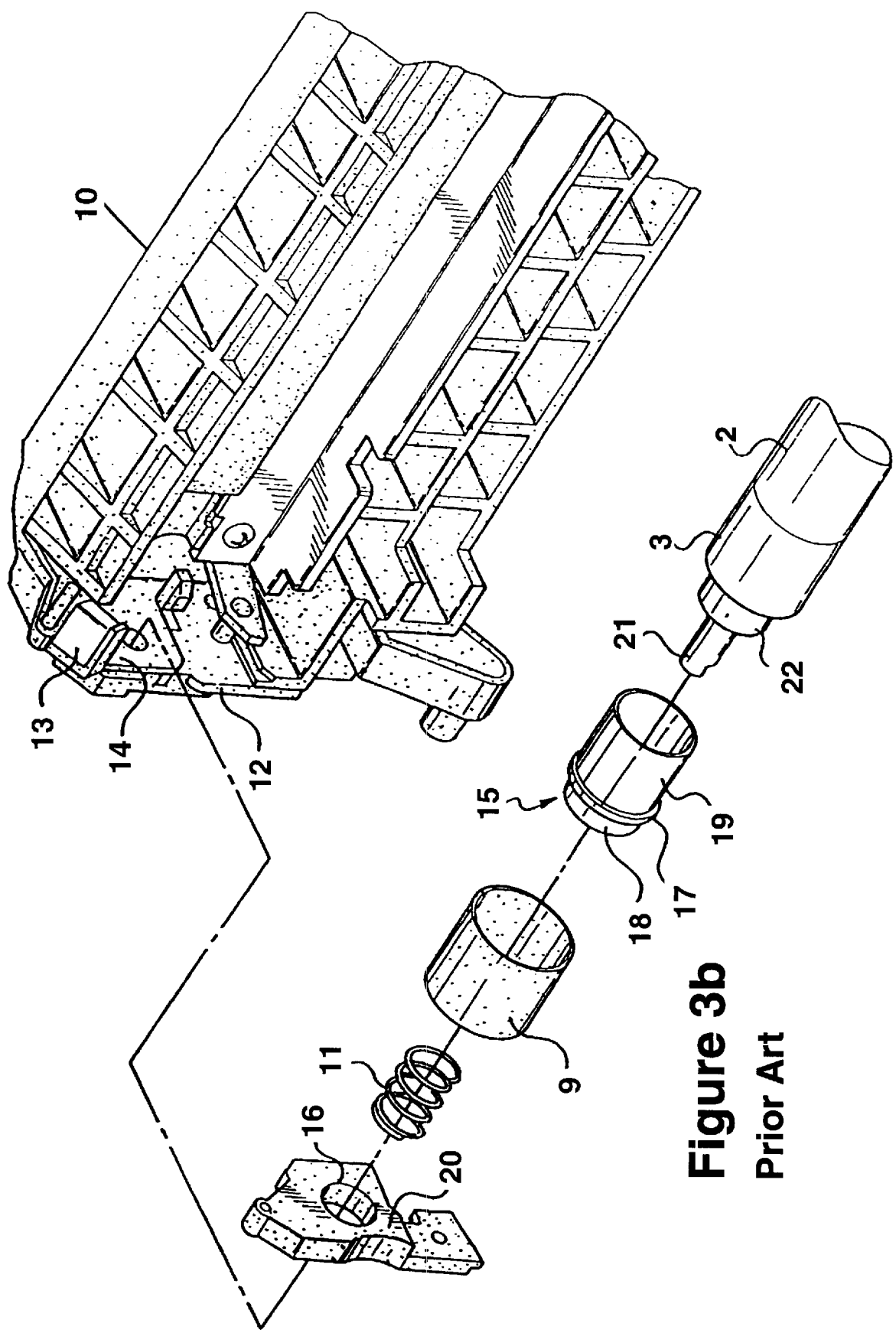

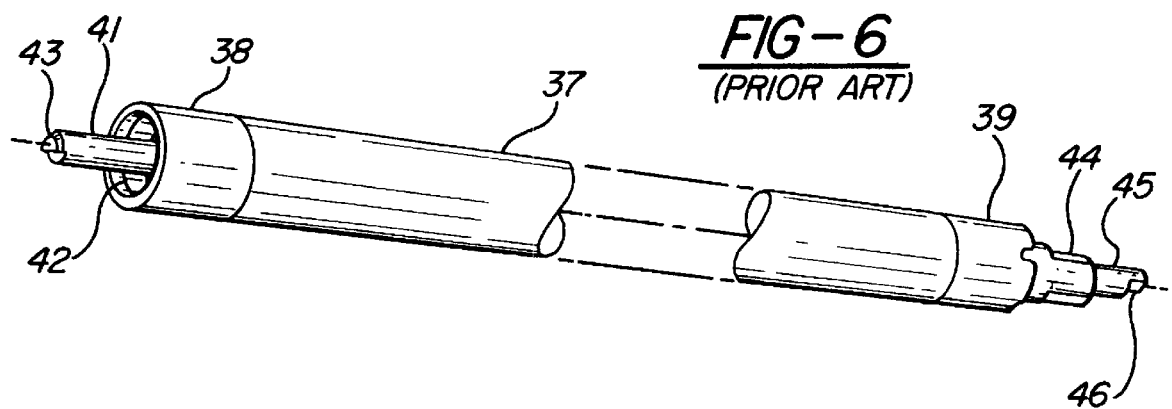
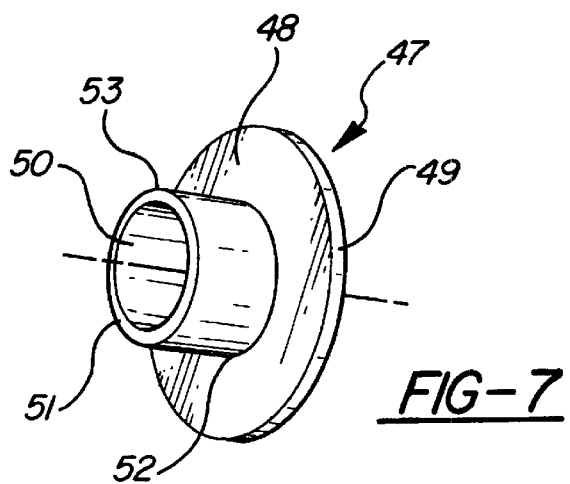
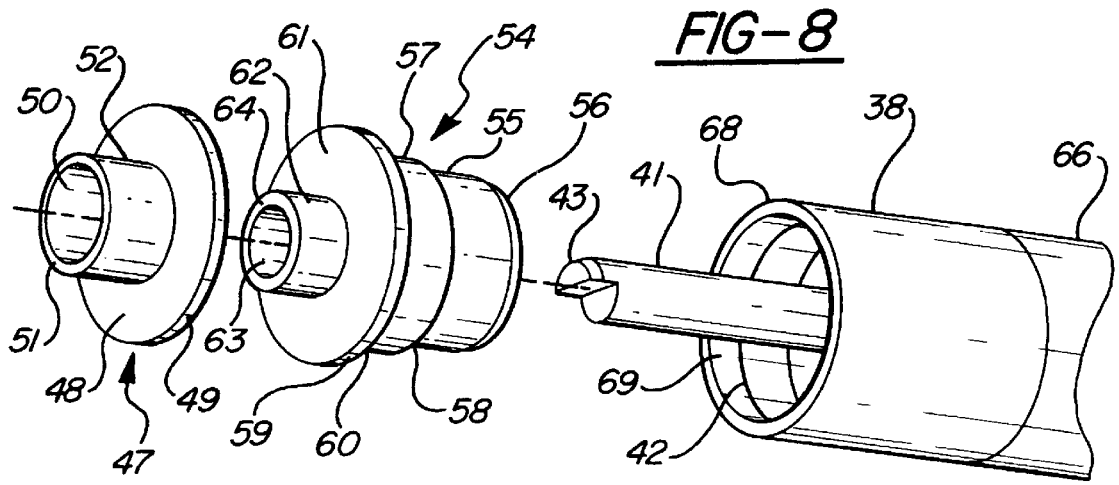

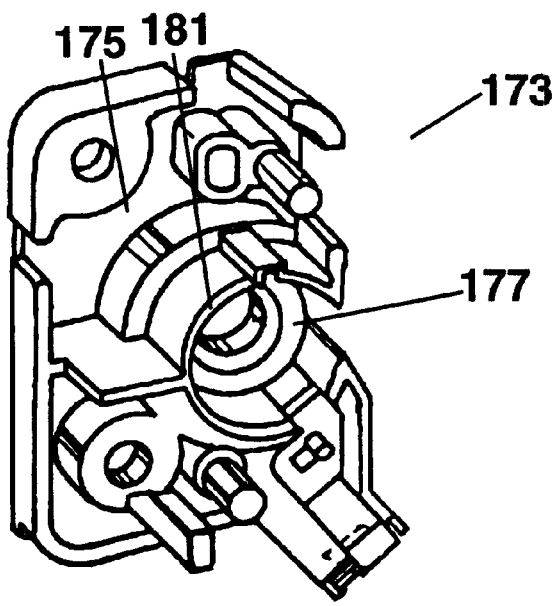
Figure 6a
Prior Art
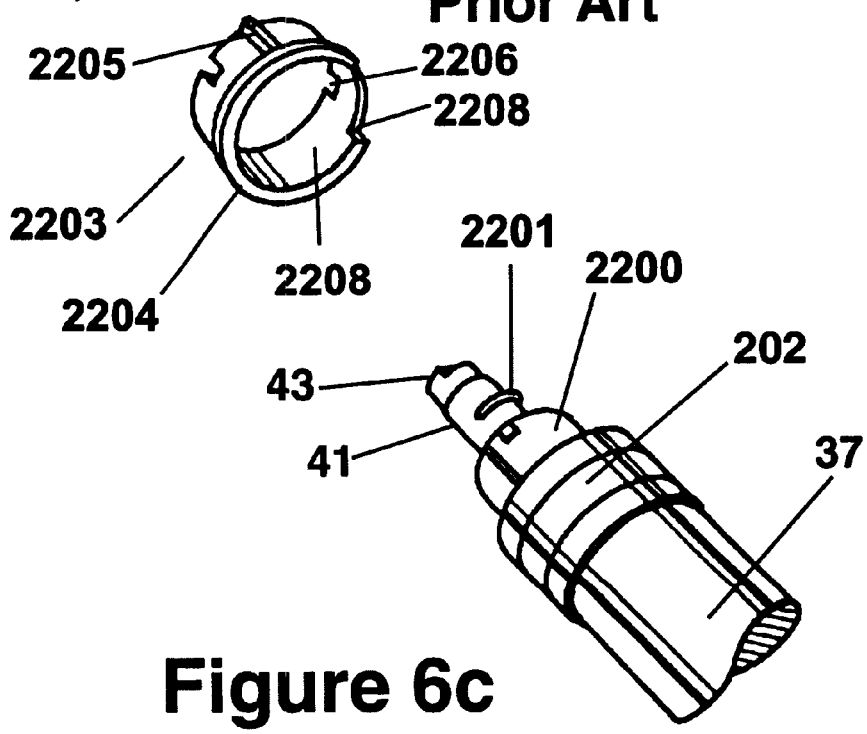
Figure 6b
Prior Art
Figure 6c
Prior Art

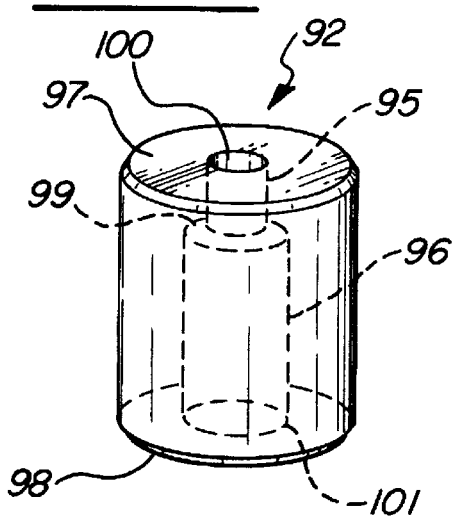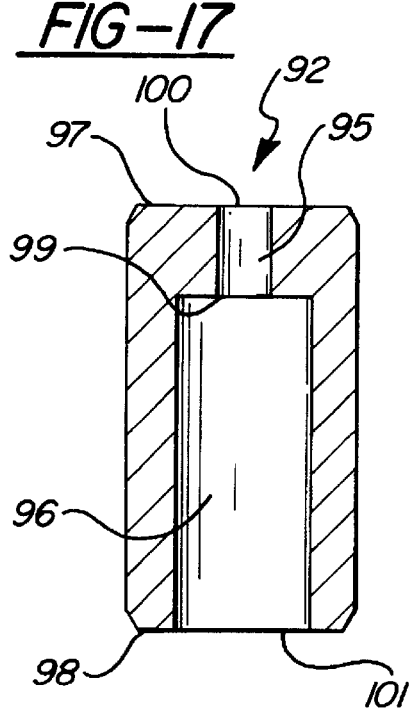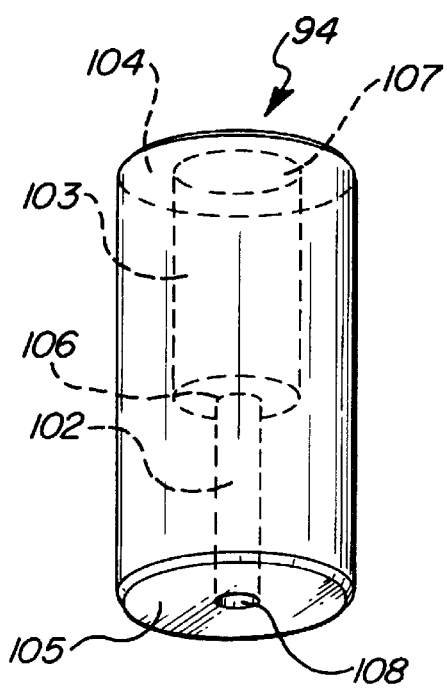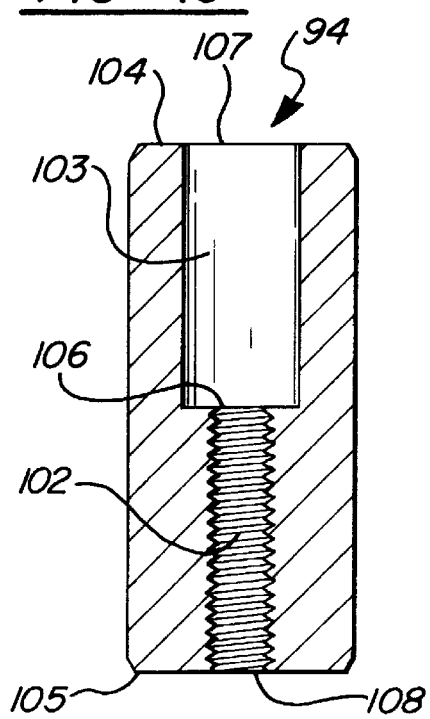

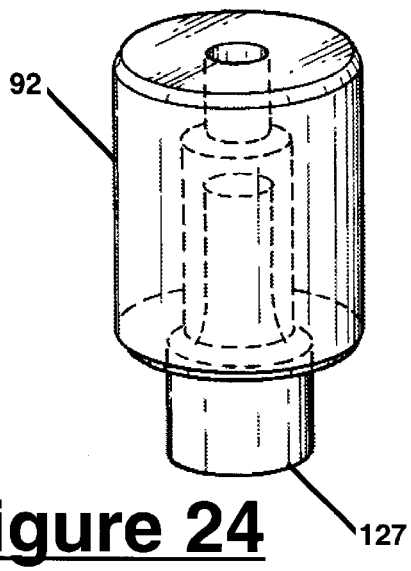
Figure 24
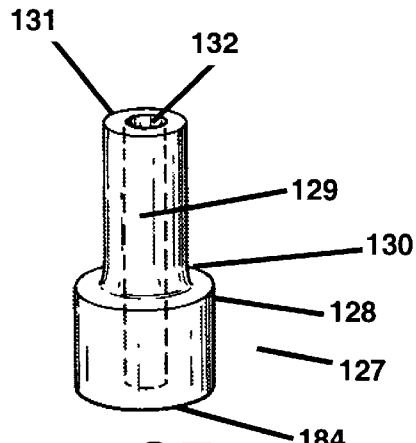
Figure 25
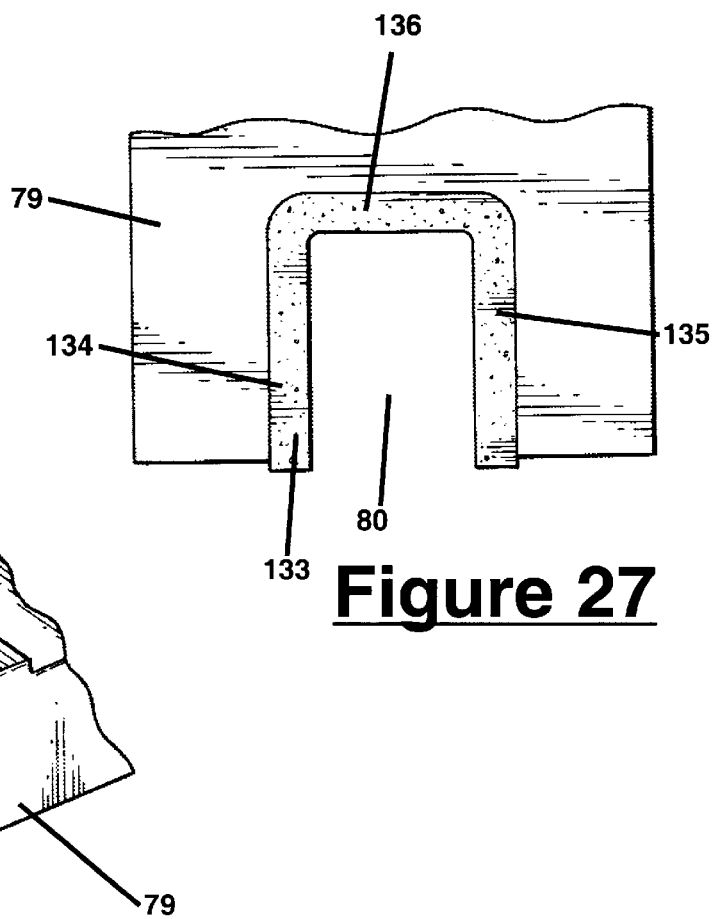
Figure 27
Figure 26

Figure 29
(PRIOR ART)
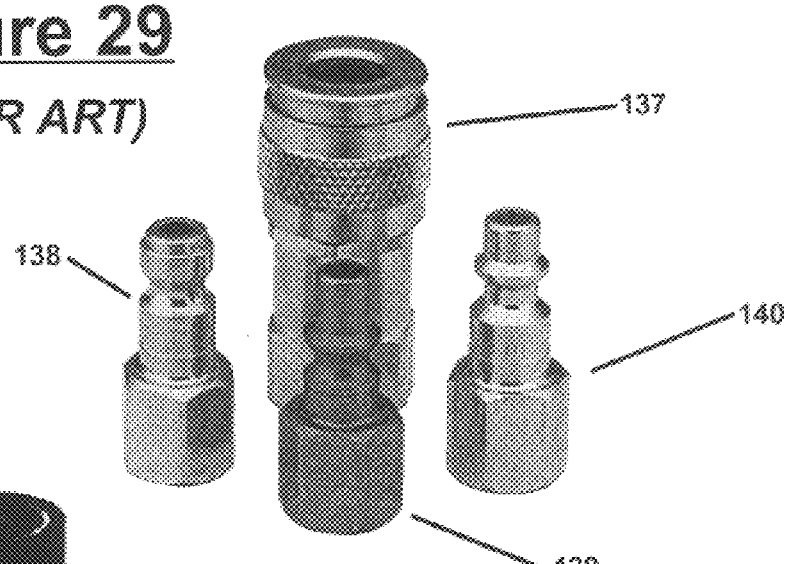
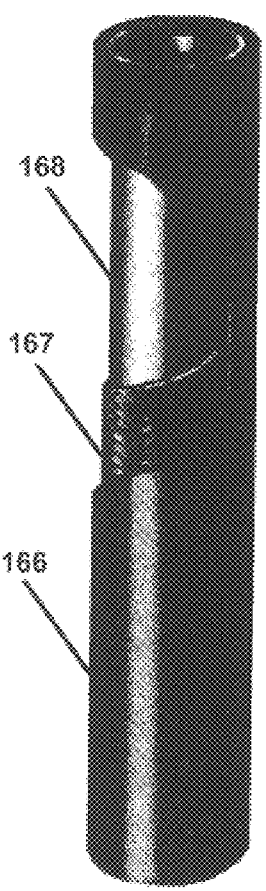
Figure 35
(PRIOR ART)
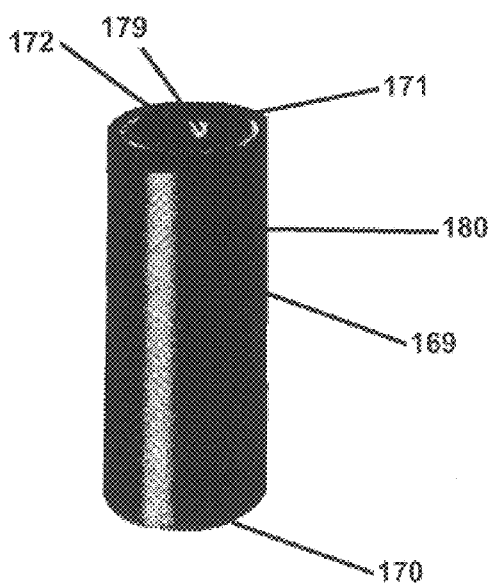
Figure 36

Figure 44
Prior Art
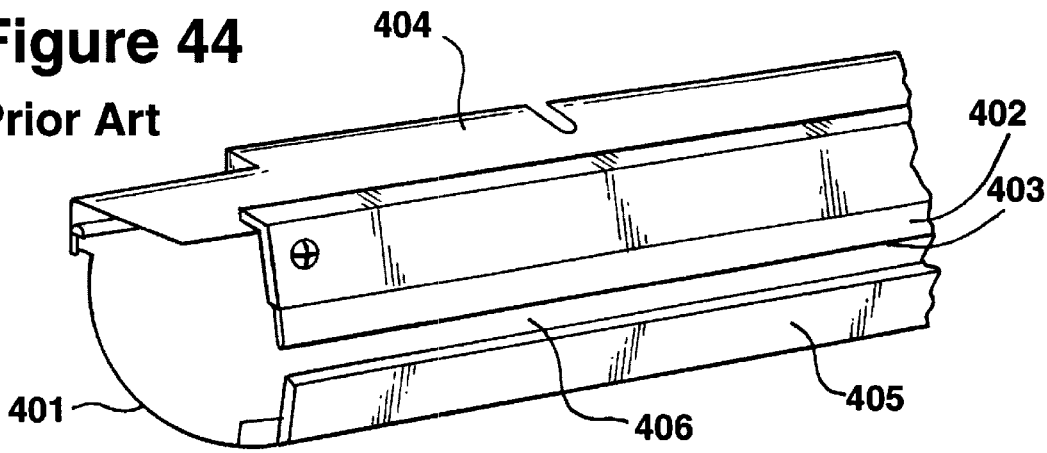
Figure 45
Prior Art
Figure 46
Prior Art
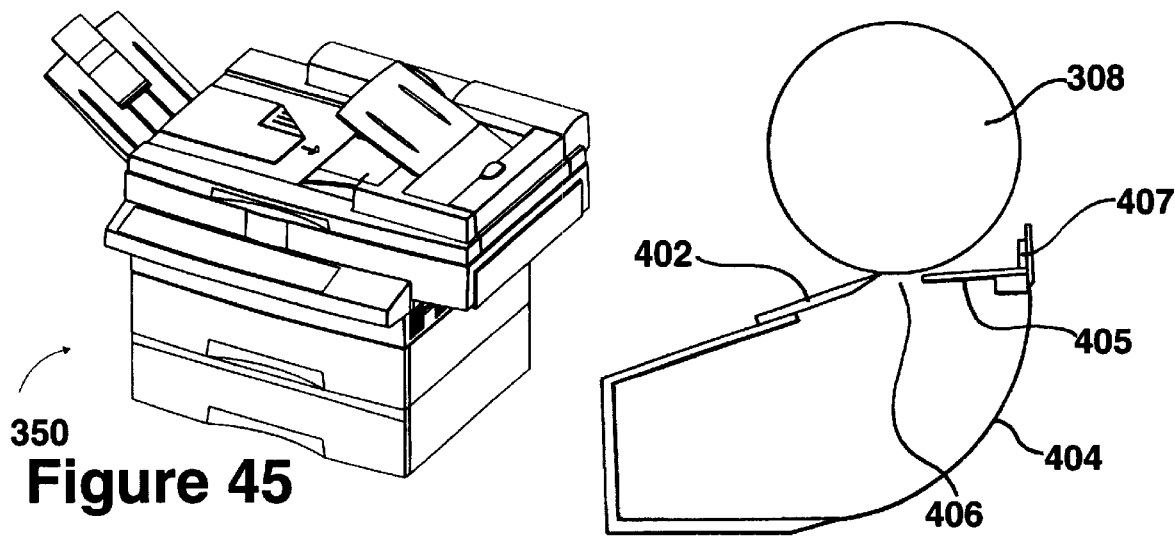
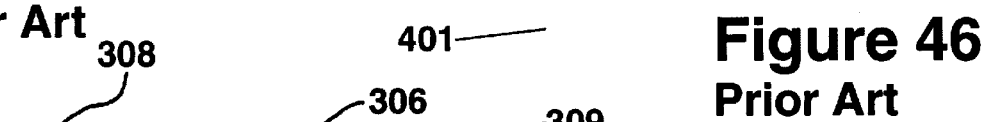
Figure 47
Prior Art
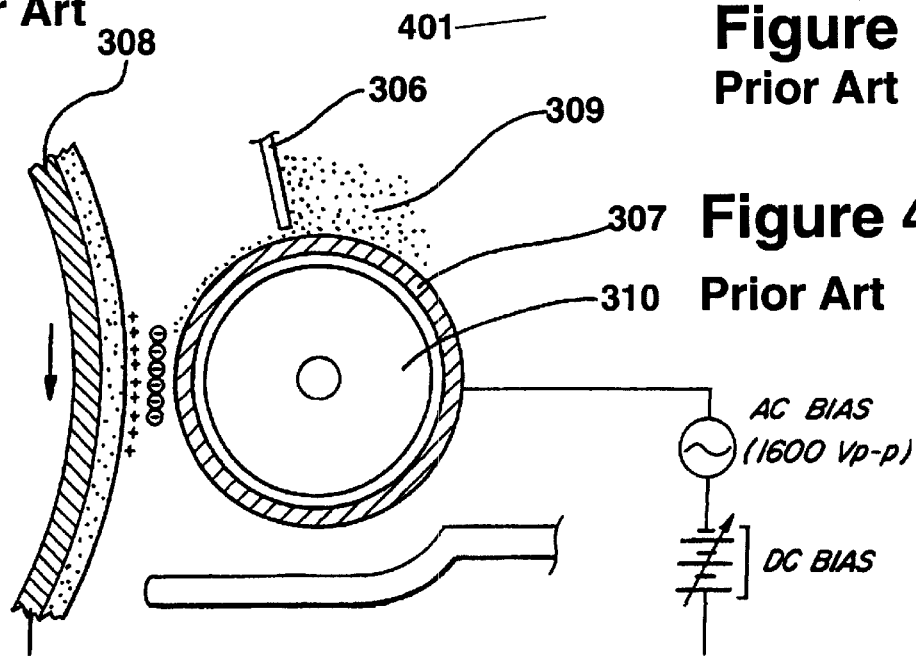

Figure 67
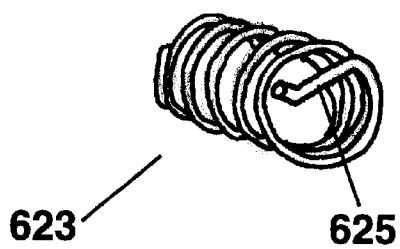
Figure 68
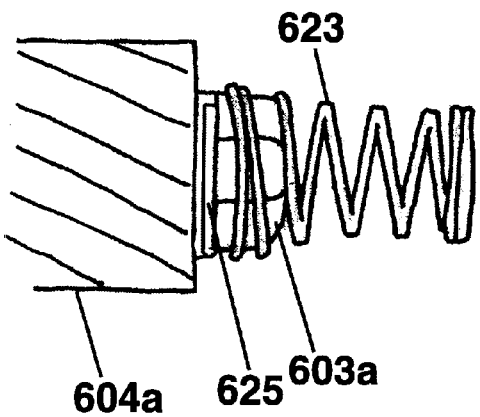
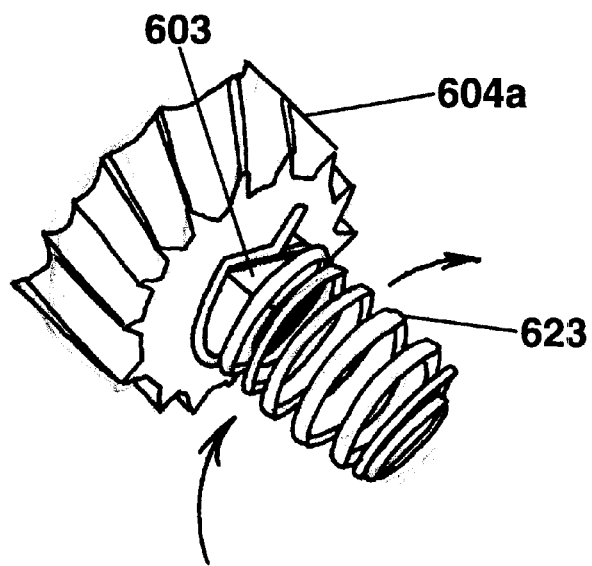
Figure 69
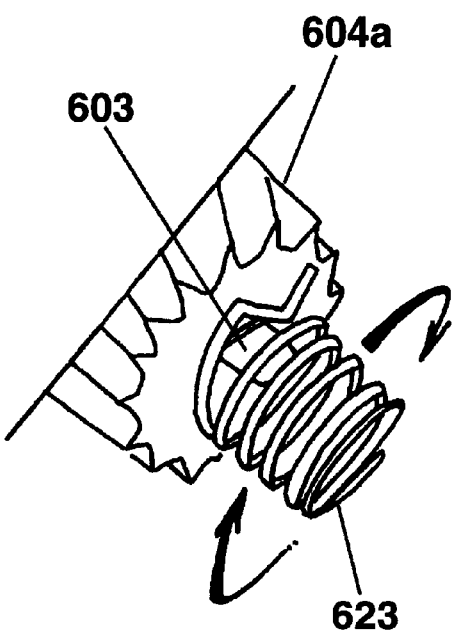
Figure 70

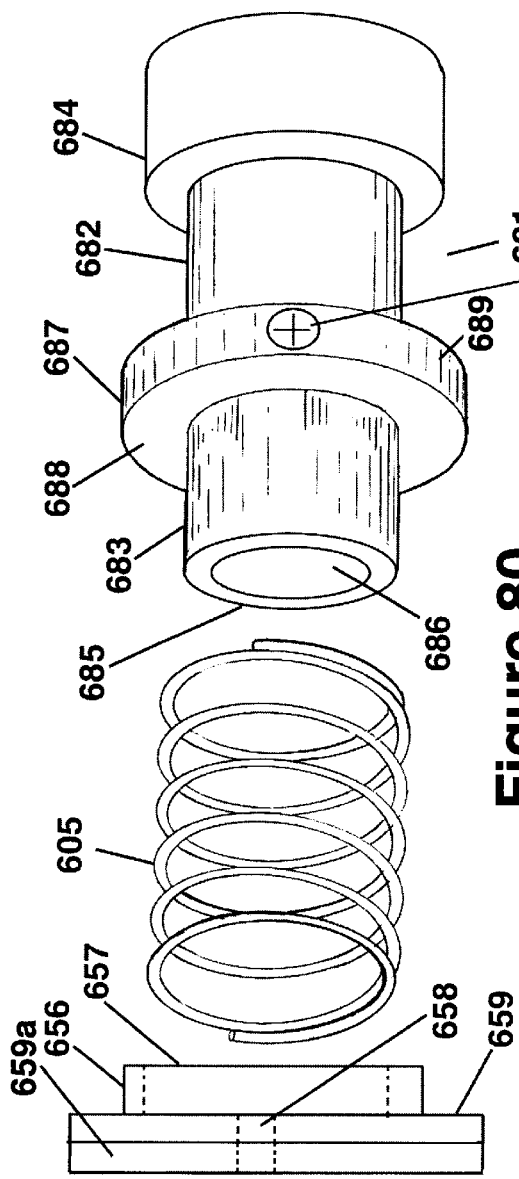
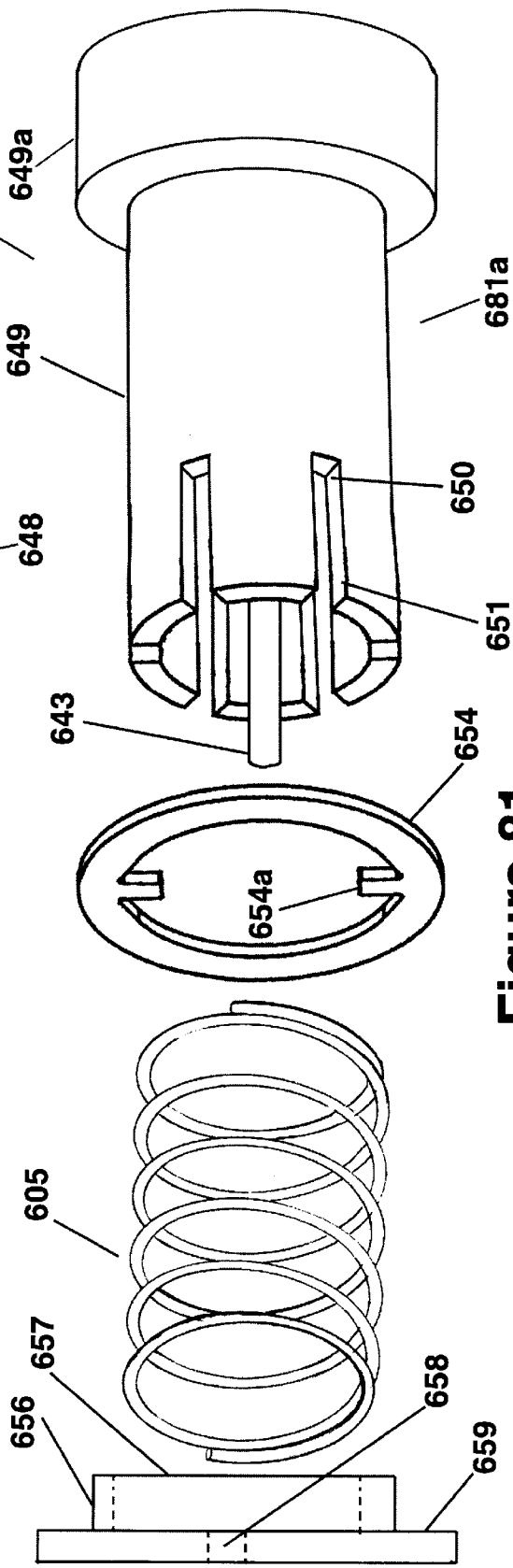
Figure 80
Figure 81

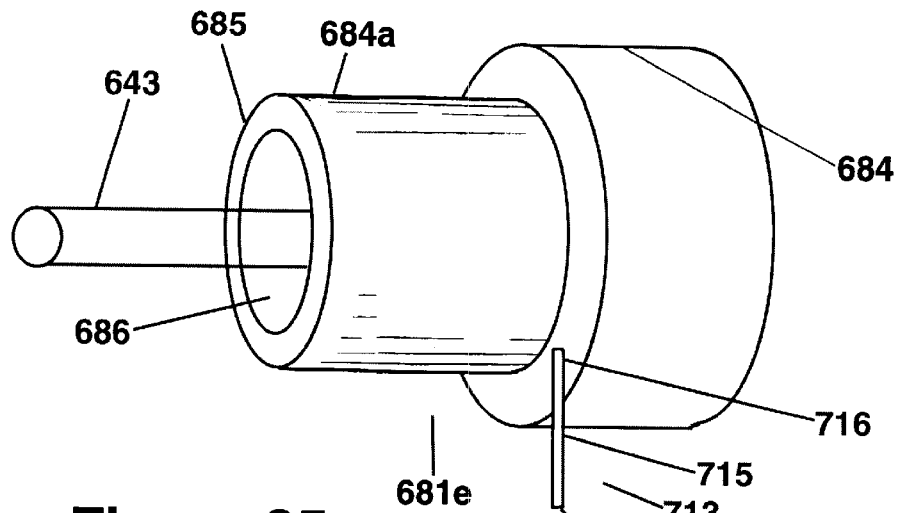
Figure 85
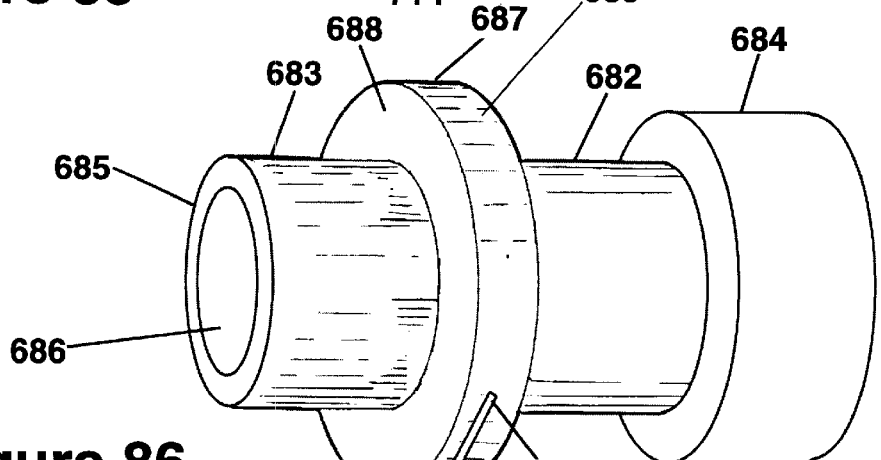
Figure 86
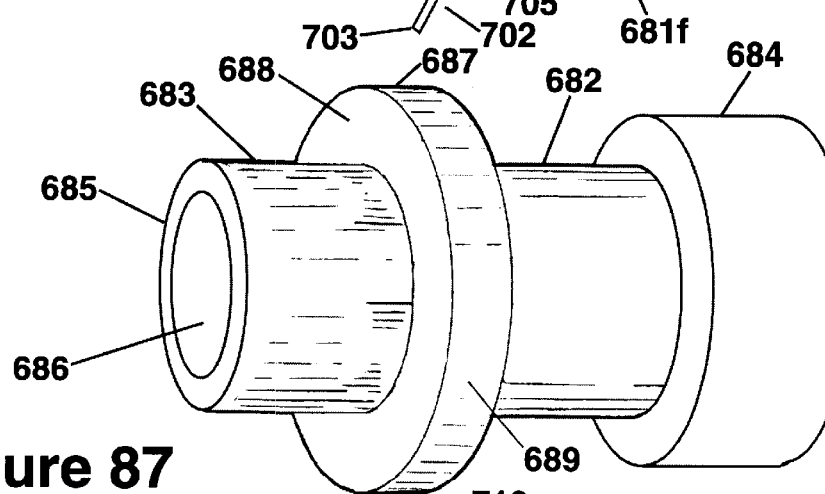
Figure 87
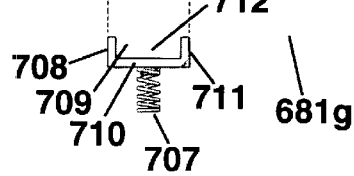

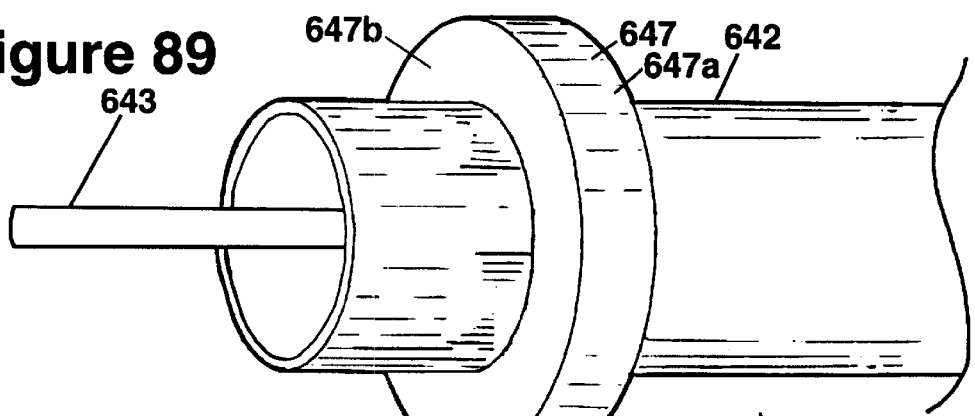
Figure 89
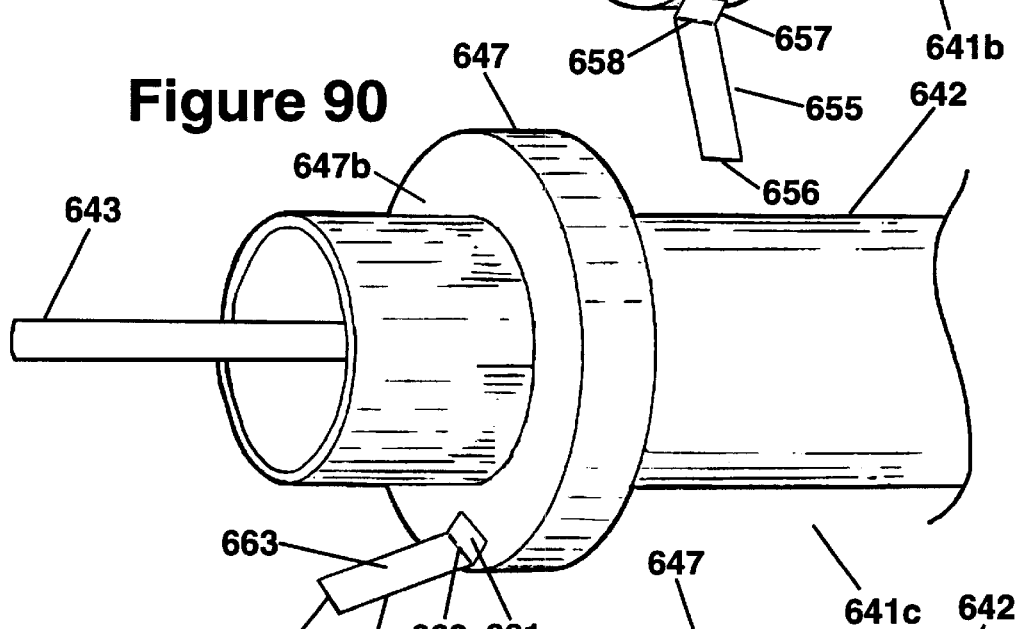
Figure 90
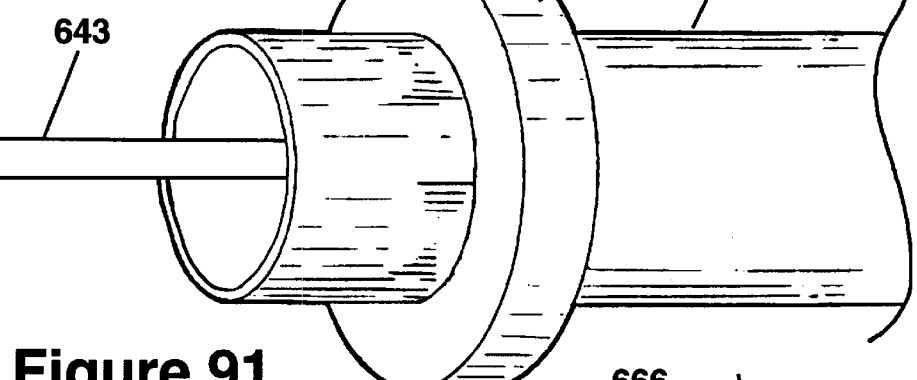
Figure 91
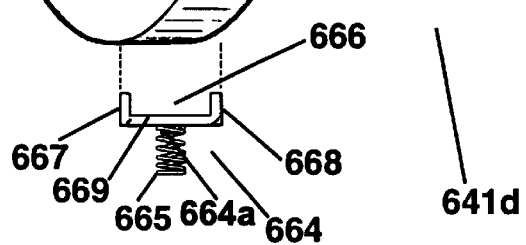

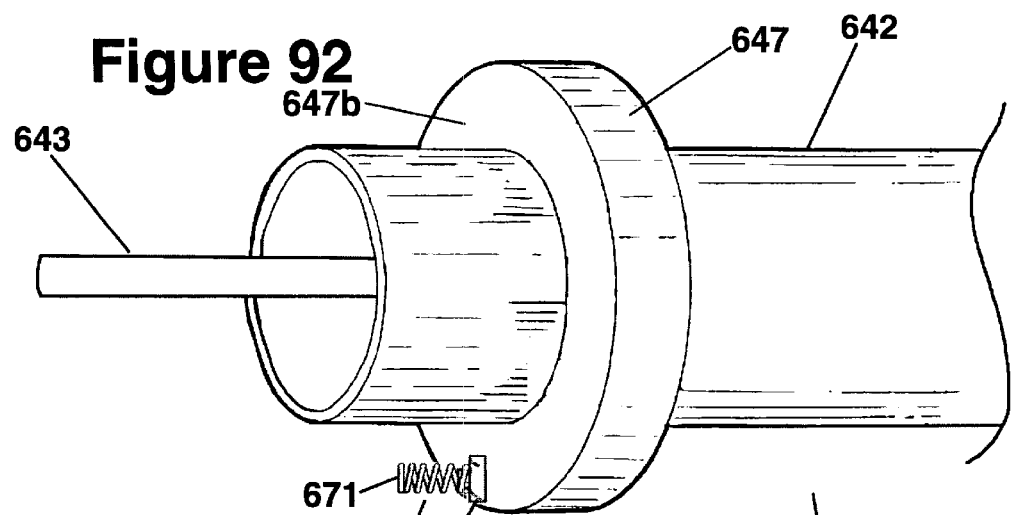
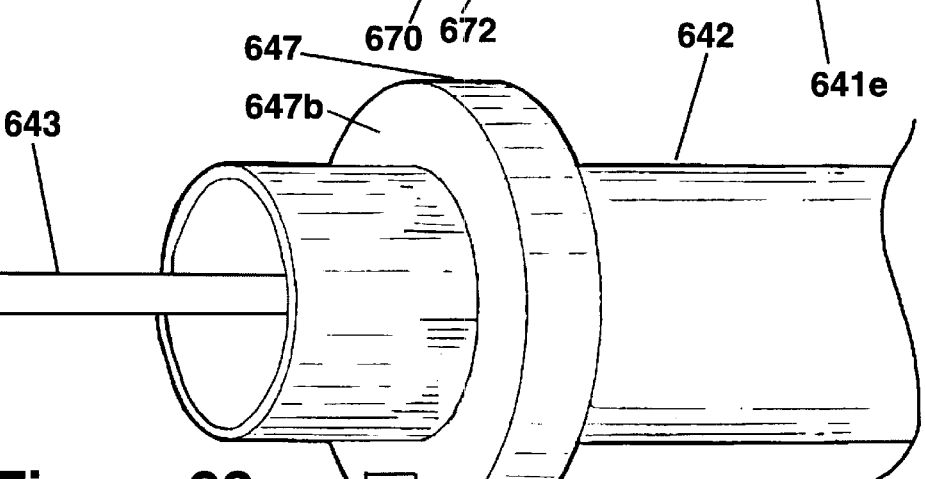
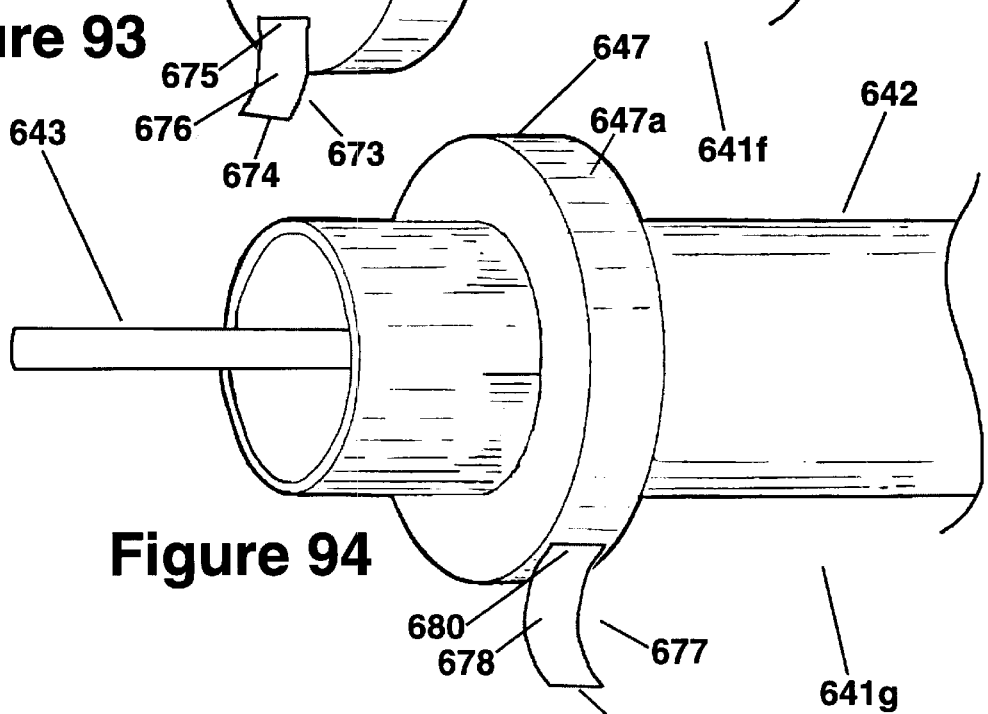

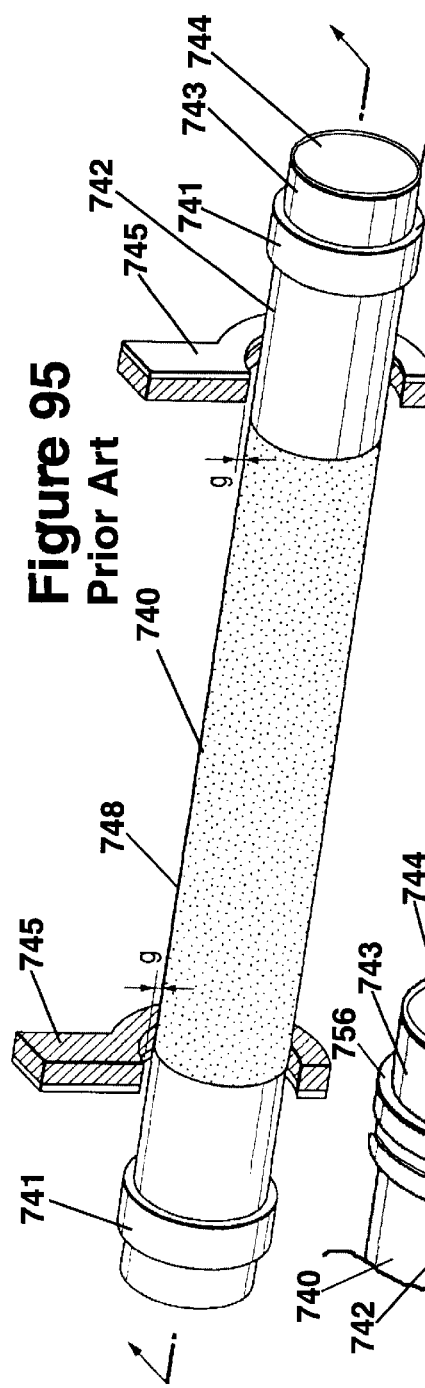
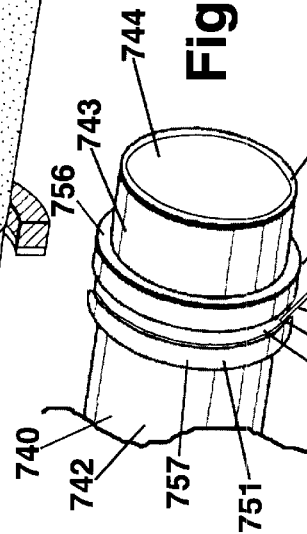
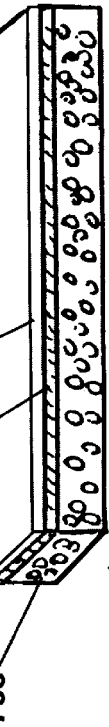
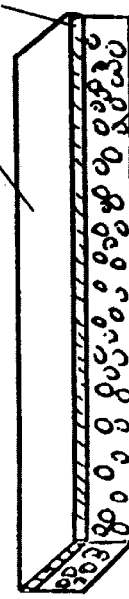
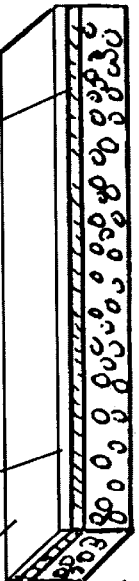
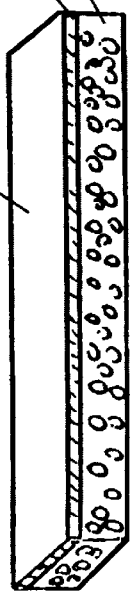

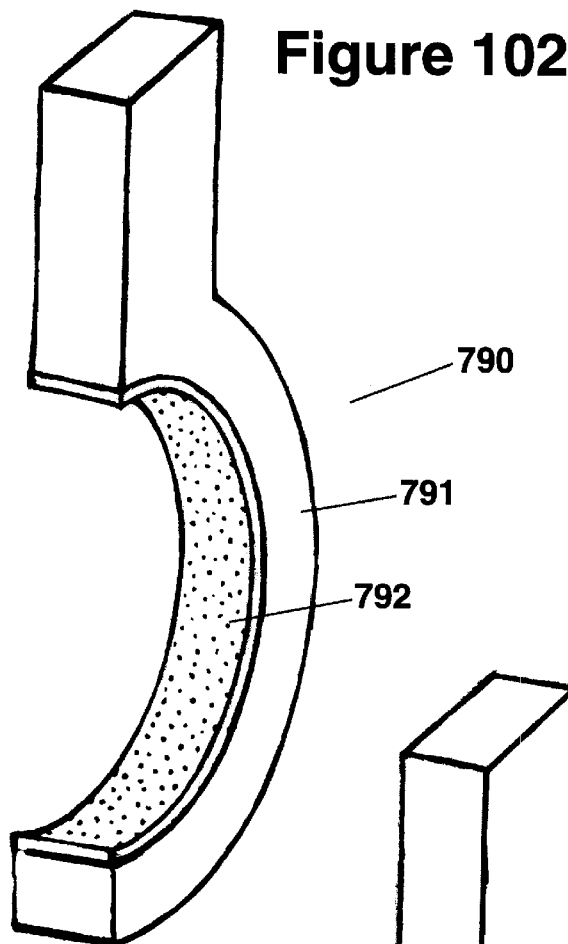
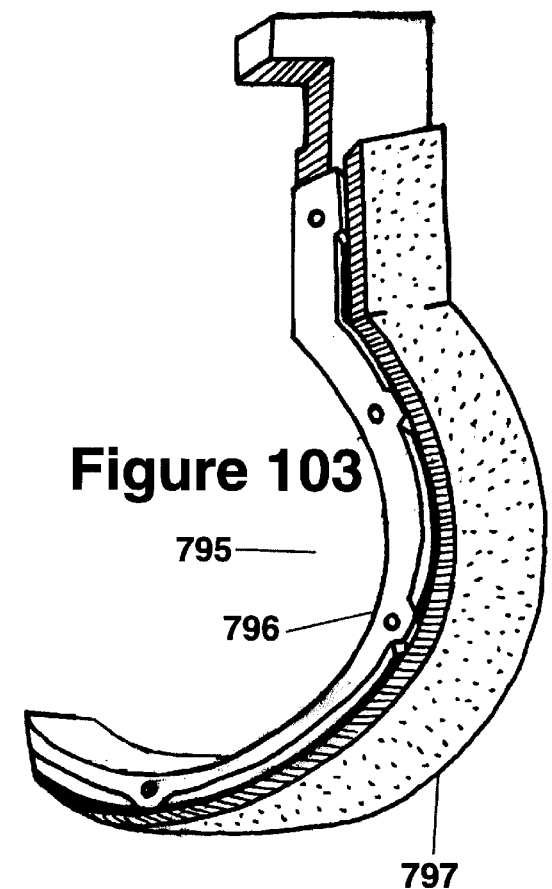
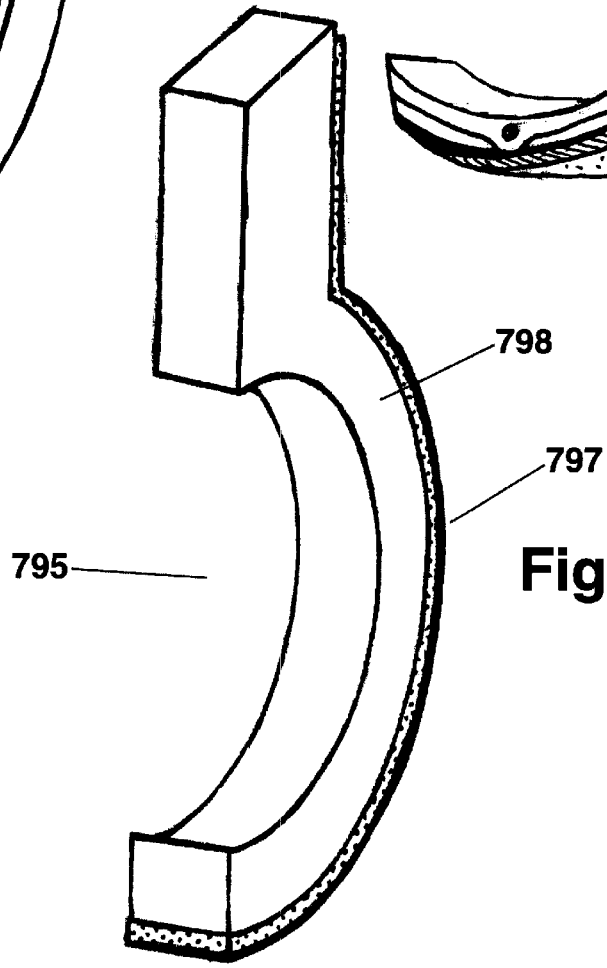

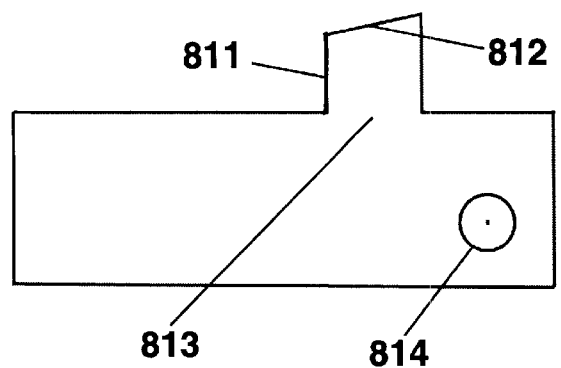
Figure 107
Prior Art
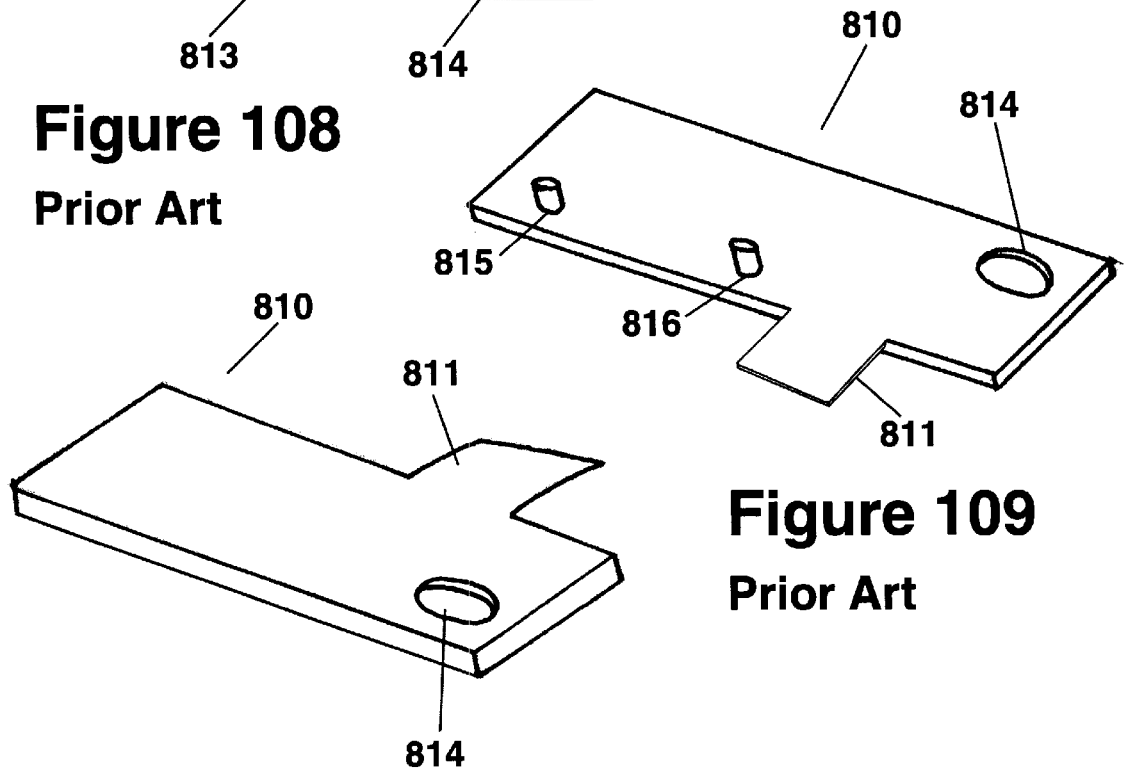
Figure 108
Prior Art
Figure 109
Prior Art
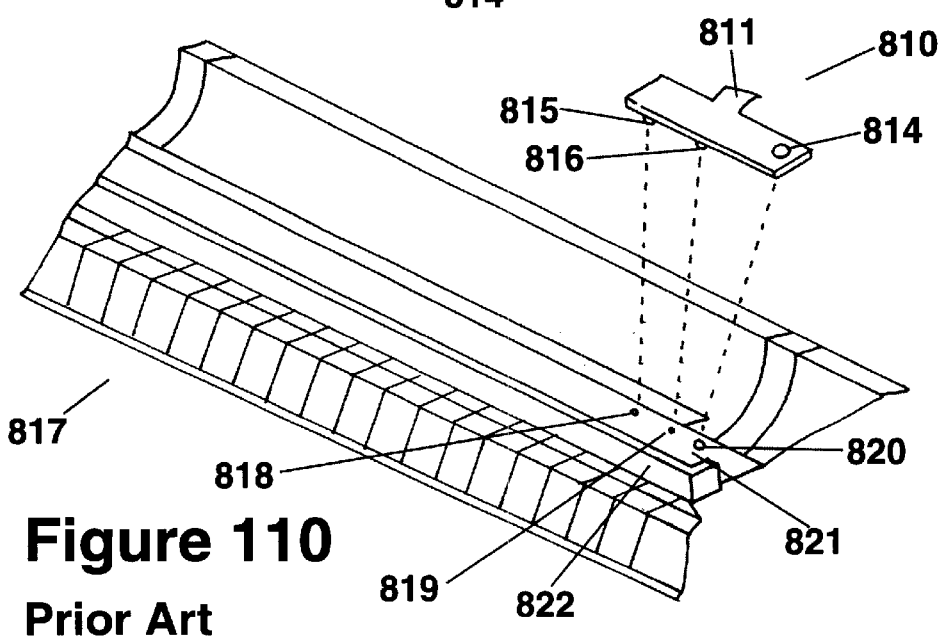
Figure 110
Prior Art

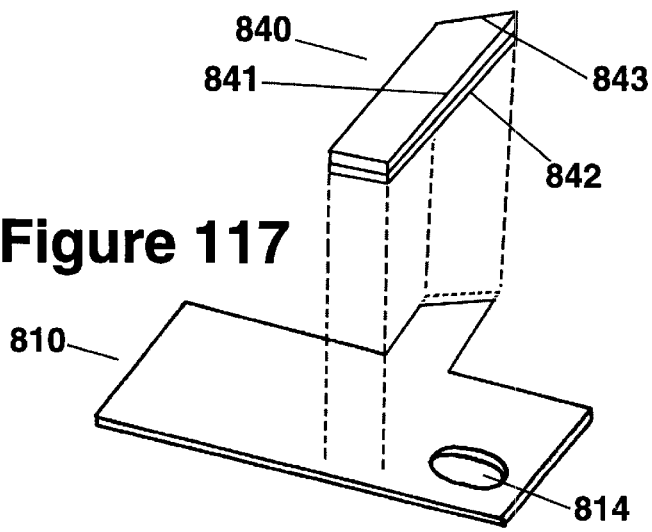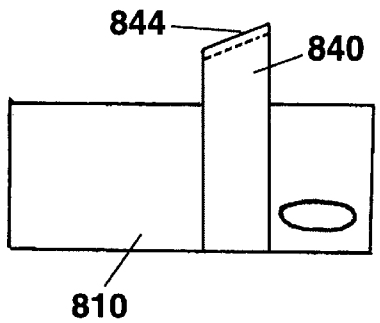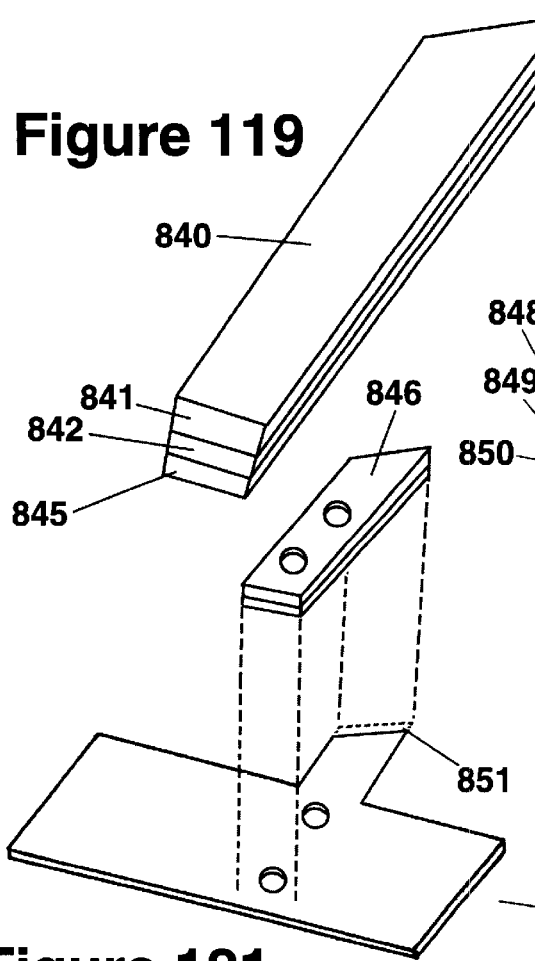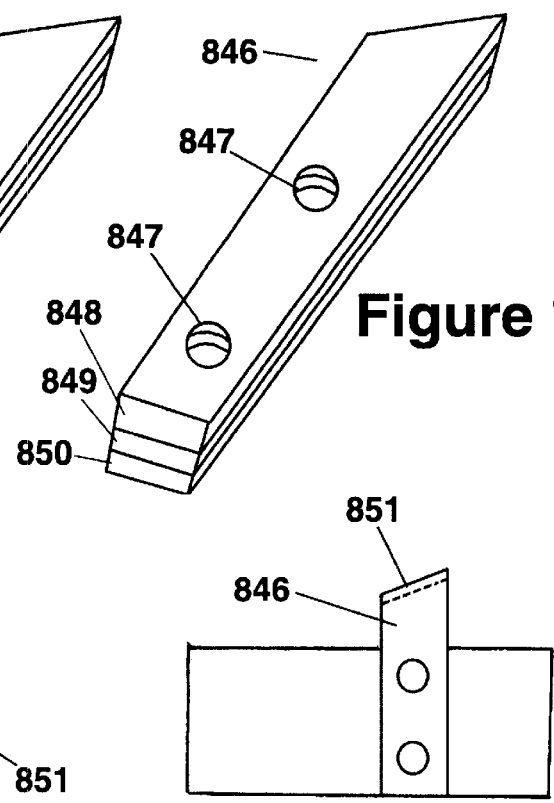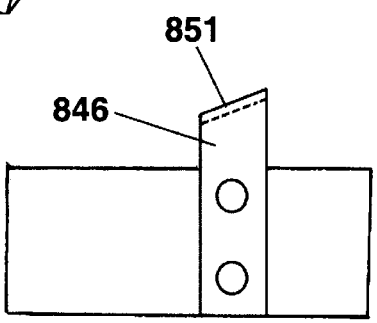
Figure 117
Figure 118
Figure 119
Figure 120
Figure 121
Figure 122

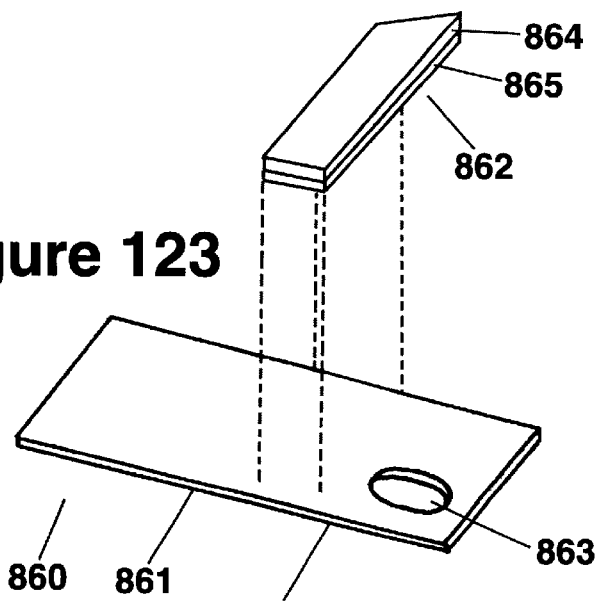
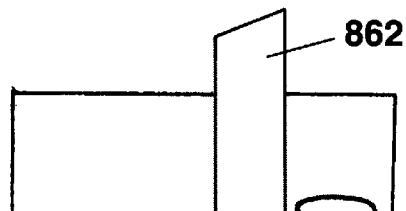
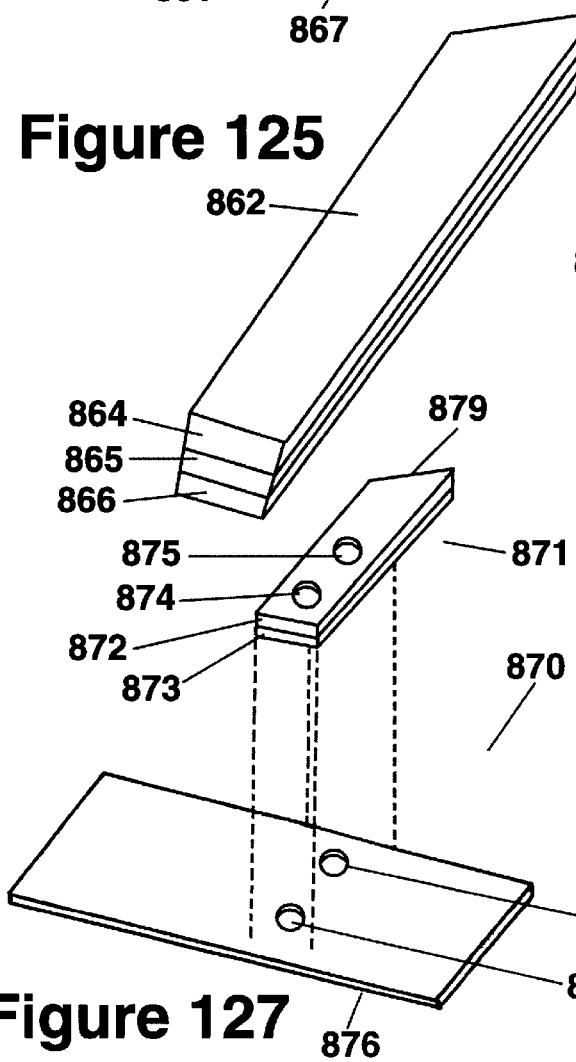
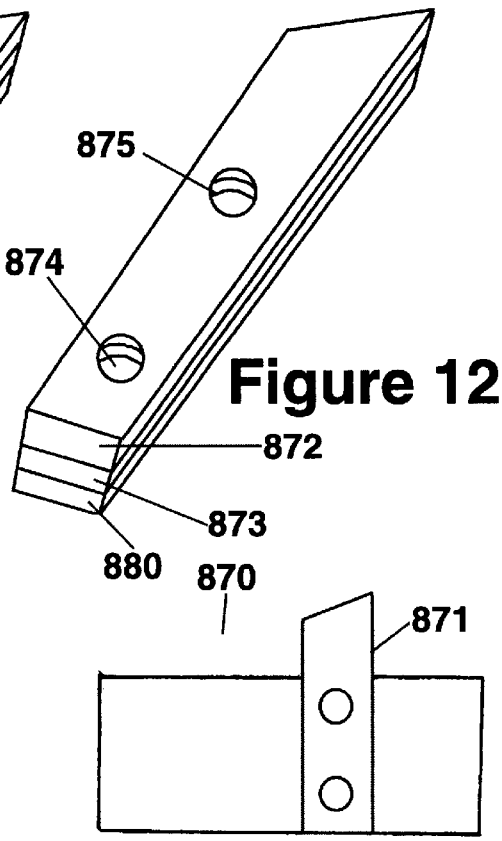
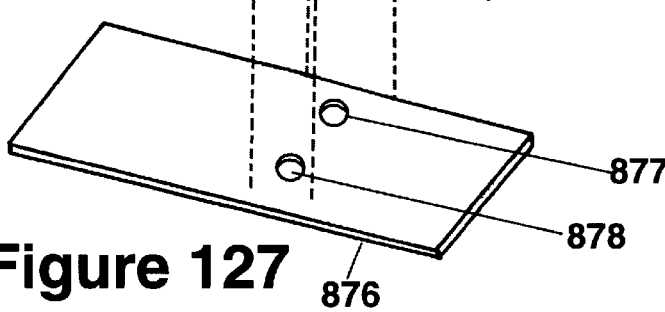

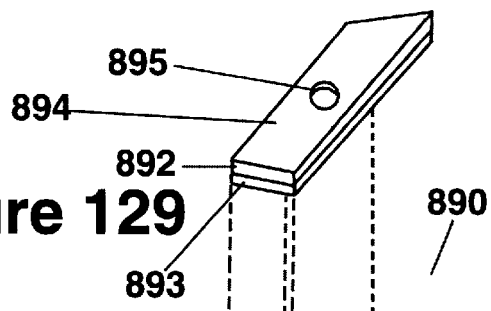
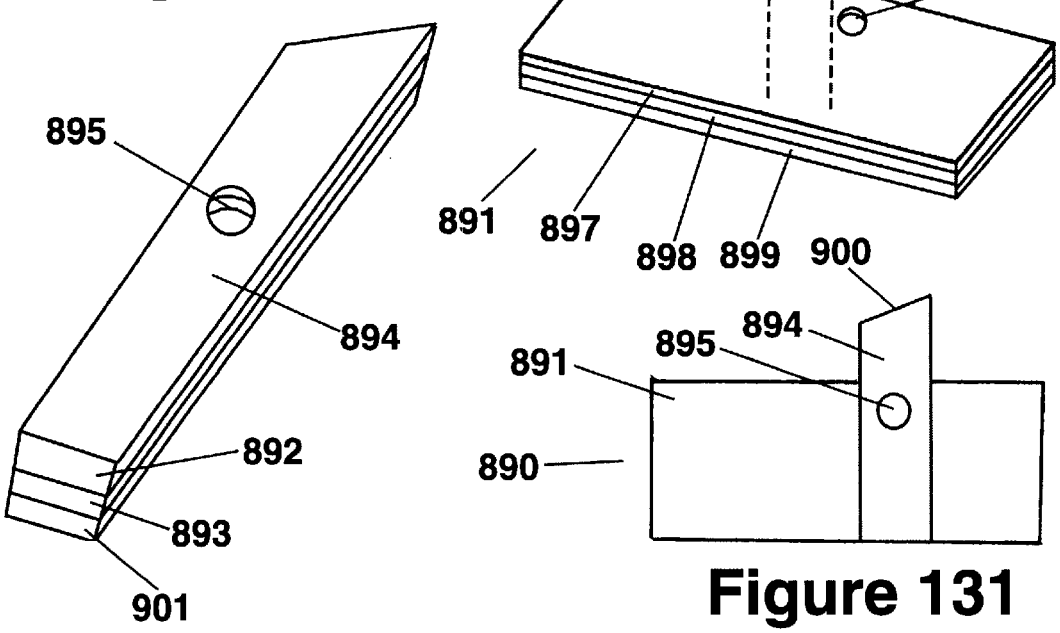
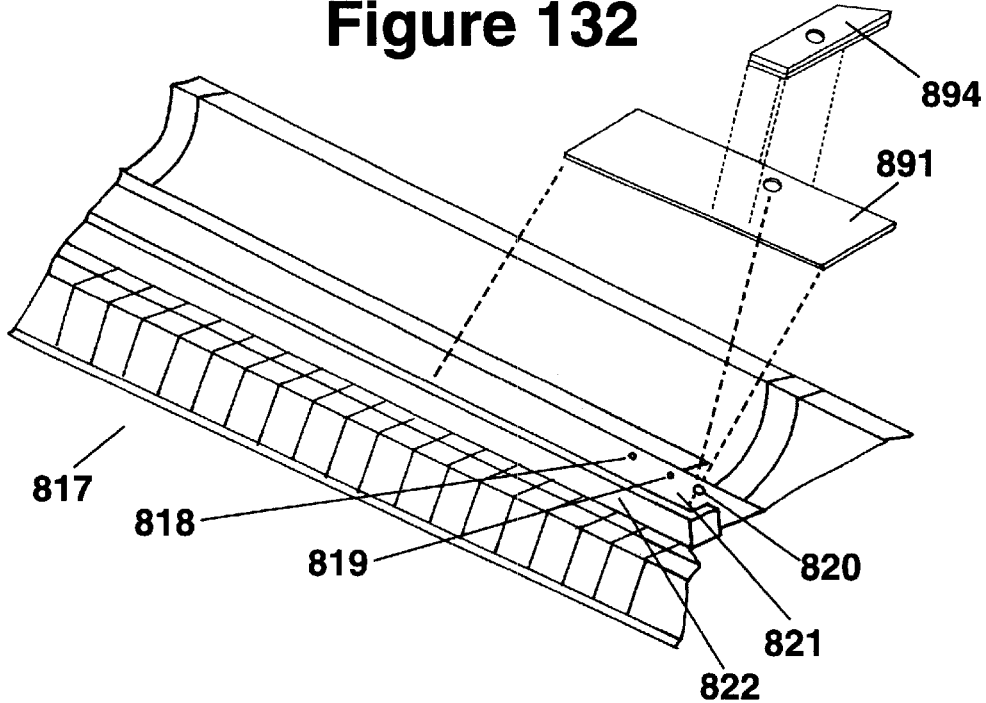

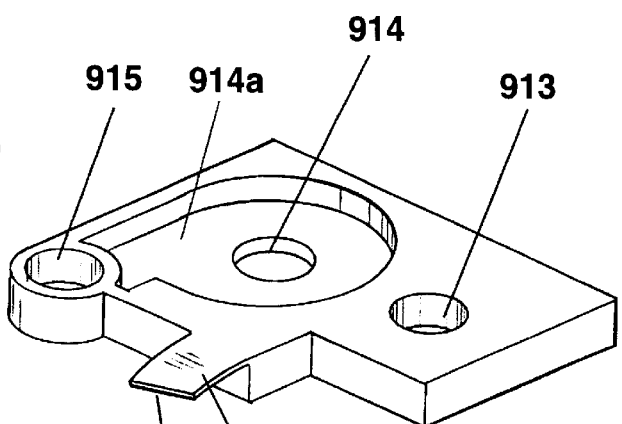
Figure 133
Prior Art
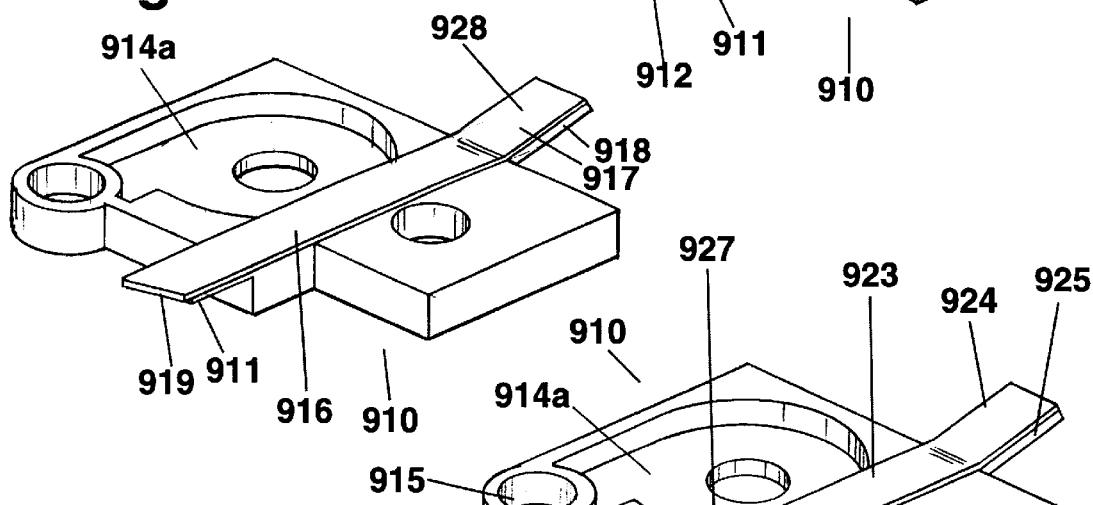
Figure 134
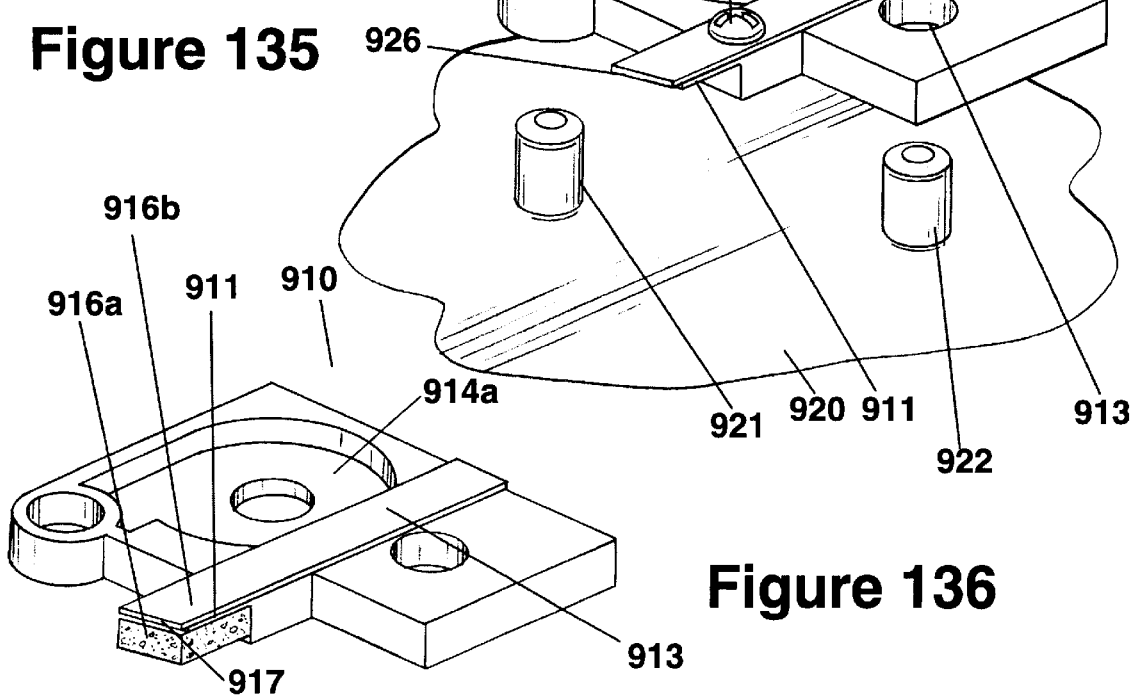
Figure 135
Figure 136

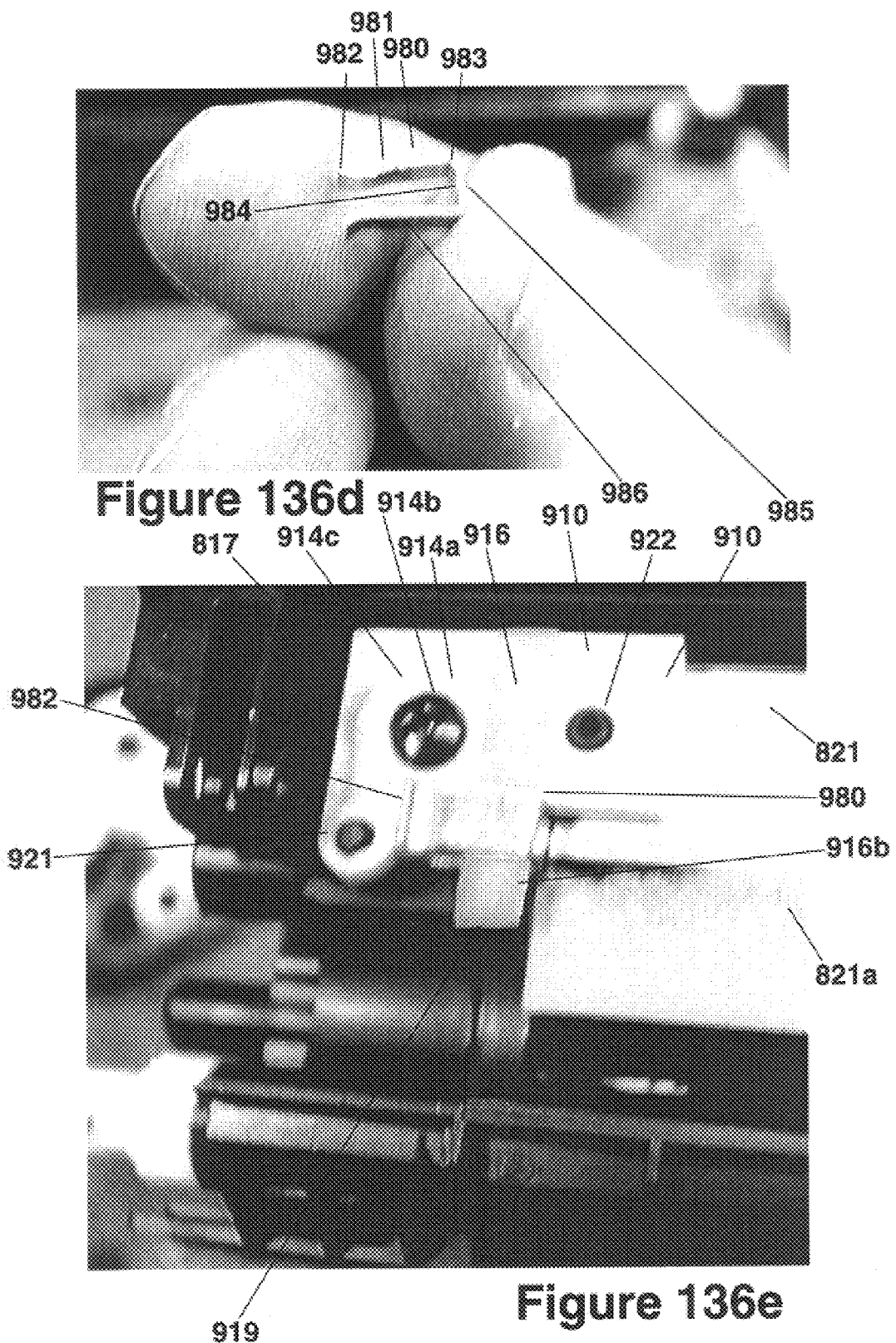

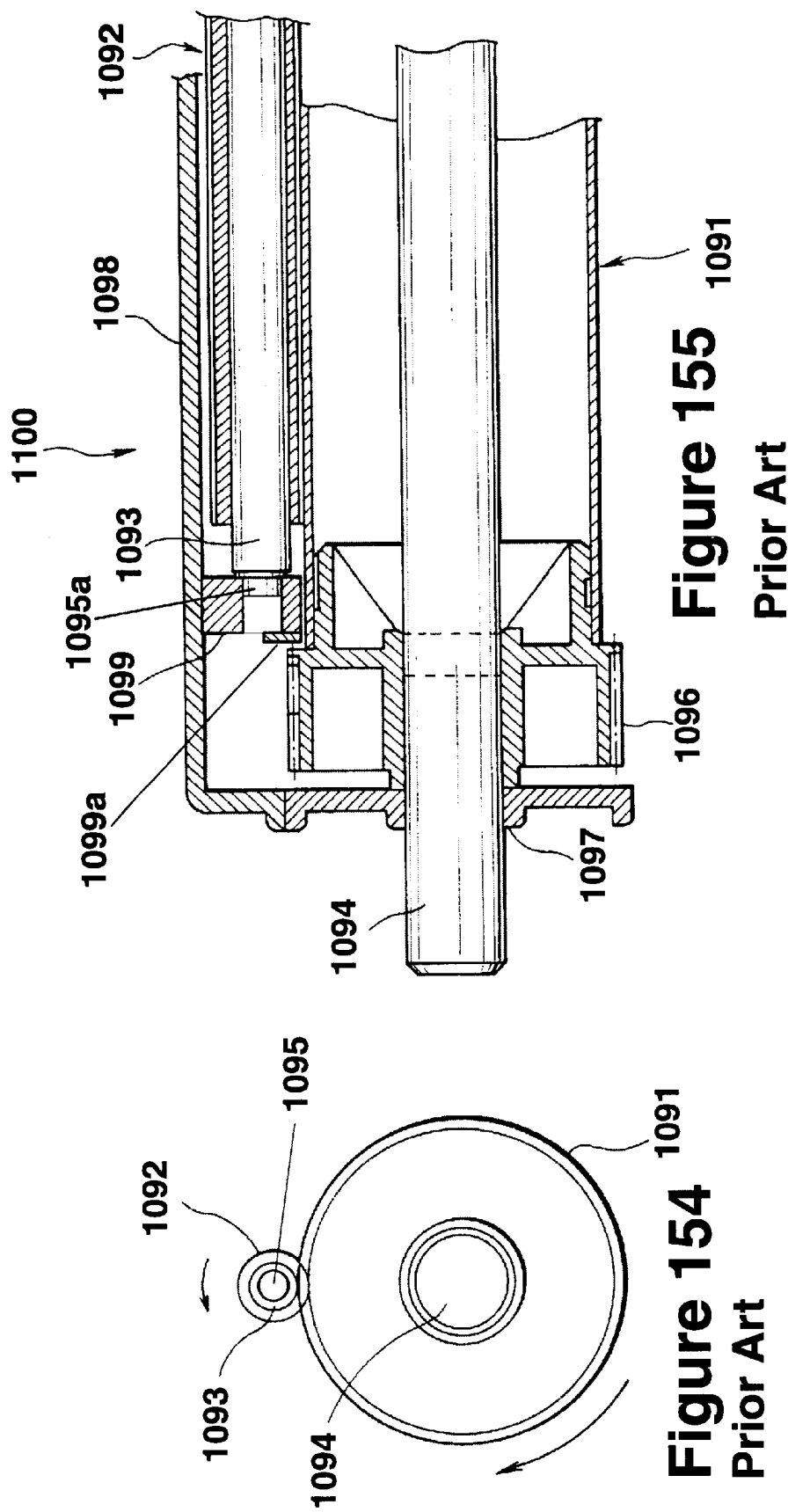

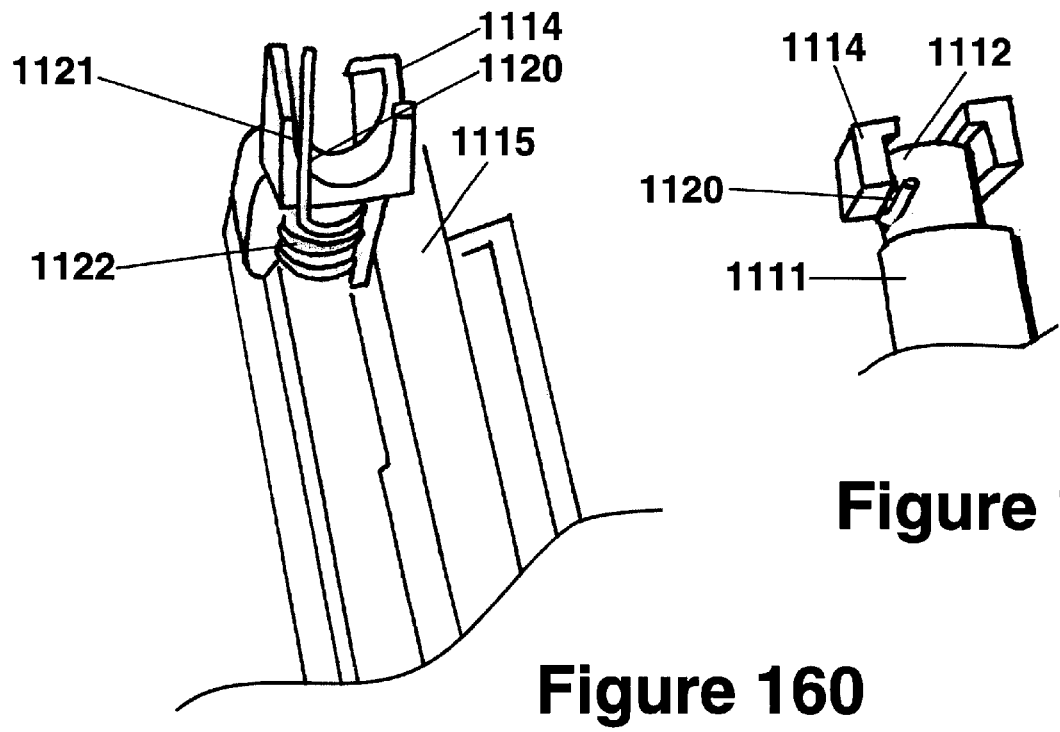
Figure 161
Figure 160
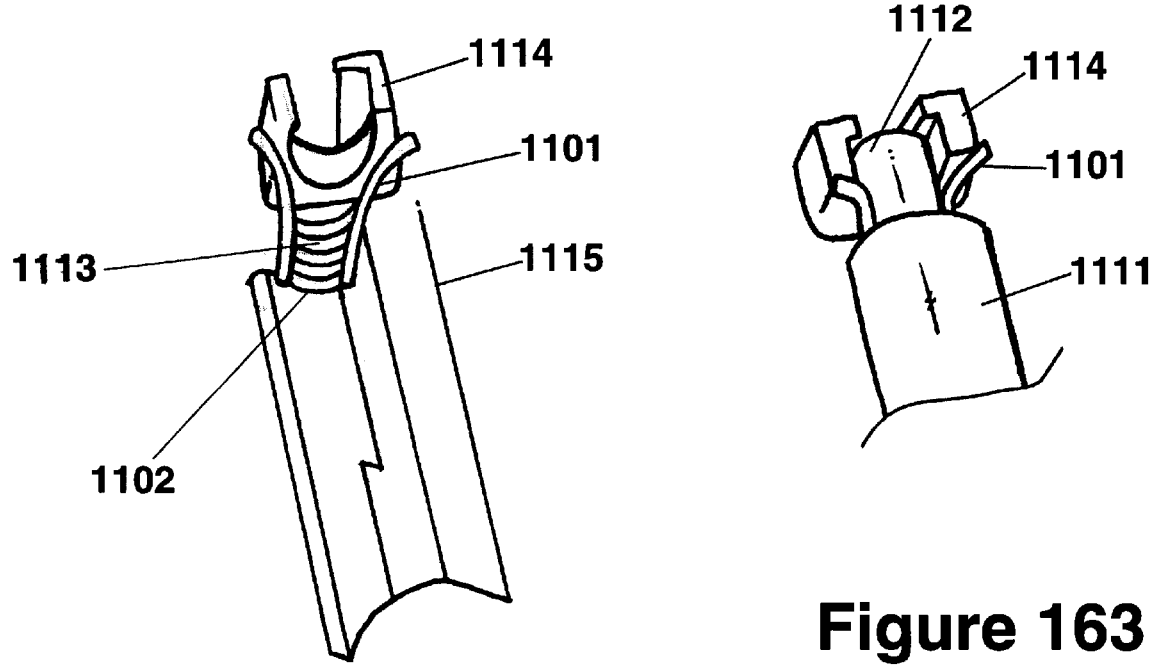
Figure 163
Figure 162

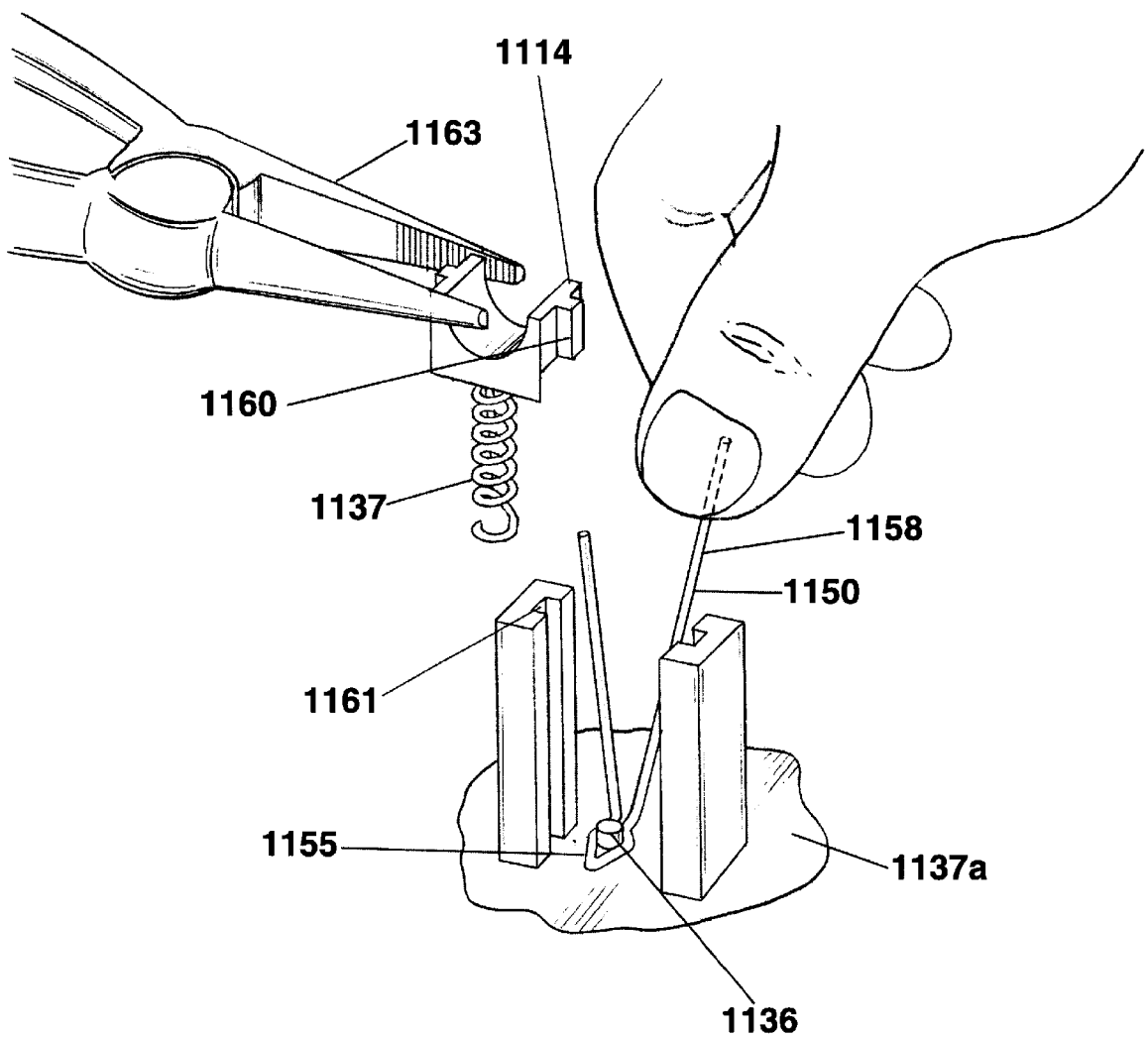

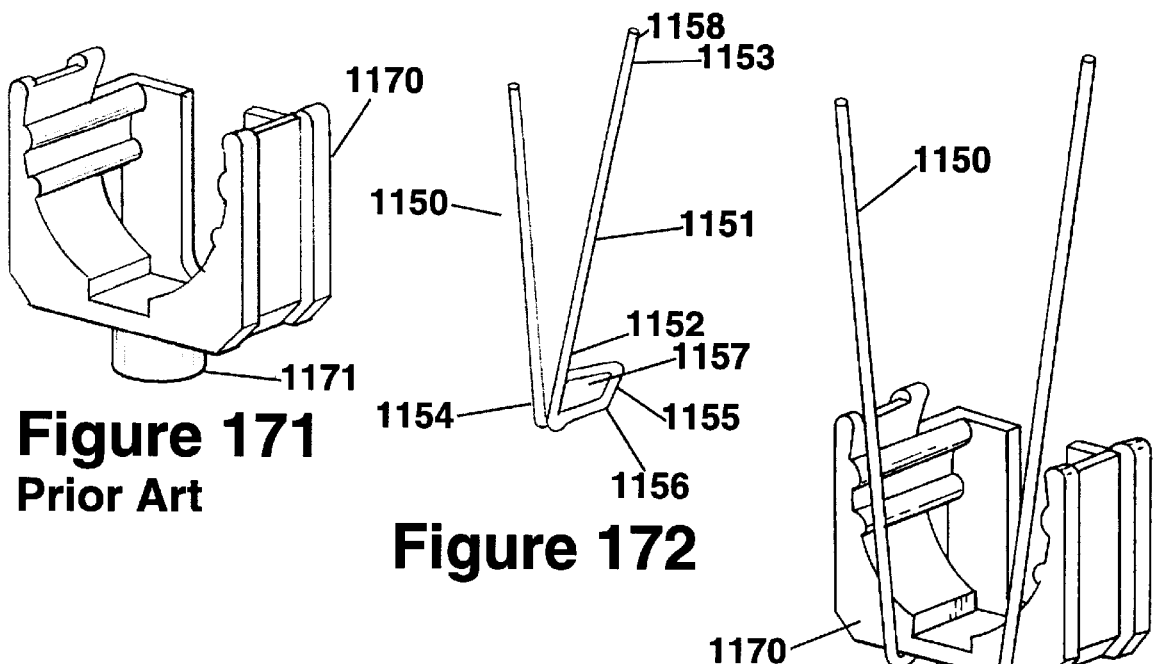
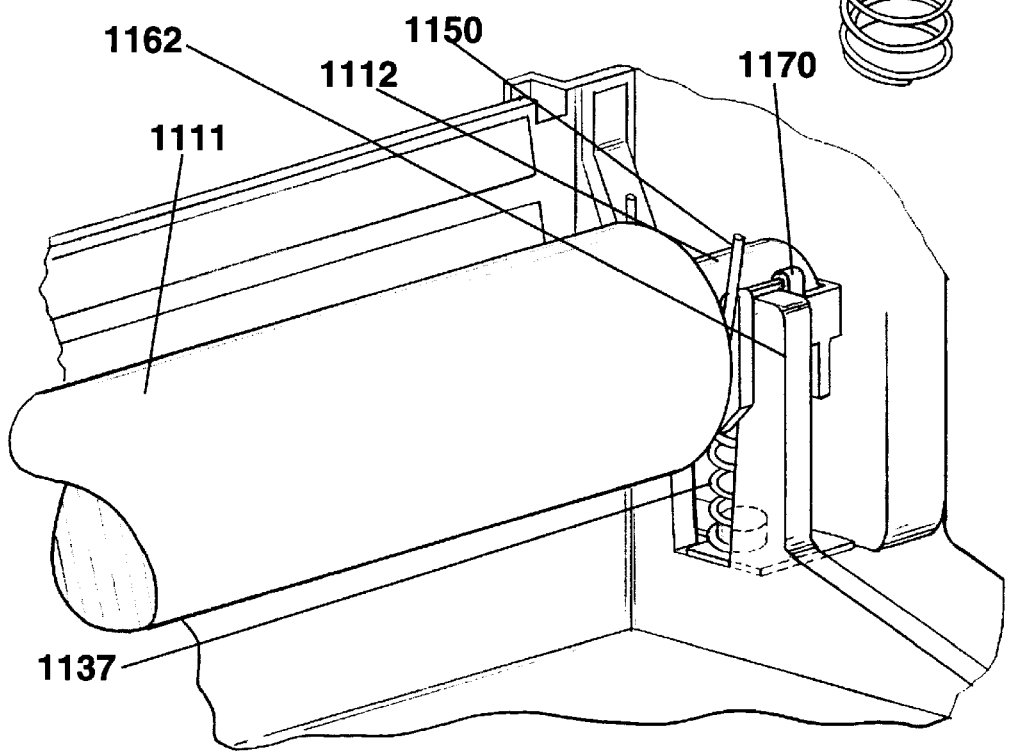
Figure 171 Prior Art
Figure 172
Figure 173
Figure 174

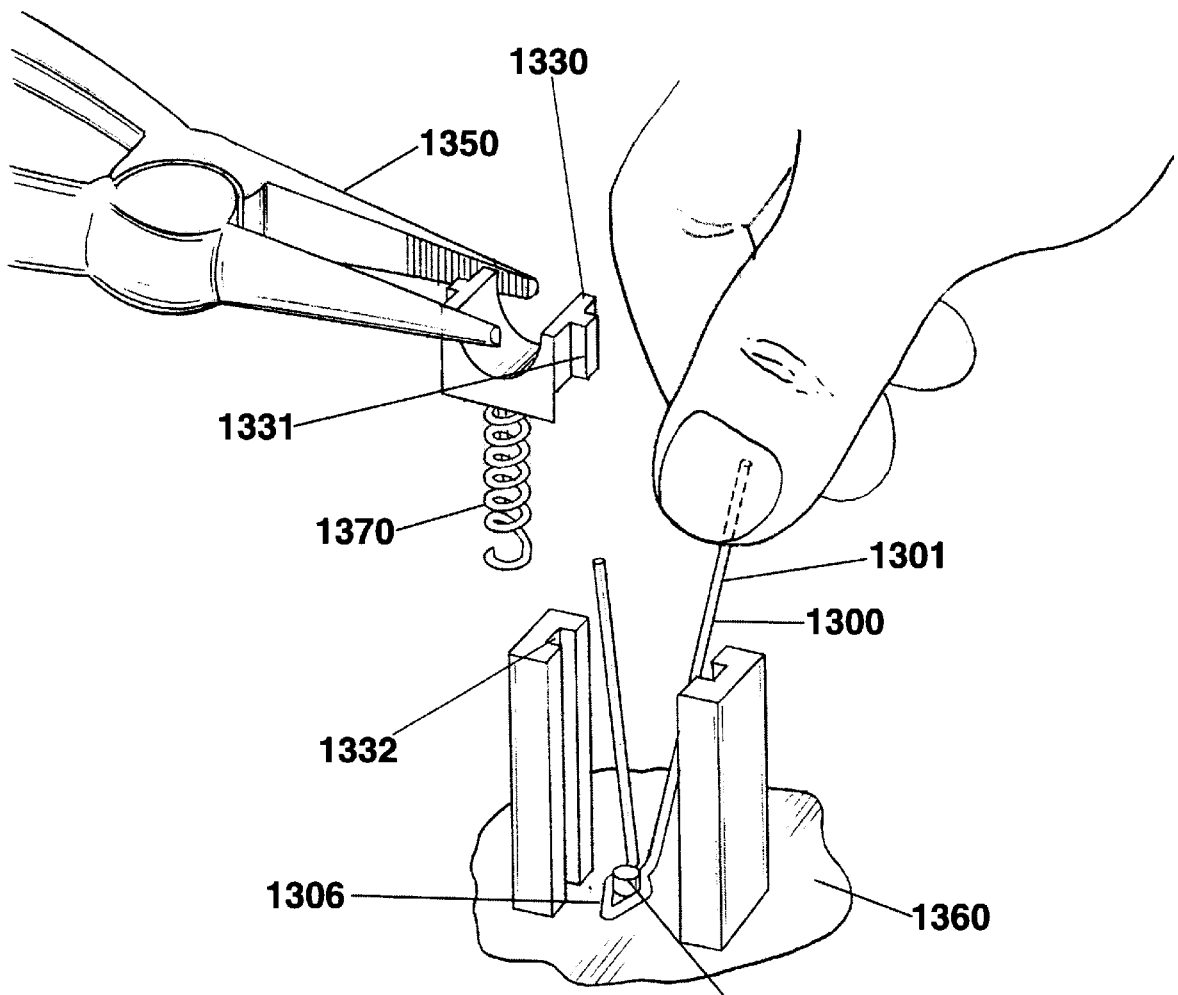

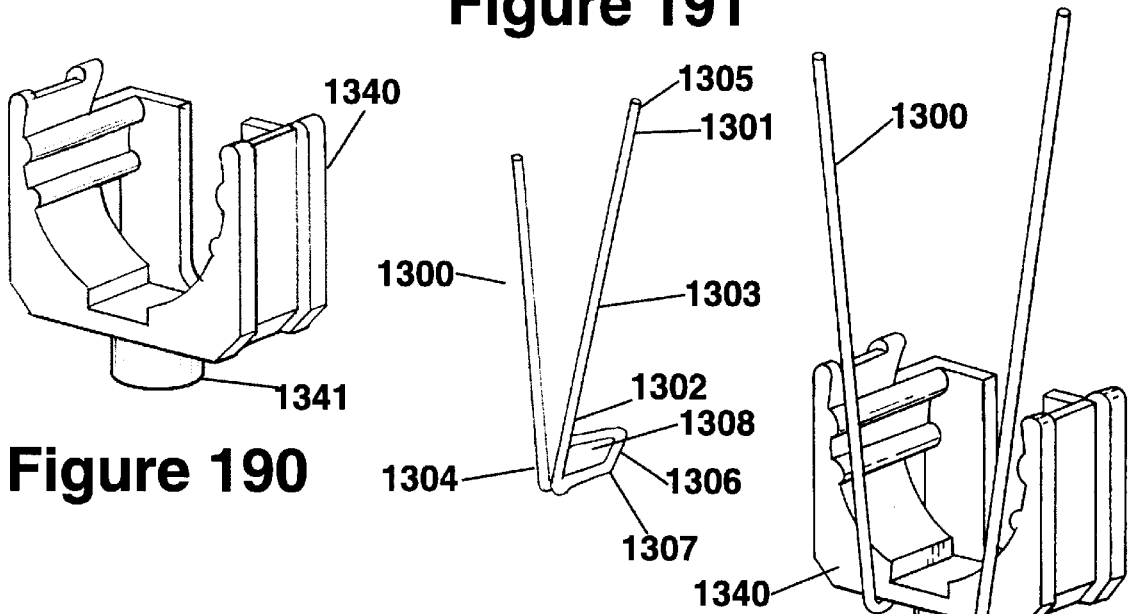
Figure 191
Figure 190
Figure 192
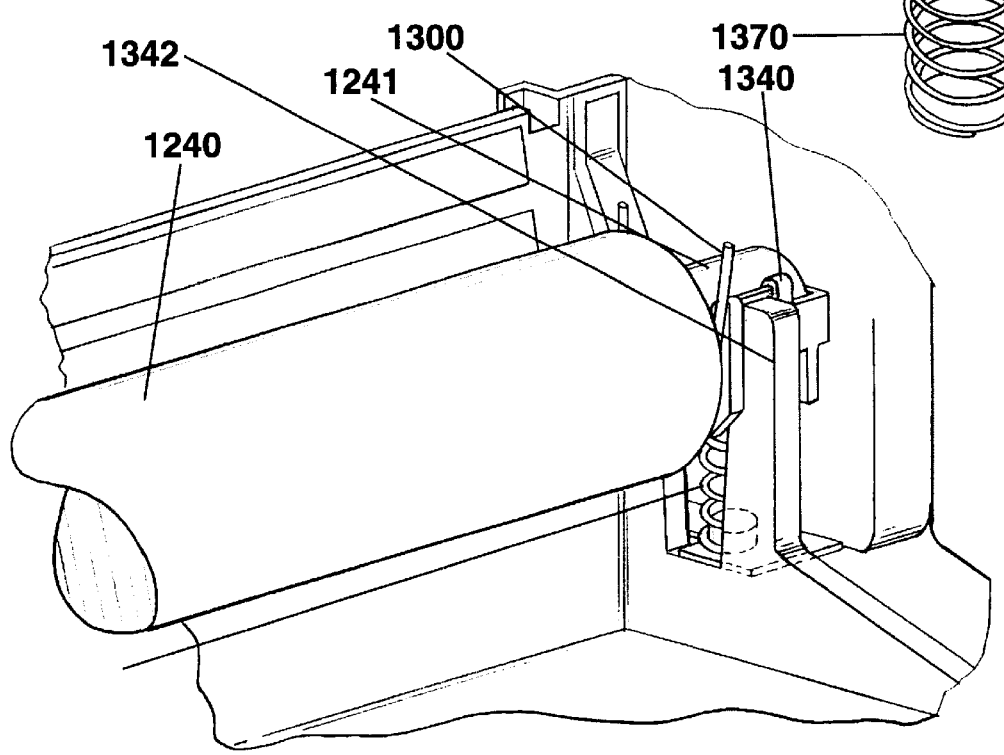
Figure 193

ELECTRICAL CONTACT DEVICE FOR A DEVELOPER ROLLER

This Application is a Continuation-In-Part of Ser. No. 09/613,145, now U.S. Pat. No. 6,321,048 which was filed on Jul. 10, 2000 which is a Continuation-In-Part of Ser. No. 09/109,309 filed on Jun. 30, 1998 which has received U.S. Pat. No. 6,131,261 on Oct. 17, 2000.

BACKGROUND OF THE INVENTION

In the original parent Application, claims were obtained on the arbor press with extender, including methods. This Application will focus on the improved image forming apparatus, toner cartridge that fits into an image forming apparatus, contact device and methods also described in the Application. The reason all devices and methods were entered in the same Application is because originally the Arbor Press, Extender and Methods were invented for the purpose of press-fitting the original electrobushing's contact device embodiment of this invention. However, it was found that the Arbor Press, extender and methods embodiments are pioneer patent in many industries without limit and inventor did not want to limit it to the imaging industry as it has usefulness in so many industries. This continuation-in-part, however, concerns the improved laser printer, copier machine, facsimile machine, toner cartridges used therein, image forming apparatus, contact devices, scraper device, endseals, magnetic seals, spacers that set the space between the developer roller and the photoreceptor, other contacts and methods thereof. It should be pointed out here that this patent discloses new and improved devices that have a specific function, but also function in the electrical chain of components supplying the bias voltage to a developer roller, including but not limited to a bushing that aligns the developer roller end bushing for truer rotation, a developer roller scraper device used to scrape toner near the endfelts to minimize or prevent leakage, a developer roller endseal, a developer roller magnetic seal, a device for controlling the space between a developer roller and a photoreceptor, and a device for controlling the position of the developer roller's drive gear.

This invention relates to solving problems in Xerography and more specifically in the toner cartridge remanufacturing industry. This includes copiers, laser printers, facsimile machines, microfiche machines and sublimation toner imaging devices all which will be referred to as imaging machines. This invention also relates to the industrial machinery industry.

CANON has designed an all-in-one cartridge as seen in U.S. Pat. No. 4,975,744, issued Dec. 4, 1990 and assigned to CANON. Several companies have used these cartridges in laser printers, copy machines and facsimile machines, each with the varying printer engines and a different nameplate. Originally, these cartridges were designed to be "disposable". However, after the first all-in-one toner cartridge was introduced, it did not take long before laser cartridge remanufacturers such as inventors began remanufacturing these cartridges. These "disposable" cartridges were designed to function for only one cartridge cycle without remanufacturing for higher profits. The remanufacturers had found certain components that needed replacement on a regular basis. In 1990, the first aftermarket photoreceptor drum became available for use in remanufacturing the all-in-one cartridge of the "SX" engine variety, the most popular printer cartridge from around 1987 through 1993. When the long-life photoreceptor drum became available, the entire remanufacturing industry gained strength and credibility as a huge growth surge began that still continues. In October 1993, HEWLETT-PACKARD, the largest seller of this printer engine using the all-in-one cartridge, entered the cartridge remanufacturing industry with the "OPTIVA" cartridge, further increasing the size as well as credibility of this relatively new industry although this OPTIVA program was eventually discontinued. However, this relatively new industry grew from the all-in-one cartridge shortly after its debut in 1985. Before the introduction of the long-life drum, sometimes called the "superdrum" or "duradrum", the SX cartridge would last for around three cartridge remanufacturing cycles at best, since the actual useful life of the OEM drum was three cycles. However, the long-life drums got their names from the fact that they were designed to last for many remanufacturing cycles or recharges as they are sometimes called. Typically, the early versions of the long life drum lasted for ten or more such cycles, unlike the typical OEM (Original Equipment Manufacturer) drum. With the additional developments of drum coatings, originally designed for OEM drums, the long-life drum may last for many additional cycles. Some coatings, in theory, were designed to be dissolved and removed from over the drum surface every 1–3 cycles, so the drum life of the long-life drum may be much longer than both the original design life of the OEM drum and the aftermarket drum.

However, with photoreceptor drums lasting for many cycles, other components of the cartridge have a tendency to require greater durability or design life. Also, as the success of the cartridges has been positive, the demand is for cartridges with longer cycles, so component improvements are significant. Therefore, avoiding natural problems with prevention means must also be implemented for cartridges of longer life both in longer cycle times and greater number of cycles. One good example is the electrical contact used in many developer rollers of toner cartridge assemblies. The advancements in technology of the laser printers and toner cartridges may be applied in other parts of the imaging industry including copy machines, facsimile machines, all-in-one machines, multi-function machines, microfiche machines, sublimation printers (for t-shirt iron-ons, mugs and other printing and copying where the final output winds up transferred from the page), and for many applications in the imaging industry.

Inventor was awarded U.S. Pat. Nos. 5,634,175 and 5,648,838, pioneer patents for electrical contacts for developer roller assemblies. Much of what is manufactured today uses things from that patent. To properly install an electrical contact from the above patents in the most robust way, one would want to press-fit the contact into the inner wall of the developer roller. It sounds simple. However, you can not just get an arbor press and press fit the contacts because arbor presses have a very short maximum press-fit height. Most arbor presses look alike, just that some are bigger and more powerful than the others, among the most common arbor presses. However, a ½ ton arbor press has a 4 inch height and a one ton press is not much higher, a two ton press is not much higher and even a 5 ton arbor press typically is not very high. To press-fit contacts into developer rollers, most developer rollers are over ten inches long and even an expensive 5 ton arbor press, much greater in weight and power than necessary, is not long enough to press-fit all sizes of developer rollers. In another example, the WX (5Si) developer roller is over 18 inches long and would not even fit in a 5 ton arbor press in the typical case. To solve this problem, inventor has developed an arbor press extender device to lengthen the maximum press length that an arbor press may press. Thus, with this invention, even a small ½ ton arbor press may be used for press-fitting an electrical contact on a long developer roller sleeve. With the extender device of this invention, there is no limit in the maximum allowable press length that may be pressed with an arbor press, and thus, a small ½ ton arbor press with the extender device of this invention may press a part of a greater length than a large 5 ton arbor press without the extender device of this invention which saves a lot of money.

An electrobushing will be introduced that is a bushing for truing rotational motion of a developer roller while at the same time acting as an electrically contacting device. This simplifies number of parts and makes a stronger connection and thus may obsolete the use of spring with contact.

SUMMARY OF THE INVENTION

Accordingly, it is object of this invention to show an improved image forming system including but not limited to an improved laser printer, copy machine, facsimile machine or microfiche machine.

It is yet a further object of this invention to show an improved toner cartridge used in an image forming system or image forming apparatus.

It is yet a further object of this invention to show an improved toner hopper used in either a toner cartridge or an image forming apparatus including components that make a better toner hopper.

It is yet a further object of this invention to show an improved image forming apparatus that uses an antistatic toner cartridge by using conductive materials in the plastic casings of the toner hopper and waste toner hopper.

It is yet a further object of this invention to show an improved toner cartridge made to be antistatic by using conductive materials in the plastic.

It is yet a further object of this invention to show an improved contact receiving device that not only improves rotational trueness of developer rollers, but also is a link in the electrical contact's connection, thus making an improved toner cartridge and improved image forming apparatus.

It is yet a further object of this invention to show an improved contact receiving device to improve rotational trueness of developer rollers.

It is yet a further object of this invention to show an improved contact device to improve electrical contact of developer rollers.

It is yet a further object of this invention to show an improved contact device that uses a shaft collar or similar device on an electrical contact where a coil spring or leaf spring is contacted to the shaft collar where either type of spring optionally has a graphite insert, similar to graphite inserts of an electrical motor.

It is yet a further object of this invention to show an improved contact device to improve electrical contact of developer rollers using a C-clip, e-clip or any other similar fastener, positioned on a piece that goes into a slot on a developer roller sleeve or on a contact connected inside a developer roller bore in conjunction with a coil spring with or without a washer-like piece pressed against the C-Clip or similar clip.

It is yet a further object of this invention to show an improved contact device to improve electrical contact of developer rollers using a sliding ring that goes into a slot on a developer roller sleeve or on an endpiece contact connected to a developer roller in conjunction with a coil spring with or without a washer-like piece pressed against the sliding ring.

It is yet a further object of this invention to show an improved contact device to improve electrical contact of developer rollers using a shaft collar or similar device over a developer roller sleeve in conjunction with a coil spring, flat spring, any form of spring whatsoever, or graphite insert with or without any form of coil spring.

It is an further object of this invention to show a scraper device that electrically contacts the developer roller while it scrapes toner from the developer roller at or near the endseal of the developer roller.

It is an further object of this invention to show an improved scraper insert that is used to repair worn scrapers.

It is an further object of this invention to show an improved module for scraping a developer roller at or near the endseal that does not require alignment pegs molded into the scraper holder.

It is an further object of this invention to show an improved module for scraping a developer roller at or near the endseal that does not use an injection molded plastic and a method of manufacturing this module.

It is an further object of this invention to show an improved endseal of a toner hopper that involves making electrical contact with the developer roller.

It is an further object of this invention to show an improved magnetic endseal of a toner hopper that uses a material on inside or outside of the magnetic endseal that is foam, velvet or where the material is placed on the inside or outside surface of the magnetic seal by flocking the magnetic endseal either completely or on specific surfaces.

It is an further object of this invention to show an improved magnetic endseal of a toner hopper as above where the flock material is made conductive and the magnetic endseal may then be used as a developer roller electrical contact.

It is an further object of this invention to show an improved magnetic endseal of a toner hopper as above where the flock material is made conductive or antistatic so that toner will not stick to it.

It is an further object of this invention to show an improved primary charge roller assembly (PCR).

It is an further object of this invention to show an improved primary charge roller assembly with an improved device and method of making electrical contact with the primary charge roller assembly to supply electricity to the primary charge roller.

It is an further object of this invention to show an improved PCR contact device and method where a two-pronged wire is locked in place in the PCR assembly either locked under the coil spring or over the coil spring and where the device has either a partial circle, hairpin shape or a v-shape at the base of the contact device.

It is an further object of this invention to show an improved PCR contact device and method using a coil spring with a straight piece of unitary with the spring that makes contact with the shaft of the PCR, the unicorn contact.

It is an further object of this invention to show an improved PCR contact device and method where a thin metal piece is cut and formed with 2 prongs to make contact with the PCR.

It is an further object of this invention to show an improved developer roller contact device and method where a two-pronged wire is locked in place in a developer roller assembly either locked under a coil spring or over the coil spring and where the device has either a partial circle, hairpin shape or a v-shape or diamond shape at the base of the contact device.

It is an further object of this invention to show an improved developer roller contact device and method using a coil spring with a straight piece of unitary with the spring that makes contact with the endpiece contact of the developer roller.

It is an further object of this invention to show an improved developer roller contact device and method where a thin metal piece is cut and formed which has 2 prongs to make contact with the endpiece contact of the developer roller.

It is an further object of this invention to show a conversion device whereby a primary charge roller made for a specific toner cartridge style A may be used in toner cartridge for style B when the primary charge roller (PCR) style A is too short to normally use in a style B toner cartridge.

It is an further object of this invention to show an arbor press extender device to increase the length that a press-fit may be performed.

It is a further object of this invention to show an arbor press extender with modular fixtures and fixture holders that receive each end of the developer roller including an electrical contact that may be press-fit.

It is still a further object of this invention to show an arbor press extender with fixtures that receive each end of the developer roller including an electrical contact that may be press-fit.

It is yet a further object of this invention to show modular fixtures to fit into fixture holders to allow quick change from one type of press-fit to be performed to another with minimal set-up time between press-fit styles and sizes.

It is yet a further object of this invention to show quick snap-on/snap-off fixtures and fixture holders for quick connect/quick disconnect of fixtures to fixture holders where fixtures may be held firmly in place without falling off the fixture holder using the concept used in quick connect air hose connections.

It is yet a further object of this invention to show modular fixture holders and fixtures for press fitting applications that quickly install and uninstall using air-hose quick-connect couplers and nipples.

It is yet a further object of this invention to show modular fixture holders and fixtures for press fitting applications that quickly install and uninstall using a small piece of hose in the bore of the fixture module to make a tight yet removable quick connection.

In carrying out this invention in the illustrative embodiment thereof, an arbor press is equipped with an extender device to increase the maximum allowable part length that may be press ed. This not only eliminates the need for using a larger press by allowing a smaller press to be used for pressing long parts, which also saves money, but some parts which may be too long to fit on a much larger arbor press may now be pressed on a small arbor press. Modular quick-connect/quick-disconnect fixtures may be used to fit in fixture holders for holding firm different types of parts and different styles of developer rollers which may now be press-fit using this extender device of this invention. With this extender device, even extremely long parts may be press-fit economically which opens new doors for applications using arbor presses in many industries as a result of this invention. Even an adjustable length arbor press extender may be used for variable extender length for multiple applications with one extender device. An electrobushing is a bushing that conducts electricity to a developer roller in a toner cartridge which is a component of an image forming apparatus or directly in an image forming apparatus for improved toner efficiency, darker print, more even print and an improved system. Various electrical contact device configurations and methods are described for contacting primary charge rollers, developer rollers and photoreceptor drums. It should be pointed out here that this patent discloses new and improved devices that have a specific function, but also function in the electrical chain of components supplying the bias voltage to a developer roller, including but not limited to a bushing that aligns the developer roller end bushing for truer rotation, a developer roller scraper device used to scrape toner near the endfelts to minimize or prevent leakage, a developer roller endseal, a developer roller magnetic seal, a device for controlling the space between a developer roller and a photoreceptor, and a device for controlling the position of the developer roller's drive gear.

BRIEF DESCRIPTION OF THE DRAWINGS

This invention, together with other objects, features, aspects, and advantages thereof, will be more clearly understood from the following description, considered in conjunction with the accompanying drawings.

FIG. 3b is an isometric view of a portion of a prior art toner hopper assembly showing the breakdown of the developer roller and some aftermarket electrical contacts and other components.

FIG. 6 shows an isometric view of a prior art developer roller sleeve, showing the shaft and inside of the contact end of the developer roller.

FIG. 6a is a prior art printer contact assembly of the HP-4000 toner cartridge.

FIG. 6b is a prior art plastic bushing of the HP-4000 toner cartridge

FIG. 6c is a prior art developer roller, contact and shaft of the HP-4000 toner cartridge FIG. 7 is an isometric view of an aftermarket bushing used to receive the electrical contact which functions with the electrical contact to make electrical connection.

FIG. 8 shows an isometric view of a metal bushing for receiving the end of a developer roller that prevents wobble, trues rotation and may optionally act as a link in the electrical contact's connection, shown prior to the press-fit of the aftermarket electrical contact.

FIG. 16 is an isometric view of an upper fixture holder.

FIG. 17 is a cutaway view of an upper fixture holder.

FIG. 18 is an isometric view of an lower fixture holder.

FIG. 19 is a cutaway view of an lower fixture holder.

FIG. 24 is an isometric view of an upper fixture holder with a male fixture module attached.

FIG. 25 is an isometric view of a male fixture module.

FIG. 26 shows a cutaway isometric view of an arbor press with foam in the arbor press opening to prevent the magnetic developer roller from getting damaged.

FIG. 27 shows a cutaway top view of an arbor press with foam in the arbor press opening to prevent the magnetic developer roller from getting damaged.

FIG. 29 shows a prior art universal quick connect coupler for making an air hose connection that is capable of receiving the three quick connect different style nipples in the figure.

FIG. 35 shows a cutaway of a typical hose material.

FIG. 36 shows a small piece of hose used to fit in the bore of a modular fixture holder for quick installation and removal of removable fixtures.

FIG. 44 shows an isometric cutaway view of a waste toner hopper.

FIG. 45 shows a typical image forming apparatus.

FIG. 46 shows an endview cutaway of a typical waste toner hopper.

FIG. 47 shows a cutaway enlargement of a photoreceptor and a developer roller and shows the charging in the typical case and is not to scale.

FIG. 67 shows an isometric view of a coil spring with an improved locking mechanism.

FIG. 68 shows a side view of the gear and an installed improved locking coil spring on a cylindrical contact member.

FIG. 69 shows an isometric view of a fully installed improved locking coil spring on a cylindrical contact member with arrows indicating the direction to rotate the locking coil spring to remove it.

FIG. 70 shows an isometric view of a partially removed improved locking coil spring on a cylindrical contact member with arrows indicating the direction the locking coil spring has been rotated to remove it.

FIG. 80 shows an isometric view of a shaft collar positioned on a cylindrical contact member that is to go in the end of a developer roller sleeve where a coil spring is used for making electrical contact against the shaft collar and also contacts the printer contact.

FIG. 81 shows an isometric view of a guided washer is positioned on a developer roller sleeve with a coil spring to show how the coil spring and guided washer fits on the developer roller's contact although the conductive cylindrical member shown can also be depicted instead as a developer roller.

FIG. 85 shows an isometric view of a contact member that is to go in the end of a developer roller sleeve where a spring wire is used for making electrical contact against the side of the larger diameter portion of the developer roller's contact member.

FIG. 86 shows an isometric view of a shaft collar positioned on a cylindrical contact member that is to go in the end of a developer roller sleeve where a spring wire is used for making electrical contact against the shaft collar.

FIG. 87 shows an isometric view of a shaft collar positioned on a cylindrical contact member that is to go in the end of a developer roller sleeve where a coil spring with a contact that may hold a modular insert is used for making electrical contact against the shaft collar.

FIG. 89 shows an isometric view of a shaft collar positioned on a developer roller sleeve with a flat spring making electrical contact.

FIG. 90 shows an isometric view of a shaft collar positioned on a developer roller sleeve with a flat spring making electrical contact.

FIG. 91 shows an isometric view of a shaft collar positioned on a developer roller sleeve with a coil spring using a contactor that may optionally hold a modular insert for making electrical contact.

FIG. 92 shows an isometric view of a shaft collar positioned on a developer roller sleeve with a coil spring using a contactor insert for making electrical contact.

FIG. 93 shows an isometric view of a shaft collar positioned on a developer roller sleeve with a flat spring making electrical contact.

FIG. 94 shows an isometric view of a shaft collar positioned on a developer roller sleeve with a flat spring making electrical contact.

FIG. 95 shows an isometric view of prior art magnetic endseals sealing a developer roller at the ends with plastic spacers that set the distance between the developer roller and the photoreceptor.

FIG. 96 shows an end portion of a developer roller with a new and improved spacer that sets the distance between the developer roller and the photoreceptor and the spacer also acts as a bias voltage contact.

FIG. 97 shows an isometric view of a prior art endseal made of a resilient material and a crush resistant material.

FIG. 98 shows an isometric view of a prior art endseal made of a resilient material with a crush resistant material and a crush-resistant layer.

FIG. 99 shows an isometric view of an endseal made of a resilient material that has been flocked.

FIG. 100 shows an isometric view of endseal made of a resilient material with a film layer that has been flocked.

FIG. 102 shows an isometric view of a magnetic endseal with a material inside that may touch the developer roller to form a better seal.

FIG. 103 shows an isometric view of a magnetic endseal with a material outside that may touch the toner hopper to form a better seal.

FIG. 104 shows an isometric view of a magnetic endseal with a material outside that may touch the toner hopper to form a better seal.

FIG. 107 shows a top view of a prior art scraper device used to help keep a developer roller clean in the vicinity of the endseals.

FIG. 108 shows an isometric view of a prior art scraper device used to help keep a developer roller clean in the vicinity of the endseals showing the positioning pins molded into the scraper.

FIG. 109 shows an isometric view of a prior art scraper device used to help keep a developer roller clean in the vicinity of the endseals.

FIG. 110 shows an isometric view of a prior art scraper device used to help keep a developer roller clean in the vicinity of the endseals showing the positioning pins molded into the scraper lining up with holes on a spreader blade frame in a toner hopper.

FIG. 115 shows an isometric view of a prior art scraper device used to help keep a developer roller clean in the vicinity of the endseals showing the position of the scraper assembly in a toner hopper and showing where the positioning pins molded into the scraper line up with holes in a toner hopper.

FIG. 116 shows an enlargement of a portion of scraper device of the scraper assembly of FIG. 115 showing how the scraping edge gets pitted and worn away.

FIG. 117 shows an isometric view of a scraper assembly with a modular scraper device placed over the scraper portion.

FIG. 118 shows a top view of a scraper assembly with a modular scraper device placed over the scraper portion.

FIG. 119 shows an isometric view of a modular scraper device.

FIG. 120 shows an isometric view of a modular scraper device.

FIG. 121 shows an isometric view of a scraper assembly with a modular scraper device placed over the scraper portion.

FIG. 122 shows a top view of a scraper assembly with a modular scraper device placed over the scraper portion.

FIG. 123 shows an isometric view of a scraper assembly with a modular scraper device.

FIG. 124 shows a top view of a scraper assembly with a modular scraper device.

FIG. 125 shows an isometric view of a modular scraper device.

FIG. 126 shows an isometric view of a modular scraper device.

FIG. 127 shows an isometric view of a scraper assembly with a modular scraper device.

FIG. 128 shows a top view of a scraper assembly with a modular scraper device.

FIG. 129 shows an isometric view of a scraper assembly with a modular scraper device.

FIG. 130 shows an isometric view of a modular scraper device.

FIG. 131 shows a top view of a scraper assembly with a modular scraper device.

FIG. 132 shows an isometric view of a scraper assembly with a modular scraper device shown as the assembly is to be positioned into a toner hopper.

FIG. 133 shows the prior art scraper assembly of the HP-4000 toner cartridge.

FIG. 134 shows the prior art scraper assembly of the HP-4000 toner cartridge with a scraper insert installed over the scraper portion.

FIG. 135 shows the prior art scraper assembly of the HP-4000 toner cartridge with a scraper insert installed over the scraper portion where a screw holds the scraper insert firmly in place.

FIG. 136 shows the prior art scraper assembly of the HP-4000 toner cartridge with a scraper insert installed over the scraper portion with a foam support under the scraper region.

Figure 136A:
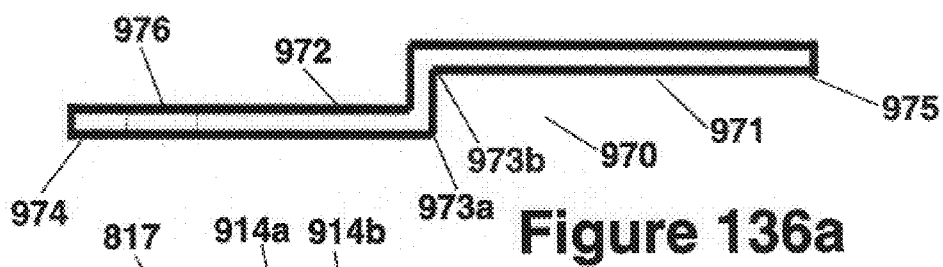
Figure 136B:
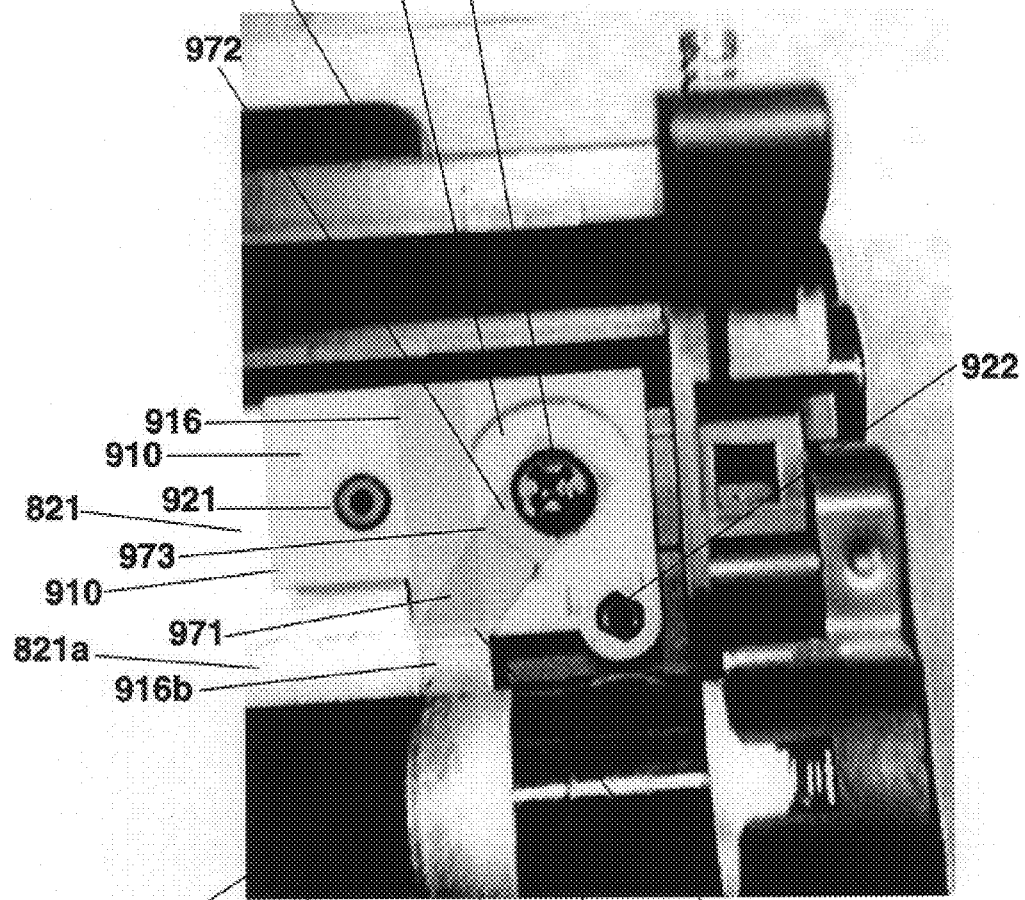

FIG. 136a shows a side view of a scraper holder device or scraper clamp that holds down a modular scraper FIG. 136b shows the prior art scraper assembly of the HP-4000 toner cartridge with a modular scraper over the original scraper and a scraperclamp holding down the scraper module so that the scraper module will not fall out.

Figure 136C:
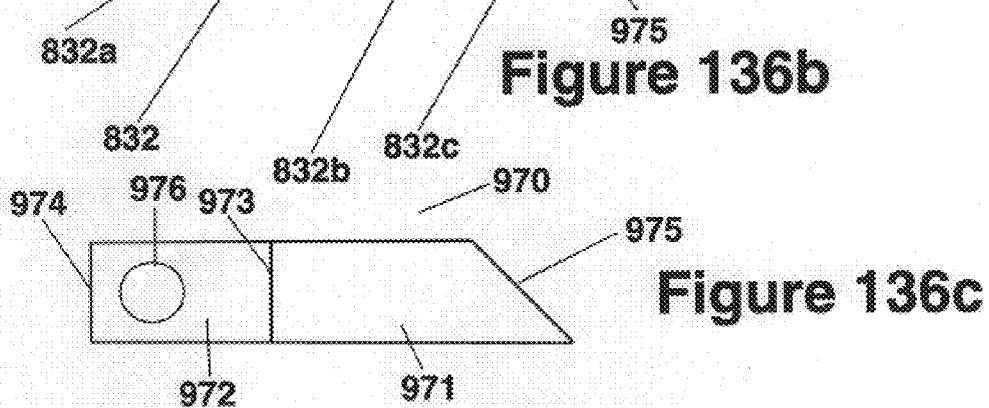

FIG. 136c shows a side view of a scraper holder device or scraper clamp that holds down a modular scraper FIG. 136d shows a scraperclip that is used to hold down a scraper module so that the scraper module will not fall out.

FIG. 136e shows a side view of a scraper holder device or scraper clip that holds down a modular scraper of a HP-4000 toner cartridge.

Figure 136F:
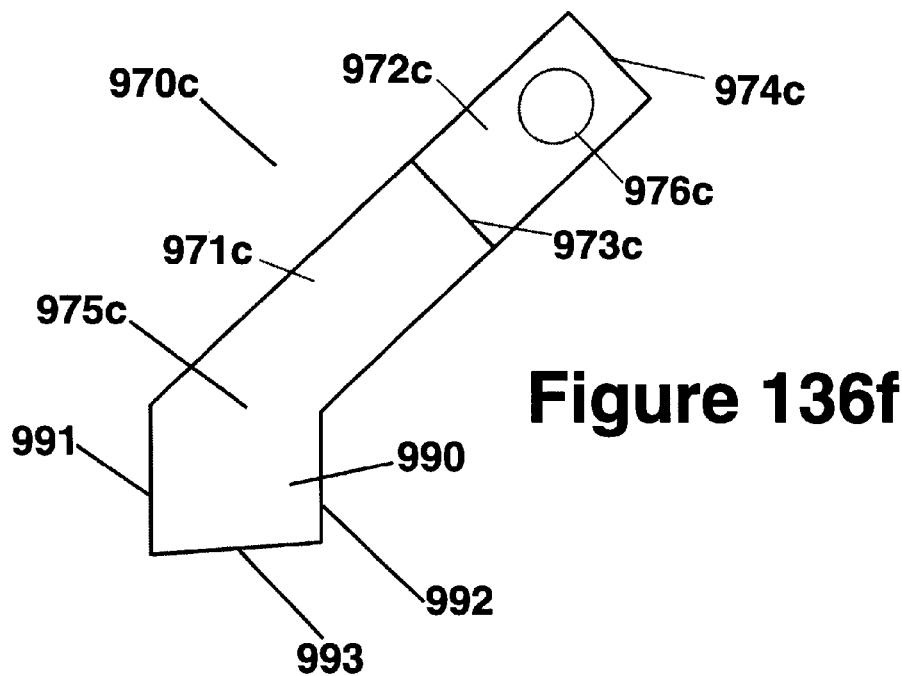

FIG. 136f shows a top view of a scraper device that functions as the scraper holder clamp and the scraper at the same time with a hole for screwing it down.

Figure 136G:
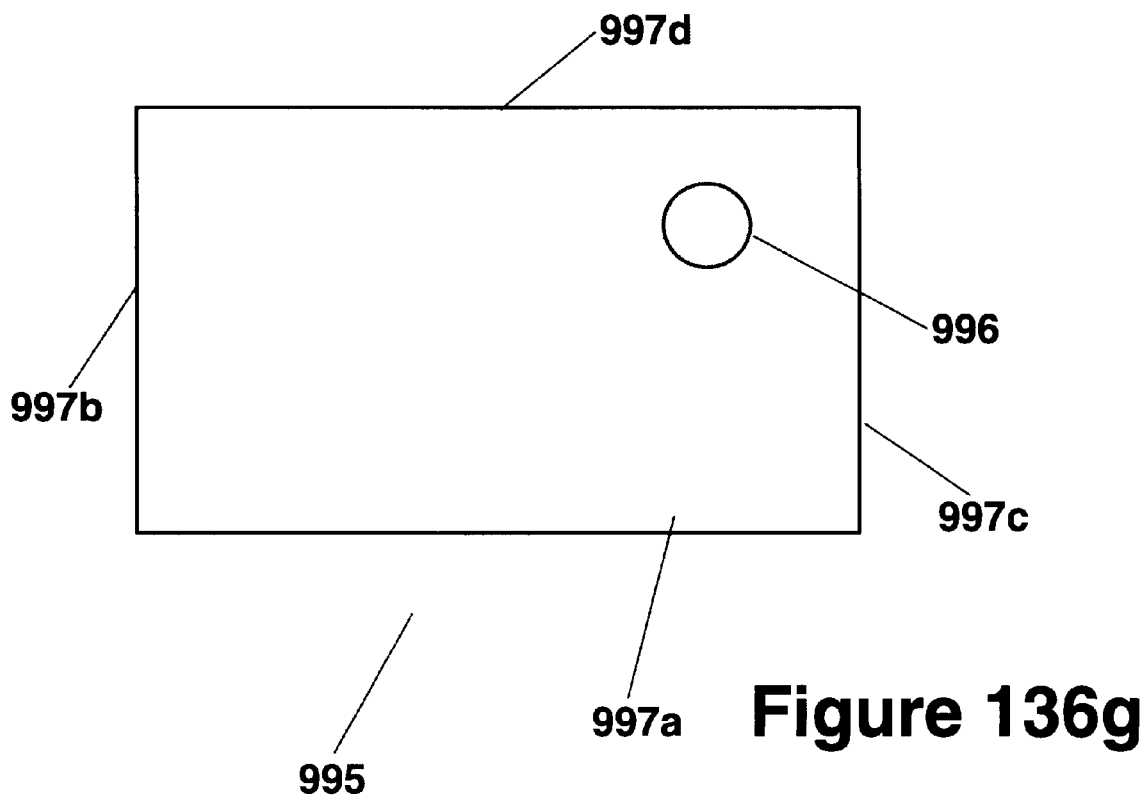

FIG. 136g shows a top view of a scraper holder clamp used to hold down a scraper module.

Figure 137:
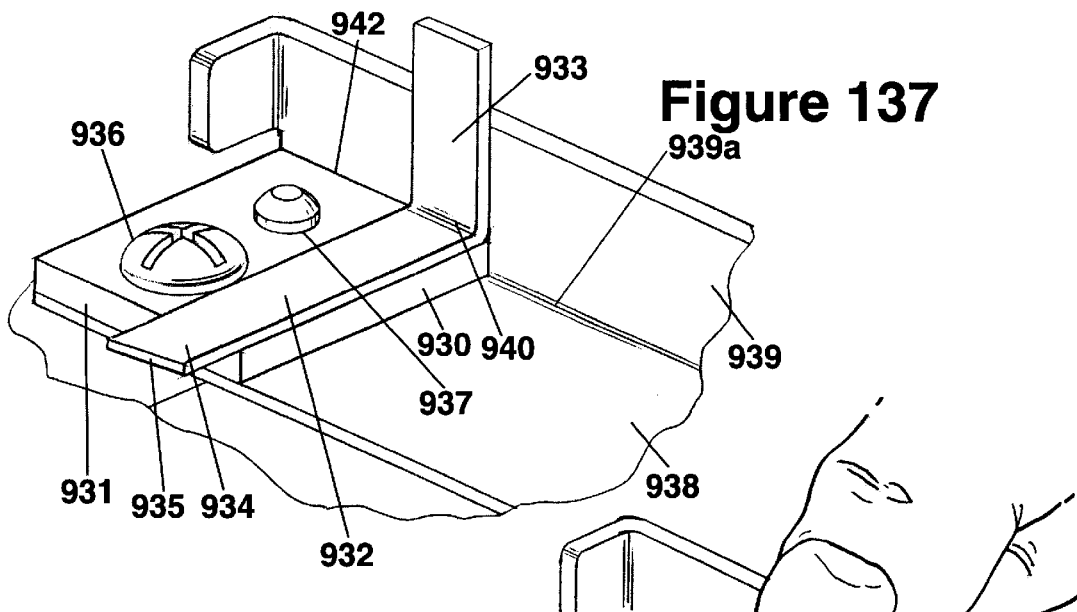

FIG. 137 shows an improved modular scraper device that uses the guide of the spreader blade frame for positioning.

Figure 138:
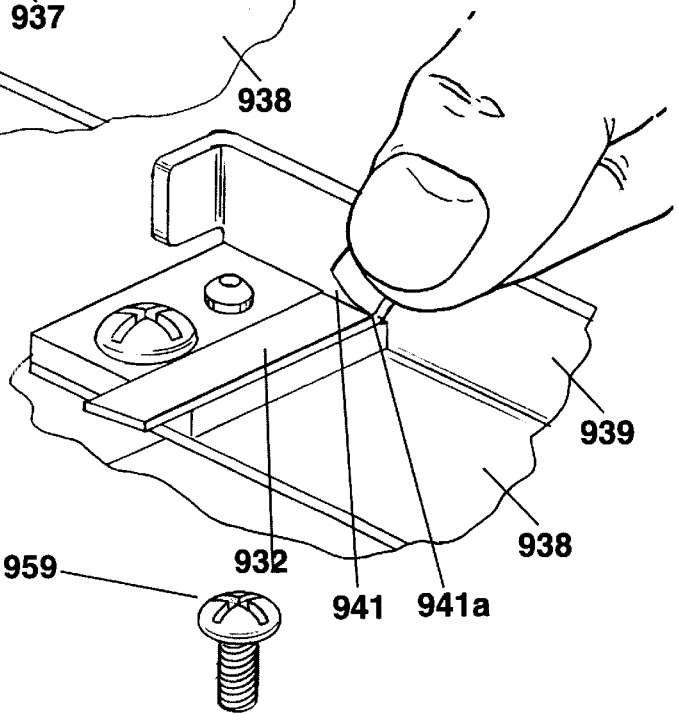

FIG. 138 shows an improved modular scraper device that uses the guide of the spreader blade frame for positioning where the install handle is being removed.

Figure 139:
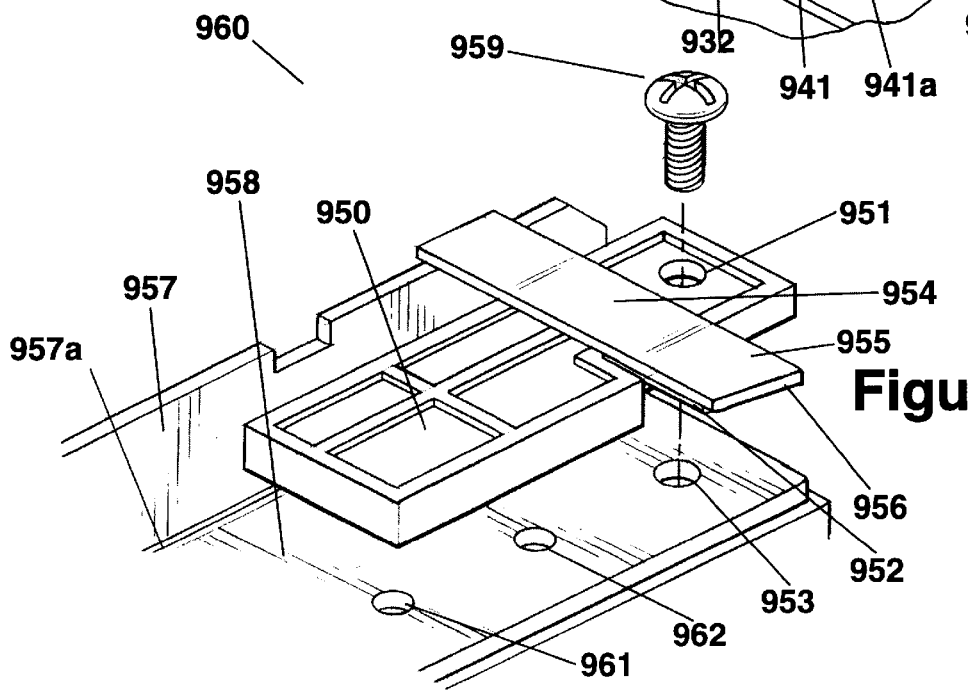

FIG. 139 shows a scraper assembly from the LASERJET 5Si toner cartridge with a scraper insert being positioned over the worn scraper portion.

Figure 140:
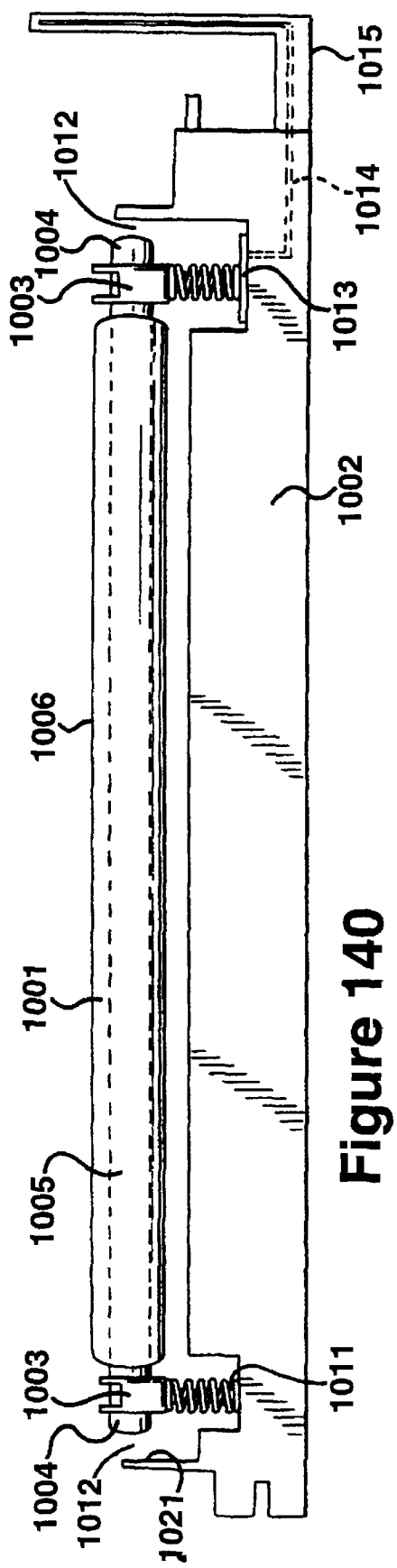

FIG. 140 shows a side view of a prior art primary charge roller assembly.

Figure 141:
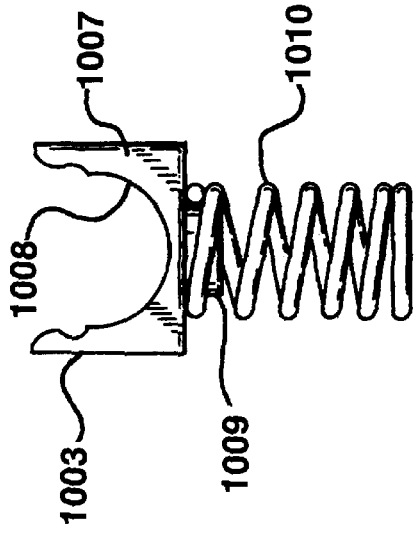

FIG. 141 shows a side view of a prior art saddle and spring as used in a primary charge roller assembly.

Figure 142:
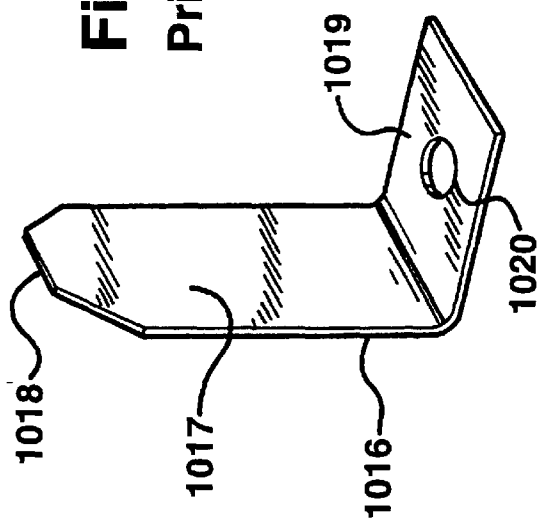

FIG. 142 shows an isometric view of a prior art electrical contact for a primary charge roller from inventor Michlin's U.S. Pat. No. 5,367,364.

Figure 143:
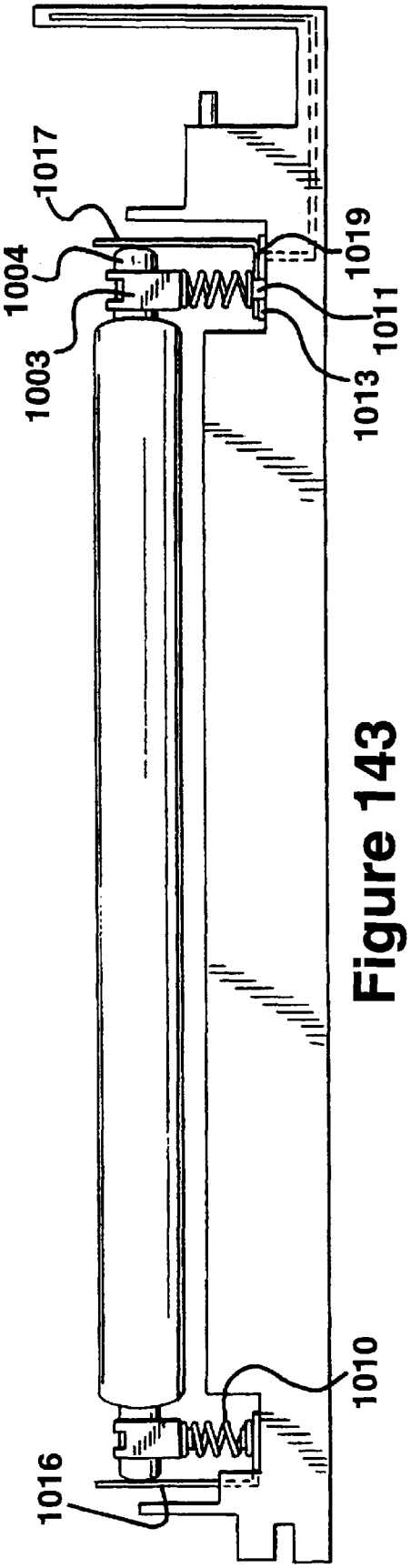

FIG. 143 shows a side view of this prior art charge roller contact installed in a charge roller assembly.

Figure 144:
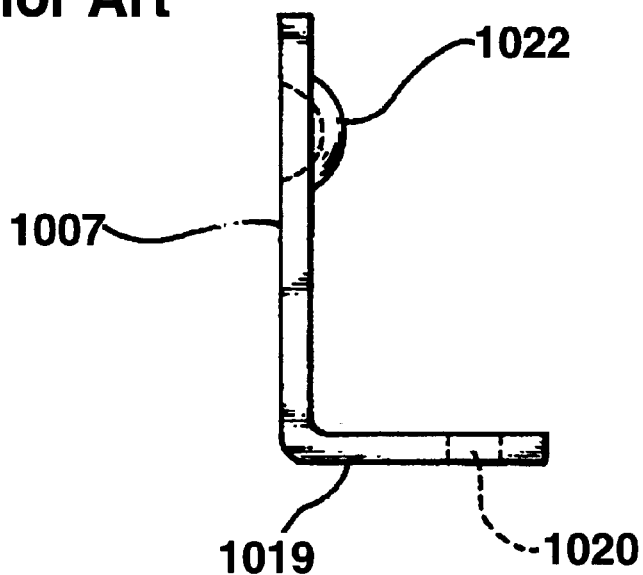

FIG. 144 shows a side view of a prior art electrical contact for a primary charge roller.

Figure 145:
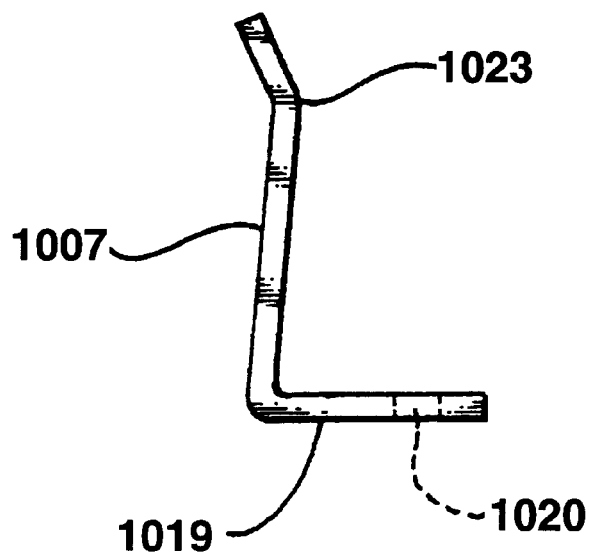

FIG. 145 shows a side view of a prior art electrical contact for a primary charge roller.

Figures 146, 147:
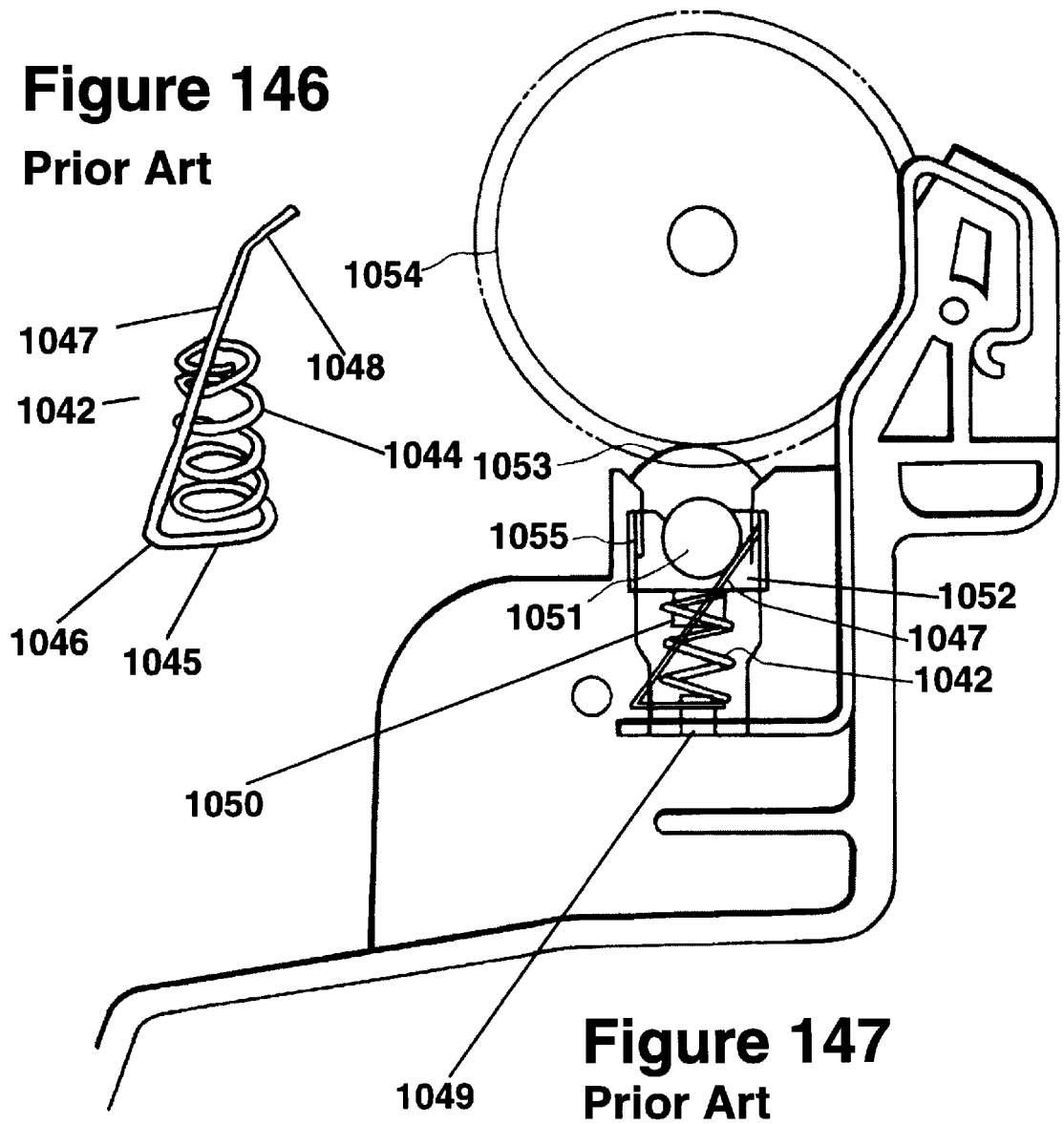

FIG. 146 shows an isometric view of a prior art electrical contact for a primary charge roller.

FIG. 147 shows a side view of a prior art electrical contact for a primary charge roller installed in charge roller assembly in a waste toner hopper.

Figure 148:
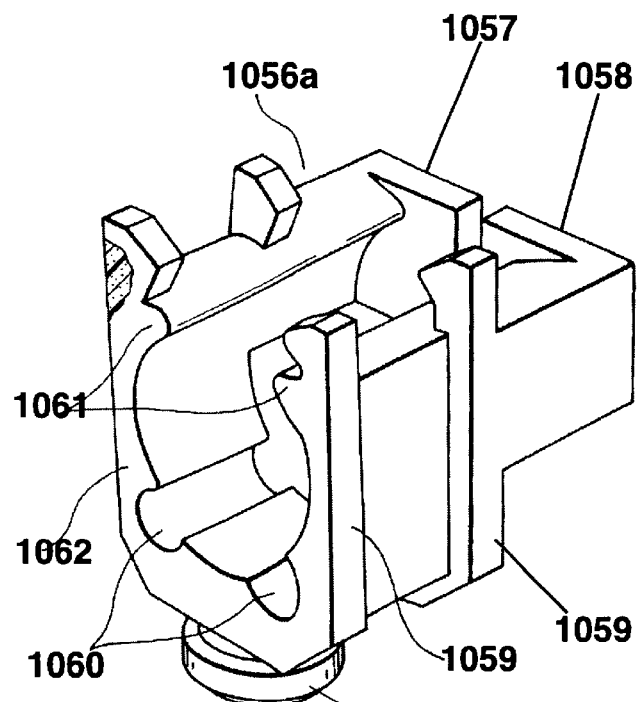

FIG. 148 shows an isometric view of a prior art saddle for a charge roller assembly which can receive partial graphite inserts.

Figure 149:
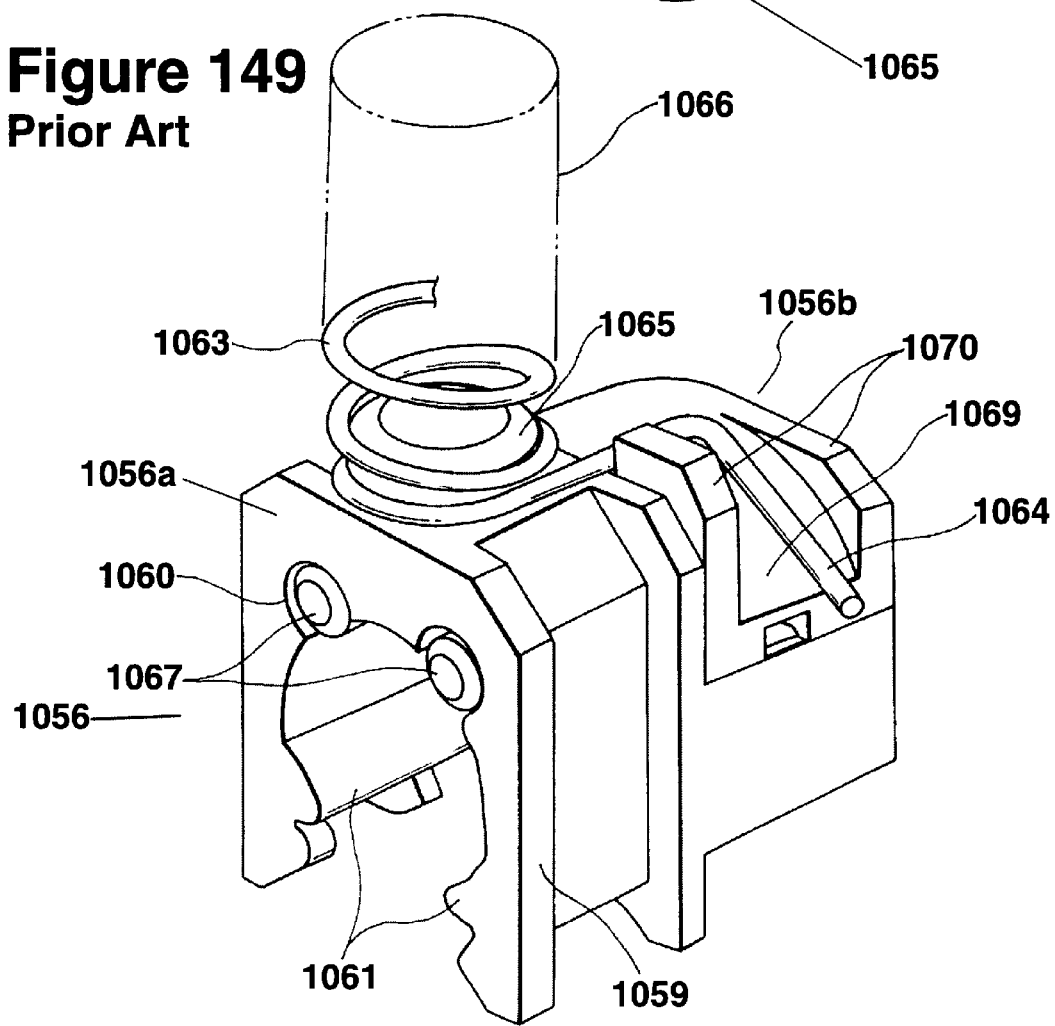

FIG. 149 shows an isometric view of a prior art saddle for a charge roller assembly with graphite insert installed and locking spring holding the partial graphite insert in place.

Figure 150:
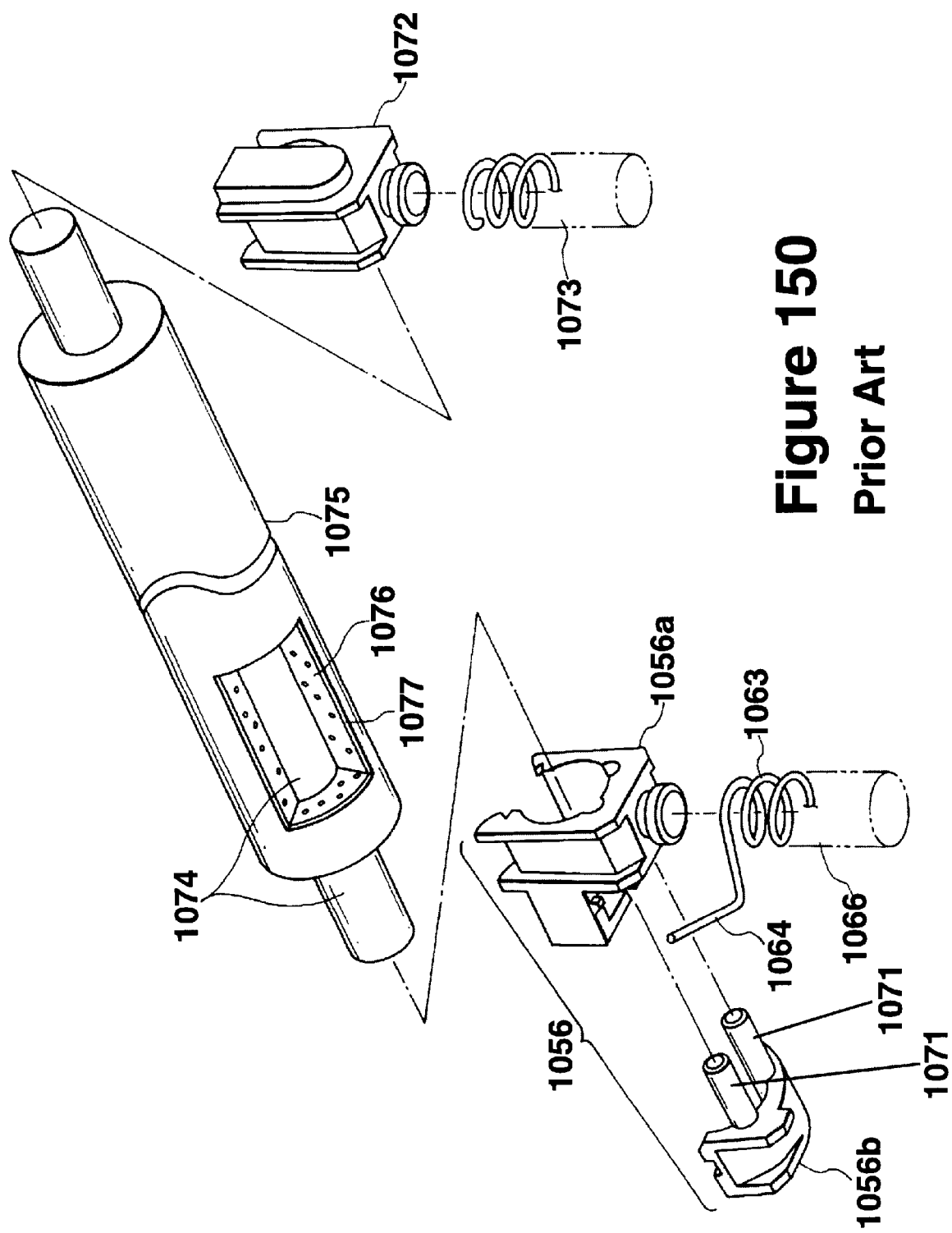

FIG. 150 shows an isometric view of prior art saddles showing where the saddles hold the primary charge roller without a charge roller assembly with graphite insert installed and locking spring holding the partial graphite insert in place where the PCR is partly cutaway.

Figure 151:
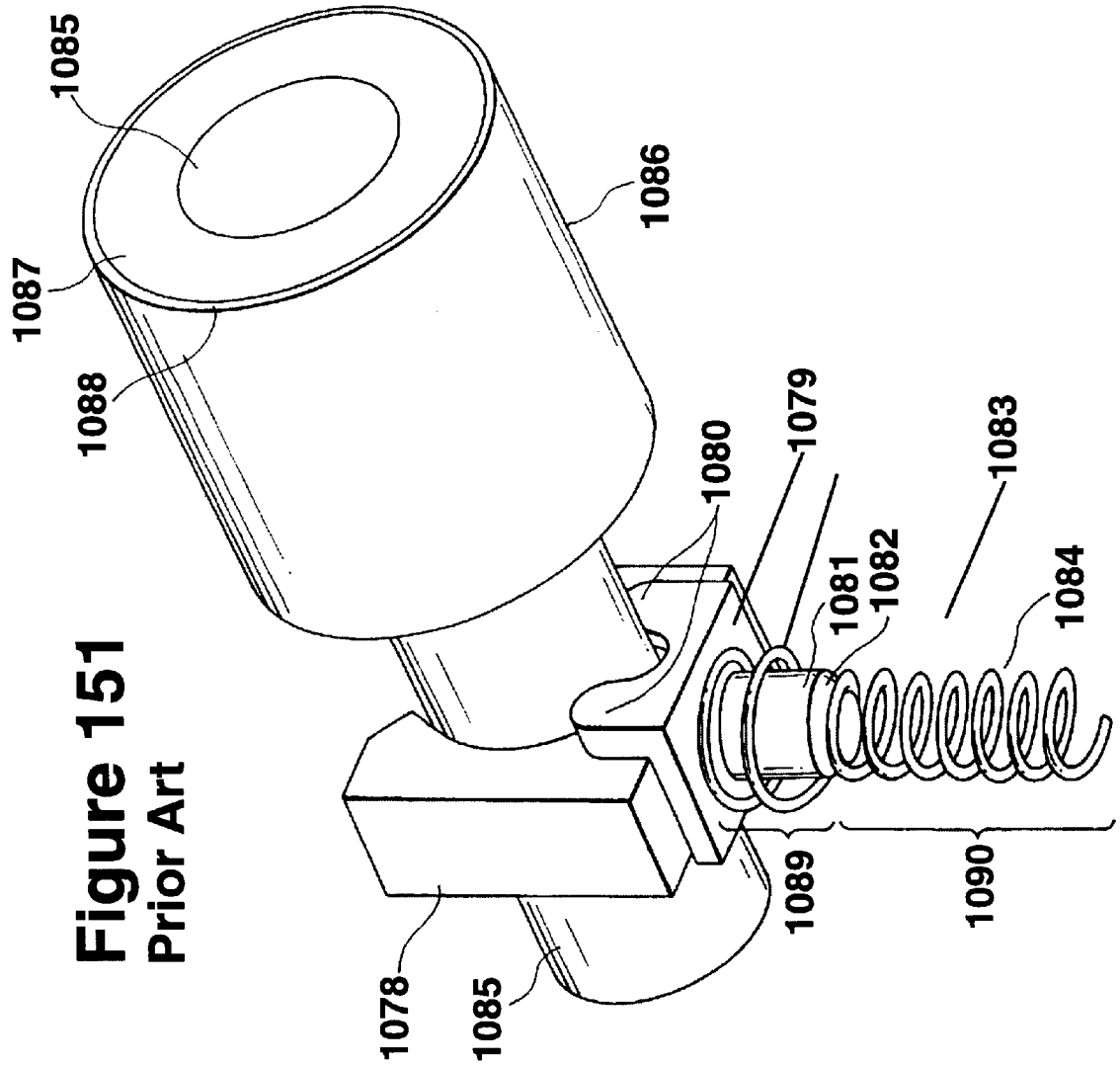

FIG. 151 shows an isometric view of a prior art saddle showing where the saddle holds the primary charge roller showing the partial graphite insert in place.

Figure 152:
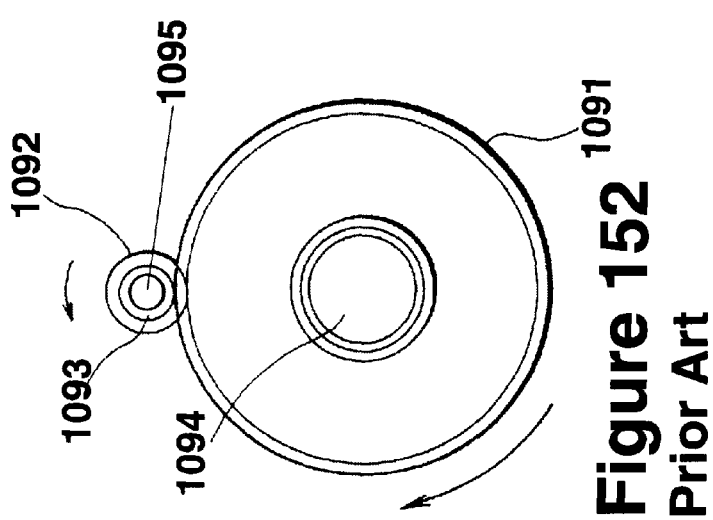

FIG. 152 shows an end view of a primary charge roller pressing on a photoreceptor drum.

Figure 153:
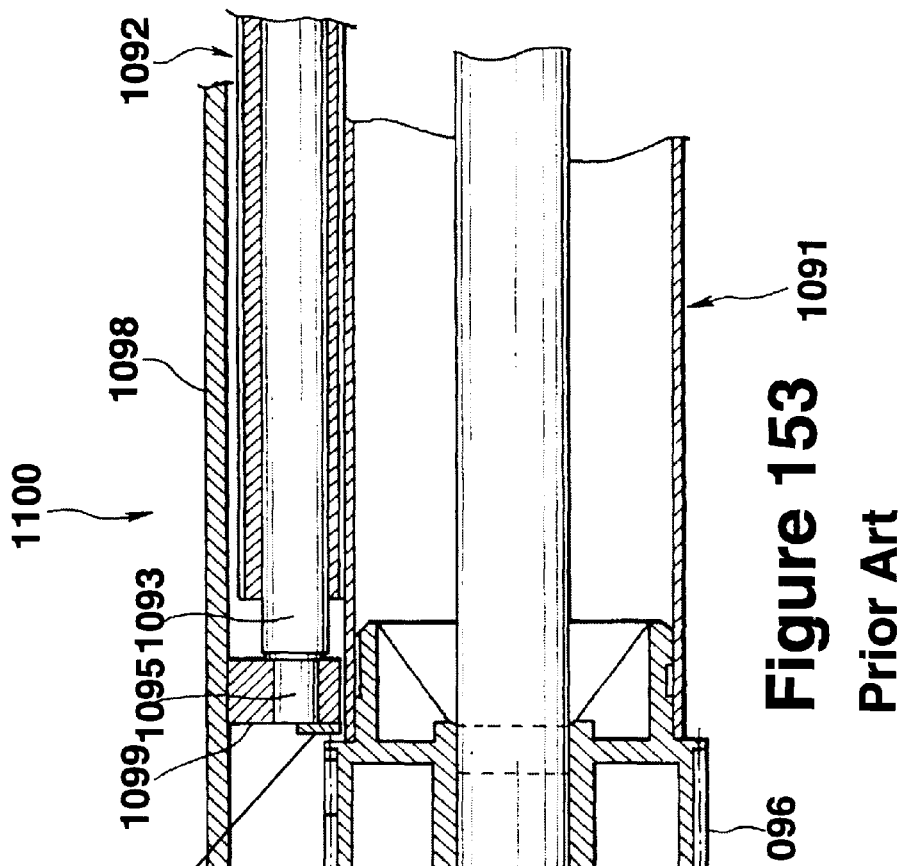

FIG. 153 shows a side view of a primary charge roller pressing on a photoreceptor drum.

FIG. 154 shows an end view of a primary charge roller pressing on a photoreceptor drum.

FIG. 155 shows a side view of a primary charge roller pressing on a photoreceptor drum showing a type A charge roller where the charge roller shaft is not long enough to fit in a type B primary charge roller assembly.

Figure 156:
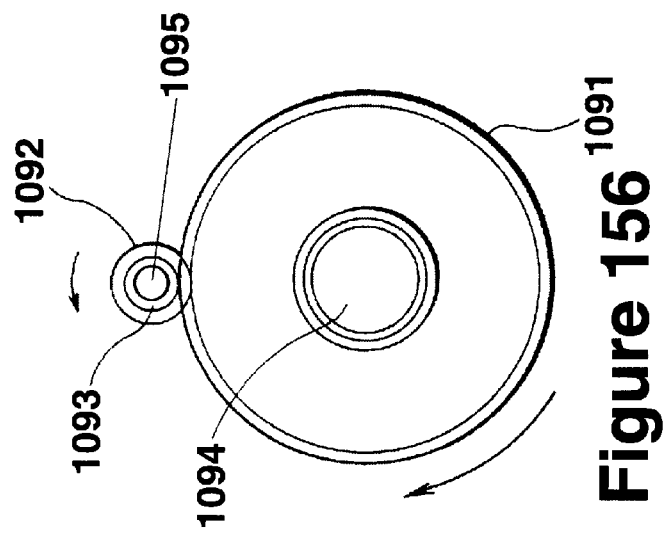

FIG. 156 shows an end view of a primary charge roller pressing on a photoreceptor drum.

Figure 157:
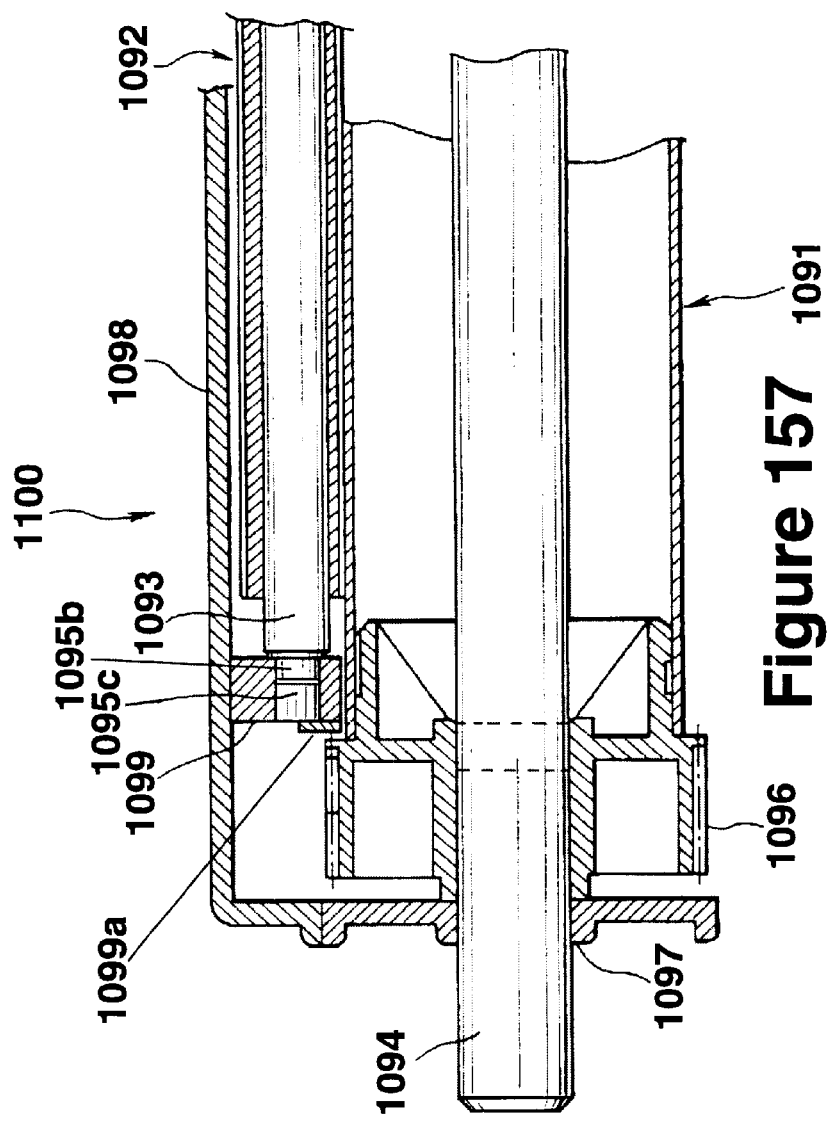

FIG. 157 shows a side view of a primary charge roller pressing on a photoreceptor drum showing a type A charge roller where the charge roller shaft is not long enough to fit in a type B primary charge roller assembly and a conversion spacer is placed in the PCR saddle to allow the conversion.

Figure 158:
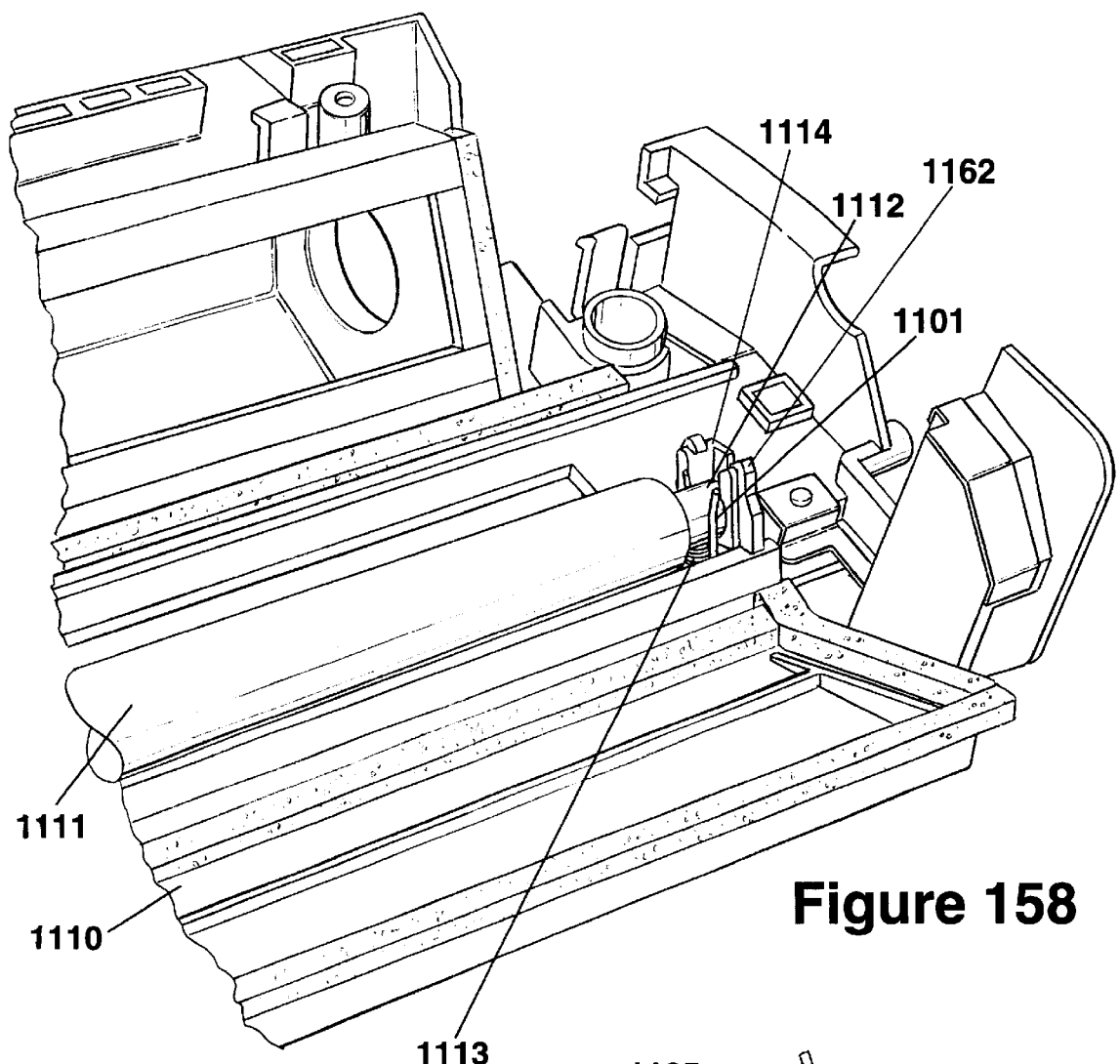

FIG. 158 shows an isometric view of a waste toner hopper with a primary charge roller that is given electrical contact with a two legged contact.

Figure 159:
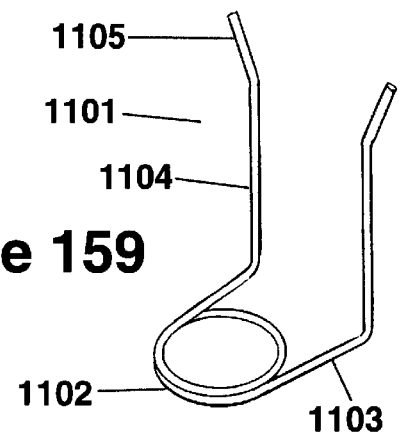

FIG. 159 shows an isometric view of the two legged contact of FIG. 158.

FIG. 160 shows an isometric view of an end of a charge roller assembly with a saddle and a unicorn contact with a straight end.

FIG. 161 shows an isometric view of the saddle, unicorn contact and charge roller assembly of FIG. 160 with a charge roller in the saddle with the end shaft of the charge roller contacting the contact.

FIG. 162 shows an isometric view of an end of a charge roller assembly with a saddle and a coil double prong spring contact.

FIG. 163 shows an isometric view of the saddle, double prong contact, spring and charge roller assembly of FIG. 159 with a charge roller in the saddle with the end shaft of the charge roller contacting the contact.

Figure 164:
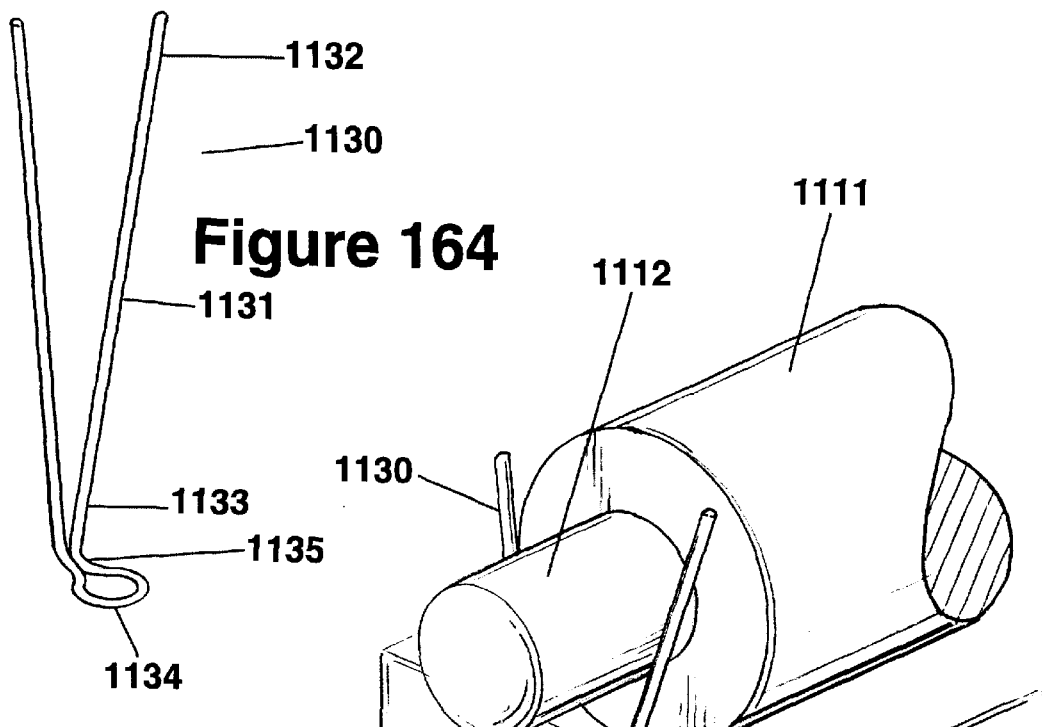

FIG. 164 shows an isometric view of a double prong contact for a primary charge roller with a hairpin base.

Figure 165:
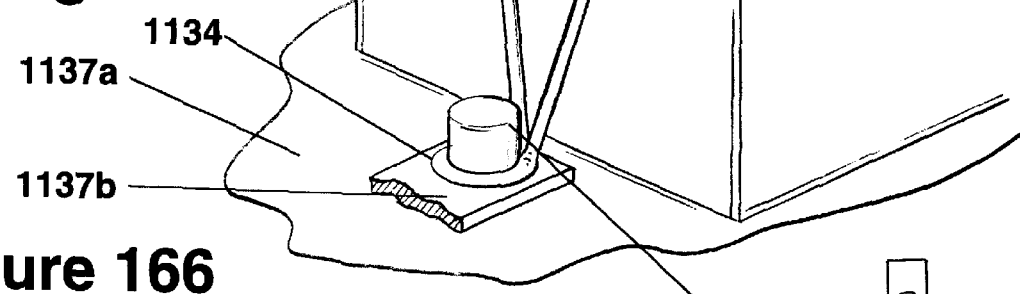

FIG. 165 shows an isometric view of the double prong contact for a primary charge roller with a hairpin base installed and touching the endshaft of a charge roller but without the saddle and saddle spring, shown this way for illustrative purposes.

Figure 166:
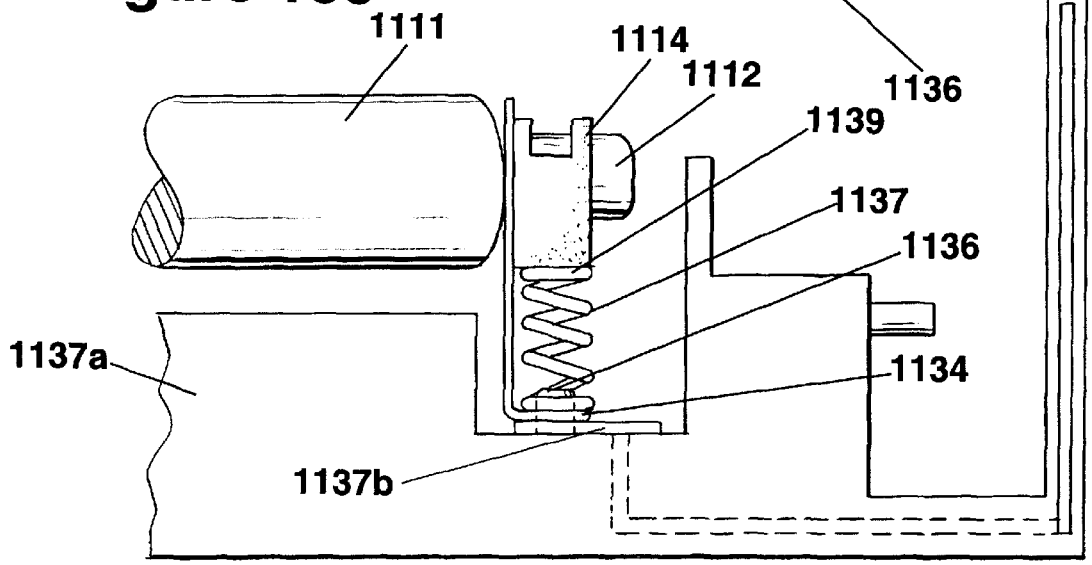

FIG. 166 shows a side view partial of the hairpin contact of FIG. 164 installed into a generic charge roller assembly with a charge roller.

FIG. 167 shows an isometric view of the process of placing the saddle with coil spring in place over two prong contact with a diamond shaped hair pin bottom.

FIG. 168 shows an isometric view of a two prong contact with a diamond shaped hair pin bottom placed over the nub at the bottom of a charge roller assembly which may also be press-fit over the nub.

Figure 169:
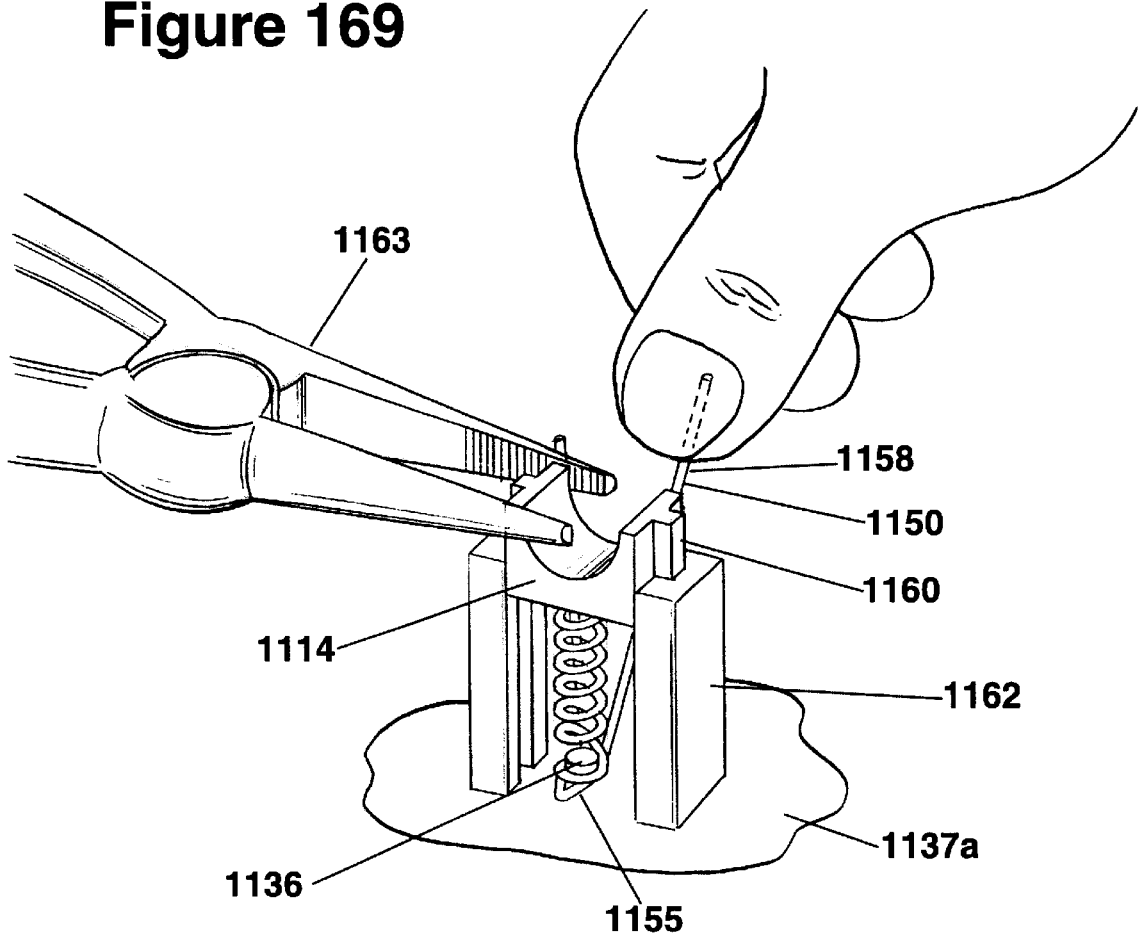

FIG. 169 shows an isometric view of the latter part of the process of placing the saddle with spring over the two pronged diamond shaped hair pin bottom contact showing how the installer is holding on to the diamond shaped bottom contact with the long prong so that the diamond shaped bottom contact will stay in position.

Figure 170:
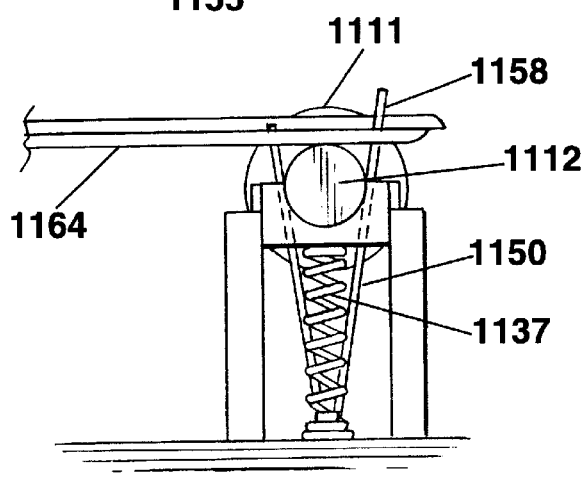

FIG. 170 shows an end view of the last step of the installation process of the diamond shaped hair pin bottom contact which involves cutting the tops of the two prongs with a scissors or other cutter.

FIG. 171 shows an isometric view of a typical saddle.

FIG. 172 shows an isometric view of the diamond shaped hair pin bottom contact.

FIG. 173 shows an isometric view of the diamond shaped hair pin bottom contact installed to the nub of the saddle instead of the nub of the PCR assembly, also showing the coil spring that secures the diamond shaped hair pin bottom contact in place.

FIG. 174 shows an isometric view of the diamond shaped hair pin bottom contact installed to the nub of the saddle instead of the nub of the PCR assembly, also showing the PCR assembly and the PCR being contacted with the diamond shaped hair pin bottom contact.

Figure 175:
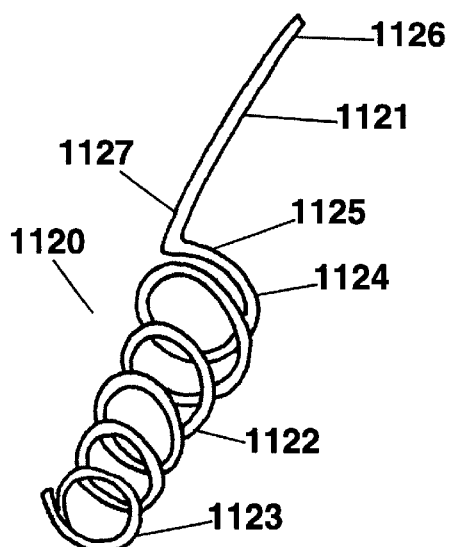

FIG. 175 shows an isometric view of a unicorn contact.

Figure 176:
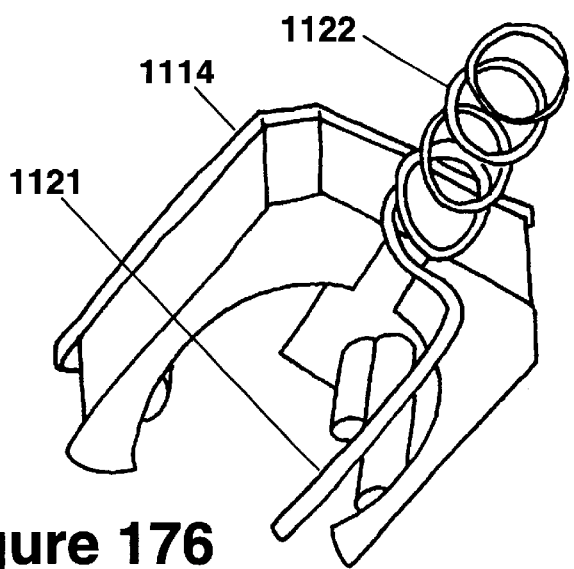

FIG. 176 shows an isometric view of a saddle and a unicorn contact with a straight end positioned on a nub of a saddle showing where the straight portion of the spring will touch the shaft of the PCR shaft that will rest in the saddle.

Figure 177:
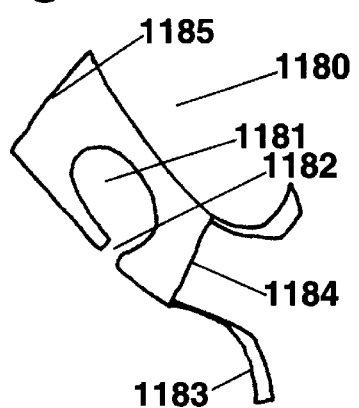

FIG. 177 shows an isometric view of a stamped metal spring contact with two prongs.

Figures 178, 179:
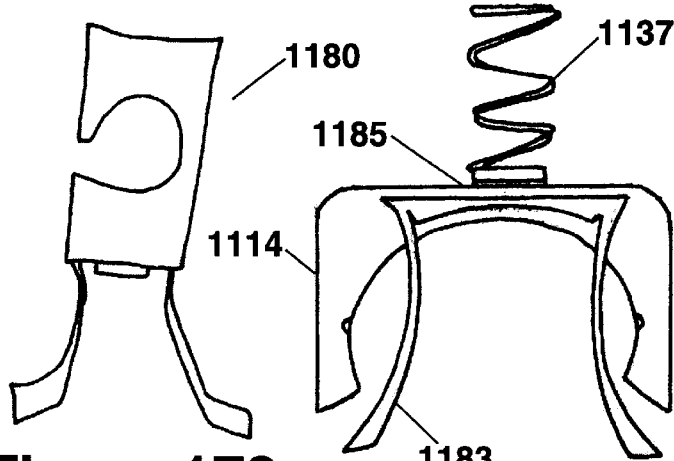

FIG. 178 shows an isometric view of a stamped metal spring contact with two prongs.

FIG. 179 shows an isometric view of a stamped metal spring contact with two prongs fit on a PCR saddle with a coil spring fit over the nub.

Figure 180:
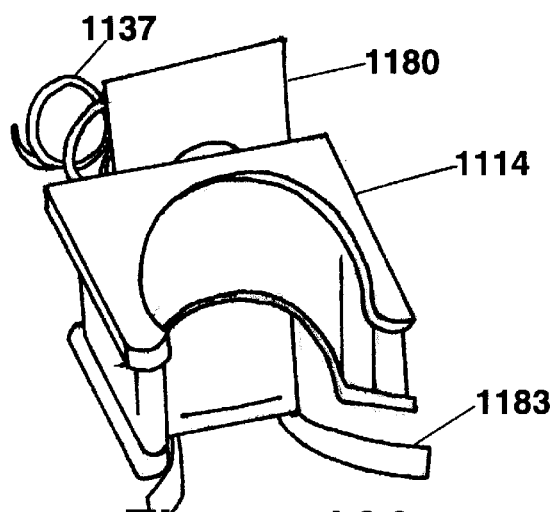

FIG. 180 shows an isometric view of a stamped metal spring contact with two prongs fit on a PCR saddle with a coil spring fit over the nub.

Figure 181:
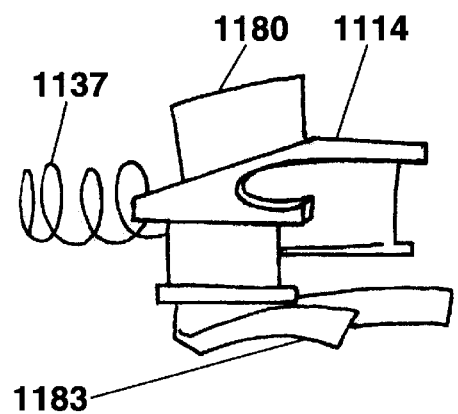

FIG. 181 shows an isometric view of a stamped metal spring contact with two prongs fit on a PCR saddle with a coil spring fit over the nub.

Figure 182:
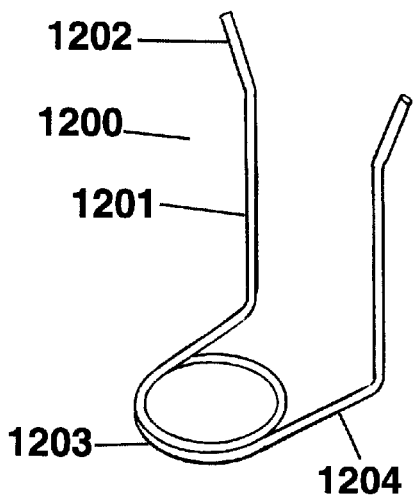

FIG. 182 shows an isometric view of a two pronged contact device for use in contacting a cylindrical contact member of a developer roller.

Figure 183:
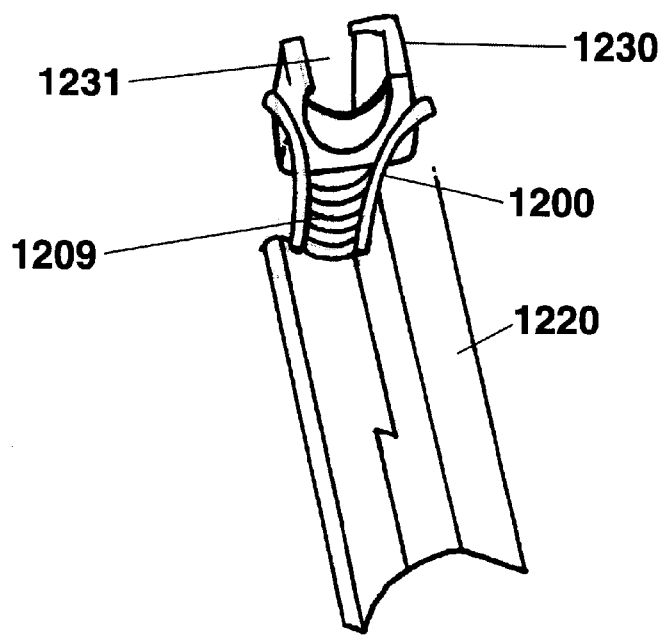

FIG. 183 shows an isometric view of a saddle used to hold a cylindrical contact member showing two pronged contact device for supplying electricity to the cylindrical contact member.

Figure 184:
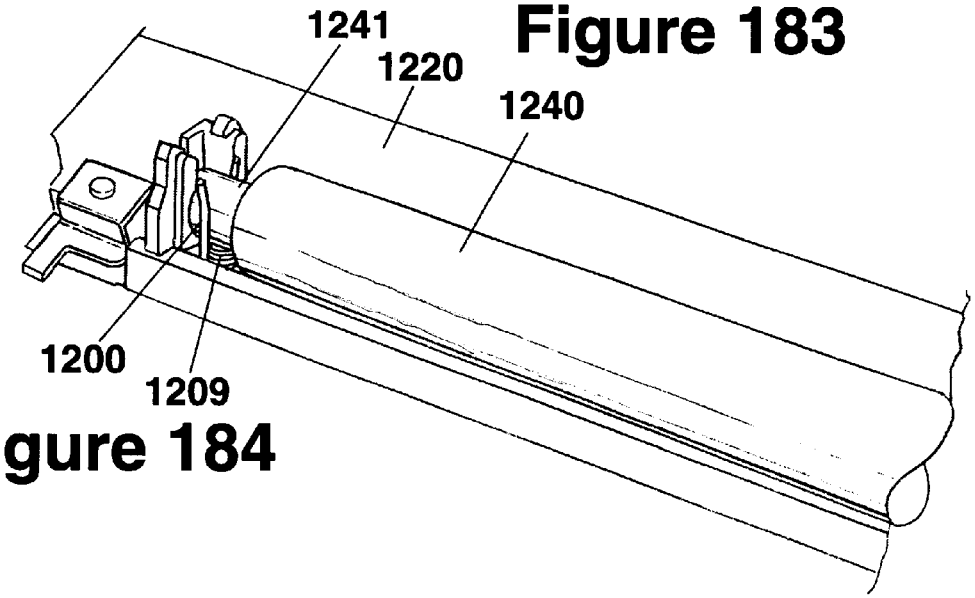

FIG. 184 shows an isometric view of a developer roller showing the cylindrical contact member being contacted by the two prongs of a two pronged contact device.

Figure 185:
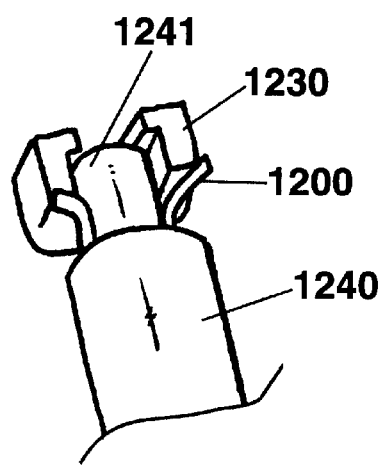

FIG. 185 shows an isometric view of a saddle holding a cylindrical contact member showing two pronged contact device for supplying electricity to the cylindrical contact member and a portion of a developer roller.

FIG. 186 shows an isometric view of the beginning of the process of installing the developer roller saddle into a developer roller assembly.

FIG. 187 shows an isometric view of a diamond shaped bottom two pronged contact for a developer roller placed over a nub and being held down in the installation process while the saddle is being placed over it.

Figure 188:
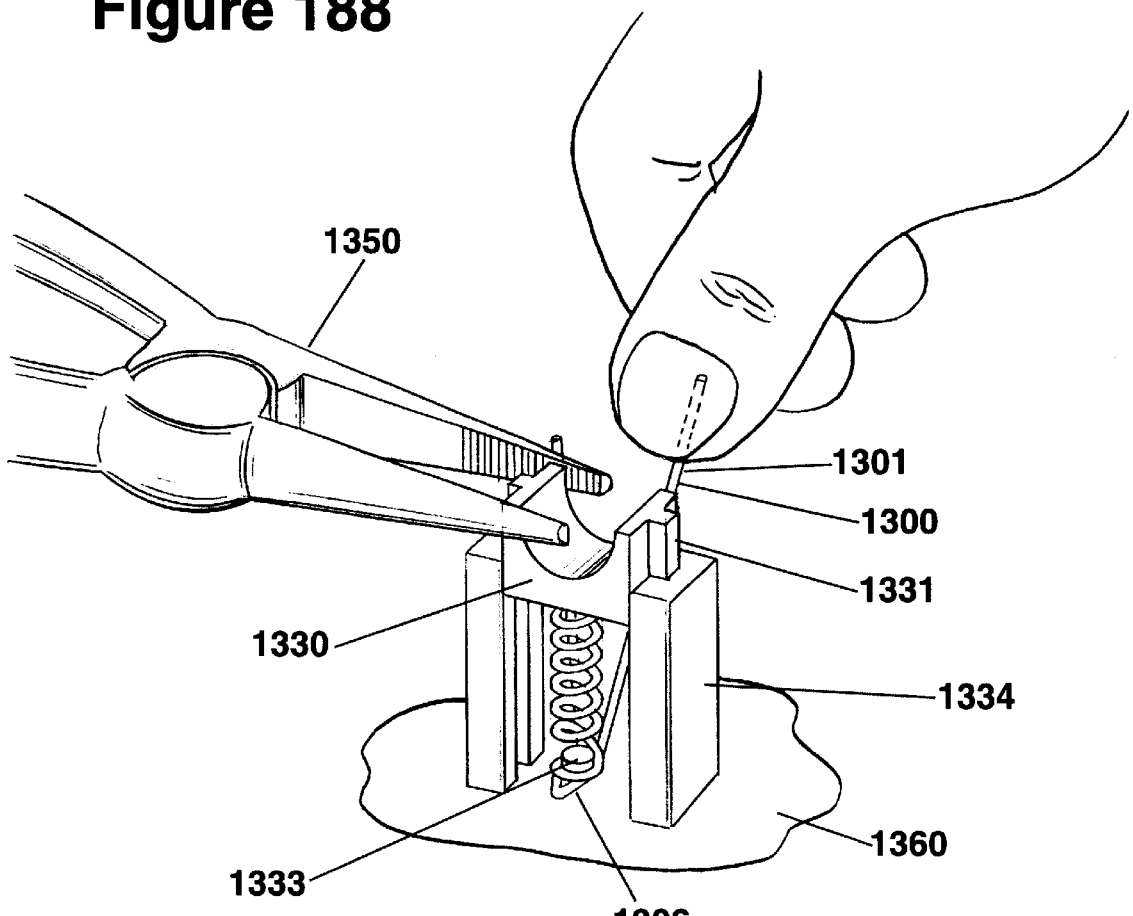

FIG. 188 shows an isometric view of the saddle with spring being placed over the diamond shaped bottom two pronged contact for a developer roller conductive member while the long prong is holding the diamond shaped contact in place during the install process.

Figure 189:
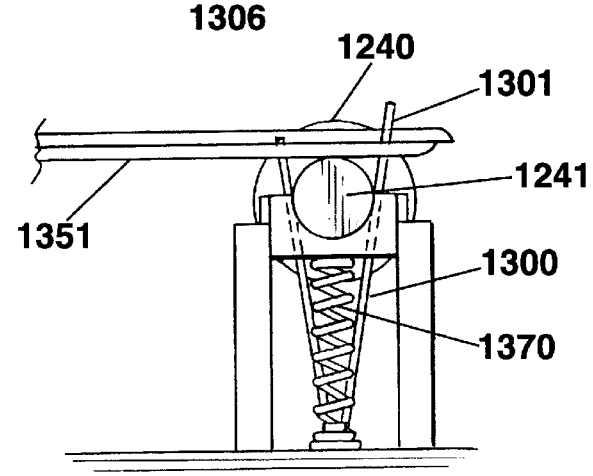

FIG. 189 shows an end view of the last step of the installation process of the diamond shaped bottom two pronged contact for a developer roller conductive member which involves cutting the prongs to length with a scissors or other cutting instrument.

FIG. 190 shows an isometric view of a typical saddle.

FIG. 191 shows an isometric view of a diamond shaped bottom two pronged contact for a developer roller conductive member.

FIG. 192 shows an isometric view of a diamond shaped bottom two pronged contact for a developer roller conductive member installed in a saddle using the saddle's nub for positioning with a coil spring locking it in place.

FIG. 193 shows an isometric view of a diamond shaped bottom two pronged contact contacting a developer roller conductive member installed in a saddle using the saddle's nub for positioning with a coil spring locking it in place with the developer roller.

Figure 194:
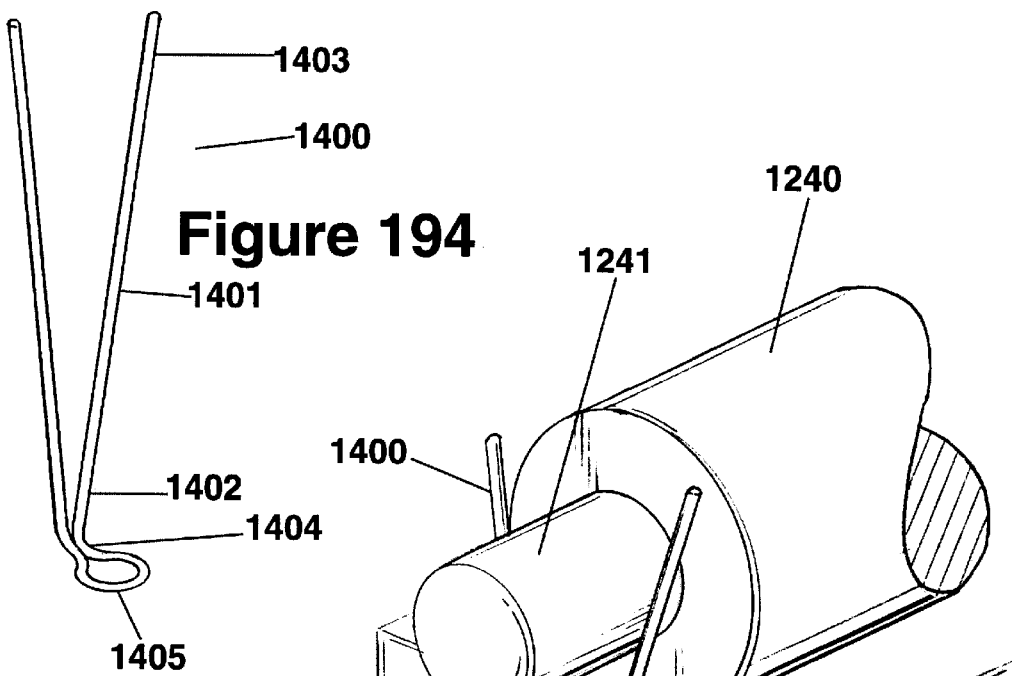

FIG. 194 shows an isometric view of a hairpin bottom two pronged contact for a developer roller conductive member.

Figure 195:
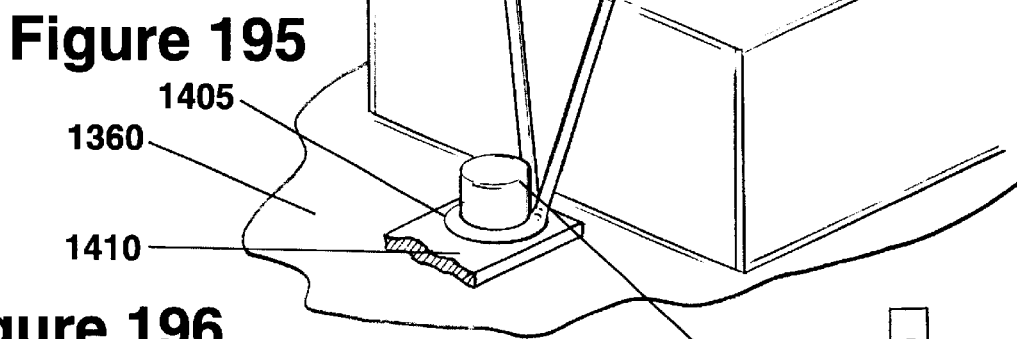

FIG. 195 shows an isometric view of a hairpin bottom two pronged contact for a developer roller conductive member fit over a nub of a toner hopper with the two prongs contacting the developer roller conductive member.

Figure 196:
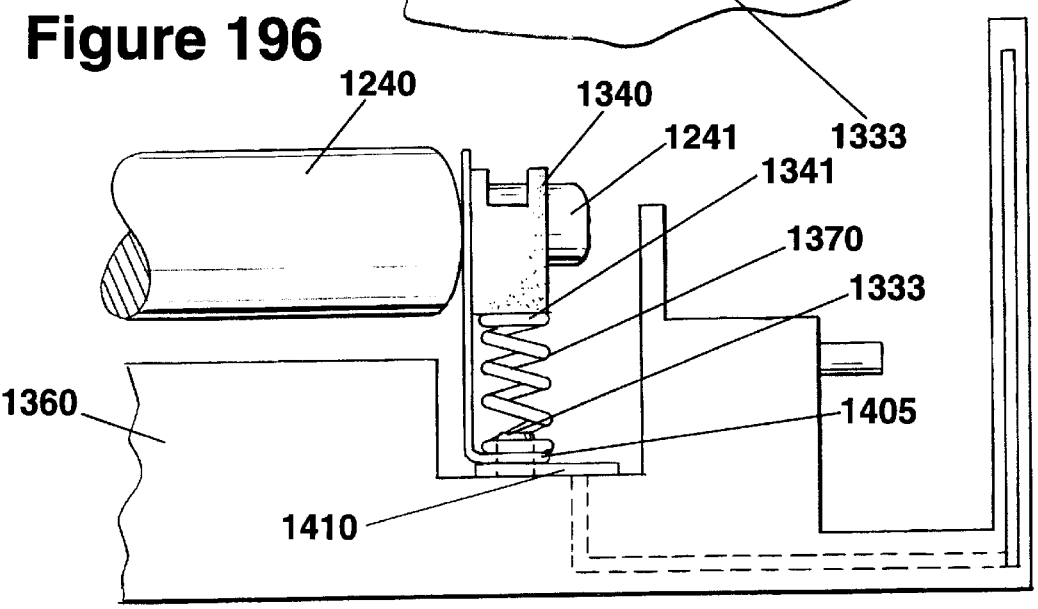

FIG. 196 shows a side view of a hairpin bottom two pronged contact for a developer roller conductive member fit over a nub of a toner hopper with the two prongs contacting the developer roller conductive member installed in a toner hopper showing the developer roller in place.

Figure 197:
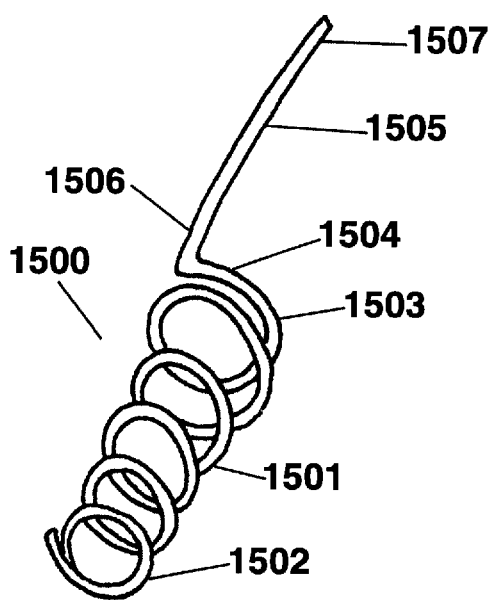

FIG. 197 shows an isometric view of a unicorn contact spring that goes under the saddle used for contacting a cylindrical contact member of a developer roller.

Figure 198:
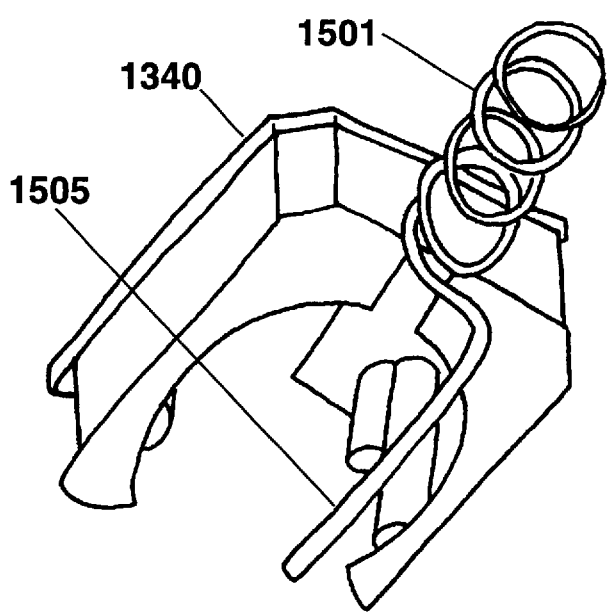

FIG. 198 shows an isometric view of a unicorn contact spring attached to the nub of the saddle as in FIG. 197 used for contacting a cylindrical contact member of a developer roller.

Figure 199:
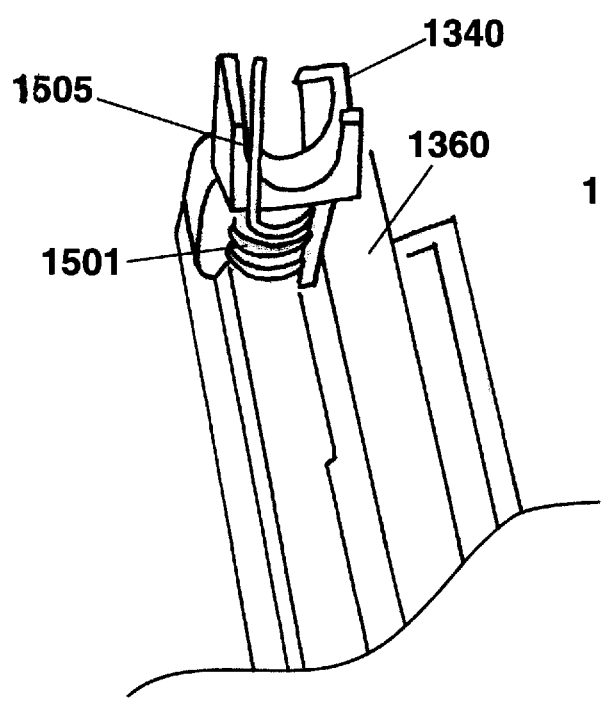

FIG. 199 is an isometric view of a saddle in a toner hopper with a unicorn contact spring under the saddle and the saddle is vacant as there is no cylindrical contact member of a developer roller in the saddle.

Figure 200:
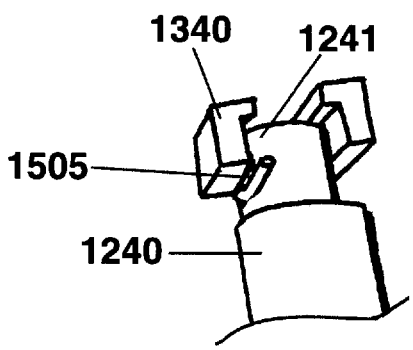

FIG. 200 is an isometric view of a saddle in a toner hopper with a unicorn contact spring under the saddle and the cylindrical contact member of a developer roller is in the saddle pressing against the straight piece of the unicorn contact.

Figure 201:
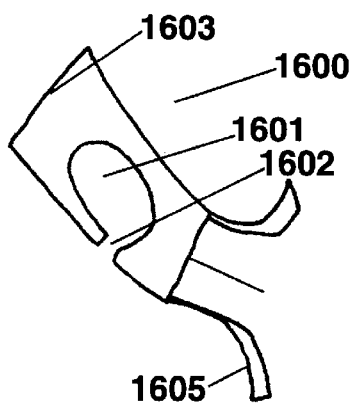

FIG. 201 shows an isometric view of a stamped metal spring contact with two prongs used for contacting a cylindrical contact member of a developer roller.

Figure 202:
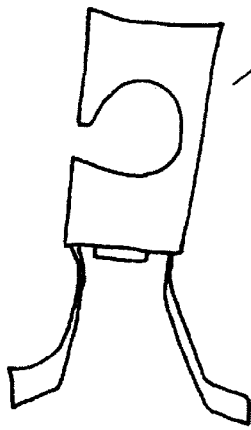

FIG. 202 shows an isometric view of a stamped metal spring contact with two prongs used for contacting a cylindrical contact member of a developer roller.

Figure 203:
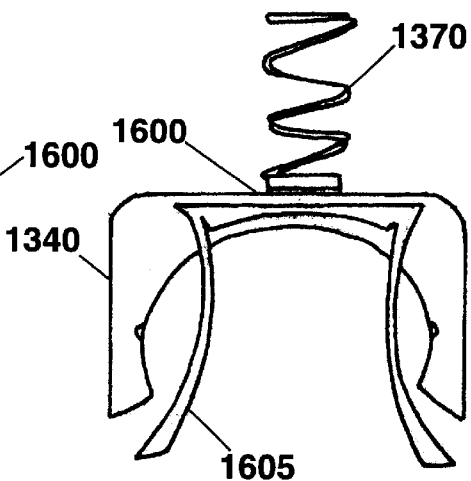

FIG. 203 shows an isometric view of a stamped metal spring contact with two prongs fit on a saddle with a coil spring fit over the nub used for contacting a cylindrical contact member of a developer roller.

Figure 204:
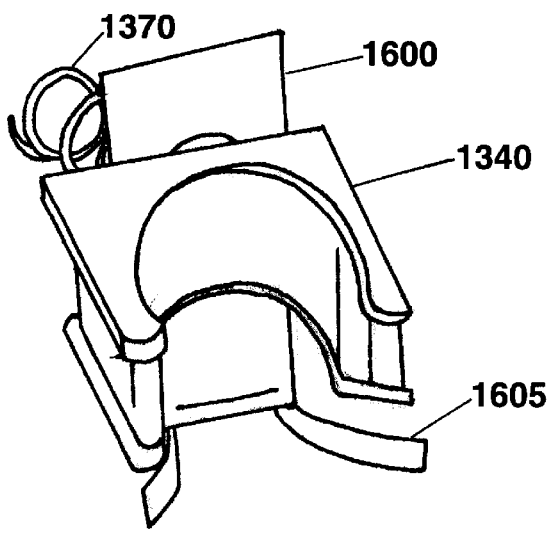

FIG. 204 shows an isometric view of a stamped metal spring contact with two prongs fit on a saddle with a coil spring fit over the nub used for contacting a cylindrical contact member of a developer roller.

Figure 205:
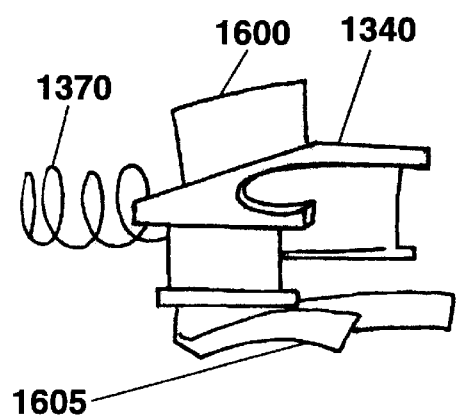

FIG. 205 shows an isometric view of a stamped metal spring contact with two prongs fit on a saddle with a coil spring fit over the nub used for contacting a cylindrical contact member of a developer roller.

Figure 206:
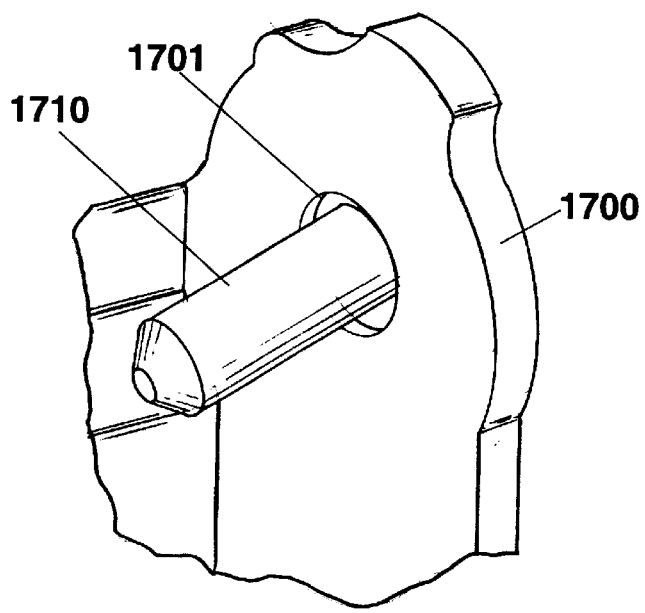

FIG. 206 is an isometric view of a drum axle improperly installed on an angle in a waste toner hopper without the drum.

Figure 207:
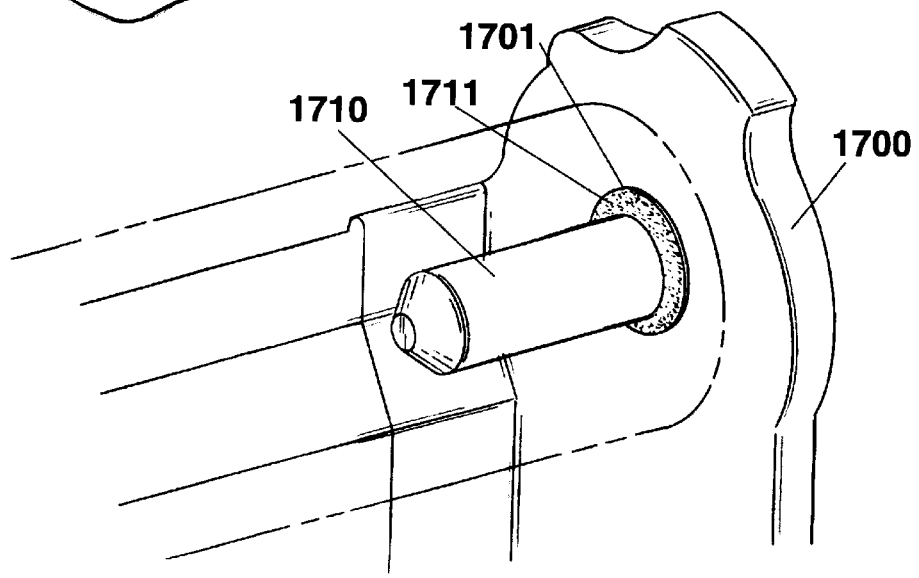

FIG. 207 is an isometric view of a drum axle installed straight, not on an angle in a waste toner hopper without the drum, installed straight by using an o-ring as an installation guide.

COMPLETE DESCRIPTION OF THE PREFERRED EMBODIMENT

This section will begin with a definition of some terms used in this patent Application. The purpose of this section is to try to avoid ambiguity in the meaning of any of the terms defined.

Nomenclature

1. Image Forming Apparatus or Image Forming System or Imaging System: An image forming apparatus is any device that uses dry toner to make an image, including but not limited to a laser printer, copy machine, facsimile machine and microfiche machine. An image forming apparatus uses a dry toner to make the image.

2. Toner cartridge: A toner cartridge is a device that goes into an image forming apparatus and has a photoreceptor, toner hopper and a waste toner hopper. There may be some toner cartridges where the toner hopper and waste toner hopper are connected or have interchanged components. Some toner cartridges use holding pins to attach the toner hopper to the waste toner hopper. Some older cartridges use a case to house the toner hopper and waste toner hopper and thereby hold them in proper position. Some toner cartridges do not include all the above components, for example, may be missing a photoreceptor and/or the waste toner hopper. This may be particularly so with a color toner cartridge.

3. Toner Hopper: A toner hopper contains a toner storage container, a developer roller, a printer contact device, a developer roller contact device, a shipping seal and various seals, strips and/or blades to prevent leaks. It usually contains a "magroller sealing blade" and a spreader blade or doctor blade. Oftentimes, a toner hopper contains a stirring paddle for mixing the toner. Sometimes a toner hopper has a "toner low bar" for sensing a low toner condition. Also, sometimes a toner hopper has an indicator for whether the shipping seal has been pulled or not. A toner hopper also has endseals that seal the developer roller near the ends from leaking out. A toner hopper also has a scraper to scrape near the ends adjacent the endseals either to prevent toner from leaking upstream or downstream to the endseals.Some toner hoppers do not include all the above components, for example, maybe missing a shipping seal or other component.

4. Waste toner hopper: A waste toner hopper is a device that collects unused toner. Often the waste toner that it collects may be mixed with paper particles. Usually a waste toner hopper has other components besides a receptacle for receiving the waste toner. It usually contains a drum cleaning blade otherwise known as a wiper blade. It usually contains a recovery blade, sometimes known as a scavenger blade, keeper blade, MYLAR or waste hopper blade.

5. Photoreceptor: A photoreceptor reacts to light. In the typical case, a photoreceptor will be insulative but conductive when exposed to laser light. A photoreceptor may be manufactured in the form of a drum or a belt. A drum photoreceptor is a cylinder with a photoconductive coating on it. A belt photoreceptor is a belt with photoconductive coating on it used in an image forming apparatus. A photoreceptor in some ways resembles a capacitor. In an imaging system, the photoreceptor's latent image defines the image on the page.

6. Reservoir, Garbage Can, Trash Container or Toner storage container or Toner Storage Tank: A toner storage container is also called a reservoir. It is essentially the tank that stores the toner for use. Oftentimes, the reservoir has one or more paddles to stir the toner.

7. Developer roller: A developer roller is a roller that holds toner for dispensing in the print process.

8. Magnetic roller: A magnetic roller is a developer roller that has a sleeve and at least one magnet inside. The magnet(s) cause magnetic toner to be attracted to the outer wall of the sleeve for dispensing toner.

9. Sleeve: A sleeve is a thin walled tube used in a magnetic roller and has at least one magnet inside.

10. Cylindrical member: A contact device that is cylinder shaped.

11. Contact: (Noun) Contact is defined as electrical contact between any two or more things. It can also be a device that makes electrical contact between any two or more things directly or indirectly. A contact device does not have to be the only supply of electricity to another component, for example, a developer roller may have a primary contact device and a secondary contact device that may have a relatively minor electrical effect on the developer roller and is also considered a contact device. If a contact uses a spring directly in its electrical path, then contact means the spring and the contact, if the spring is not mentioned with it.

Contact: (Verb) to make electrical contact between two or more things either directly or indirectly.

13. Printer Contact device: A device in the toner cartridge that makes contact directly or indirectly with the printer's power supply, as it is in the electrical component chain of the bias electrical voltage from the imaging system's power supply to the developer roller, but this device directly engages the printer from the toner cartridge and also makes contact to any number of components in the electrical chain that leads to the developer roller.

14. Shipping seal: A seal device that prevents toner from leaking from the toner hopper of a toner cartridge from the time the toner cartridge is manufactured or remanufactured until the time when the toner cartridge is to be used by the enduser. The enduser then pulls on the shipping seal after which toner is released to be dispensed in the toner cartridge so that the toner cartridge may be installed into the image forming system.

15. Strip: (noun) A strip is a strip in a toner cartridge or an image forming system. Most strips act as a seal in some way. Some examples of strips are recovery blades and magnetic roller sealing blades. Some strips act as a seal and also have another function such as a drum cleaning blade cleans a photoreceptor while it also forms a seal.

16. Blade: A blade is any blade or strip in a toner cartridge or image forming system, usually a strip of some sort, such as spreader blade, sealing blade, recovery blade, wiper blade, drum cleaning blade, and so on.

17. Magroller sealing blade: A magroller sealing blade or magnetic roller sealing blade is a strip that is adhered to a toner hopper and partially sticks out in the narrow dimension. The part that sticks out in the narrow direction rubs against the magroller or magnetic roller or developer roller to prevent leakage along an edge.

18. Doctor blade: A doctor blade is a strip that doctors some toner from the magnetic roller to control the toner thickness on the developer roller which in turn controls the amount of toner that may be transferred from the developer roller to the photoreceptor. The spreader blade is sometimes called a doctor blade.

19. Spreader blade: A spreader blade is a flexible blade, usually an elastomeric blade, usually on a metal frame. The flexible portion of the spreader blade rubs on the developer roller, thus controlling the amount of toner on the outer surface of the developer roller that may be transferred from the developer roller to the photoreceptor, and thus controlling print darkness. The spreader blade is sometimes called a doctor blade only because it does the same thing in a different way. One advantage of a spreader blade over the doctor blade is that the spreader blade, when it rubs the toner on the developer roller, it thereby may charge the toner from the rubbing action. This is similar to the way that a balloon may be rubbed on a wool sweater to get charged. When the toner is charged, it performs better, for example the toner can have a greater efficiency and cause less waste toner to accumulate in the waste toner hopper. For these reasons, the spreader blade is preferred over the doctor blade.

20: Stirring paddle: A stirring paddle or agitator is a device on a rotating rod inside the toner hopper that agitates to toner to stay stirred for improved toner properties which enhances print quality or helps prevent print quality from degenerating.

21: Toner low bar: A metal bar that electrically helps detect when the toner cartridge is low on toner. Oftentimes, this sensor acts up by giving a false toner low signal when the toner cartridge has a poor bias voltage electrical contact.

22: Endseal or endfelt: A seal near the ends of the print region of a developer roller which are there to prevent or minimize leakage of toner beyond the endseals. Endseals may be hard magnetic seals or soft felt-like material.

23: Scraper: A scraper or mag roller scraper is a device that scrapes the developer roller to minimize or prevent leakage from the toner hopper. Usually, the region being scraped has a shiny look.

24: Downstream: Downstream is towards the direction where toner will leak, for example toner on a magnetic roller migrating toward the endfelt in the direction outside the endfelt which would cause a toner leak.

25: Upstream: Upstream is towards the direction where toner will not leak, for example toner on a magnetic roller migrating away from the endfelt in the direction inside the pair of endfelts which would cause a toner not to leak.

26. Toner: A dry powder used to print on an output page. Oftentimes, toner powder contains mostly styrene with oxides of iron, but this is not a rule, as long as the powder is designed to wind up on the output page.

27: Waste toner: Toner powder that is scraped off the drum after imaging, toner powder that did not find the output page as its destiny, and thus was scraped by the drum cleaning blade into the waste toner hopper. Waste toner may be mixed with paper particles to some extent.

28: Wiper blade or Drum Cleaning Blade: A blade, usually an elastomeric blade, usually housed on a metal frame, which scrapes excess toner off of the photoreceptor where it lands into the waste toner hopper.

29: Recovery blade: A strip or blade in a waste toner hopper that is parallel to the drum cleaning blade that is used to prevent leakage.

30: Primary Charge Roller or PCR: A roller device used to provide or deposit an electrostatic charge onto a photoreceptor.

31: Chain of electrical components: Any set of components that are in contact together either directly or indirectly, for example a printer electrical contact and a shaft collar on the conductive member of a developer roller (as shown in this invention) are in the same electrical chain although they do not physically touch each other yet they do contact each other.

The Image Forming System and Toner Cartridge

FIG. 45 shows a typical image forming apparatus 350 which may be either a printer, a copy machine or a facsimile machine. Some image forming apparatae use a toner cartridge 351 shown in FIG. 39 while others have all components built into the image forming apparatus 350.

Figure 1:
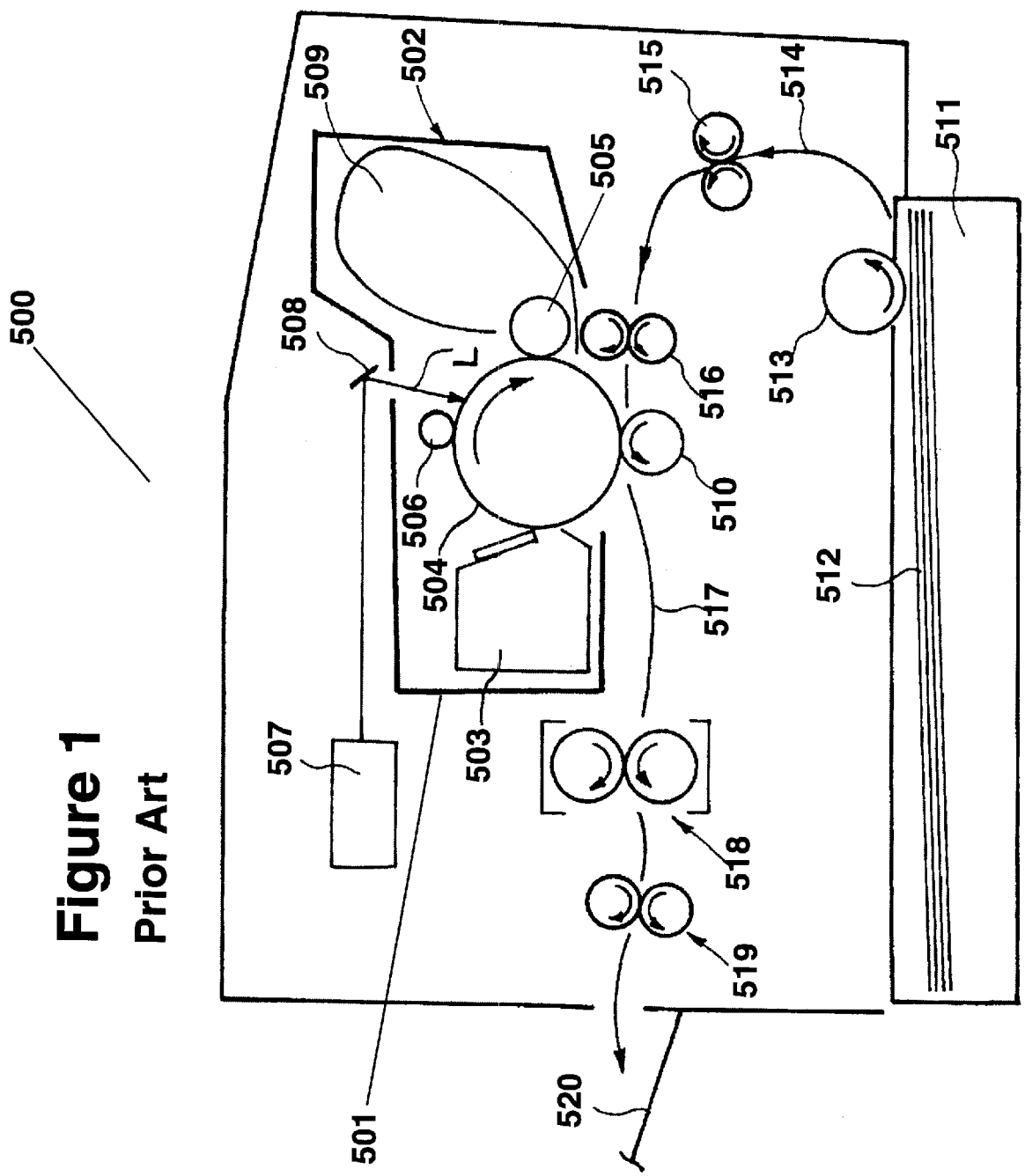
FIG. 1 is a cutaway view of a typical image forming apparatus showing the toner cartridge portion inside it and this figure is just for the purpose of showing the basic theory of the technology.
Figure 2:
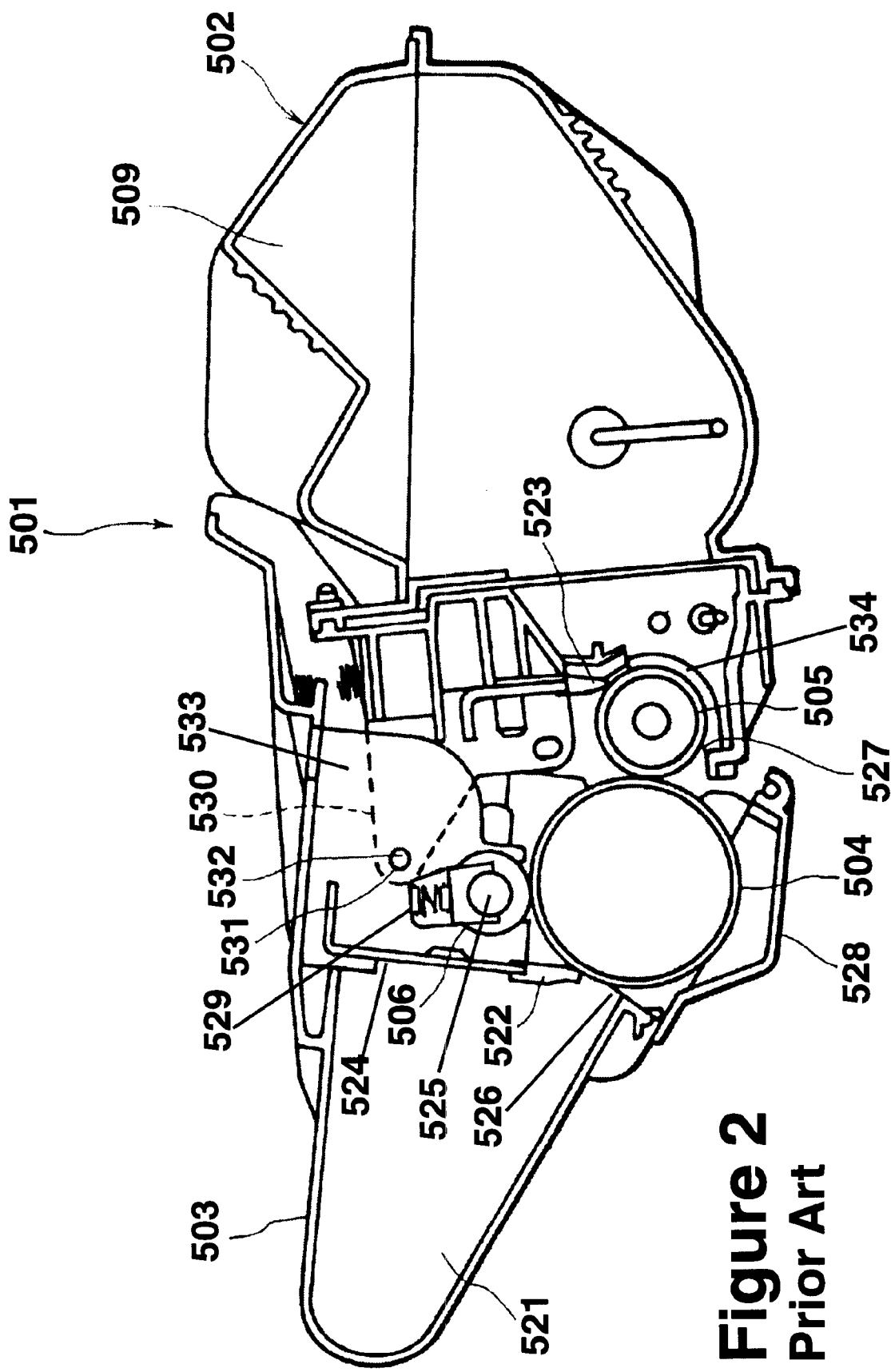
FIG. 2 is a cutaway view of a typical toner cartridge and is for the purpose of showing the basic theory of the technology.

FIG. 1 shows an image forming apparatus 500 or imaging device 500 or image forming system 500. This particular image forming device 500 uses a toner cartridge 501 shown in the image forming apparatus 500. FIG. 2 shows the typical toner cartridge 501. The toner cartridge 501 is made up of a toner hopper 502, a waste toner hopper 503 and a photoreceptor 504. In the examples, the photoreceptor is a cylindrical drum, however, a photoreceptor belt (not shown) is also common. Of course, the toner cartridge may have other components such as a case that house the toner hopper 502 and waste toner hopper 503 of the toner cartridge (not shown) or a pin 532 that connects the toner hopper 502 to the waste toner hopper 503. In this example, the toner cartridge 501 has a coupling element 530 with a hole 531 therein which holds the pin 532 snugly. The waste toner hopper 503 has a structure 533 also with a hole 531 where the pin 532 goes through to join the waste toner hopper 503 to the toner hopper 502. Inventor Michlin holds U.S. Pat. Nos. 5,390,002 and 6,118,959 on improved holding pins for toner cartridges.

The Toner Hopper

This toner hopper has a tank 509, storage container 509 or reservoir 509 which holds the unused toner. In the toner hopper 502, the spreader blade 523 or other form of doctor blade rubs against the toner that is magnetically clung to the developer roller 505 the magnetic roller 505 causing the toner to electrostatically charge up. This is similar to rubbing a balloon on a wool sweater which electrostatically charges the balloon after which the balloon's charge exceeds the gravitational force on the balloon when it is suspended from a wall or a ceiling. The spreader blade 523 also helps prevent leakage of toner from the toner hopper 502. Also preventing leakage is the mag roller sealing blade 527 and a pair of endseals 534, one endseal 534 at or near each end of the developer roller 505. Thus, the developer roller while containing toner powder and distributing toner powder, remains hermetically sealed from unwanted leakage. There is another seal not yet shown in the toner hopper, the shipping seal which prevents leakage while the toner cartridge is shipped to the user location where it may experience bouncing, vibrations, pressure changes and so on en route to its destination. The shipping seal is typically pulled from the toner cartridge 501 by the enduser at the location of the imaging device 500 to allow toner to be used during imaging.

The Waste Toner Hopper

The waste toner hopper 503 has a tank 521 for storing the used toner particles which also receives impurities such as paper particles. The wiper blade 522 (attached to frame 524) scrapes toner from the photoreceptor 504 and also acts as a seal to prevent leakage of toner from the waste tank 521 that stores unused toner. Also acting as a seal is the recovery blade 526. FIG. 2 is not shown in actual orientation because it does not show that most waste toner hoppers use gravity as a tool for the toner scraped off the drum 504 to fall into the tank 521. The primary charge roller 506 or PCR 506 is usually made of a partially conductive rubberized roller around a metal shaft 525 that transmits or deposits an electrostatic charge to the drum 504. The PCR 506 has a metal shaft 525 and a spring 529 with a saddle that is used both to transmit electricity to the PCR 506 and also to maintain constant pressure between the drum 504 and the PCR 506 as they rotate together, the PCR 506 is driven by the drum 504. The drum 504 is protected from external damage during transportation and handling by a shutter 528 which in simple terms is a door that opens to expose the fragile drum 504 when the toner cartridge 501 is installed into the image forming apparatus 500 or image forming system 500. Usually, the PCR 506 is a component of the waste toner hopper 503, however, some toner cartridges 501 are configured differently where some of the components of the toner hopper 502 and waste toner hopper 503 are switched around. There are many configurations that achieve the same result. The typical case is shown but not limited to the examples. What is shown in FIGS. 1 and 2 are a typical toner cartridge 501 and image forming system 500 as they are made in the year 2000. Note that most systems today use a PCR 506 for charging the drum 504, however, some systems use corona assemblies (not shown) which consist of a wire that electrostatically charges up and the charge is transferred to the drum. There maybe other new charging systems in the future not mentioned in this Patent application.

The image forming system 500 has a laser light source 507 which reflects light onto mirrors 508. The mirrors 508 reflect light "L" and move slightly generating "scan lines" along along the length of the scan line. Each pixel represents a true or false signal, light or no length of the drum 504 where the "scan line" is composed of discreet, equally spaced pixels light. In simple terms, what happens is that the PCR 506 charges the drum 504. Where the laser light hits in any specific pixel location on the previously charged drum 504, the drum 504 is discharged and where the light hits the drum 504 and pixels where no light hits the drum 504 remain charged. In most imaging systems 500, the charged pixels repel toner and the discharged pixels attract toner so that charged pixels are white space and uncharged pixels are black (or other color) space. However in other systems, particularly those with positively charged toner, the opposite takes place where charged pixels become black and discharged pixels become white. In the current technology, there is no "grey space". Shades of grey or other colors are simulated by mixing dot patterns or pixel patterns of dark and white. The pixels are very small ranging in the year 2000 from about 1/300" to about 1/1200" and some imaging systems 500 such as those used in typesetting can go much smaller such as 1/2400" and smaller. Thus with patterns of such small pixels, patterns of black and white dots can trick the eye into seeing shades of gray, however, these shades of gray are optical illusions.

The paper 512 is stacked in the paper tray 511. The pickup roller 513 moves a sheet of paper in the paper path beginning at 514. Then the paper 512 moves through a pair of rollers 515 and another pair of rollers 516. The paper 512 then moves between the photoreceptor 504 and the transfer charge roller 510 or TCR 510 where the image of toner powder is electrostatically transferred from the drum 504 to the paper as the charge of the TCR 510 attracts all toner from the drum 504. Whatever toner on the drum 504 that does not get transferred stays on the drum 504 and then gets scraped by the wiper blade 522 into the tank 521 of the waste toner hopper 503.

After the toner is transferred to the paper 512 at the TCR 510, it moves further to 517 in the paper path. At this point, the toner is powder on the paper 512 in the form of the image. However, if one was to turn off the power of the image forming system 500 or IFS 500, at this point, this image would look like the output image, but one can wipe this image right off the page 512 as the toner is not adhered to the page. Then the paper 512 moves through the fuser roller section 518 where pressure rollers called fuser rollers heat-press the toner to the page so that the toner sticks to the page and the image is thus preserved. Then the output rollers 519 move the paper 512 outside the IFS 500 to the output tray 520 where the output paper 512 is completed with the image properly on the paper 512. Please note that the IFS 500 and toner cartridge 501 shown in FIGS. 1 and 2 are simplified diagrams of how an IFS 500 functions and a real system has more moving parts.

Figure 39:
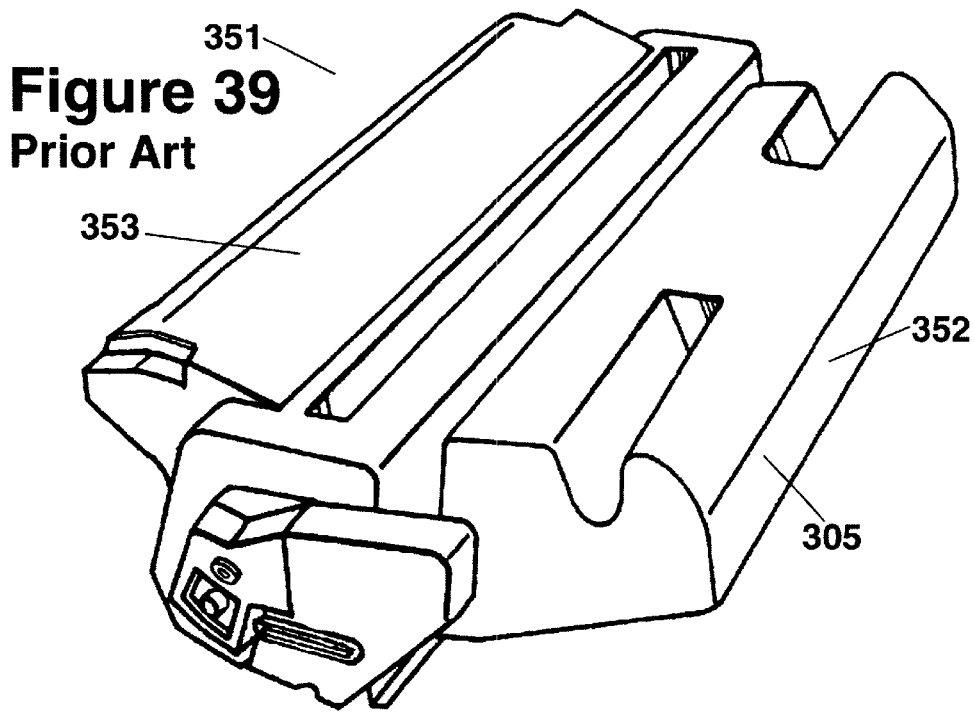
FIG. 39 is an isometric view of a typical toner cartridge.
Figure 40:
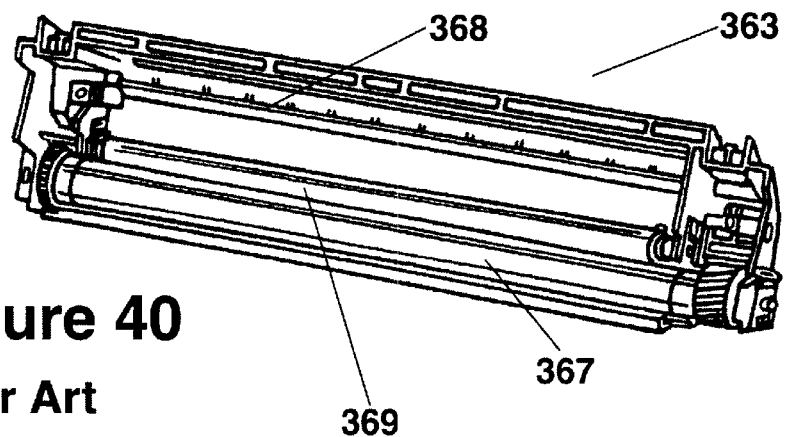
FIG. 40 is an isometric view of a waste toner hopper.
Figure 41:
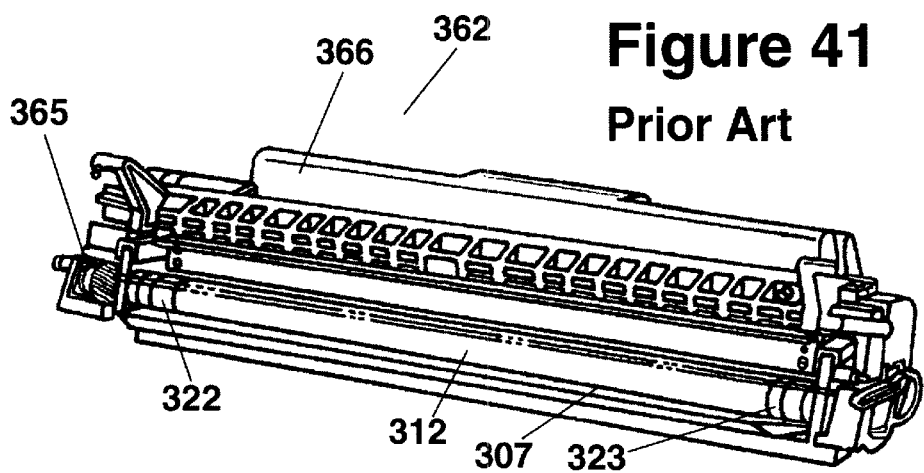
FIG. 41 is an isometric view of a toner hopper.
Figure 42:
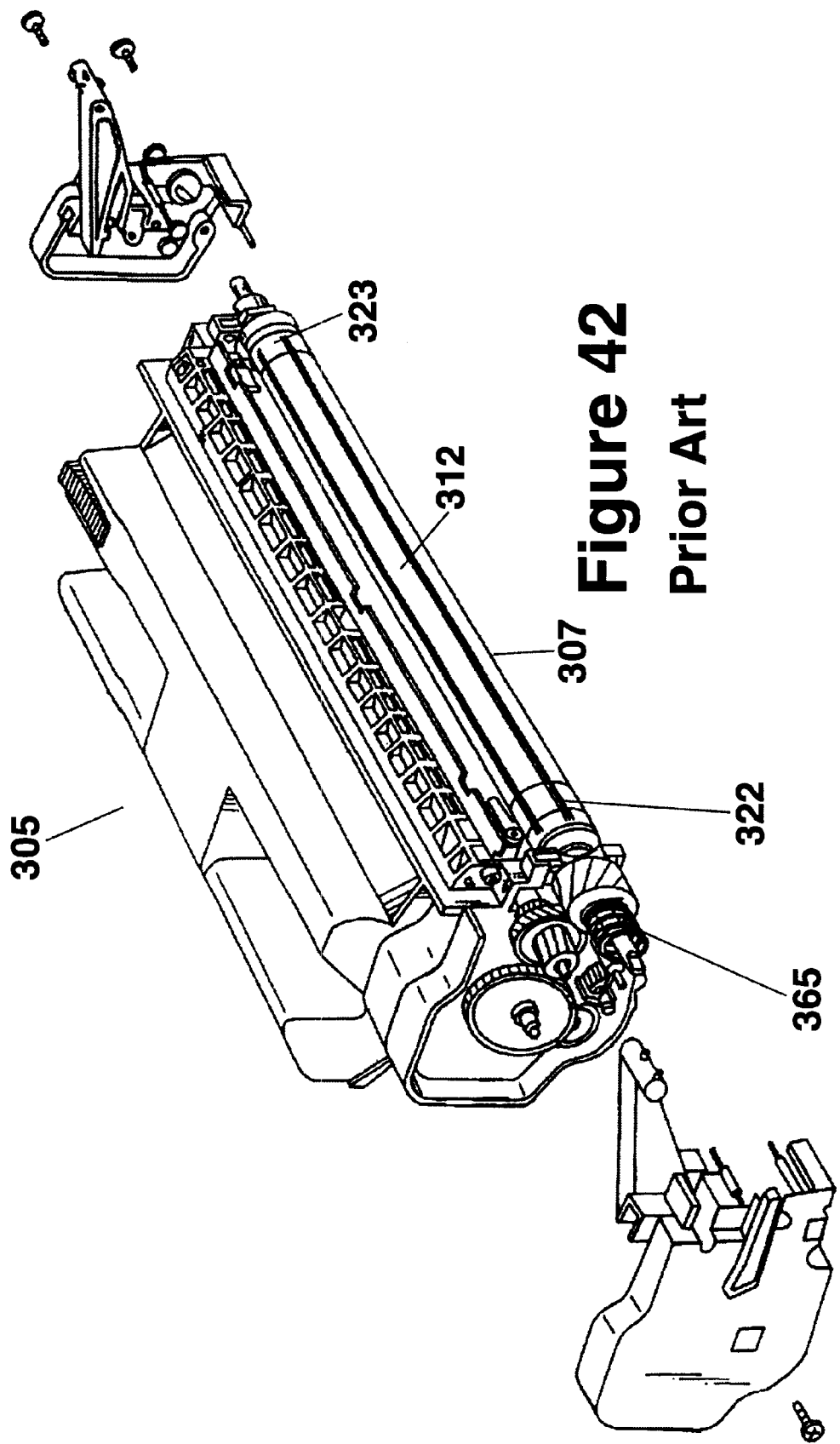
FIG. 42 is an isometric breakdown of a typical toner hopper and its components.

The toner cartridge 351 of FIG. 39 is typically made up of two components, the toner hopper 352 and the waste toner hopper 353. FIGS. 40–41 show another set of tonerhopper 362 and waste toner hopper 363. The toner hopper 362 has a developer roller 307, a contact 365 and a tank 366. The waste toner hopper 363 has a photoreceptor 367, a charge roller 369 and a waste tank 368.

Figure 43:
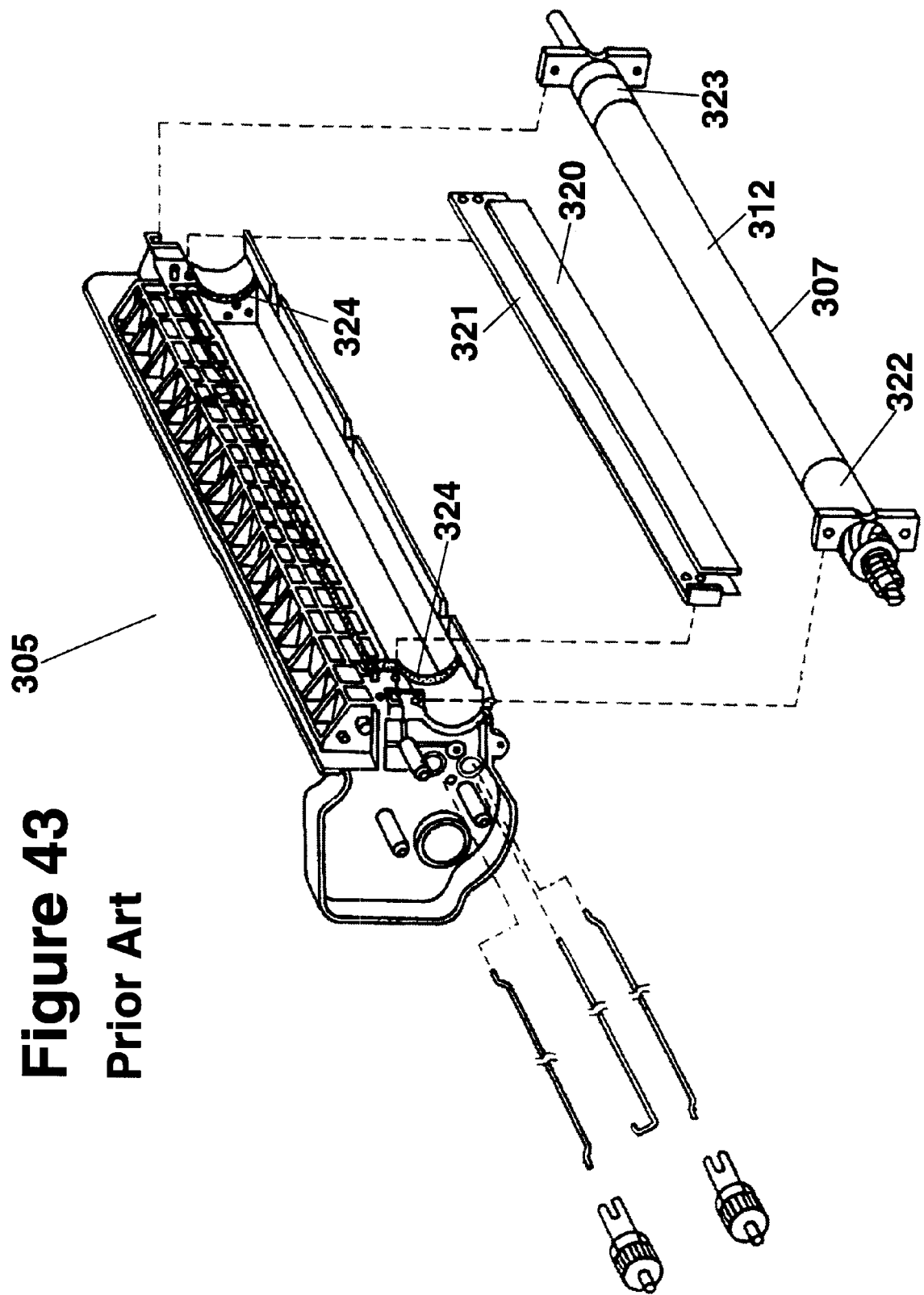
FIG. 43 breaks down more components of a toner hopper so that you may see the components that were blocked from view inside the toner hopper.

The toner is attracted from the developer roller 307 to the photoreceptor drum 308 as illustrated in FIG. 47. The toner 309 is composed of black plastic resin bound to iron particles. The developer roller 307 has a magnetic core 310 so the toner particles are attracted to it. As the roller 307 rotates with toner 309 on it, the doctor blade 306 controls the thickness of toner on the surface of the developer roller 307. Newer devices use a urethane spreader blade 320 held in place by being on a metal assembly 321 as shown in FIG. 43. The plastic toner particles receive a negative surface charge by rubbing against the developer roller because the roller 307 is connected to a DC supply. The electrostatic charge on the particles attracts the toner 309 particles to uncharged portions of the photoreceptor drum 308 that have removed charge using pixels of light. The charged areas of the photoreceptor drum 308 repel the toner particles 309. An AC potential on the developer roller 307 helps move the toner 309 to the photoreceptor drum 308 at the desired uncharged areas yet helps toner come back to the developer roller 307 from charged areas of the drum 8 to improve density and contrast because the AC charge alternates.

The roller 307 has a nonprint region 322 and 323 shown in FIG. 43. In this nonprint region 322 and 323, the developer roller 307 is smoother than the toner transport section 312 of the roller 307. Toner is not allowed to adhere to the surface of the roller 307 in the nonprint region 322 and 323. Typically, a felt pad 324 forms a semicircle, partially around the roller 307 and seals off the end of the roller 307 to prevent toner leakage from the assembly 305. The smooth felt pad 324 keeps the nonprint region 322 of the roller 307 clean or free of toner and other debris. Also, in some models, a plastic member 910 in FIG. 133, attached to the doctor blade 306 frame has an extension 911 with a scraping edge 912 which scrapes toner from the area of the nonprint region 322 and 323 of the roller 307.

In older toner cartridge assemblies like SX, the all-metal doctor blade is charged the same as the developer roller bias, and is on the same circuit, and similarly the frame of the NX doctor blade is charged with a bias voltage.

It should be noted that the toner transport section 312 of the developer roller 307 cannot be an electrical contact point for two reasons. First, it has a rough surface, typically etched and sandblasted with glass beads or other special treatment such as a conductive coating. Secondly, the section 312 has a continual layer of toner on it. This toner is ready to be transported to the photoreceptor drum.

FIGS. 44 and 46 show another waste toner hopper 401. The waste toner hopper 401 has a wiper blade 402 or cleaning blade 402 with a sharp cutting edge 403. The waste toner hopper 401 has a tank 404. There is a recovery blade 405, sealing blade 405 or keeper blade 405 that acts as a seal so that as waste toner that is scraped into the waste tank 404 will fall through the opening 406. The toner will gravity fall between the cleaning blade 402 and the recovery blade 405. The recovery blade 405 has a pickup magnet 407 nearby to pick up any toner that may leak out when the enduser removes the toner cartridge 351 from the image forming apparatus 350 for any reason.

Figure 3:
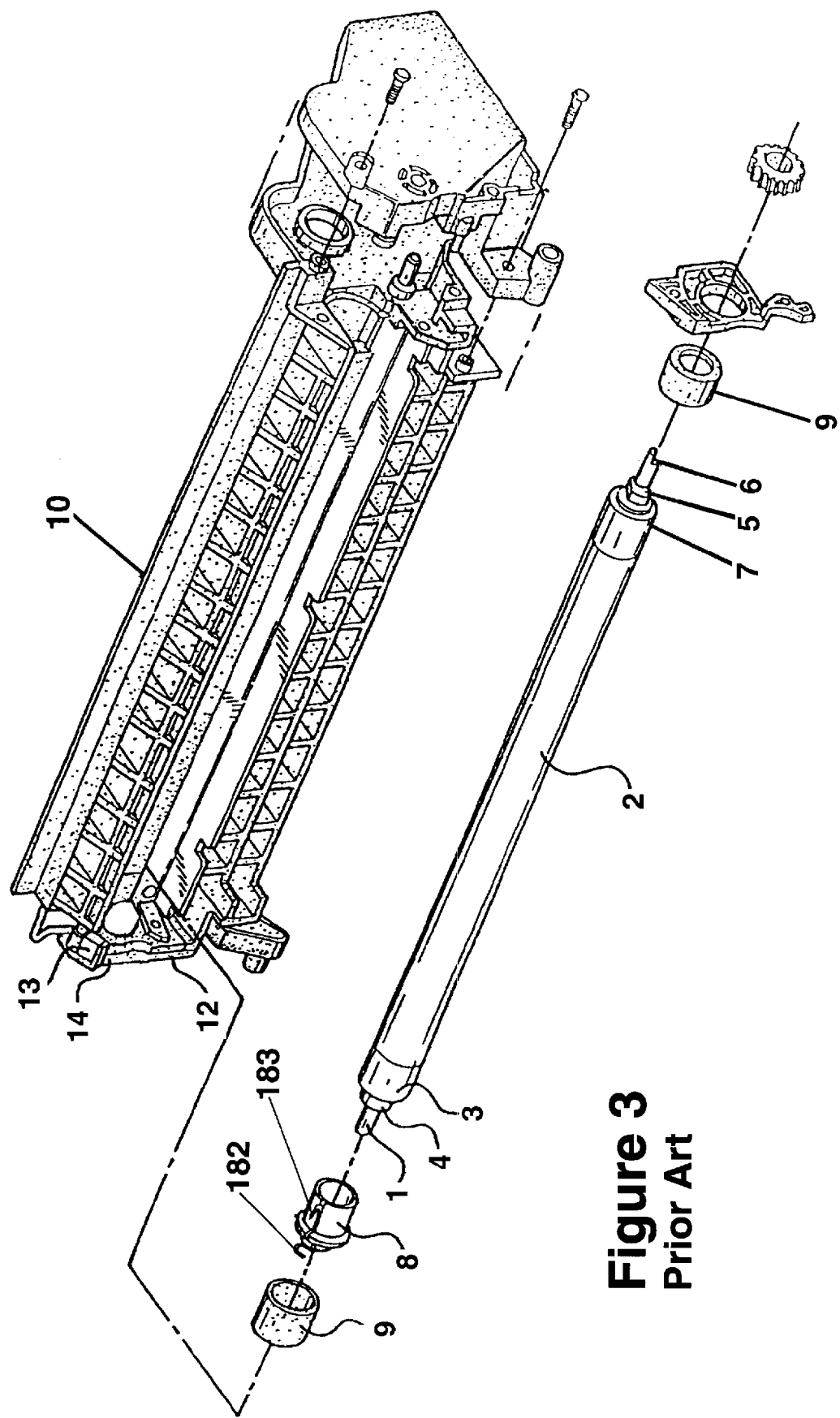
FIG. 3 is an isometric view of a typical prior art toner hopper assembly showing the breakdown of the developer roller and OEM electrical contacts and end fittings.

FIG. 3 is a broad illustration of the EX toner hopper 10 used in the HP LASERJET series 4 printer. The developer roller 2 has an end 3 from which the magnetic core 4 and magnetic core shaft 1 extend. The developer roller plastic contact device 8 fits into the end 3 of the developer roller 2. A white plastic insulative bushing 9 fits over the end 3 of the roller 2 and the contact device 8. An alignment piece 20 (shown in FIG. 3b) with an opening aligns the entire contact device 8 and developer roller 2 relative to the metal contact plate 14 mounted on the endcap 12 of the toner hopper assembly 10 The metal contact plate 14 connects the contact device 8 with a printer contact 13, which in turn connects with the printer's electronic circuitry. The contact device 8 has a wire. At one end the wire 182 touches and makes contact with the contact plate 14. At the other end the wire 183 touches and makes electrical contact with the inner wall of the developer roller 2. The developer roller 2 has another end 7 from which the magnetic core 5 and magnetic core shaft 6 extend, connected to the magnetic core 4.

Figure 37:
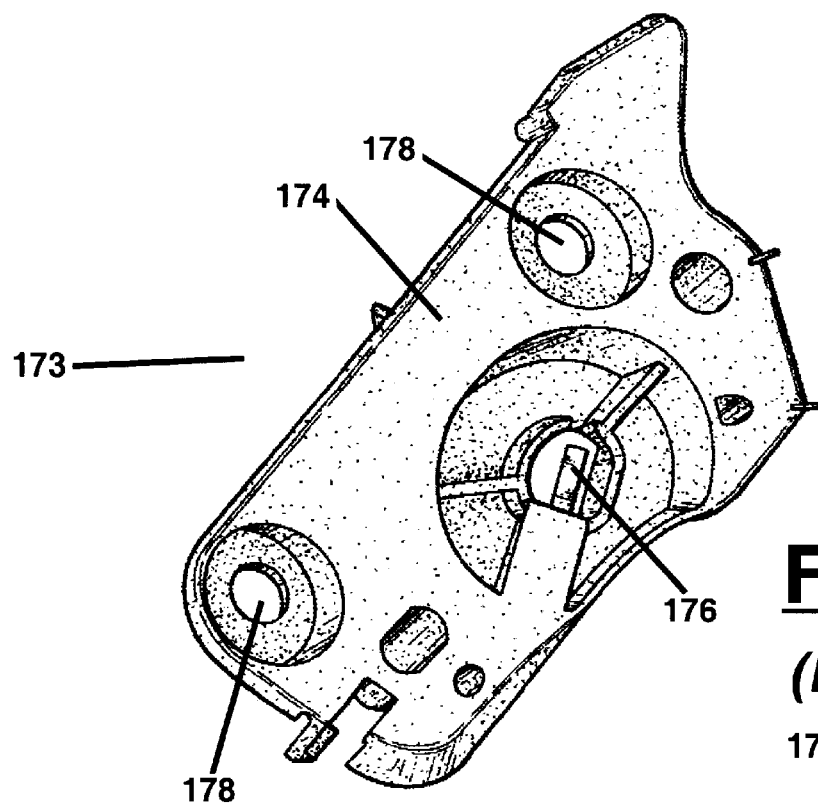
FIG. 37 shows the outside view of an endcap assembly of an HP-4000 developer roller assembly showing the printer contact.
Figure 38:
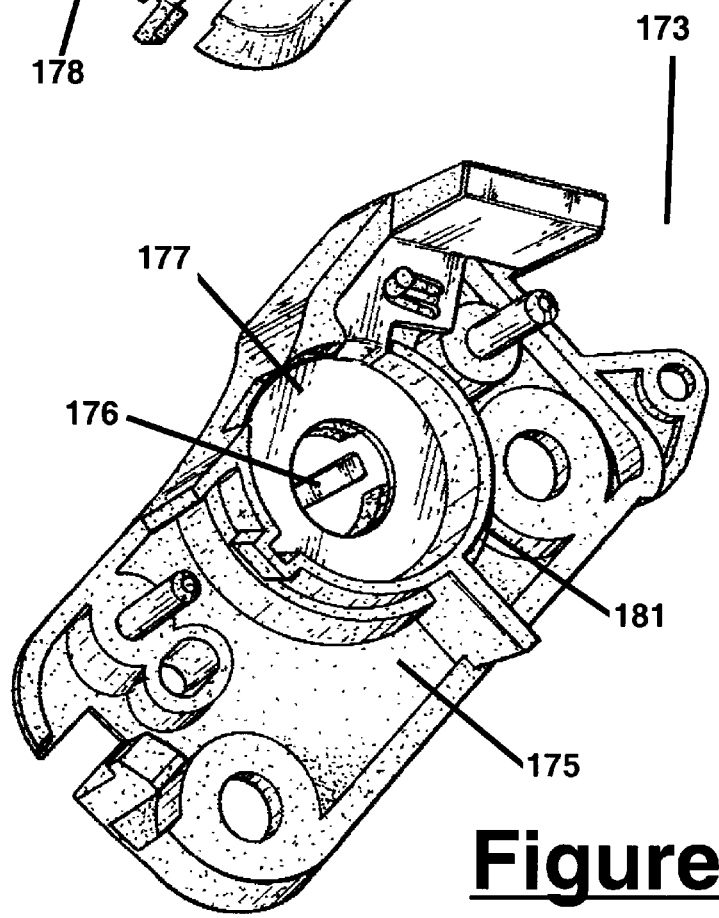
FIG. 38 shows the inside view of an endcap assembly of an HP-4000 developer roller assembly showing the printer contact attached to the ring contact.

This is a very poor bias voltage contact system. As a result of the poor contact, the printed image lacks quality after the spring wire 182 and 183 loses its resiliency, either where the spring wire 182 and 183 touches the contact plate 14 or where the spring wire 183 contacts the inner wall of the developer roller sleeve 2. The spring wire is continuous from 182 where it rotates on the contact device 8 and at the same time contacts the contact plate 14 to 183 where it contacts the inner wall of the developer roller sleeve 2. Alternately, the spring wire 182, 183 may get insulated either by toner, dust or oxidation from aging, environment and extreme use. The more the contact device 8 is used, the worse the image gets. Another contributing factor is the aged and used surface of the developer roller 2. However, the wire 182, 183 deteriorates and gradually the image degrades in steps, however, when this process is combined with the conditions of the developer roller's 2 surface, it is a defective like a shotgun shooting out of two barrels at the same time with multiplying effects. However, the contact from the wire 182 to the metal contact plate 14 is poor in the first place because wire is thin, it loses resilience and also there is not a lot of spring wire surface area to contact. There is just a small point to make contact with the ring 177 of the endcap assembly 173 (FIG. 37 and FIG. 38) and a small point 183 to contact the inner wall of the developer roller 2. Consequently, it is an accident waiting to happen. As the spring wire 182 and 183 loses resilience in time, it loses its contact effectiveness. The same is true at the segment 42 where the spring wire 183 contacts the inner wall of the developer roller 2. As time passes and more print cycles are completed, the spring wire 182, 183 loses its resilience and the integrity of the contact of the spring wire 182, 183 to the inner wall of the developer roller 2 is detrimentally affected to the point where the print quality of the image degrades.

The contact device 8, and thus the spring wire 182 and 183 rotate with the developer roller 2. So the portion referenced as 182 of the spring wire 182 moves relative to the metal contact plate 14. The mechanical motion makes the spring wire 182 even more susceptible to loss of resilience, oxidation, dust, toner and wear.

Figure 3A:
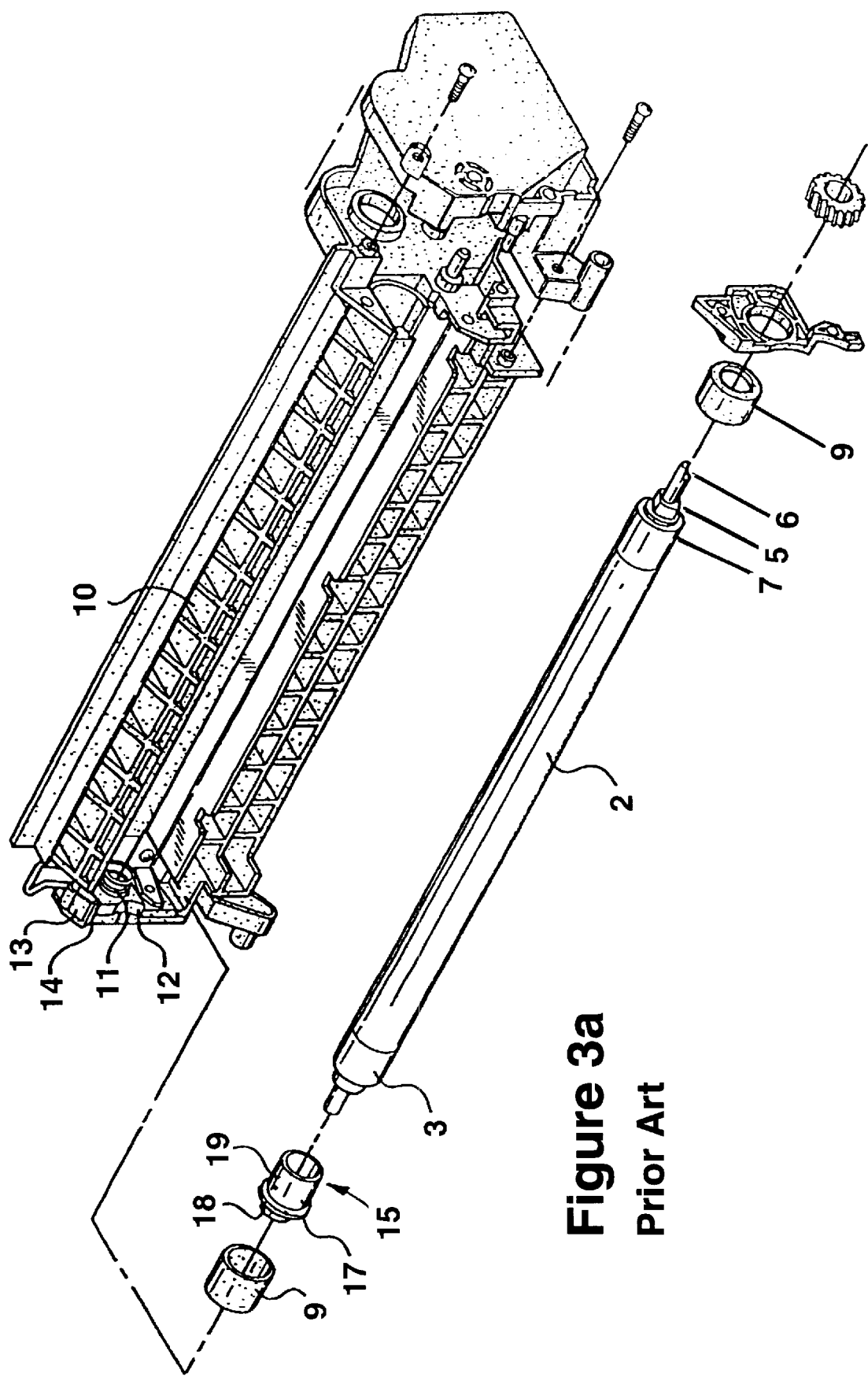
FIG. 3a is an isometric view of a prior art toner hopper assembly showing the breakdown of the developer roller and some aftermarket electrical contacts and other fittings.

These problems led to the development of the devices shown in inventor Michlin's pioneer U.S. Pat. No. 5,634,175, and improvement of the contact device 15 and spring 11 for use in the EX toner hopper assembly 10. FIGS. 3a and 3b show the contact device 15, the first aftermarket device for the EX toner hopper. The contact device 15 comprises a metal bushing with a large diameter portion 19 sized to fit into the end 3 of the developer roller 2 where the large diameter portion 19 of the contact device 15 is completely inserted into the developer roller 2, providing additional electrical surface area between the contact device 15 and the developer roller 2.

FIGS. 3a and 3b show a broad illustration of how the developer roller contact device 15 is connected with the toner hopper assembly 10. In one optimized design, the large diameter portion 19 is inserted into the end 3 of the roller 2, and the plastic bushing 9 is slipped over the roller end 3 and contact device 15. The contact device 15 has an optional rim 17. The small diameter portion 18 is then pressed against the coil spring 11 and into the opening 16 in the insulative alignment piece 20, and the developer roller 2 is mounted on the toner hopper assembly 10. FIG. 3b is an enlarged view of the relevant end of the toner hopper assembly 10 to more clearly illustrate the contact device 15 position and function. There is an optional magnetic core 22 and magnetic core shaft 21. The alignment piece 20 and coil spring 11 are shown separated from the assembly 10 for clarity. The outer surface of the large diameter portion 19 of the contact device 15 may be adhered by glue or conductive glue to the inner wall of the developer roller 2. However, for best results, a press fit would make the best electrical contact, much better than gluing the contact. Also by press-fitting the contact 15, the contact, which in this case also acts as an alignment device, will have a more true rotational motion.

Figure 4:
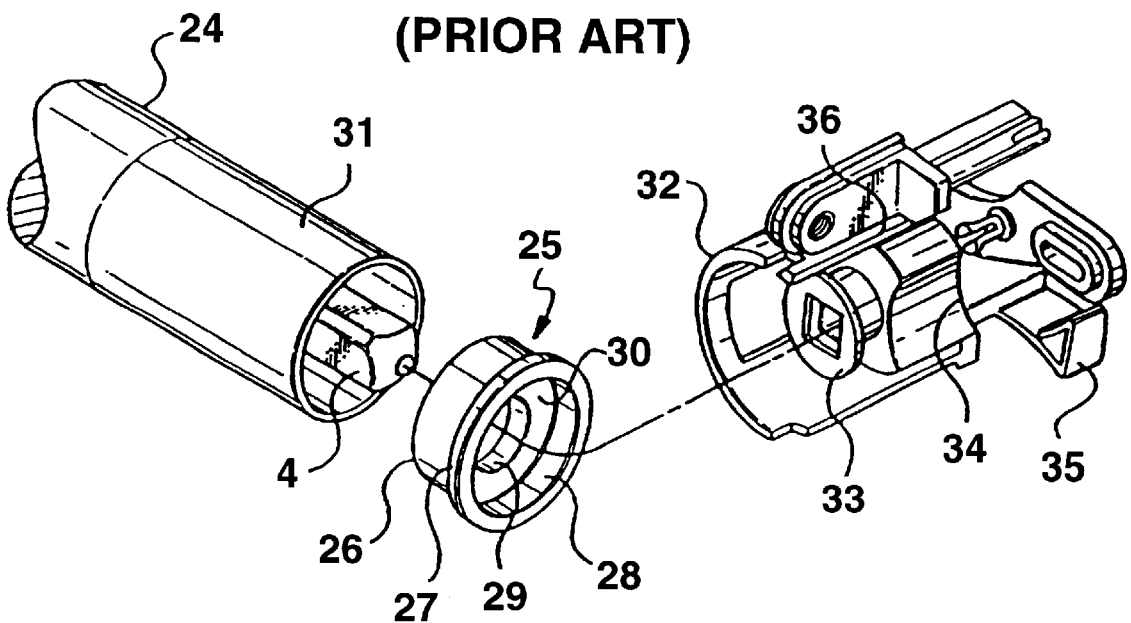
FIG. 4 is an isometric view of part of an end portion of a prior art toner hopper assembly showing the breakdown of the contact end of the developer roller, an aftermarket electrical contact and a printer contact.
Figure 5:
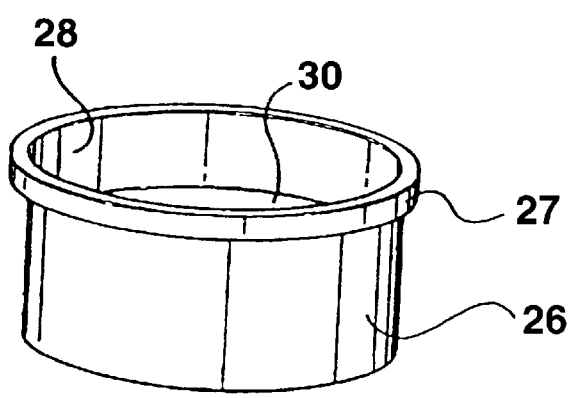
FIG. 5 is an isometric view of an aftermarket electrical contact.

FIGS. 4 and 5 show another contact device 25 from inventor's U.S. Pat. No. 5,634,175 used in the LX toner cartridge. The contact device 25 comprises a cylindrical member 26 with a rim 27. The cylindrical member 26 has an outside diameter sized to snugly fit inside the end 31 of the developer roller 1. The rim 27 is sized to abut against the end 31 of the developer roller when the cylindrical member 26 is completely inserted within the developer roller 1. The interior of the contact device 25 has two portions. The first portion 28, adjacent the rim end of the contact device 25, has an inside diameter sized to slide over the washer 33 in the printer electrical contact 36. The washer 33 is extended in a one piece assembly 34 to the projection 35 which connects to the printer's electronic circuitry including the printer's power supply. The second portion 29 has an inside diameter sized to fit around the end of the magnetic core's shaft 4 within the developer roller 24. A contact surface 30 is formed where the interior portions 28 and 29 meet. The contact surface 30 remains in contact with and rubs against the face of the washer 33 in the printer electrical contact 36 as the developer roller contact device 25 rotates with the developer roller 24. The printer electrical contact 36 includes a stainless steel washer in a plastic cap 32.

It has been found that the developer roller contact device 25 works well, fitting by snugness without adhesive. However, it has been tested using adhesive to adhere the contact device 25 within the end 31 of the developer roller 24 and there was no ill effect. When using adhesive, one must be careful not to create an insulative layer that would prevent contact. The only purpose of glue is to prevent the contact device 25 from spinning within the developer roller sleeve 24 which would machine a groove within the roller. Conductive adhesives may be used. However, it has been found that using a press-fit contact 25 eliminates the need for glue, improves the contact and makes for a more true rotation of the developer roller sleeve 24. With the developer roller contact device 25, electrical contact with the developer roller 24 is maintained not only where the rim 27 abuts against the end 31 of the roller 24, but also where the cylindrical member 26 touches the inner wall of the roller 24.

For any such contacts, a very small amount of conductive grease should be applied wherever rotating parts make electrical contact with stationary parts and vice versa. There are two basic types of conductive greases in the aftermarket, white grease and black grease. Black grease measures conductivity with an ohmmeter and white grease does not. However, white grease nonetheless performs as well even though it does not measure actual conductivity and solves the problems that conductive grease is there to solve, i.e., stability of contact, prevention of contact-loss, arc prevention and corrosion resistance. Inventor introduced the first aftermarket conductive grease to the toner cartridge remanufacturing industry in an article he wrote that was published in *Recharger* in 1992. Black grease has the major disadvantage that by the end of a cartridge remanufacture cycle, the black grease forms a hard layer on the outer surface and thus requires cleaning between every recharge cycle. However, hardened black grease does remain conductive when transformed to the hardened solid state. It is because of the cleaning requirement of the black grease that is a costly nuisance that has convinced inventor that the black grease is not recommended and that the white grease is. By the end of a toner cartridge cycle, the white grease is partially gone, thus sacrificially doing its job, but does not require any cleanup of components like black grease does.

It has been found that the best manufacture of such electrical contacts 15 and 25 may be made using a press-fit rather than requiring the use of a glue. Thus the tolerances must be plus and minus 0.0005 inches in the typical case in dimensions that involve press fit for the EX developer roller 3. This is the tolerance available in manufacture without taking special precautions that would otherwise increase the manufacture costs of the contacts 15 and 25.

FIG. 6 shows a developer roller 37 of the HP-4000 toner cartridge. The roller has a left side 38, a right side 39, a metal shaft 41, a right side bushing 44, a right side 45 of metal shaft 41, a left and right end 43 and 46 of metal shaft 41 and an inner bore 42. It can be seen in the figure that just to the right of the inner bore 42, the bore dimension of the developer roller sleeve 37 is smaller in diameter. Thus, the inner bore 42 is a counter bore in the smaller bore to the right. It is in this inner bore 42 where the plastic OEM contact 2200 fits in the HP-4000 developer roller 37 shown in FIGS. 6a–6c. This OEM contact 2200 is similar to the EX contact 8 shown in FIG. 3. However, this plastic contact assembly 2200 has a wire 2201 that contacts a ring 177 located in the printer contact assembly 173. The OEM contact 8 rotates in a plastic wearable modular receiving bore assembly 2203 which fits into the bore assembly holder 181. The assembly 173 has a top portion 175.

FIGS. 6a–6c shows the printer contact assembly 173 or endcap 173 of the HP-4000 toner cartridge. This device has a metal contact 177 that makes contact to the developer roller's contact wire 2201 of FIG. 6c. The printer electrical contact 173 has another part (not shown) that makes contact with the printer, to receive bias voltage from the printer's power supply and then it supplies the contact wire 2201 with the bias voltage which is then transmitted to the developer roller 37. The contact wire 2201 is held by a plastic bushing 2200 that fits into the developer roller 37 and has a shorter diameter portion 41. Also shown in the figures is the developer roller's magnet's shaft 43. The plastic bushing 2203 in the figure is used to keep the developer roller 37 on a straight rotational axis. Although the bushing 2203 looks complex with an inner portion 2208, a longitudinal ridge 2205, a rim 2204, a cutout portion 2208 and a cutout portion 2206, inventor has simplified this device later in this patent application to be a simple cylindrical component with a bore and a rim, made of all metal which has the dual function of making electrical contact with a replacement of the contact device 2201, and simultaneously acting as a rotational bushing. Plastic bushing 2202 acts as a spacer between the developer roller 37 and The problem is that the modular receiving bore assembly 2203 made of plastic has a bore 2208 and can enlarge in bore size 2208 from wear and thus cause the developer roller 37 to have a slight wobble. This slight wobble would cause the developer roller 37 to have chatter and appear worn prematurely. In other cases, the out-of-round modular receiving bore assembly can cause the developer roller 37 to physically contact the metal of the magnetic endseal 745 of FIG. 95 that replaces the endfelts 534 (FIG. 2) of old. When the developer roller touches the metal magnetic endseal 745, you can kiss the developer roller sleeve 37 goodbye because the metal of the developer roller 37 along the side of the magnetic endseal 745 will machine a groove into the soft aluminum developer roller sleeve 37. This is almost the same as putting the developer roller sleeve 37 on a lathe and having a metal tool cut into the aluminum tube 37.

FIG. 7 shows the electrobushing 47 that is designed to replace the removable all-plastic OEM receiving bore assembly 2203. It looks similar in shape, but the electrobushing 47 is simple and made of metal or conductive plastic and the modular receiving bore assembly 2203 has different shapes on the outside for fitting into the endcap assembly 173 (FIGS. 6b, 37 and 38) with a ridge 2205 to lock into the endcap assembly 173. The electrobushing 47 was made in a simpler way to decrease manufacturing costs and thus roundness is the key. However, the electrobushing was made to make contact with the left end 53 to the printer contact 173 contacting the contact ring 177 and thus may be designed a little longer in length than the OEM plastic bushing. The printer contact assembly 173 has an inner wall 175 and an outer wall 174. By being a little longer the electrobushing 47 will make tighter fit in the longitudinal direction of the developer roller 37 in the toner hopper, but will maintain electrical contact by being tighter. The electrobushing 47 has a rim 49, a left surface of rim 48, a bore 50, a cylindrical portion 51, a circle portion 52 where the cylindrical portion 51 joins the rim left surface 48. The endcap 173 (FIGS. 37 and 38) has two holes 178, to hold it in place, a metal flat spring contact 176 which connects to a contact ring 177, all in one metal piece. The left end 53 of the electrobushing 47 maybe longer than the OEM's plastic bushing design so that, unlike the OEM bushing, the electrobushing left side 53 makes contact with the metal contact ring 177 for better electrical contact. The OEM plastic bushing 2200 fits inside the plastic sleeve receiving wall 181 as does the electrobushing 47.

FIG. 8 shows an exploded view of the electrobushing 47, the new contact 54 and the developer roller 66. The electrobushing 47 is designed not only to prevent the out-of-roundness of the OEM plastic bushing that can cause problems after the inner bore enlarges, but also helps the functioning of the contact 15. However, the contact 15 has been slightly improved by the contact 54 of, which is designed more optimally for a press-fit. Both contacts 15 and 54 are identical except for the two steps 55 and 57 shown on the contact 54. The contact 54 has a smaller portion 55 (the first step) on the press-fit side, a right end 56, a larger portion 57 (the second step) of the press-fit cylindrical portion, a joining portion 58 where the larger portion 57 joins the smaller portion 55, a rim 59, a second joining portion 60 where the rim 59 joins the larger portion 57, shaft 61 surface of rim 59, an alignment portion 62, a bore 63 in the alignment portion, and an end surface 64 in the alignment portion 62. The press-fit contact 54 has a second bore (not shown) through the smaller portion 55 and the larger portion 57 that is larger than the diameter of the magnetic core (not shown) on the shaft 41. The press-fit contact 54 is to be press-fit onto the developer roller sleeve 66 which has an inner bore 42, a left rim 68, and a counter bore portion 69 of the inner bore 42.

Figure 9:
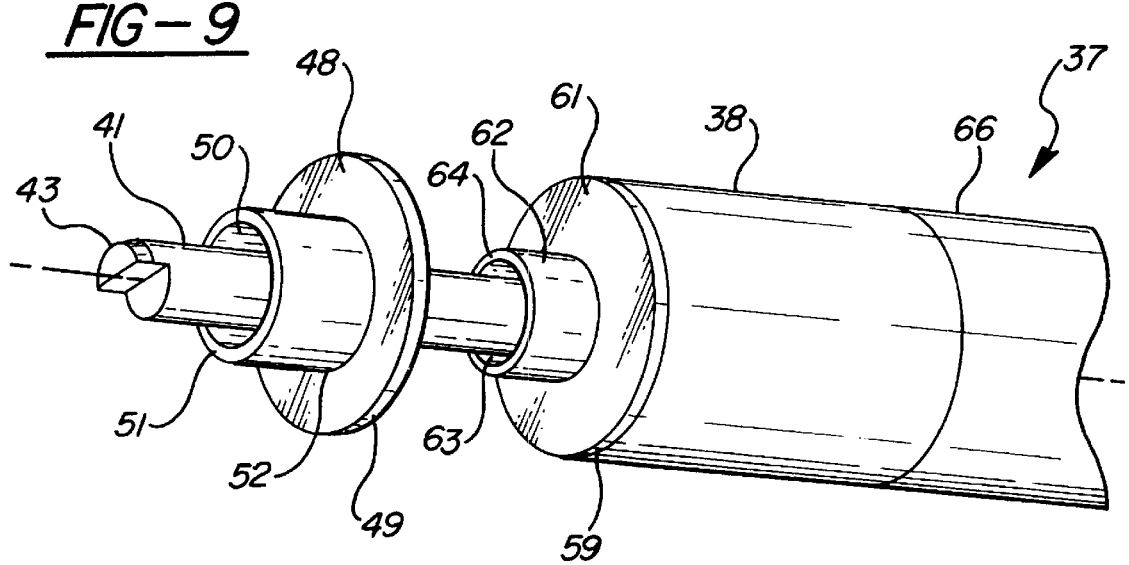
FIG. 9 shows an isometric view of a prior art developer roller sleeve end, showing the shaft, new and improved electrical contact and metal bushing after the electrical contact is press-fit in place.
Figure 10:
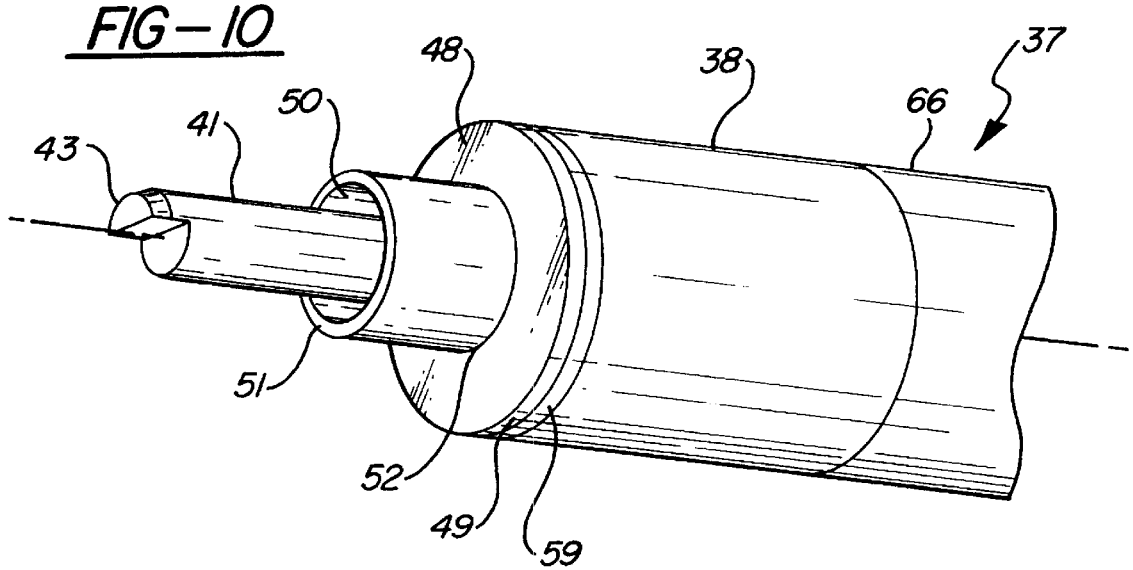
FIG. 10 shows an isometric view of a prior art developer roller sleeve end, showing the shaft, new and improved electrical contact and metal bushing after the electrical contact is press-fit in place and metal electrical bushing is in proper position.

FIG. 9 is an exploded view of the electrobushing 47 with respect to the developer roller sleeve 66 with the contact 54 already press-fit into the developer roller 66. FIG. 10 shows the same as FIG. 9 with everything in place including the electrobushing 47. The press-fit of the contact 54 may be done with a hammer. However, by hammering the contact 54 into the inner bore 42 of the developer roller sleeve 66 may cause problems. For example, the contact, made of steel, brass or bronze can cause score and scratch marks into the inner bore 42 of the developer roller sleeve 66 and can cause out-of-roundness of the developer roller sleeve 66. Thus, it is a good idea to press-fit the parts with a press instead of a hammer. The least costly and common presses used for press-fits are arbor presses. They are used by mechanics in garages to press-fit bearings and other mechanical fittings that require a press-fit. With an arbor press, a tremendous amount of pressure may be exerted with a very small effort on the part of the operator by using leverage and a gear. Although much larger arbor presses exist, the most commonly available arbor presses range from one half to five ton pressure rating. Most any tool supply house for the machining industry, tool industry and automotive industry sells arbor presses. Arbor presses are readily available most anywhere in the USA and are relatively inexpensive. Most importantly, arbor presses are more safe than power driven presses because the operator uses his or her hand to increase or decrease the pressure.

Figure 11:
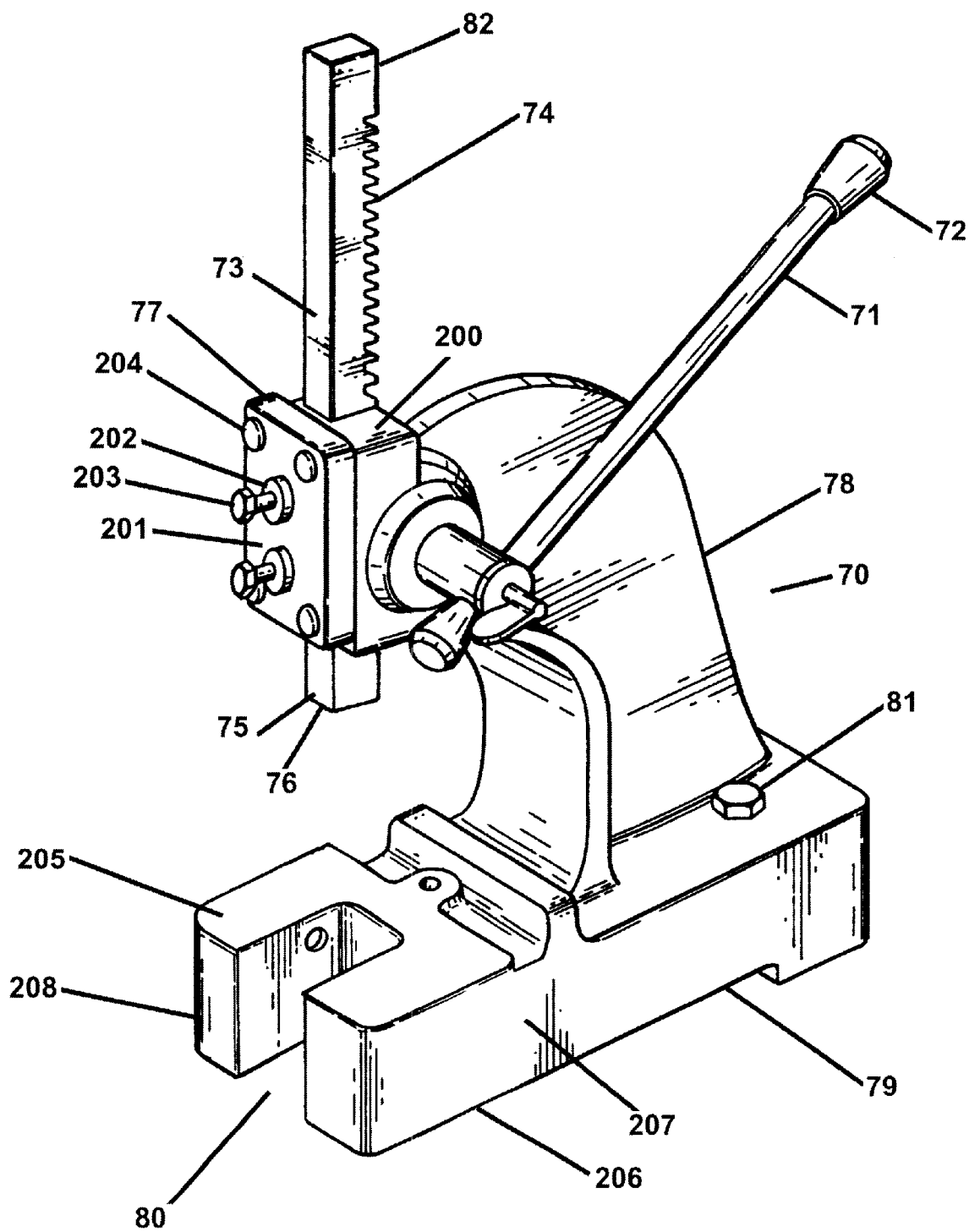
FIG. 11 shows an isometric view of a typical prior art arbor press that can be found at most tool supply distributors.

FIG. 11 shows a typical arbor press 70. A typical arbor press 70 has a handle 71 for manually exerting leverage pressure, and the handle has a rubber end 72 at each end. The arbor press 70 has a straight ram assembly 73 with gear teeth 74, a straight non-gear portion 75, a ram 76, and a top non-geared portion 82. The typical arbor press contains the straight ram assembly 73, a cap 77, handle 71, a neck 78, a base 79 with a base opening 80, a tightening bolt 81 to attach to the bench which goes through a bore (not shown) in the base 79. Prior art FIG. 11 shows that the ram guide 200 is attached to the neck 78 of the arbor press 70. The cap 77 is secured to the ram guide 200 using four holding bolts 204. The cap 77 has a front portion 201 and secures the ram 73 in the ram guide 200. The tightness of the ram 73 inside the ram guide 200 is controlled by the tightness setting of the cap positioning bolt 203 which may be locked in position with the cap position lock nut 202. The base or support structure 79 has a top 205, a bottom or underside 206, a right side 207 and a left side 208.

All structural portions are thick, especially the base 79 and the neck 78. There is one major flaw in these popular arbor press devices 70. The first flaw is that they are heavy. A ½ ton arbor press weighs over eight pounds. The second flaw is that arbor presses are designed for small parts. If the automotive industry uses the arbor press for press-fitting bearings, then they don't have to be capable of press-fitting long parts. The typical arbor press 70 limits in press-fit length are from the bottom of the cap 77 to the top of the base 79. However, the maximum part length is shorter yet because the figure does not show the metal piece that comes with most arbor presses to cover up the base opening 80 to enable press-fitting. By removing this metal cover of the base opening, parts may extend down to the workbench to gain another 2–3 inches in length of a part to be pressed with an arbor press 70. The only solution prior to this invention was to use a different kind of a press or use a larger arbor press. There is a large difference between a ½ ton arbor press and a 5 ton arbor press in cost and weight. There is not a large difference between a ½ ton arbor press and a 5 ton arbor press in length of a part to be pressed. Even so, why should a person or a company have to purchase an overpowered arbor press at great expense to do a small job just because an arbor press is too short. It is simply because arbor presses, which are mass produced to keep costs down, are not designed for applications outside the range of height simply because most users of arbor presses do not need to press a long part. Those that need to press a longer part are in the minority and must find an alternative that is not an arbor press. Inventor did not find an alternative, but instead made an extender device that attaches to an arbor press to increase the length of a part that may be pressed with an arbor press. However, the extender device 83 may also be installed in brand new arbor presses, or even cast into the arbor press and is not limited just what is described in this invention.

Figure 12:
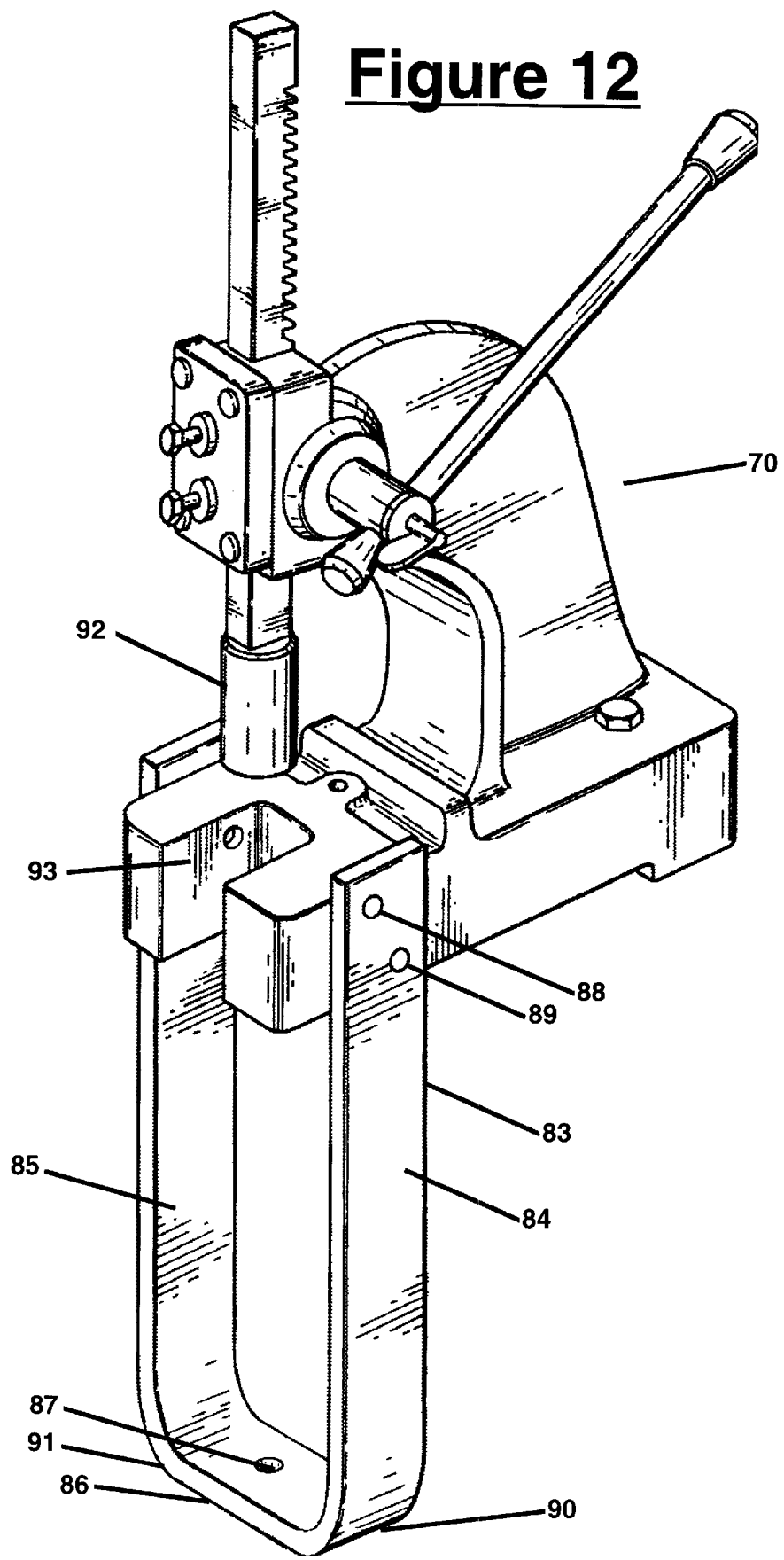
FIG. 12 shows an isometric view of an arbor press with the new extender added to the arbor press also showing the upper fixture holder module.
Figure 13:
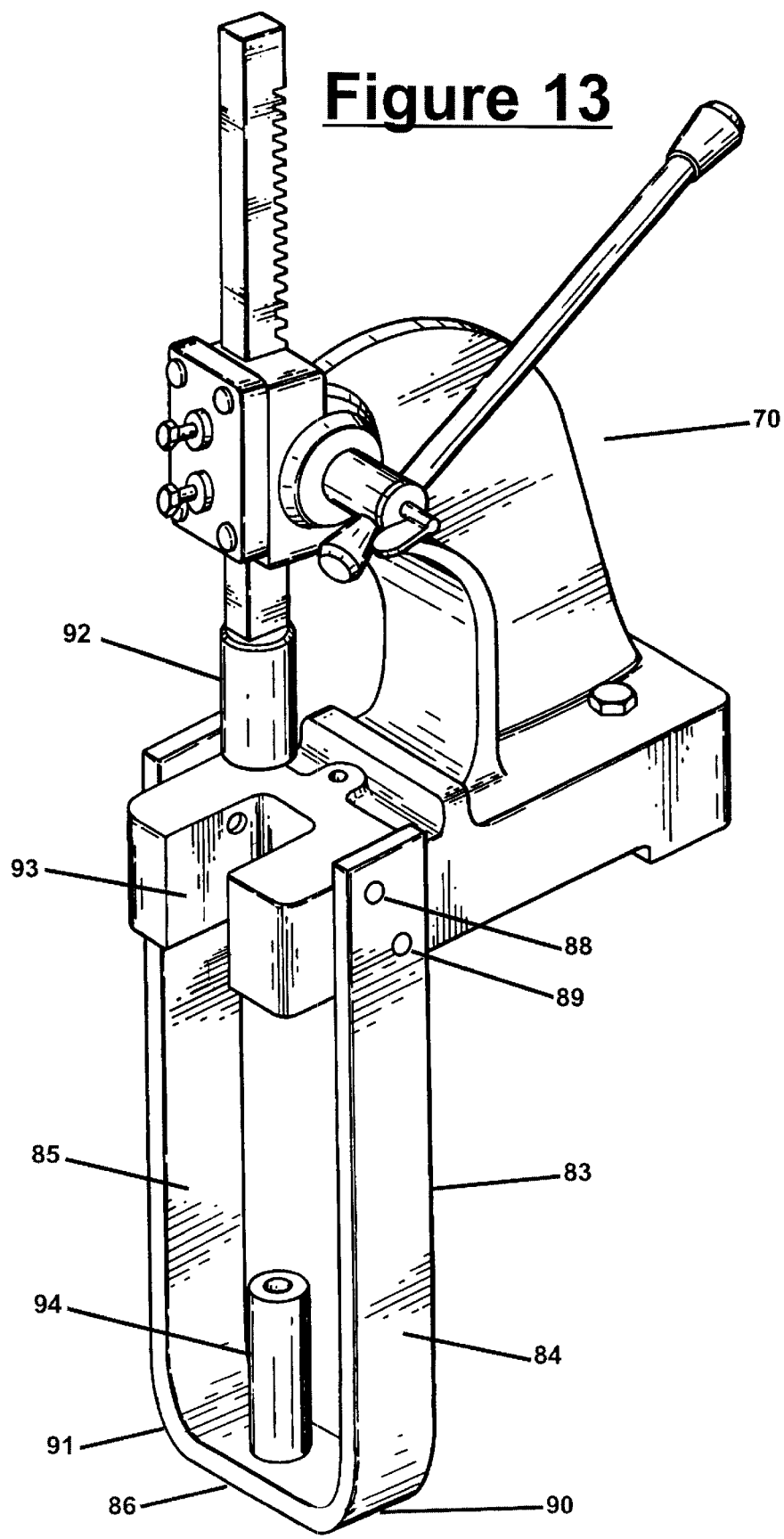
FIG. 13 shows an isometric view of an arbor press with the new extender added to the arbor press, also showing the top and bottom fixture holder modules.

FIG. 12 shows an arbor press with an extender assembly 83 used to increase the length of parts that may be pressed. The extender assembly 83 has a right leg 84 and a left leg 85, optionally a fixture attach bore 87 which may optionally be threaded, a base 86, a left bend 91, a light bend 90, and two attach holes 88 and 89. Alternately, and extender assembly may be made with multiple sets of attach holes 88 and 89 to make an extender assembly 83 with multiple length settings. The holes may be replaced with one or more slots that can be used to adjust the height of the extender. Holes are drilled and tapped into the base 79 of the arbor press 70 at holes 88 and 89 to enable the bolting attachment of the extender assembly 83 to the arbor press 70. There is an upper fixture holder module 92 on the ram 76 of the arbor press for attaching fixtures that position the parts to be pressed to insure that the press fit will be straight and proper. FIG. 13 shows the same modified arbor press with a lower fixture holder module 94 for holding a variety of fixtures for different applications, also to insure that the press fit will be straight and proper, used in tandem with the upper fixture holder module 92. Also shown in the figure is a inner surface 93 of the base opening region 80.

Figure 14:
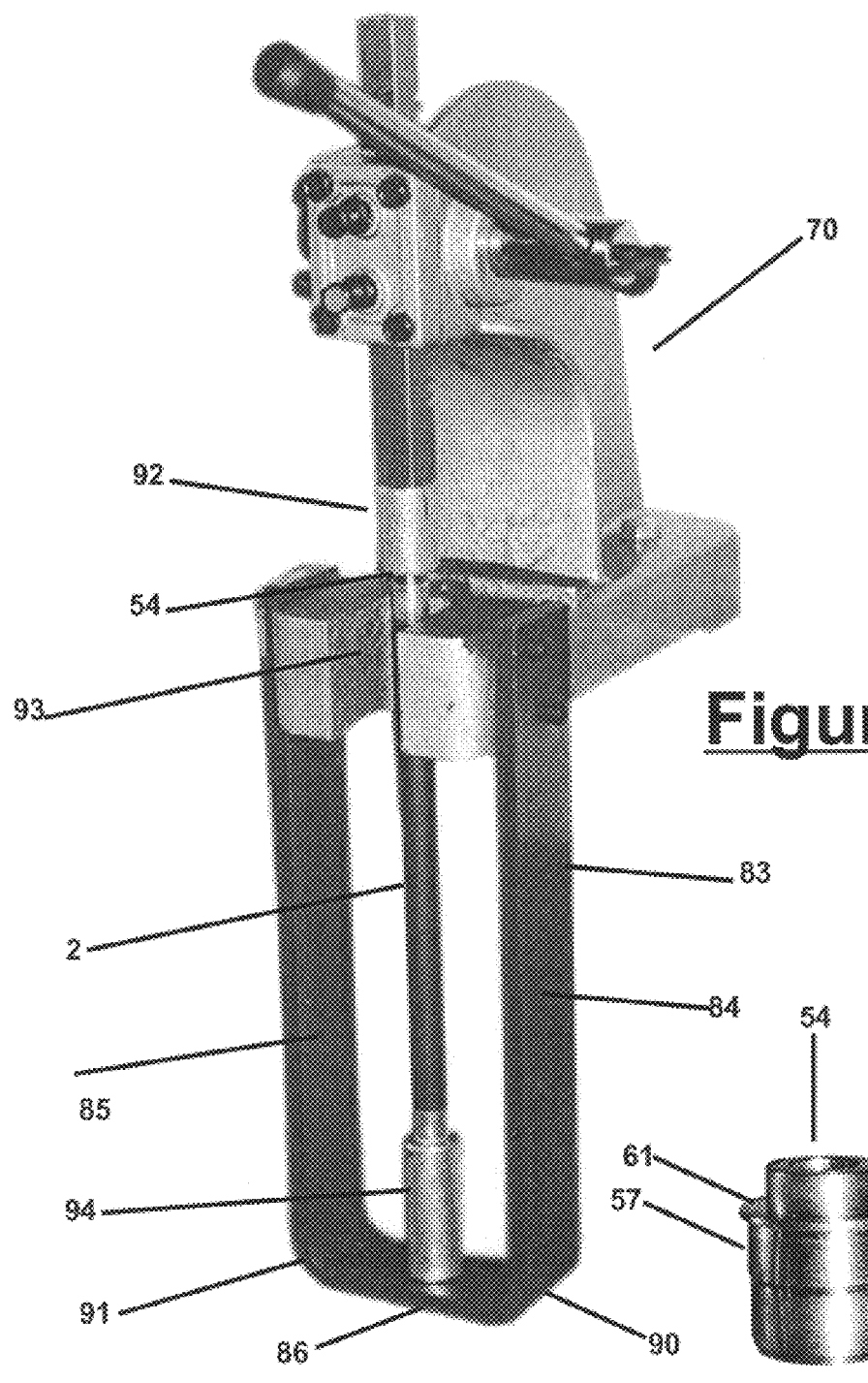
FIG. 14 shows an isometric view of an arbor press with the new extender added to the arbor press, also showing the top and bottom fixture holder modules with a developer and aftermarket contact in place.
Figure 15:
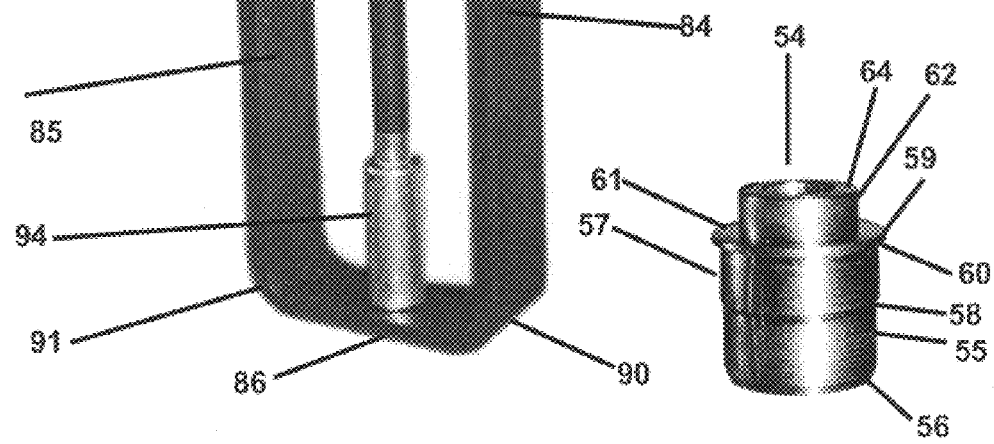
FIG. 15 is an isometric view of a new and improved aftermarket electrical contact.

FIG. 14 shows a laser printout of a digital image of the arbor press 70 with the extender assembly 83, the upper and lower fixture holder modules 92 and 94, a developer roller 2, and a press-fit contact 54 being press-fit. FIG. 15 shows a laser printout of a digital image of the press-fit contact 54 that is used in FIG. 14 because this contact 54 is difficult to see in FIG. 14. This figure shows that even though the upper fixture holder module 92 and the lower fixture holder module 94 are meant to hold modular fixtures to firmly hold parts to be press-fit at top and bottom, the fixture holder modules 92 and 94 may also be used as fixtures as in FIG. 14. By causing the fixture holder module to be based on a widely used size, then all the fixture holders can fit into that size to economize on the number of fixtures required to fit into the fixture holders. Different embodiments of these fixtures will later be described.

The extender assembly 83 is actually very simple. Some of the best pioneer inventions are simple. The extender assembly 83 is comprised of flat bar cold rolled steel flat bar ⅜ inches thick and 1 and ¾ inch wide. The extender 83 has two right angle bends at 90 and 91. Other dimensions would also work. However, inventor will manufacture this with the above dimensions for strength purposes but does not want to limit invention to these dimensions. The extender assembly 83 should function properly with almost any dimensions as long as it increases the length of a part that an arbor press can press.

FIGS. 16 and 17 show the upper fixture holder module 92 which has a small bore 95, a larger bore 96, a top 97, a bottom 98, a bore joining disk region 99, a top 100 of the smaller bore 95 and a bottom 101 of the larger bore 96. This fixture holder may be bolted through the bores 95 and 96 to the ram 76. It is easiest to use a bolt that may be tightened with an ALLEN wrench, the ALLEN wrench made to fit into the larger hole 96 to allow turning the bolt. Optionally, the small bore 95 may be tapped, however, it is easier to drill and tap a bore into the ram 76 to attach the upper fixture holder module 92.

FIGS. 18 and 19 show the lower fixture holder module 94 which has a small bore 102, a larger bore 103, atop 104, a bottom 105, a bore joining disk region 106, a bottom 105 of the smaller bore 102 and a top 107 of the larger bore 103 and a bottom 108 of the smaller bore 102. This fixture holder may be bolted from below the bottom 105 into the small bore 102, preferably threaded as shown in FIG. 19. The small bore 102 may be tapped to attach the lower fixture holder module 94 to the base 86 of the extender assembly 83 on an arbor press 70.

Figure 20:
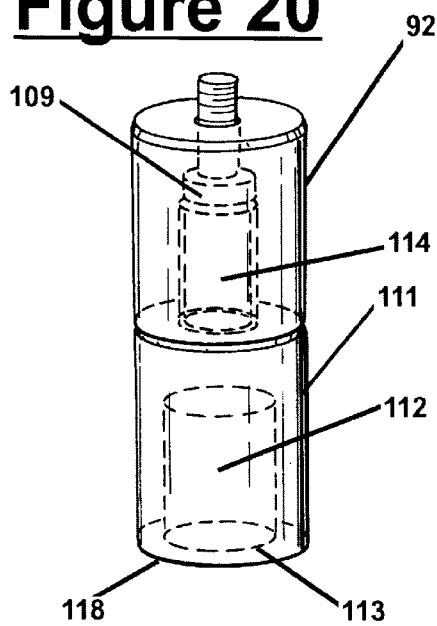
FIG. 20 is an isometric view of an upper fixture holder with a fixture module attached.
Figure 21:
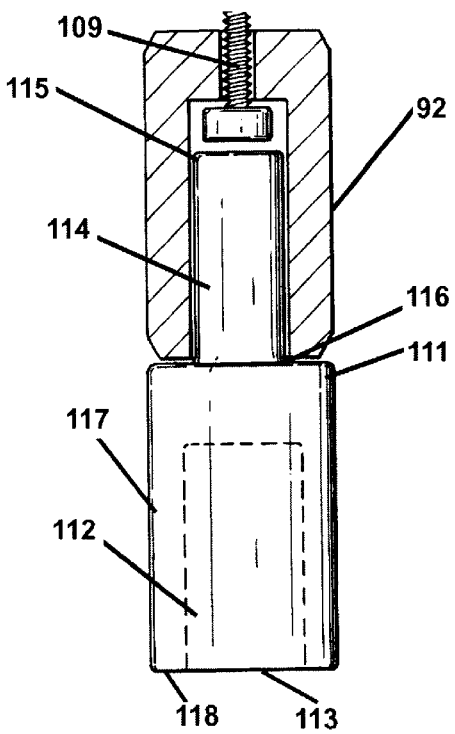
FIG. 21 is a cutaway view of an upper fixture holder with a fixture module attached.

FIGS. 20 and 21 show the upper fixture holder module 92 with an upper fixture 111 attached from the bottom 98 of the upper fixture holder module 92. A bolt 109 is shown to attach the upper fixture module 92 to the ram 76. The fixture 111 has a bore 112 to receive the end of any parts to be press-fit. The bore 112 has a bottom 113 where the press-fit part may be inserted. When the press-fit part is steel or other material that is attracted by a magnet, the fixture 111 may be made magnetic so the press-fit part can stay in by magnetism. One way to do this is to make the fixture 111 of steel and to magnetize it although the same may be done by using magnetite or magnetic steel. The fixture 111 has an upper fixture stem 114 and the stem 114 has a top 115. The fixture has a base 117 and a stem join base region 116, and a bottom 118 of the base 117. It is not just that the bore 112 is designed to "fit parts" as earlier stated, but some parts to be pressed may have protrusions that stick out and the bore 112 is designed to accommodate these protrusions as well as make a nice fit.

FIG. 35 shows a typical rubber hose material 165. In this figure it has three layers 166, at the outer layer, 167 in the middle layer and 168 at the inner layer. FIG. 36 shows a hose 169 cut to length and designed to go into the larger bore 96 of the upper fixture holder module 92. With this hose positioned tightly in the larger bore and optionally glued, upper fixtures 111 may be quickly slipped in the bore 172 of the hose 169 by placing the stem 114 of the upper fixture 111 snugly in the hose's 169 bore 172 to fit snugly into the inner wall 179. This upper fixture 111 may be quickly installed and uninstalled when different fixtures 111 which are used for press-fitting different parts are required. The hose 169 has a bottom 170, a top 171 and an outer surface 180.

Figure 22:
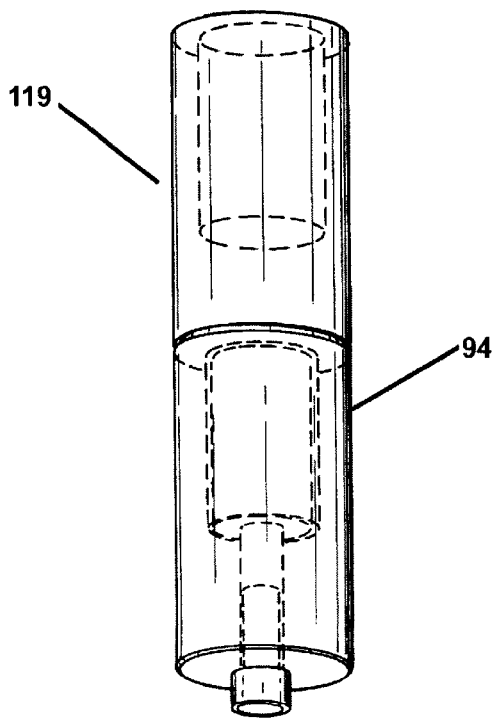
FIG. 22 is an isometric view of an lower fixture holder with a fixture module attached.
Figure 23:
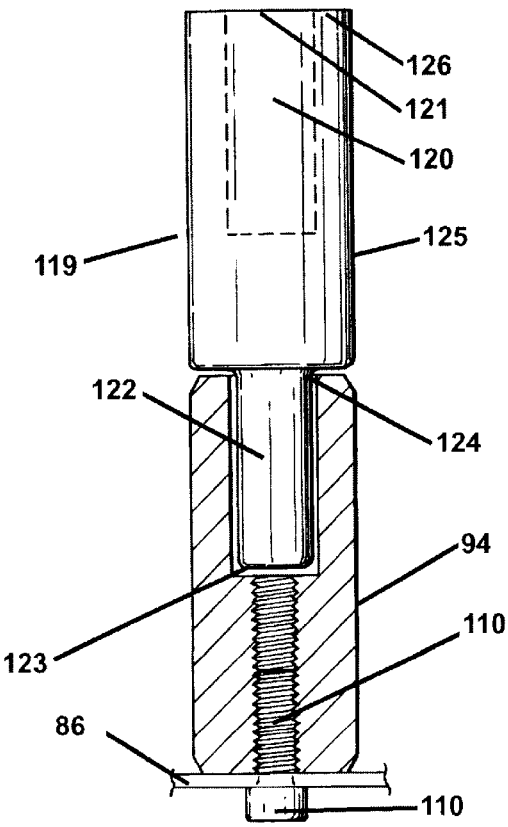
FIG. 23 is a cutaway view of a lower fixture holder with a fixture module attached.

FIGS. 22 and 23 show the lower fixture holder module 94 with a lower fixture 119 attached to the top 104 of the lower fixture holder module 94. A bolt 110 is shown to bolt the lower fixture module 94 to the base 86 of the extender assembly 83. The fixture 119 has an outer wall 125. The fixture 119 has a bore 120 to fit the end of any parts that stick out to be press-fit. The bore 120 has a top 121 where the press-fit part may be inserted. When the press-fit part is steel or other material that is attracted by a magnet, the fixture 119 may be made magnetic. One way to do this is to make the fixture 119 of steel and to magnetize it although the same may be done by using magnetite or magnetic steel. This might not be necessary since gravity will hold the component in, but it is an option. The fixture 119 has a lower fixture stem 122 that fits into the large bore 103 of the lower fixture holder module 94 and the stem 122 has a bottom 123 The a stem join base region 124.

The hose 169 may optionally fit in the larger bore 103 of the lower fixture holder in order to have a quick install and uninstall for the lower fixture 119 for changing fixtures quickly and effortlessly when press fitting different sized fixtures, for example, on a manufacturing production line. This is certainly quicker than bolting and unbolting components. Any type of hose may be used in this embodiment or other embodiments using hose. Single layer hose may be used, multilayered hose may be used, and any hose may be used, so long as it protects the surface of the developer roller 2 from scratching or other damage. For example, some of the hose materials that may be used are rubber, urethane, urethane rubber, air hose, water hose, cooling hose, automotive hose, air conditioning hose, compressed air hose, fish-tank tubing, garden hose, hydraulic hose, neoprene rubber, hard rubber, soft rubber, closed cell foam, open cell foam, among many other hoses, tubes, rubber pipe, molded rubber or extruded rubber. There is no limit in possibilities in types of hoses and tubing to use for the quick connect feature in this and other embodiments. Please note that inventor invented a quick connect lathe adapter set for quickly installing and uninstalling lathe adapters for quick connect shown in U.S. Pat. Nos. 5,309,200 and 5,381,213.

FIGS. 24 and 25 show an upper fixture holder module 92 with an upper fixture 127 attached from the bottom 98 of the upper fixture holder module 92. A bolt 109 (not shown) may be used to bolt the upper fixture module 92 to the ram 76. The fixture 127 may optionally have a bore 129 to attach to the fixture holder 92 with a bolt or other fastener. The bore 129 has a top 132. The fixture 127 has a bottom 184 to be inserted into the press-fit part. For example, this is a male fixture 127 as opposed to the female upper fixture 111. The male fixture 127 may be used to press-fit a component that is female such as the contact 25 shown in FIGS. 4 and 5. The bottom 184 of the fixture 127 inserts into the contact's 25 first portion 28 and abuts against the contact surface 30 of the contact 25 which allows the male fixture 127 to press-fit the contact 25. The same is true of this fixture for any female object to be press-fit in any industry whatsoever and is not limited to the imaging industry. When the press-fit part is steel or other material that is attracted by a magnet, the fixture 127 may be made magnetic so the press-fit part can stay in by magnetism. One way to do this is to make the fixture 127 of steel and to magnetize it although the same may be done by using magnetite or magnetic steel. The fixture 127 has an upper fixture stem 129 (top portion) which has a top 131. The fixture has a base 184 and a stem join base region 130 where the bore 184 has a top 128. Although the male fixture 127 is shown as an upper fixture, there could also be a lower male fixture designed the same way but upside down and it would have all the same features, and thus it is hereby incorporated in this patent application by having described the upper fixture 127 to save space. Similarly, the upper fixture 127 may be installed using a hose on the inside bore of the fixture holder 92 and/or 94 so the fixture 127 may be installed and uninstalled quickly into either fixture holder 92 or 94.

Figure 28:
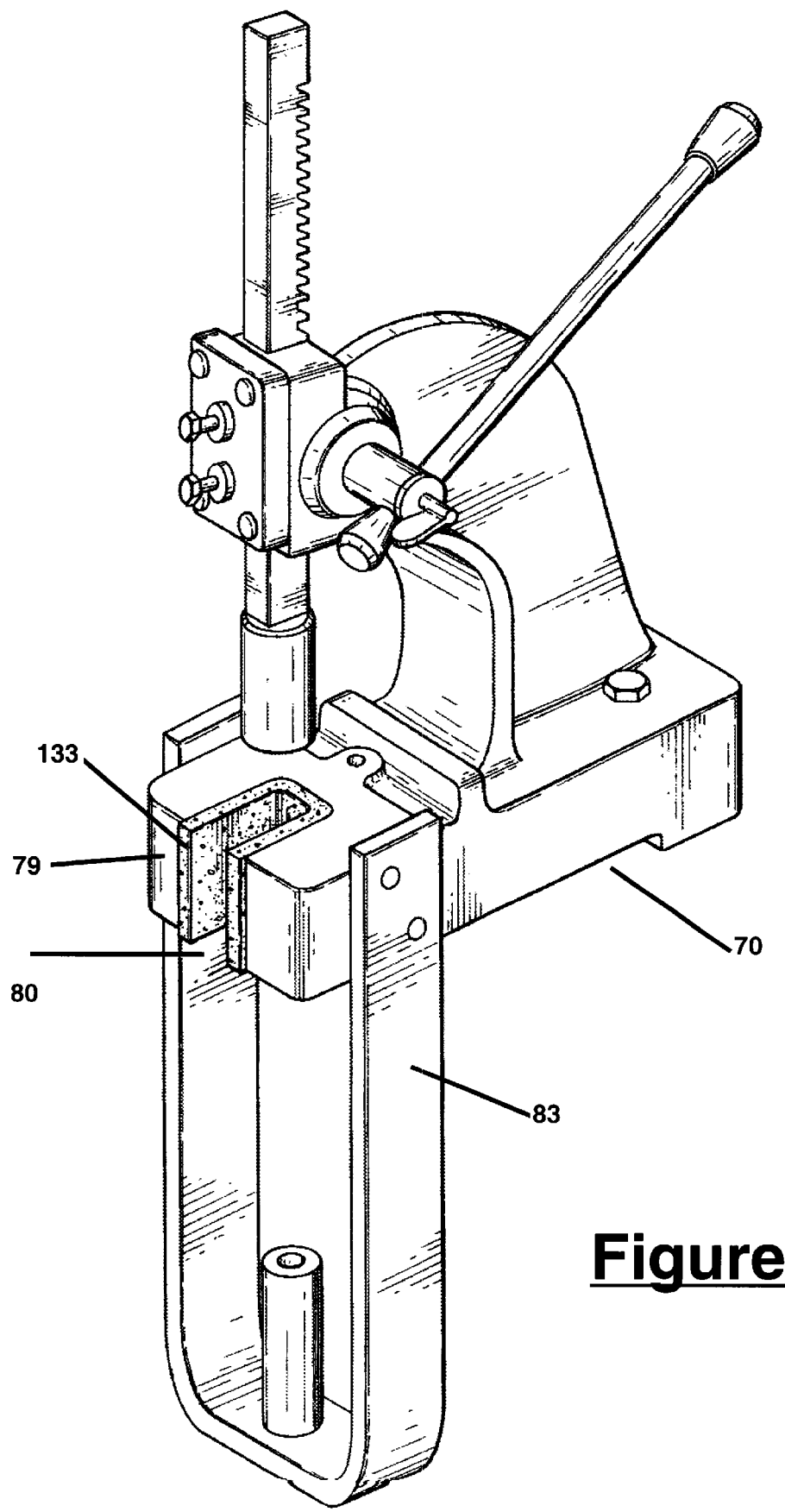
FIG. 28 shows an isometric view of an arbor press with foam in the arbor press opening to prevent the magnetic developer roller from getting damaged.

FIG. 26 shows an isometric cutaway view of the arbor press. When press-fitting developer rollers are placed in the narrow base opening 80 as in FIG. 14, since many developer rollers 2 are very magnetic by design, there is a tendency for the outer surface of the developer roller to strongly attract to the base 79 of the arbor press 70 at the inner surface 93 of the base opening region 80. It is this attraction that can easily score the sensitive surface of the developer roller 2 and cause a print defect. For this reason, some soft material 133 is inserted inside the base opening 80 to prevent damage to the developer roller 2. Many soft materials 133 may be used, for example, ester open cell foam, ether open cell foam, any open cell foam, closed cell foam, foam, rubber, foam rubber, cloth, cotton, fabric, wool, polyurethane, polyurethane foam, any open cell material, any closed cell material, any soft material, any cushiony material. If the poles are known on the developer rollers, like poled magnets may be used in place of the soft material 133 to repel the developer roller from touching the base opening 80. FIG. 27 shows a cutaway top view of the arbor press with the soft material 136 installed to protect the developer roller 2. The foam 136 has aright portion 135 and a left portion 134. FIG. 28 shows the arbor press 70 with the extender 83 and the installed soft protective material 133, in this case open cell ester foam. I like the ester foam best because my daughter's name is Esther.

FIG. 29 shows a prior art quick connect universal coupler 137, and three different quick connect nipples from the air hose (compressed air) industry. The three quick connect nipples are references 138, 139 and 140, each one different. The universal coupler 137 may be used by any of the nipples 138, 139 or 140, even though each nipple has a completely different design as seen in FIG. 29. There are many more designs of couplers too numerous to mention which are to be incorporated in this invention even though they are not all shown.

Figure 30:
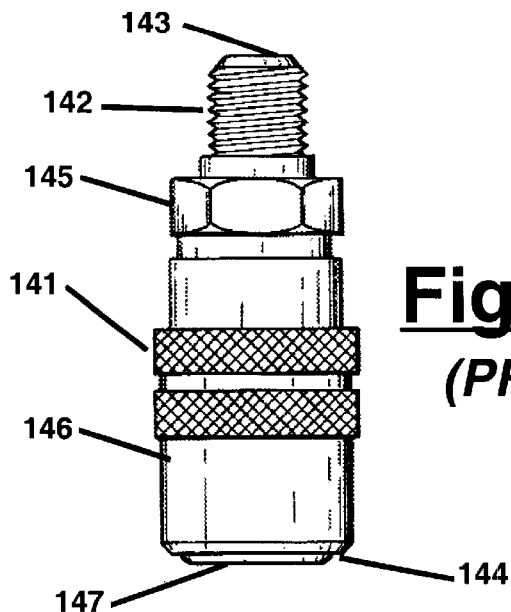
FIG. 30 is a prior art quick connect coupler with male pipe threads at the permanent/semi-permanent connection end.
Figure 31:
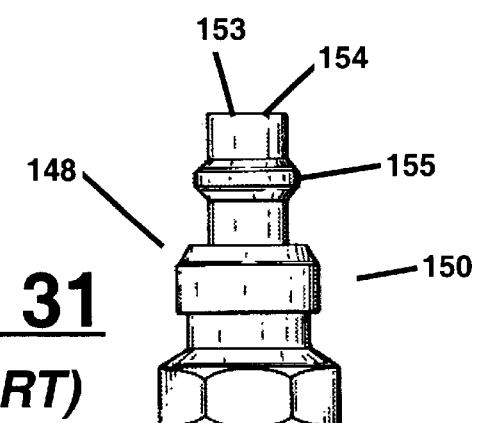
FIG. 31 shows a prior art quick connect nipple with male pipe threads at the permanent/sem-permanent connection end.
Figure 32:
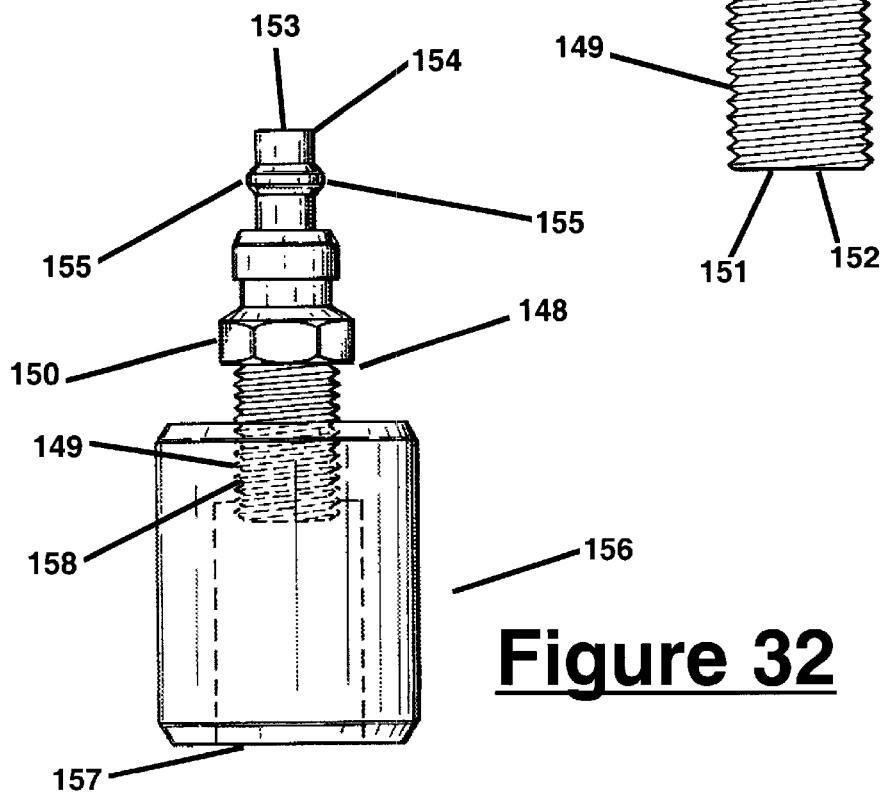
FIG. 32 shows a quick connect upper fixture holder using a coupler for quick connect features.

FIG. 30 shows a typical quick connect coupler 141, different from the one previously shown. The quick connect coupler 141 has a male pipe thread 142 which is more suitable to the application of using a coupler 141 to replace the upper and lower fixture holders 92 and 94. By using a coupler 141 with a male thread 142, the coupler would install into the threaded bore 87 in the base 86 of the extender 83. By simply replacing the lower fixture holder module 94 with a coupler 141, a different quick connect embodiment may be made. The same is true of the upper fixture holder module 92. The coupler assembly 141 may also replace the upper fixture holder module 92 in the ram 76 of the arbor press 70 and the coupler assembly 141 may instead be installed in a hole drilled and taped in the ram 76. In order to use the couplers 137 or 141 as either upper or lower fixture holders, the upper and lower fixtures 111 and 119 must have a hole drilled and tapped in them to receive the male threads 149 of a nipple 148 as shown in FIG. 31. The nipple 148 has a male pipe thread to allow the nipple to screw into a tapped hole in a quick connect fixture 156 as shown in FIG. 32. Please note that the figures show that the nipple 148 has a male thread 149, a hex wrench turn portion 150, a bottom end 151, a bottom bore 152, a top end 153, a top bore 154 and a nipple push lock 155. The coupler 141 has a male pipe thread 142, a thread end 143, a quick connect end 144, a hex-wrench turn portion 145, a sliding ring 146 and a bottom bore 147. The quick connect fixture 156 of FIG. 32 may be used either as an upper or lower fixture and has a first lower bore 157 and a second upper bore 158. The fixture 156 can quickly connect and disconnect from an upper or lower fixture holder 141 coupler (not shown in an arbor press), and a user can acquire a set of fixtures similar to 156, each of a different size and quickly plug them in and out of coupler fixture holders such as 141 located in an arbor press 70 ram 76 or on the threaded hole 87 of the base 86 of an extender 83 for quick changeover on a production line or any work environment.

Figure 33:
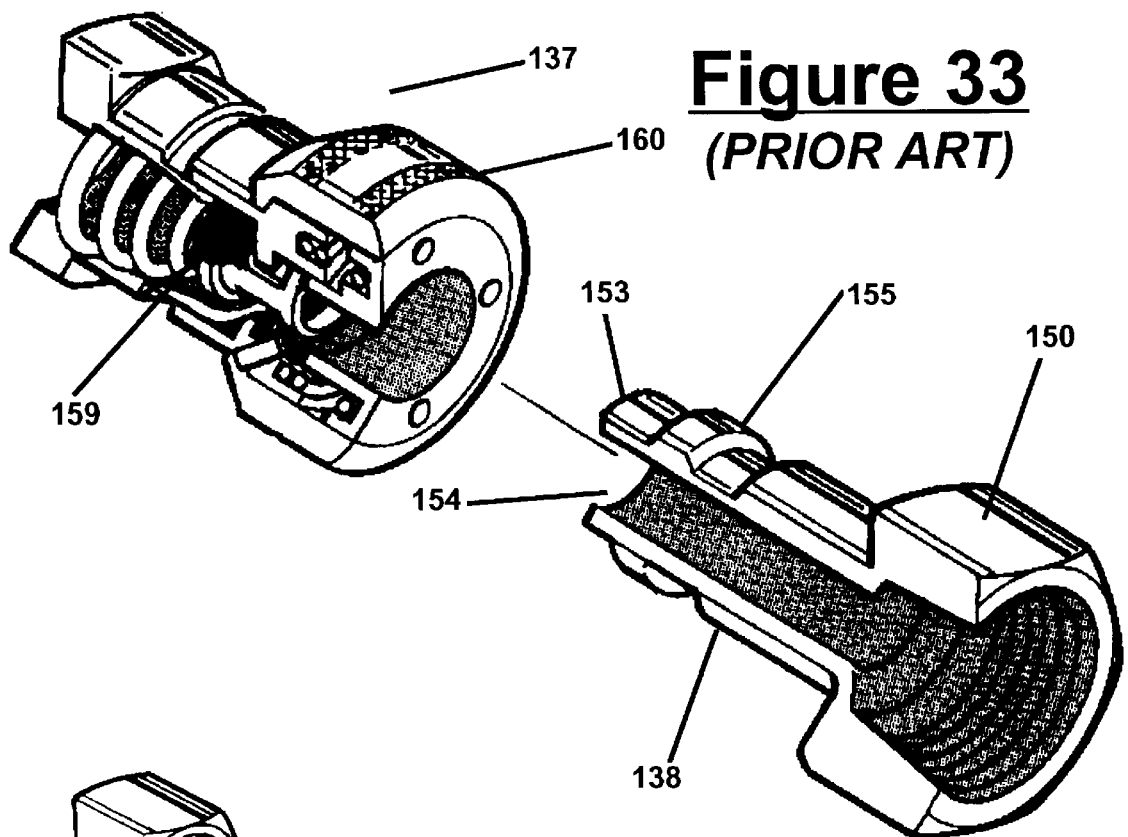
FIG. 33 shows a cutaway isometric view of a typical prior art quick connect coupling and nipple used for connection of air hoses.
Figure 34:
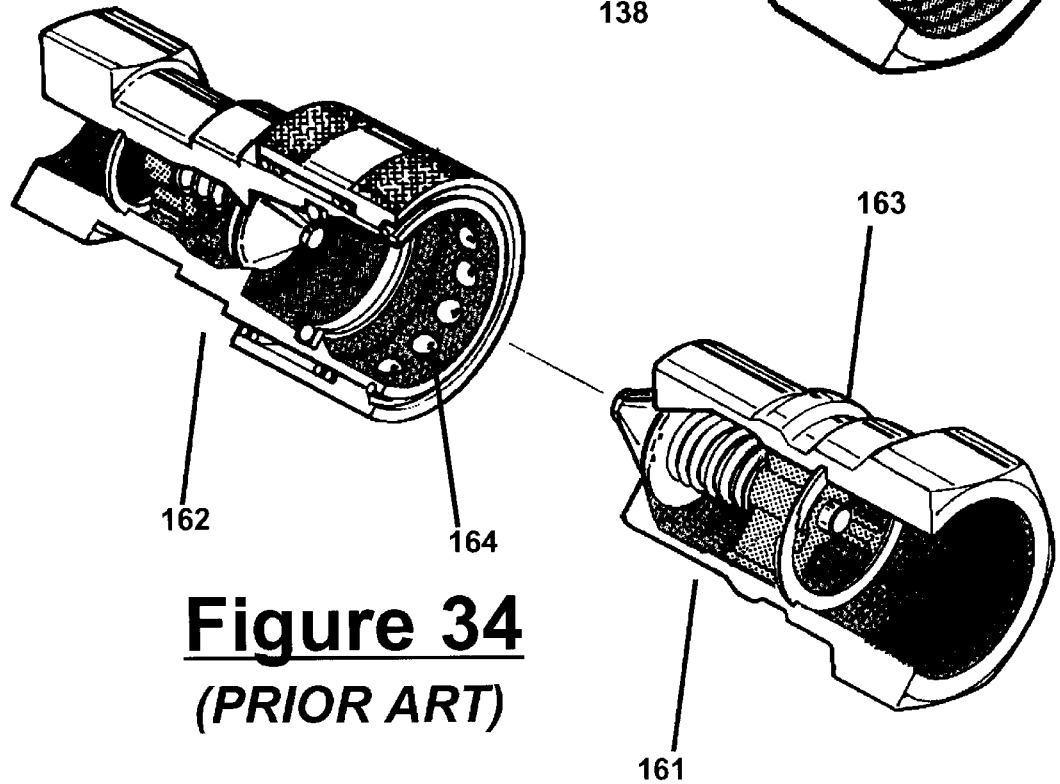
FIG. 34 shows a cutaway isometric view of a typical prior art quick connect coupling and nipple used for connection of hydraulic lines.

FIG. 33 shows a cutaway isometric view of a quick connect coupler 137 and a quick connect nipple 138. Shown in the figure on the nipple 138 is the hex wrench turn portion 150, the top end 153, the bore 154 in the top 153 and the nipple push lock 155. Shown in the figure on the coupler are the precision seal 159 and the knurl 160 for easy gripping. Of course, since the couplers are not used for a compressed air hose, the precision seal is not necessary. To use an existing coupler and nipple that is already equipped with unnecessary features relating to a pneumatic compressed air line does not hurt the performance of using the quick connect coupler and nipple solely for the quick connect features. FIG. 34 shows a cutaway isometric view of a coupler 162 and a nipple 161 from the hydraulic industry, used to quickly connect hydraulic lines. The hydraulic coupler 162 and nipple 161 may also be used similar to the pneumatic coupler 137 and nipple 138 as already described. The hydraulic coupler 162 has a ball locking mechanism 164. The hydraulic nipple 161 has a nipple push lock 163 to secure the nipple 161 into the coupler 162.

Figure 48:
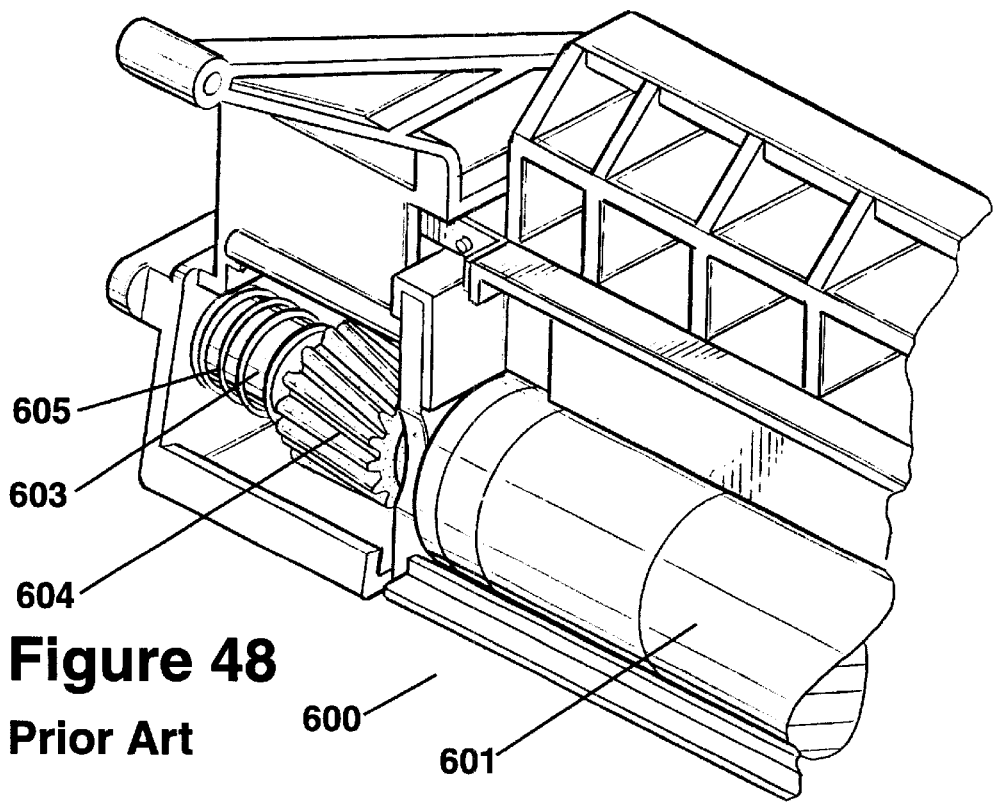
FIG. 48 shows an isometric view of an end portion of a prior art toner hopper.
Figure 49:
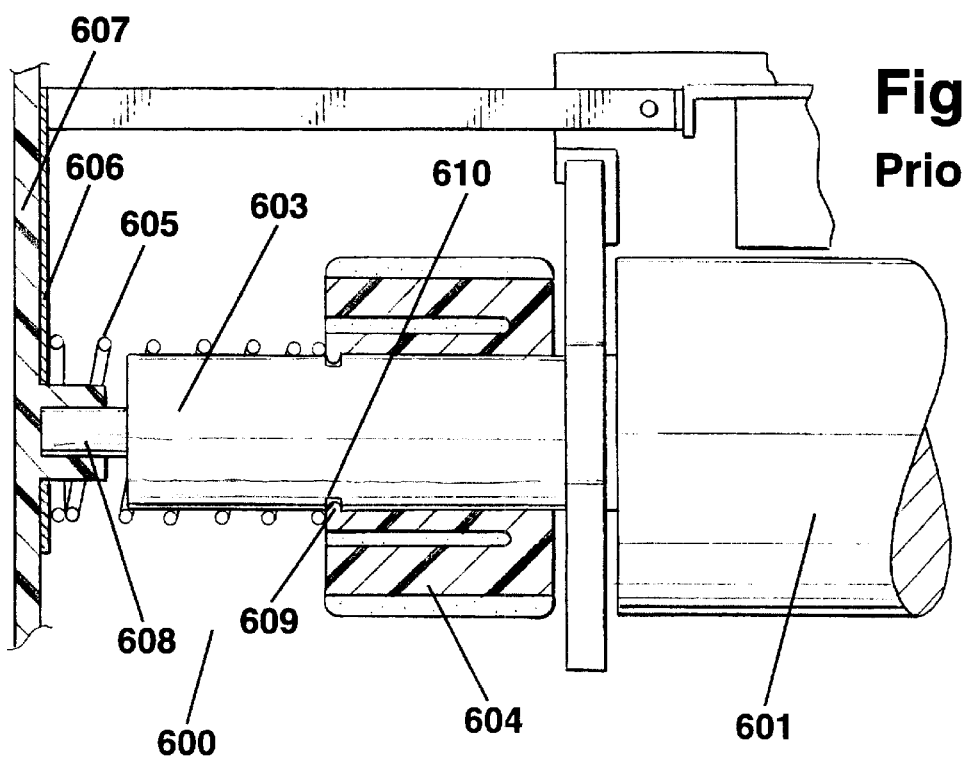
FIG. 49 shows a cutaway view of an end portion of a prior art toner hopper.

FIGS. 48 and 49 show a prior art end portion of a toner hopper 600. These figures show the magnetic roller 601, the drive gear 604, the electrical contact device 603 with the contact device's coil spring 605. The spring 605 completes the connection between the contact device 603 and the printer contact 606 located on the printer contact assembly 607. Note that the gear 604 has a lock mechanism 609 that locks into a groove 610 in the contact device 603. A magnetic core (not shown) has a magnetic core shaft 608.

Figure 50:
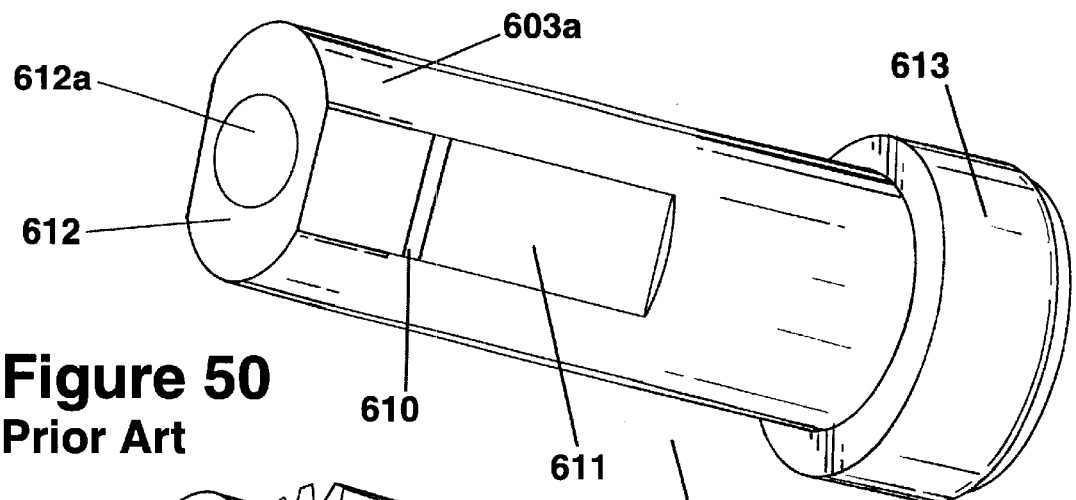
FIG. 50 shows an isometric view of a prior art cylindrical member that fits inside a developer roller sleeve which is an electrical contact device.
Figure 51:
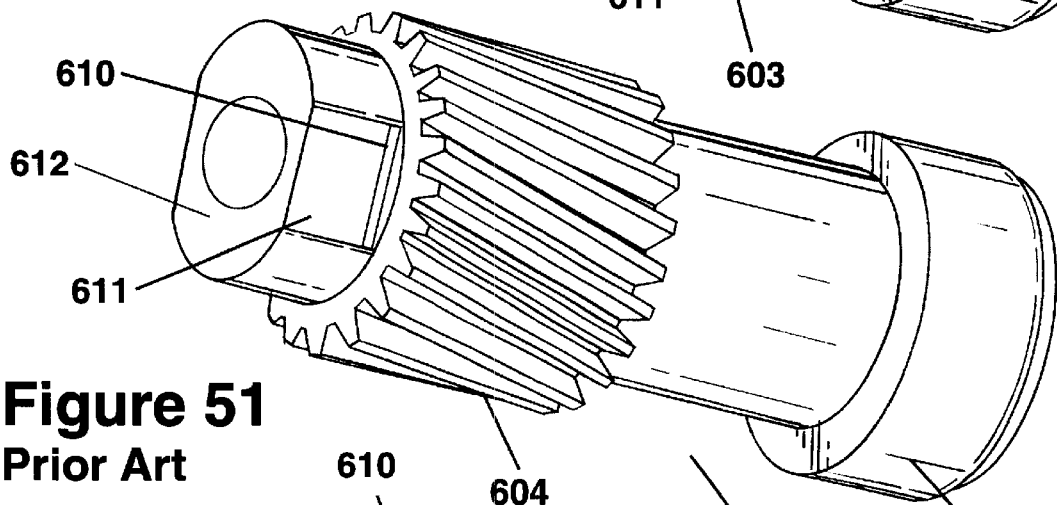
FIG. 51 shows an isometric view of the prior art cylindrical member with a gear on it.
Figure 52:
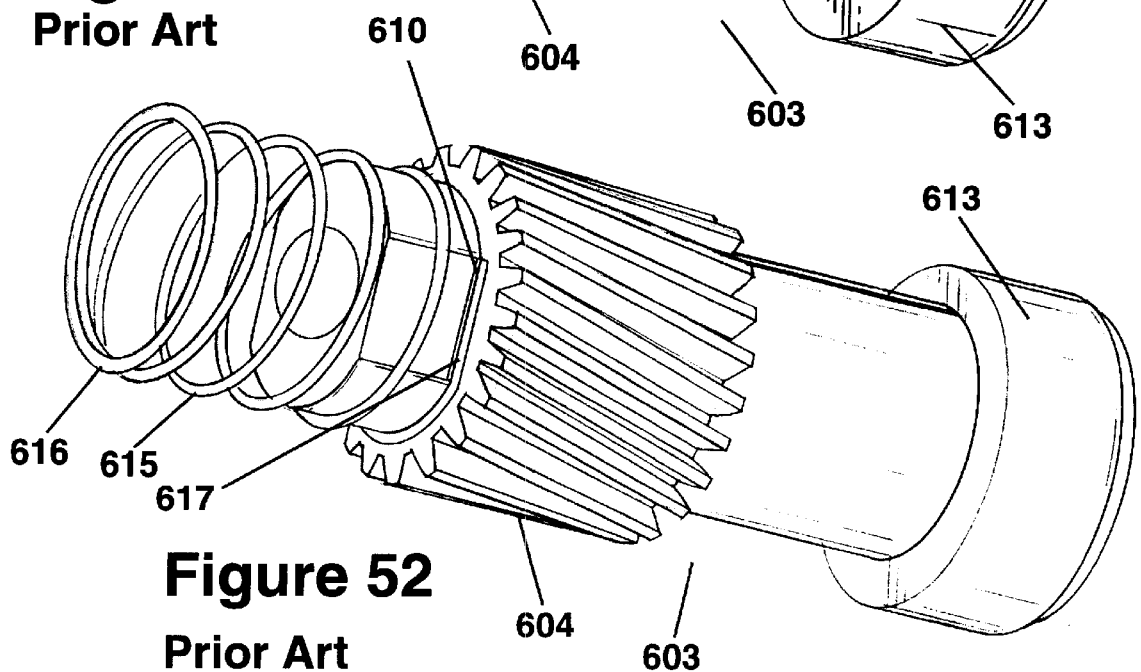
FIG. 52 shows an isometric view of the prior art cylindrical member with a gear of FIG. 51 but also has a conductive spring on the end of the smaller portion of the electrical contact device.

FIGS. 50–52 show the contact device 603. It is easier to see the groove 610 in the flat portion 611 of the contact device 603. Also, it can be seen that the flat portion 611 enables the gear 604 to fit on the contact device 603 in such a way that the gear 604 will drive the contact device 603. The gear 604 turns without requiring a set screw or other such attachment. There is an end portion 612 of the contact device 603 and a bore 612a. The spring 615 has a rim 616 on the left side and a lock portion 617 on the right side that locks into the groove 610 located on the flat portion 611 of the contact device 603.

Figure 53:
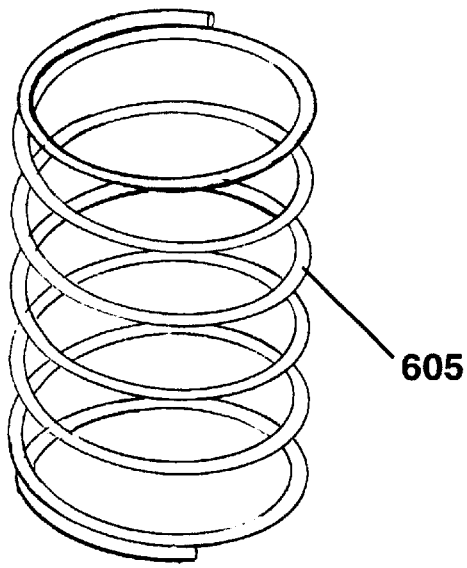
FIG. 53 shows an isometric view of a prior art coil spring.
Figure 54:
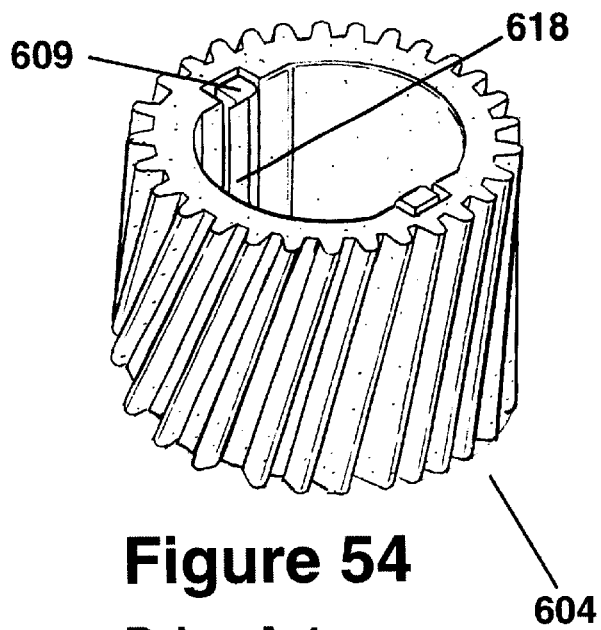
FIG. 54 shows an isometric view of the prior art gear of FIG. 52.
Figure 55:
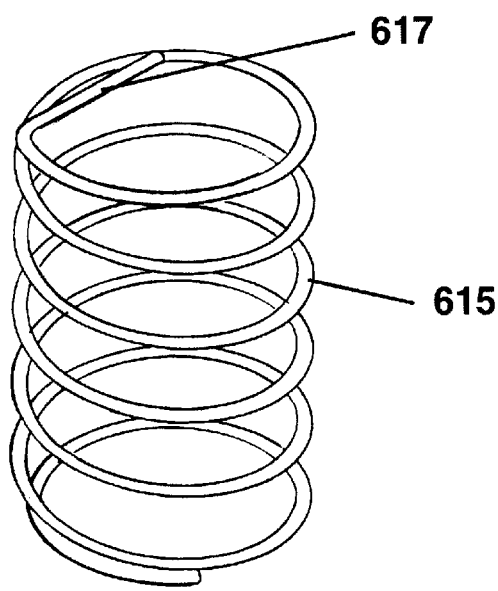
FIG. 55 shows an isometric view of another prior art spring with a locking mechanism.
Figure 56:
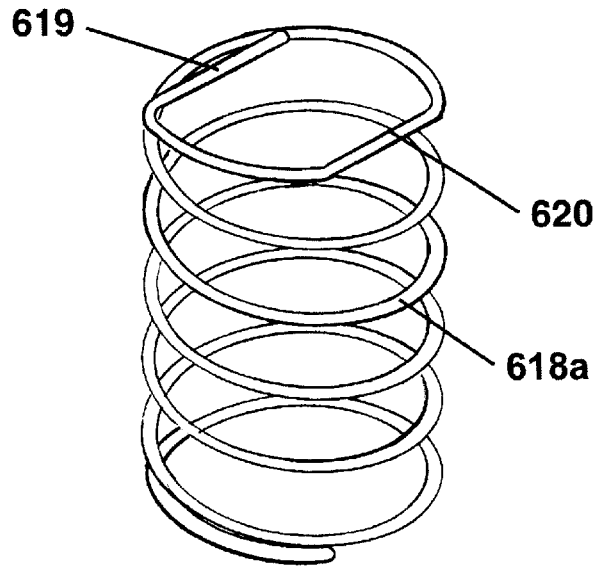
FIG. 56 shows an isometric view of a spring with two locking mechanisms.
Figure 64:
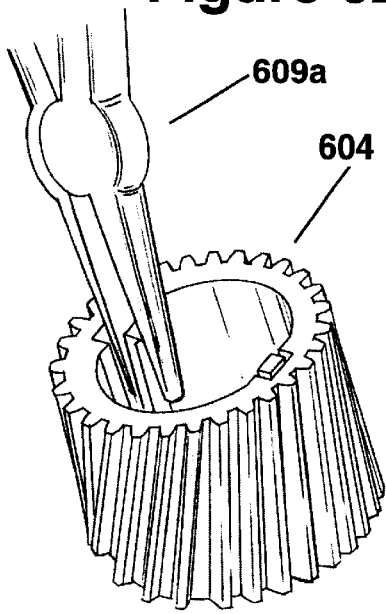
FIG. 64 is a gear from FIG. 63 after sanding away the top ridge, and shows the process of breaking off the prong from the gear.
Figure 65:
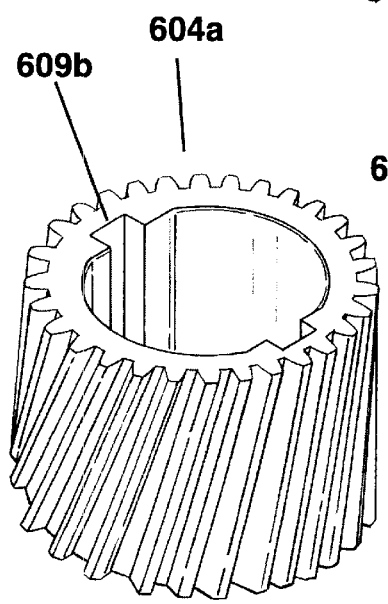
FIG. 65 shows the gear from FIG. 64 after the prong is broken off.

FIGS. 53–56 show versions of the coil springs and gear 604. For example FIG. 53 shows the plain coil spring 605. FIG. 54 shows the gear 604 with locks 609 and locking stem 618. Since only one lock system can lock in the groove 610 of the contact device 603 at one time, when the coil spring 615 with a lock 617 is used, the locks 609 of the gear 604 must be removed. This is easily done by simply breaking the locking stems 618 as shown in FIGS. 64–65 as only one locking system can populate the groove 610. However, noticing that there are two grooves as shown in FIG. 49, FIG. 56 shows a coil spring 618a that may populate both grooves 610 as it has lock portions 619 and 620.

Figure 57:
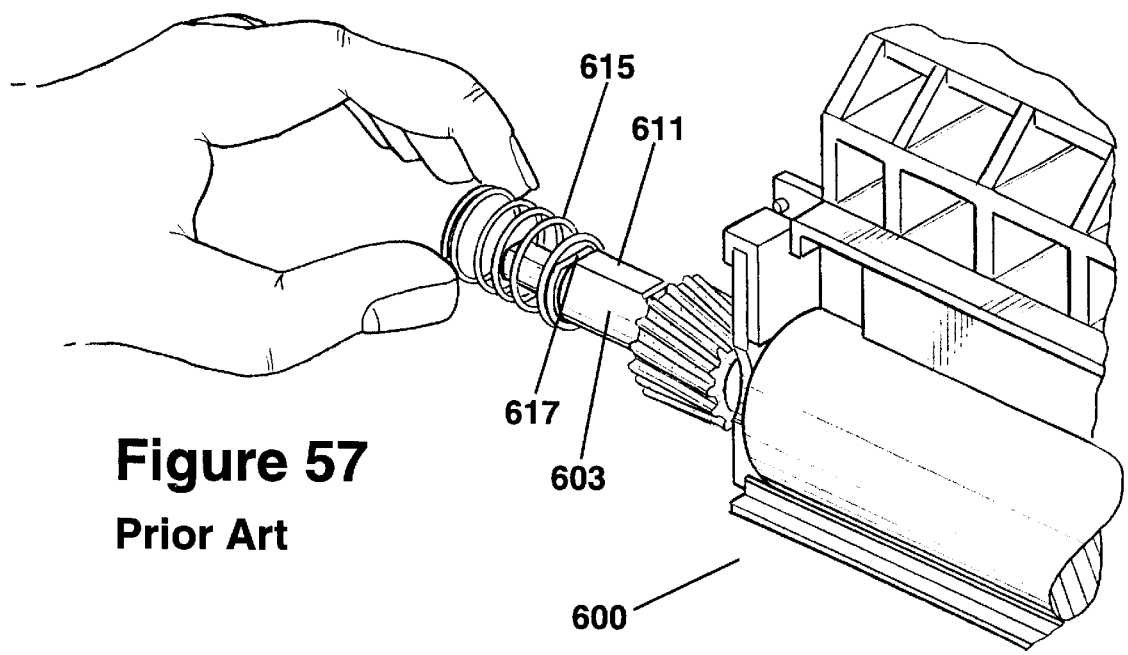
FIG. 57 shows an isometric view of the prior art beginning of the installation process of the locking spring onto a prior art cylindrical contact member.
Figure 58:
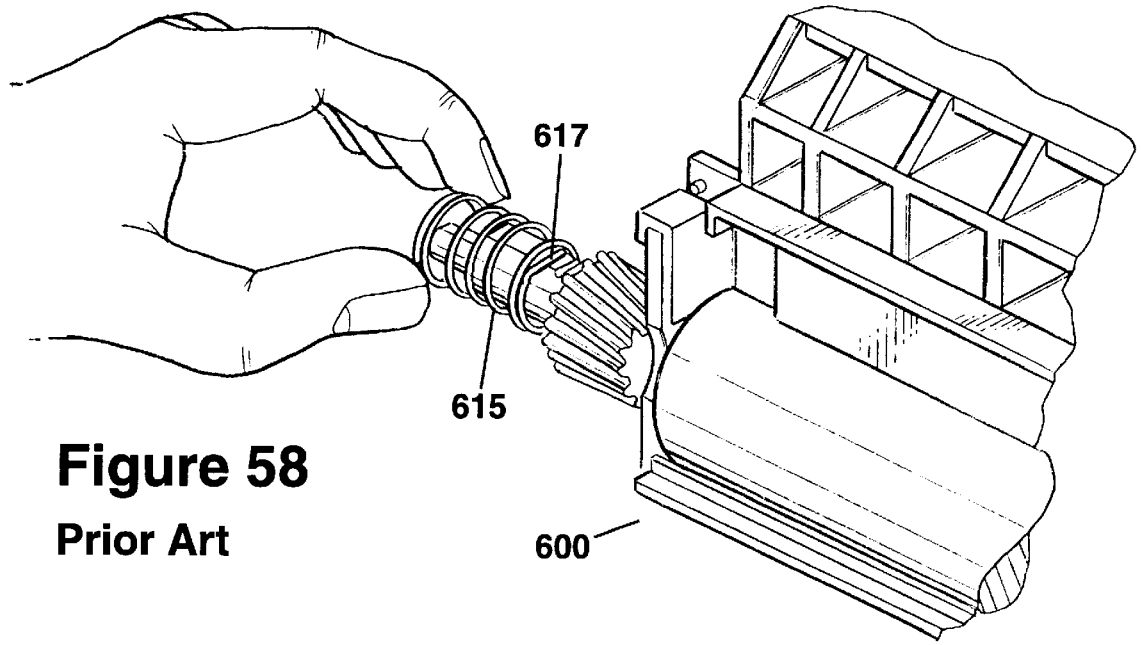
FIG. 58 shows an isometric view of further on in prior art the installation process of the locking spring onto a prior art cylindrical contact member.
Figure 59:
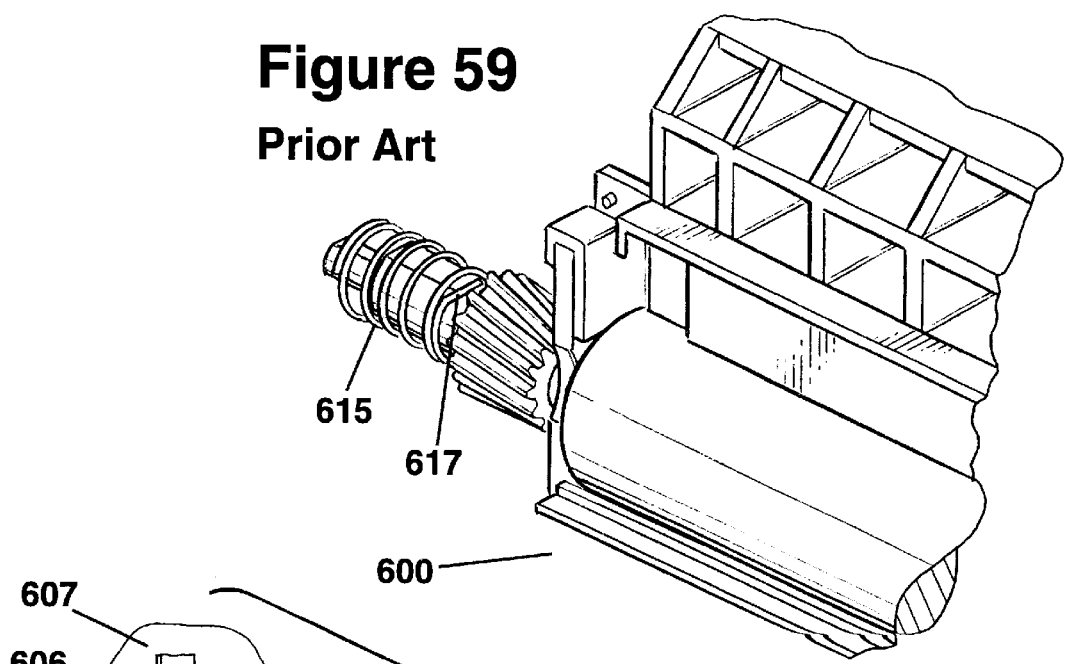
FIG. 59 shows an isometric view of an almost fully installed prior art locking spring onto a prior art cylindrical contact member.
Figure 60:
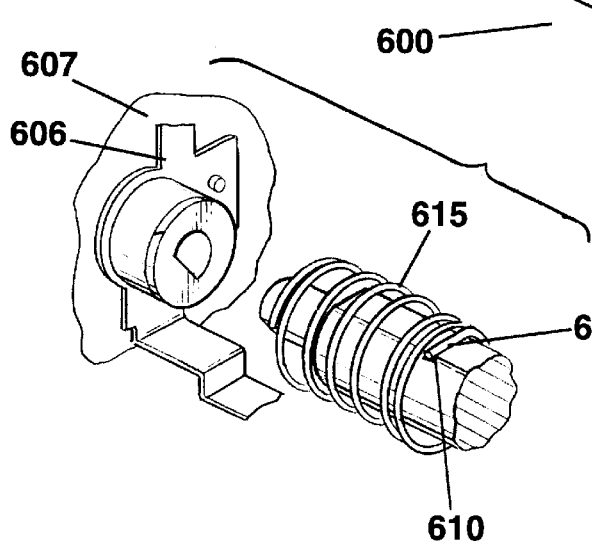
FIG. 60 shows a breakaway view of the prior art locking spring installed on a cylindrical contact member with the printer's electrical contact device on its electrical contact assembly.
Figure 61:
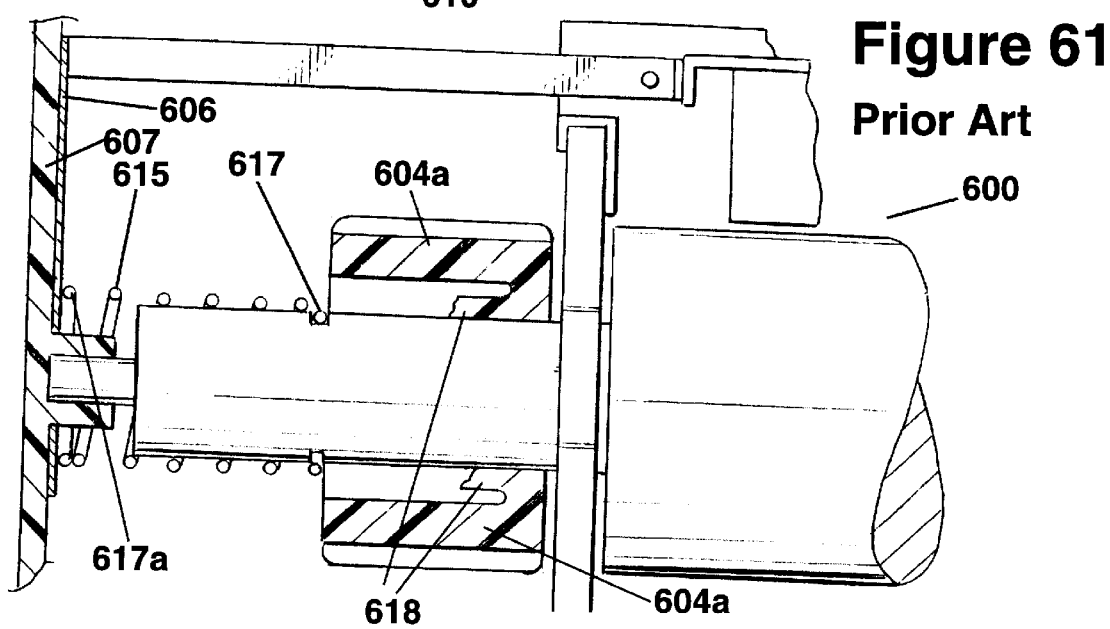
FIG. 61 shows the cutaway view of a prior art locking spring fully installed on a cylindrical contact member with the printer's electrical contact device on its electrical contact assembly.

FIGS. 57–59 show a locking spring 615 being installed onto contact device 603. FIG. 57 shows the initial placement of the spring 615, FIG. 58 shows the locking spring 615 installed further and FIG. 59 shows the spring 615 further installed. FIGS. 60–61 show the spring 615 fully installed with the lock 617 in the groove 610 and the end portion 617a of the spring 615 opposite the lock 617 touching the printer contact 606 on the printer contact assembly 607. Note that FIG. 61 shows the gear 604a lock 609 and locking stem 618 is broken off as it works better when the stem 618 is broken off the gear 604a. The figure shows a portion of each stem 618. FIGS. 64 and 65 show the simple process of breaking off the locks 609. First you grab the lock 609 with a needle nose pliers 609a or other tool. The resultant notchless gear 604a is shown in FIG. 65. The groove 609b in the gear 604a is shown where the lock 609 and stem 618 were removed.

Figure 62:
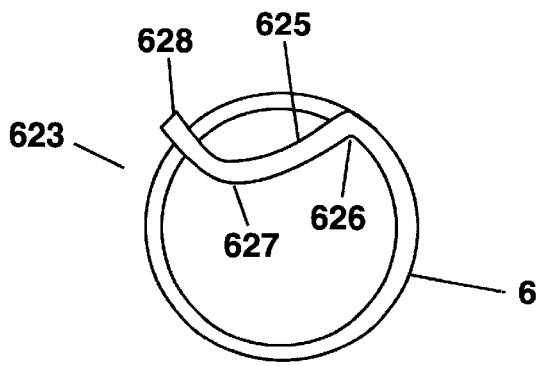
FIG. 62 shows an end view of an improved coil spring with an improved locking mechanism.

Also, there is an improved spring 623 shown in FIG. 62 that functions better than the spring 615. This spring 623 has a coil portion 624, and a lock 625. The lock 625 has an attachment point 626 to the coil portion 624, an end 628, and a bend 627. The bend portion 627 is the portion that generally locks into the groove 610 shown in FIG. 66. The improved spring 623 has a lock mechanism 625 that does a better job of locking into the groove 610.

Figure 63:
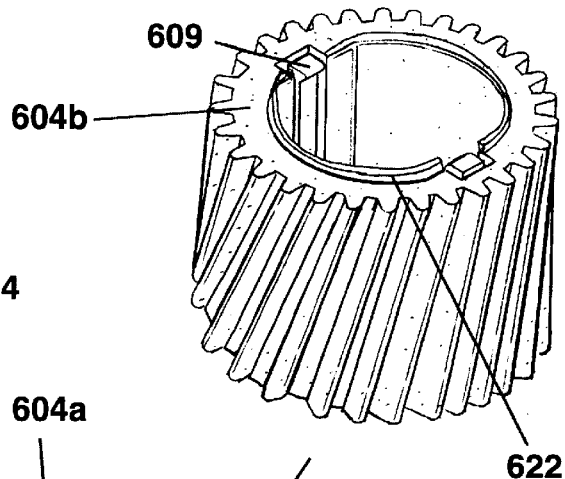
FIG. 63 shows an isometric view of the gear of FIG. 54 emphasizing the lip causing the gear to stick out further.

FIG. 63 shows a closer look at the top portion 604b of the gear 604 shown in more detail than in FIG. 54. This gear has a ridge 622 along the top 604b portion. The ridge 622 is ever so slight and barely visible in real life.

However, the ridge 622 causes a problem in installing the spring 615 and 623 into the groove 610. Now and this is an important problem solved in this patent application. Inventor Michlin has a company that manufactures the prior spring 615 he previously invented but did not obtain a patent. Michlin's company has sold over 5,000 springs. However, these springs have been useless as customer after customer either never reordered or returned the springs 615. After all this time the springs, on the market were not selling the way other products do. Then it was discovered around November to December, 2000 why the springs 615 did not sell well. It was discovered that the gear 604 has the aforementioned ridge 622. The slight amount that the ridge 622 sticks out is enough to prevent the lock 617 from seating in the groove 610. This amount is enough to prevent seating the lock 617 in the groove 610, and therefore, the spring 615 was not a practical product and for this reason sales stayed slow. The new method in installing the spring 615 is to first sand or grind very slightly on the ridge 622 of the gear 604, then the ridge 622 does not obstruct the spring 615 and the lock 617 can properly fit in the groove 610. Thus, this new method has made the old spring 615 a practical and viable product. However, this method also works well with the new locking spring device 623.

Figure 66:
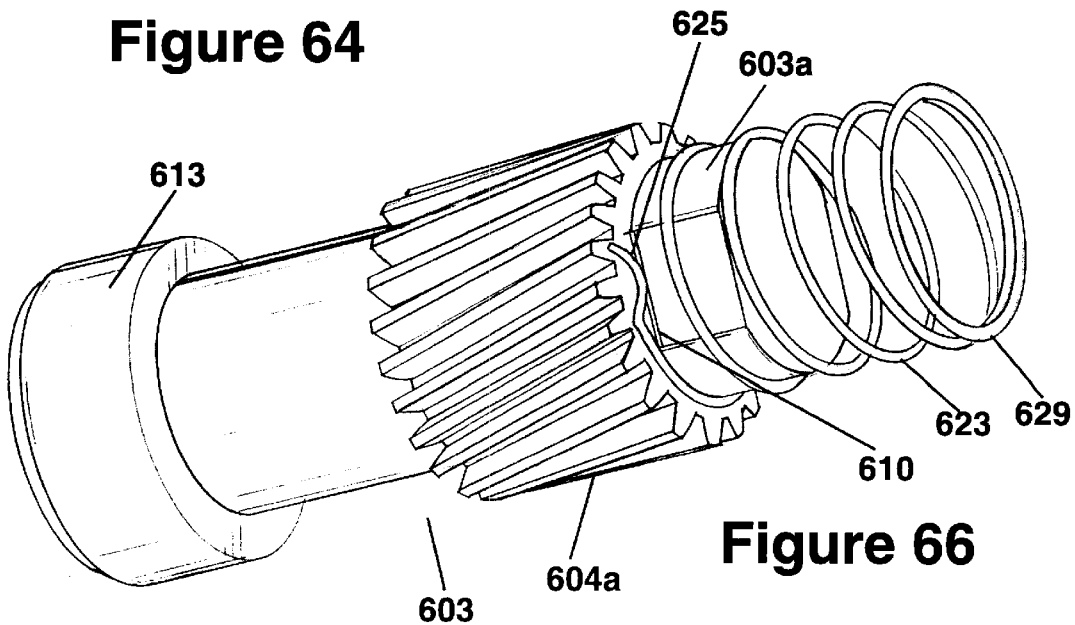
FIG. 66 shows an isometric view of the gear and an installed improved locking coil spring on a cylindrical contact device.
Figure 72:
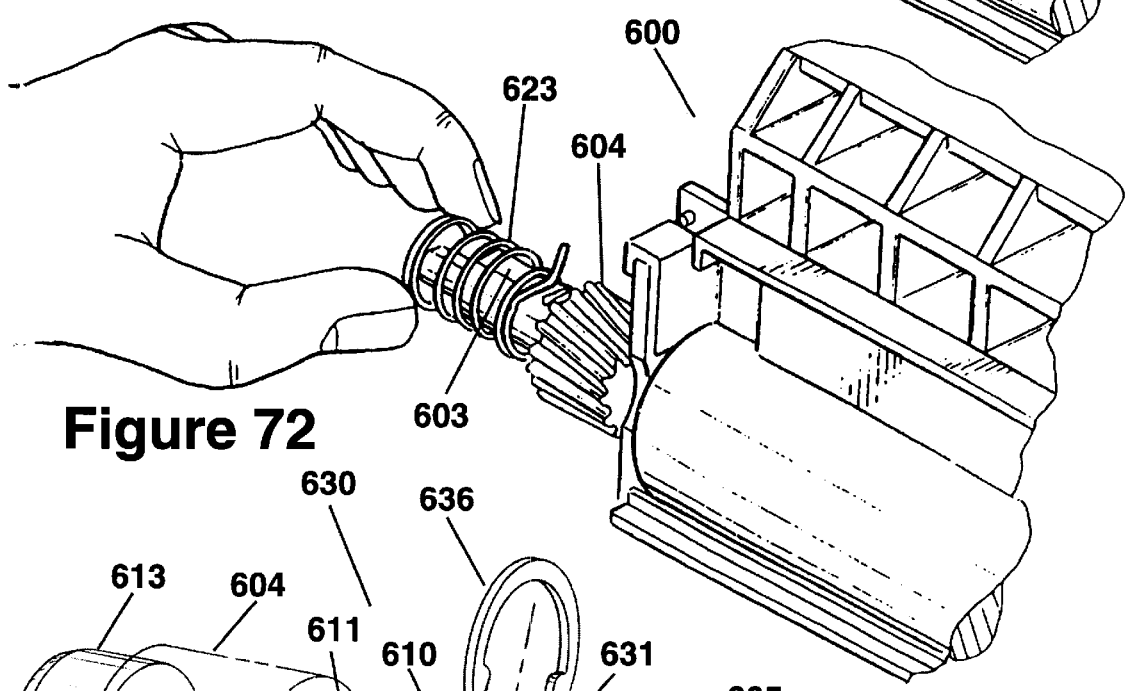
FIG. 72 shows an isometric view of an improved locking coil spring at the latter part of the process of installation on to a cylindrical contact member.

FIG. 66 shows the new spring device 623 with its right end 629 and the lock 625 is in the groove 610 of the contact device 603. Also shown in the figure is the larger diameter portion 613 where the contact device 603 will fit into the magnetic roller sleeve 601. The gear 604a is adjacent the groove 610 in the contact device 603. The lock 625 locks into the groove 610 to stabilize the position of both the spring 623 and the gear 604a on the small portion of the contact device 603. FIG. 67 shows another view of the spring device 623. FIG. 68 shows the spring device 623 with the gear 604a on the small diameter portion 603a of the contact device 603. FIGS. 69 to 70 shows the removal process of the spring 623 from the contact device 603 as in FIG. 72. To remove the spring device 623, first rotate the spring device 623 as shown in FIG. 69, then the bottom of the lock portion 625 pops out of the groove 610 as shown in FIG. 70 after which the spring 623 easily pulls off of the contact device 603.

Figure 71:
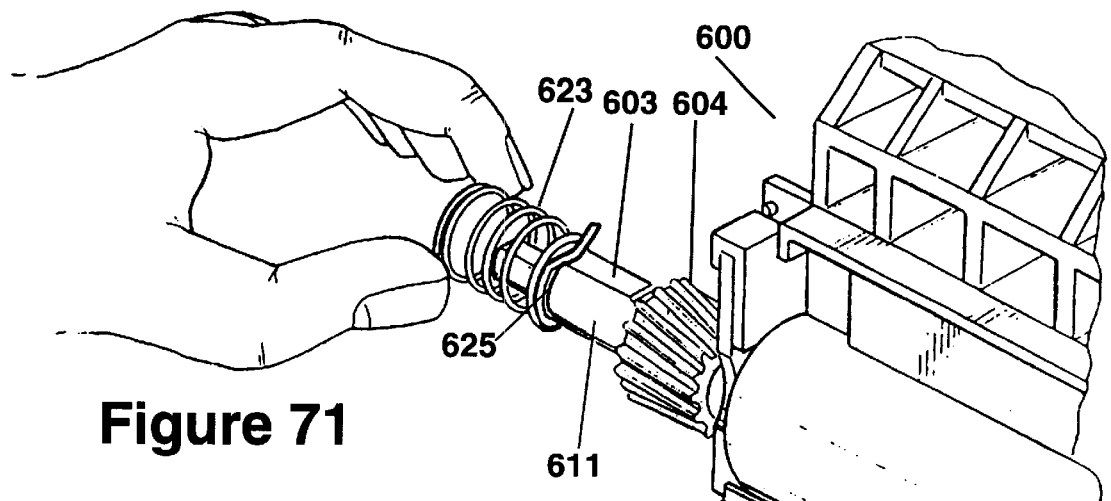
FIG. 71 shows an isometric view of an improved locking coil spring at the early part of the process of installation on to a cylindrical contact member.

To install the spring 623 on a contact device 603, place the lock portion 625 on the flat portion 611 of the contact device 603 as in FIG. 71. Then twist the spring device 623 clockwise with respect to the figure. Then push the spring device 623 along the small portion of the contact device 603. When the lock portion 625 gets as far as the groove 610 in the contact device 603, then rotate the spring device counterclockwise and the spring device 603 will snap right into the groove 610.

Figure 73:
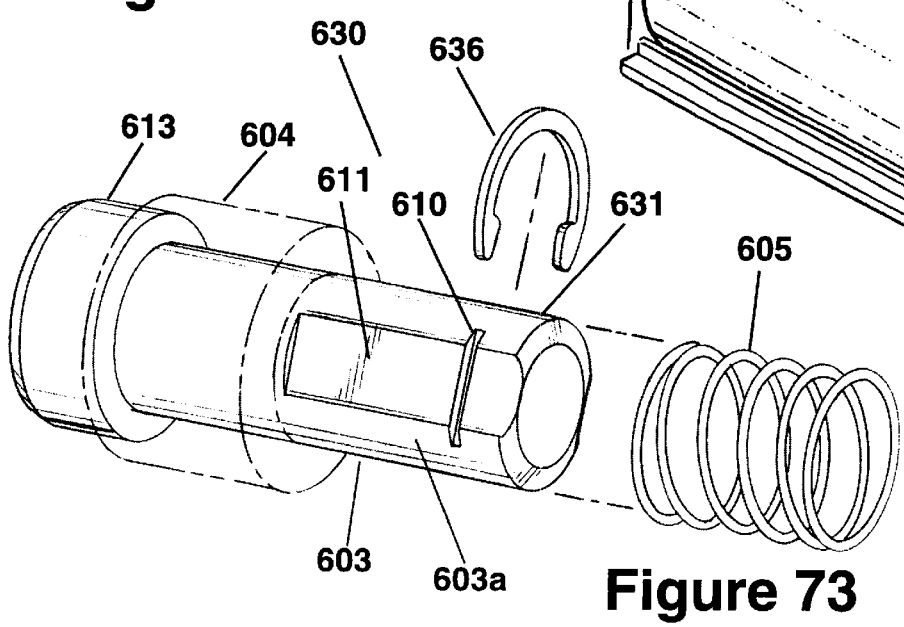
FIG. 73 shows an isometric view of a locking contact that goes on a cylindrical contact member and a coil spring contact that contacts the locking contact.
Figure 74:
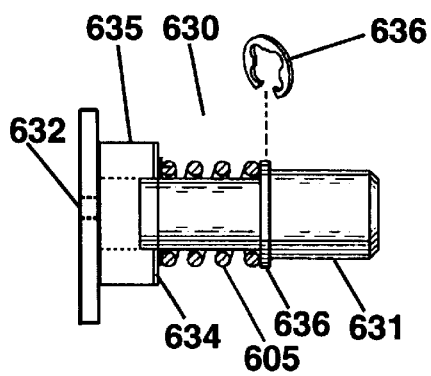
FIG. 74 shows a cutaway view of a side of a locking clip positioned on a cylindrical contact member with a coil spring and a printer contact being installed and the coil spring is not yet fully depressed.
Figure 75:
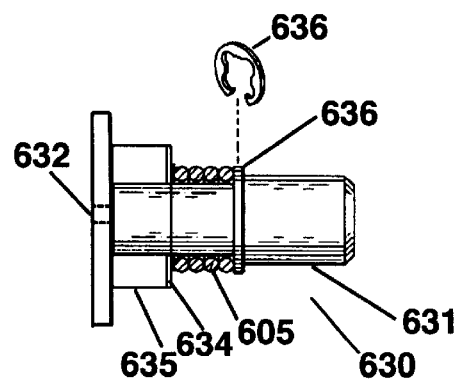
FIG. 75 shows a cutaway view of a side of a locking clip positioned on a cylindrical contact member with a coil spring and a printer contact fully installed and the coil spring compressed.
Figure 79:
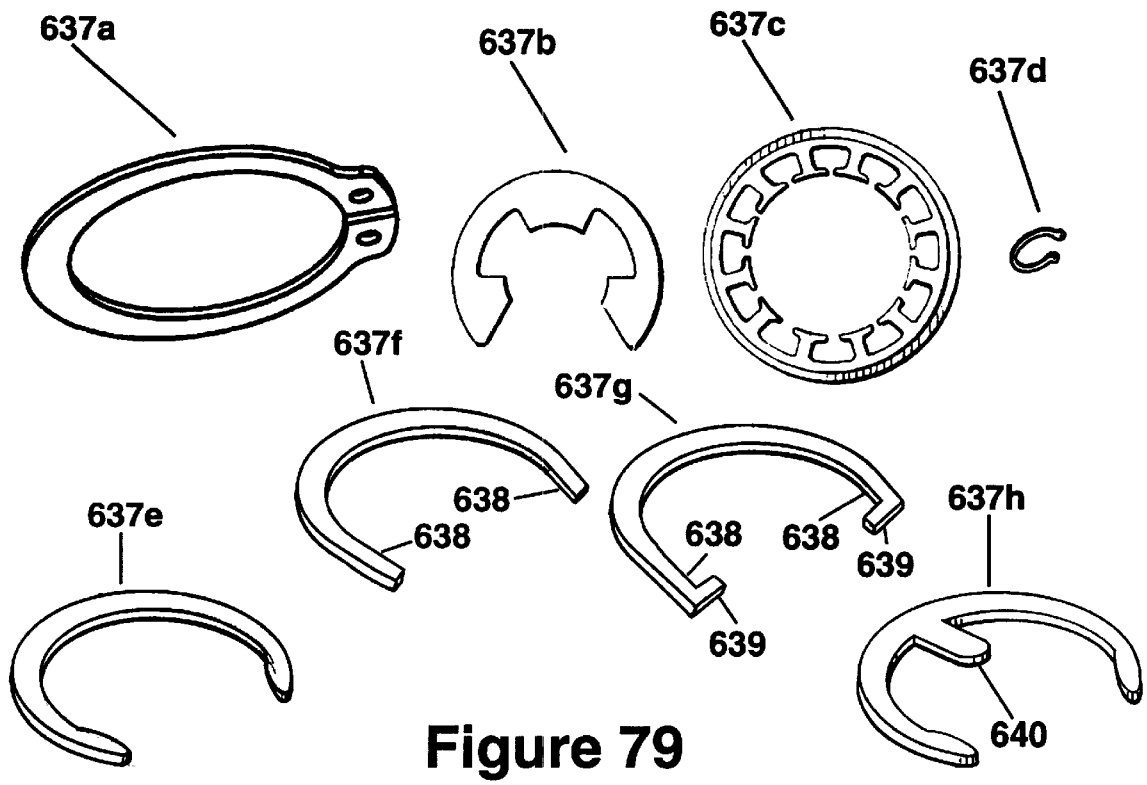
FIG. 79 show just some of the various locking clips that may be used although the invention is not limited to these.

FIG. 73 shows a similar contact system 630 using the contact device 603 with the old spring 605. This system entails the use of a metal or conductive lock ring 636 that locks into the groove 610. Then the spring 605 presses over the small diameter portion 631 onto the lock 636 for increased contact properties between the spring 605 and the small portion 603a of the contact device 603. FIGS. 74 to 78 show a similar system, and for description purposes shows the locking ring 636 in both on and off the contact device 603 at the same time as in FIGS. 74, 75 and 78 for purposes of improving clarity. FIGS. 74 and 75 show the system as it would be in a toner cartridge 501 showing the printer contact plate 634 and plate holder 635. FIG. 74 shows the spring 605 prior to compression of the spring 605 and FIG. 75 shows the spring 605 after compression. It includes the core shaft receiving offset bore 632 The locking ring is not limited to that shown in FIGS. 73–78. This locking ring may have any shape as long as it fits into at least one groove 610 of the contact. FIG. 79 shows some various locking rings, 637a–h, and note that the ring 637h has an alignment prong 640 which would require a longitudinal groove in the small portion 603a contact device 630. This device may function with any number of such alignment prongs 640, each which requires a longitudinal groove in the contact device 630. Note that the locking ring 637f has two parallel flat portions 638 designed to fit precisely in both grooves 610 in the contact device 630. Also, note that ring 637g is like ring 637f with 2 parallel flat portions 638, but also has two safety prongs 639 to prevent the ring 637g from sliding out of the groove 610 of the contact device 630.

Figure 76:
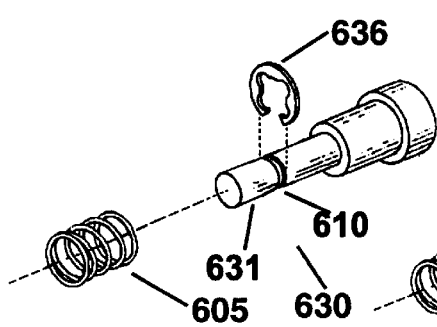
FIG. 76 shows an isometric view of a locking clip to be positioned on a cylindrical contact member that is fit in the end of a developer roller sleeve with a coil spring to show how the coil spring and locking clip fit.
Figure 77:
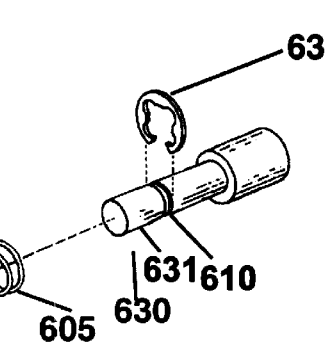
FIG. 77 shows an isometric view of a locking clip to be positioned on a cylindrical contact member with a coil spring to show how the coil spring and locking clip will fit.
Figure 78:
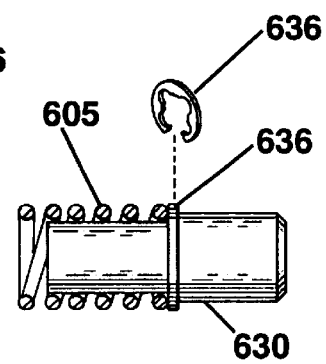
FIG. 78 shows a cutaway view of a side of a locking clip positioned on a cylindrical contact member with a coil spring to show how the coil spring and locking clip will fit.

Note that FIGS. 76–77 are absent a flat portion 611, yet the contact device 630 has the same reference number as the contact with a flat portion. However, in these embodiments using a locking ring 636, 637a–f, or retaining ring 636, 637a–f, a flat portion is not required, as this design can decrease the cost of having to machine a flat portion in the contact 630. Note that the shape of the retaining ring 636–637 is not relevant as long as it both locks the gear from moving and also has spring pressure with electrical contact from the retaining ring 636, 637a–f and the contact 630 while the spring 605 also makes contact with the printer contact plate 634 to make a better connection to the image forming system 500.

Inventor Michlin has pioneer U.S. Pat. Nos. 5,634,175 and 5,648,838 on electrical contact devices that connect to the developer roller 2. The first patent has among its embodiments a metal cylindrical electrical contact that fits in the end of a developer roller one embodiment having a smaller diameter portion that contacts a printer contact with or without a coil spring and another embodiment that has an inner bore that receives a coil spring which contacts the printer contact. The second patent has, among other embodiments, a ring shaped device that goes into the developer sleeve up to a shoulder formed at the end of a counterbore and the ring makes contact with the printer contact.

FIG. 80 shows another contact system 681 using a shaft collar 689 or similar ring device. Although this shaft collar 689 uses a set screw 648 to tighten it onto the small diameter portion 683 of the contact device 681, there are other ways of securing a shaft collar 689 or similar device, for example, a set screw may angle in from the side 688, a side extension (not shown) on the shaft collar 689, where the side extension may tighten using a setscrew or other locking mechanism, clamp ring, press fit or other method. The contact device 681 has a small diameter portion 683, a large diameter portion 684, a middle portion 682, a left end 685 and a bore 686. The shaft collar 689 has a side 688 and an outer cylindrical surface 687. The spring 605 then presses against the side 688 of the shaft collar 689 to make contact with the spring on one side while on the other side the spring 605 makes contact with the contact plate 659 located on the printer contact assembly 659a. The spring 605 and some of the small diameter portion 683 of the contact device 681 fits through a bore 657 in the alignment piece 656. There is a bore 658 in the printer contact assembly 659a. As the developer roller 601 rotates, the contact device 681 rotates with it and the shaft collar 689 rotates with the contact device 681. The large diameter portion 684 fits into the bore in the developer roller 601.

FIG. 81 shows another contact system 681a, using a ring contact device 654. This contact device 654 has one or more notches 654a which fit in one or more grooves 651 and pressing uniformly against the shoulder 650 of the groove 651 in the small portion 649 of the contact device 652. The number of grooves 651 and notches 654a is variable and is shown with two notches 654a and 4 grooves 651 only as an example. This could even be made with only one groove 651 and notch 654a. The magnet shaft 643 may protrude through the bore 658 in the printer contact plate 659. The coil spring 605 fits through the bore 657 in the alignment piece 656 to make contact with the printer contact plate 659 on the left side and with the ring contact device 654 on the right side. This does not prevent the spring 605 from also contacting the small diameter portion 649 of the contact device 652, but the more electrical contact that is made, the more robust the electrical connection, the better the print quality, graphics capability, capability of smaller dpi resolution, color capabilities and toner efficiency of the image forming apparatus 500. The contact device has a larger diameter portion 649a that fits into the bore of a developer roller sleeve 601.

Figure 82:
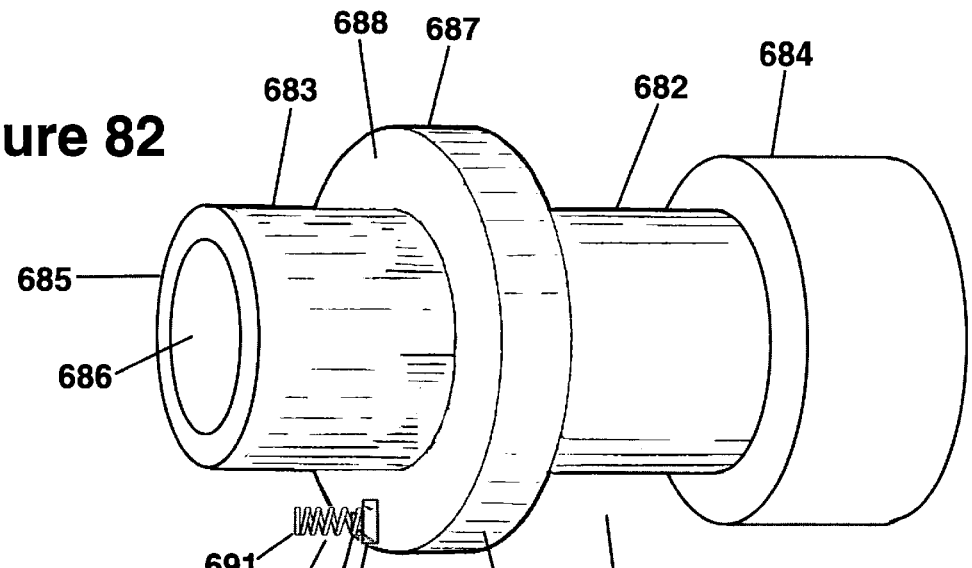
FIG. 82 shows an isometric view of a shaft collar positioned on a cylindrical contact member that is to go in the end of a developer roller sleeve with a coil spring using a contactor insert for making electrical contact against the shaft collar.

FIG. 82 shows another contact system 681b using a shaft collar 689 or similar ring device. The contact device 681b has a small diameter portion 683, a large diameter portion 684, a middle portion 682, a left end 685 and a bore 686. The shaft collar 689 has a side 688 and an outer cylindrical surface 687. This device 681b uses a coil spring contact 690 with a friction contact portion 692 that touches the side 688 of the shaft collar 689. The friction contact portion 692 may be made of metal, graphite or any conductive material. If made of graphite, similar to a contact "point" in an electric motor, the friction contact portion 692 could be modularly replaceable after wear just like electric motor points. There could optionally be a groove (not shown) in the side 688 of the shaft collar 687 that would guide the friction contact portion 692. A groove could wear in after use. The spring 690 has a left end 691 and a coil portion 693. The left end 691 of the coil spring 690 makes contact either directly or indirectly to the printer or uses a printer contact plate 659 or other similar means of contact. As the developer roller 601 rotates, the contact device 681b rotates with it and the shaft collar 689 rotates with the contact device 681b. The large diameter portion 684 fits into the bore in the end of the developer roller 601.

Figure 83:
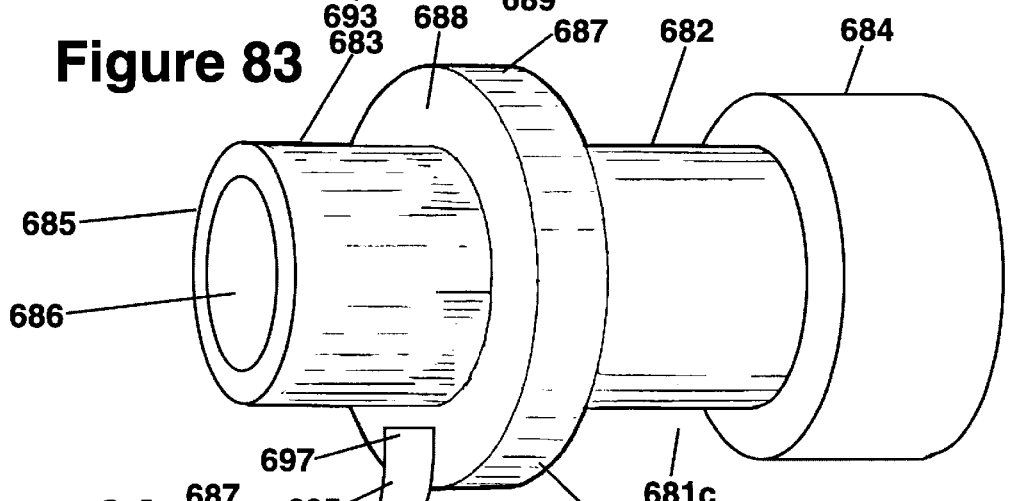
FIG. 83 shows an isometric view of a shaft collar positioned on a cylindrical contact member that is to go in the end of a developer roller sleeve where a flat spring is used for making electrical contact against the shaft collar.

FIG. 83 shows another contact system 681c using a shaft collar 689 or similar ring device. The contact device 681c has a small diameter portion 683, a large diameter portion 684, a middle portion 682, a left end 685 and a bore 686. The shaft collar 689 has a side 688 and an outer cylindrical surface 687. The contact system 681c uses a leaf spring 694 to contact the side 688 of the shaft collar 689. The leaf spring 694 has a top portion 697, a bottom portion 696 and a middle portion 695. As the developer roller 601 rotates, the contact device 681c rotates with it and the shaft collar 689 rotates with the contact device 681c. The large diameter portion 684 fits into the bore in the developer roller 601.

Figure 84:
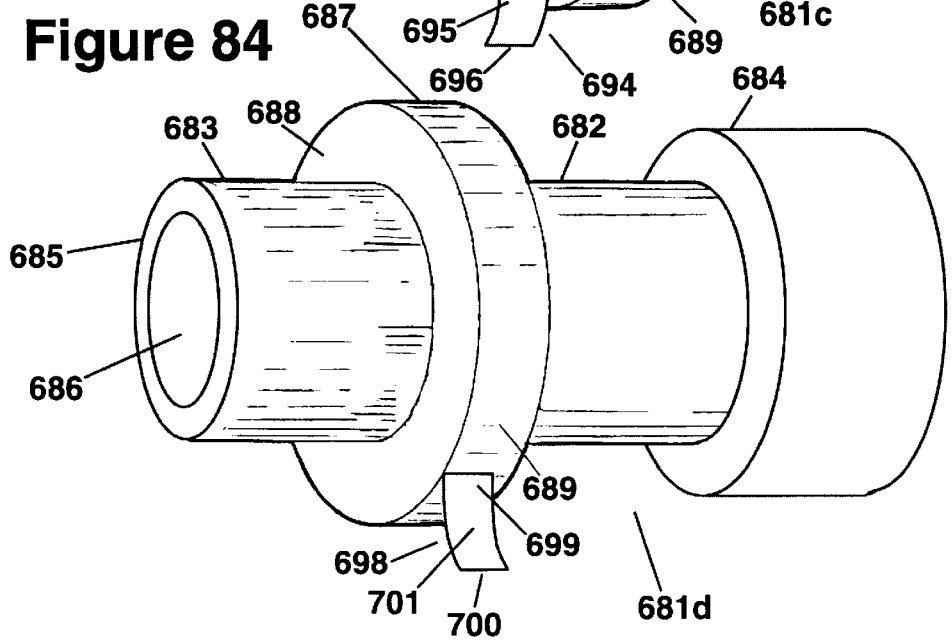
FIG. 84 shows an isometric view of a shaft collar positioned on a cylindrical contact member that is to go in the end of a developer roller sleeve where a flat spring is used for making electrical contact against the shaft collar.

FIG. 84 shows another contact system 681d using a shaft collar 689 or similar ring device. The contact device 681d has a small diameter portion 683, a large diameter portion 684, a middle portion 682, a left end 685 and a bore 686. The shaft collar 689 has a side 688 and an outer cylindrical surface 687. The contact system 681d uses a leaf spring 698 to contact the outer cylindrical surface 687 of the shaft collar 689. The leaf spring 698 has a top portion 699, a bottom portion 700 and a middle portion 701. As the developer roller 601 rotates, the contact device 681d rotates with it and the shaft collar 689 rotates with the contact device 681d. The large diameter portion 684 fits into the bore in the developer roller 601.

FIG. 85 shows another contact system 681e. The contact device 681e has a small diameter portion 683, a large diameter portion 684, a left end 685 and a bore 686. The contact system 681e uses a spring wire 713 to contact the side 684a of the large diameter portion 684 of the contact device 681e. The spring wire 713 has a top portion 716, a bottom portion 714 and a middle portion 715. As the developer roller 601 rotates, the contact device 681e rotates with it and the large diameter portion 684 rotates with the contact device 681e. The large diameter portion 684 fits into the bore in the developer roller 601.

Although in this example, a wire 713 is used to contact the side 684a of the large diameter portion 684, it is not so limited. This could be done with most any other system shown in this application, particularly those shown in FIGS. 80, 82–87, but instead of contacting against a shaft collar, to instead contact against the side 684a of the large diameter portion 684 of the contact device 681e. This could have many benefits including shortening the required length of a toner hopper, thus shortening the toner cartridge, imaging system 500, saving shipping and materials costs and having the luster of a smaller machine 500.

FIG. 86 shows another contact system 681f using a shaft collar 689 or similar ring device. The contact device 681f has a small diameter portion 683, a large diameter portion 684, a middle portion 682, a left end 685 and a bore 686. The shaft collar 689 has a side 688 and an outer cylindrical surface 687. The contact system 681f uses a spring wire 702 to contact the outer cylindrical surface 687 of the shaft collar 689. The spring wire 702 has a top portion 704, a bottom portion 703 and a middle portion 705. Alternately, the spring wire 702 could contact the side 688 of the shaft collar 689. As the developer roller 601 rotates, the contact device 681f rotates with it and the shaft collar 689 rotates with the contact device 681f. The large diameter portion 684 fits into the bore in the developer roller 601.

FIG. 87 shows another contact system 681g using a shaft collar 689 or similar ring device. The contact device 681g has a small diameter portion 683, a large diameter portion 684, a middle portion 682, a left end 685 and a bore 686. The shaft collar 689 has a side 688 and an outer cylindrical surface 687. The contact system 681g uses a coil spring 707 with a wearable friction contact portion 712 to contact to the outer cylindrical surface 687 of the shaft collar 689. The friction contact portion 712 has a base 710, a left guide rail 708, a right guide rail 711, and an optional open portion 709. The open portion 709 could hold a wearable friction insert that could be wired to a portion that makes contact with the image forming system 500, similar to points in an electric motor. As the developer roller 601 rotates, the contact device 681g rotates with it and the shaft collar 689 rotates with the contact device 681g. The large diameter portion 684 fits into the bore in the developer roller 601. Inventor wants to mention Japanese laid out patent number 5-25458 (1993) which uses a "bearing" that it references as numeral 10 on the cover page and a spring 7.

Figure 88:
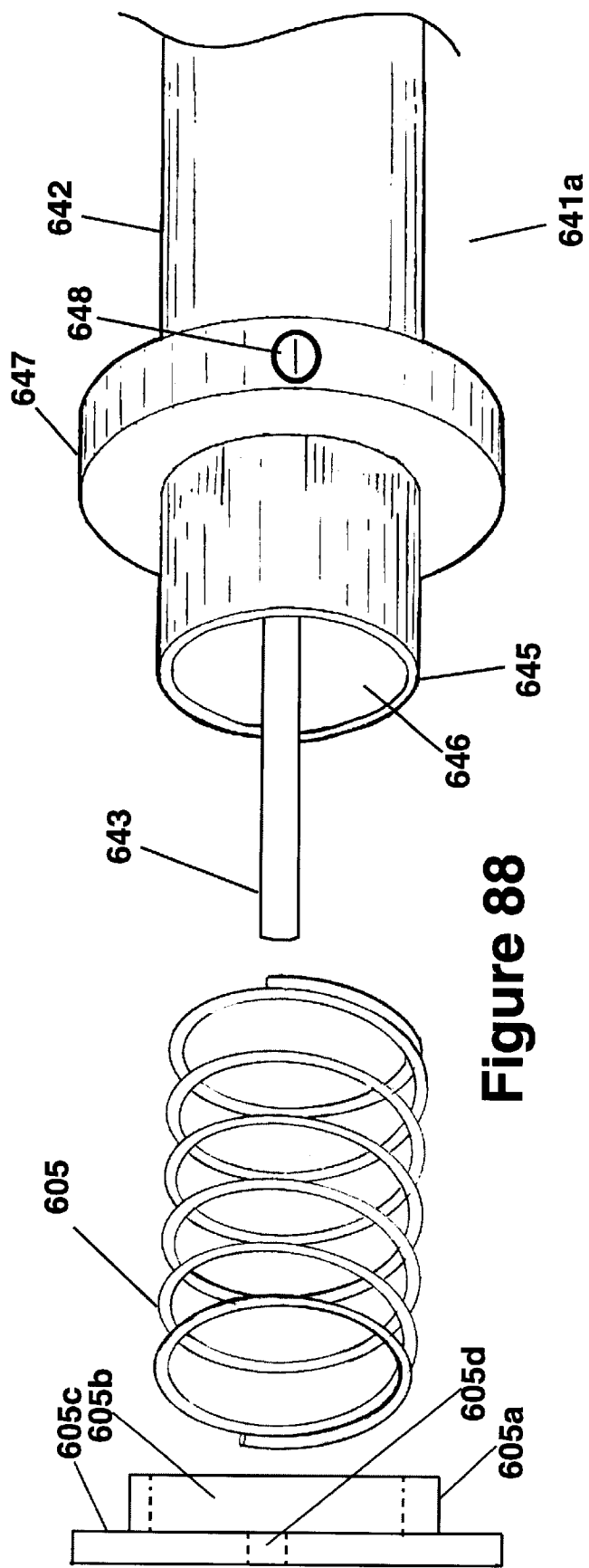
FIG. 88 shows an isometric view of a shaft collar positioned on a developer roller sleeve with a coil spring to show how the coil spring fits with respect to the developer roller, shaft collar and printer contact assembly.

FIG. 88 shows a device 641a similar to that of FIG. 80, however, the device of FIG. 88 uses a shaft collar 647 or similar ring device directly on a developer roller 642. This system 641a includes a developer roller 642, a shaft collar 647, a shaft collar set screw 648, a shaft 643 or magnet shaft 643, a developer roller 642 end 645, a developer roller 642 bore 646, a coil spring 605, an alignment piece 605a with an inner bore 605b, a contact plate 605c and a shaft receiving bore 605d. As shown here, the developer roller 642 fits into the insulative alignment piece 605a. But other variations may be made, for example. This embodiment could also be varied where a bushing (not shown) fits in the bore of the developer roller, similar to the contact device 681 which would fit into the alignment piece 605a for improved rotational trueness where the spring makes the contact with the contact plate 605c and the shaft collar 647. The device is not limited to these variations. It is preferable that the alignment piece 605a be insulated material such as TEFLON or DELRIN or other plastic, but this is not a limitation. There will be more examples of similar devices to follow, but please remember that it is not limited to these devices.

FIG. 89 shows an example of a similar contact system 641b. This system uses a shaft collar 647, or similar ring device, on a developer sleeve 642, but please keep in mind that many pieces that fits on the sleeve 642 will work, it is not limited to being a shaft collar 647 for all embodiments that use shaft collars. For example, a press-fit ring would have the same effect, a ring that attaches with a side portion would work the same, a ring with a set screw that comes in on the side 647b on an angle (not shown) would work, and a ring with a side piece that tightens with a double-flange-like piece (not shown) that tightens with a screw or bolt would also work.

In this system 641b, the shaft collar is locked onto the developer roller sleeve 642 a different way, not using a setscrew on the outer cylindrical surface 647a because a flat spring 655 makes contact with that outer surface 647a. The flat spring 655 has a bottom end 656, a bend 658 and a contact portion 657.

FIG. 90 shows a similar contact system 641c using a flat spring 659 which touches the side 647b of the shaft collar 647. The flat spring 659 has a left end 660, a main body portion 663 a bend 662 and a contact portion 661 and the contact portion 661 touches the side 647b of the shaft collar 647 as it rotates.

FIG. 91 shows another contact system 641d using a spring loaded contactor portion 664 that contacts the outer cylindrical surface 647a of the collar 647. The contactor portion 664 has a coil spring 665, a base 669, a left guide 667, a right guide 668 and a receiving portion 666 that may also be used to hold a modular insert or may hold a graphite insert wired to a printer contact piece or somehow wired to connect to the image forming system. The bottom portion may include an insert (not shown) that wears and is modularly replaceable, similar to graphite insert points used in an electric motor technology. Then the graphite insert would wear and be replaced on a scheduled interval or when it gets worn. The coil-spring 665 attaches to a nub 664a on the contactor portion 664.

FIG. 92 shows another contact system 641e similar to the contact system 641d but only where the contactor 670 touches the side 647b of the collar 647. This device 641e involves the use of a contactor 670 with a coil spring portion 671 and a contacting portion 672. Just like the previous embodiment, the contacting portion 672 may either be made of or use a modular removable contacting piece 672 or modular piece that sacrificially wears so that the rest is preserved. Then the sacrificial piece that wears can be modularly replaced at either scheduled intervals or when it wears, again similar to graphite points of an electric motor and may also be optionally made of graphite.

FIG. 93 shows another contact system 641f using a shaft collar 647 or similar device on a developer roller sleeve 642. This device 641f is similar to the device 641c but instead of having a bend 662, this device has a flat spring 673 pressed against the side 647b of the collar 647 which may generate a slight curvature. The flat spring 673 has a bottom 674, a top 675 in the contact region and a main body portion 676.

FIG. 94 shows another contact system 641g using a shaft collar 647 or similar device. This uses a flat spring 677 is similar to the flat spring 655 only this flat spring 677 does not have a bend 658. The flat spring 677 touches the outer circumferential surface 647a of the collar 647 and has a bottom 679, a top contacting portion 680 and a main body portion 678 that may have a slight curvature from flexing against the collar 647.

FIG. 95 shows a prior art developer roller 740 which has a print region portion 748 which is treated and shown as a lot of dots, a nonprint portion 742 which is not treated for imaging and shown without dots, an end portion 743, a bore 744 and an end ridge 746. There are a pair of magnetic seals 745 that are positioned at a precise distance shown as g from the developer roller sleeve 740. These magnetic seals seal the ends of the developer roller to prevent leaks. The developer roller 740 uses a pair of insulative spacers 741 that set the space or distance between the developer roller 740 and the photoreceptor drum although in FIG. 2 it appears that the photoreceptor 504 and developer roller 505 touch, in fact they do not. They are set apart by a precise space by using insulative spacers 741 or insulative bushings 9 shown in FIG. 3a. The earlier prior art is shown in FIG. 3 using plastic insulator bushings 9 that insulate between the photoreceptor 504 and the developer roller 2. However, the more recent prior art uses a pair of spacers 741 in place of the bushings 9 to achieve the same effect. The prior art spacers 741 are made of a plastic insulative material to avoid contact. The space between the drum and developer roller sleeve 740 is the thickness 747 of the spacer 741 and it is this thickness 747 that is a critical dimension which controls the space between the developer roller 740 and the drum. As the prior art plastic insulative bushings 9 wear, this critical spacing changes which adversely affects the print quality, the same as when the plastic spacers 741 wear which decreases the thickness 747 below acceptable tolerance which also adversely affects print quality. Also, the plastic bushings 9 made of all plastic and the spacers 741 are very thin in range from 0.001" to 0.030" and are very flexible.

Now and the following embodiment is an important part of the invention. FIG. 96 shows an improvement of the spacer 741 shown as 751. The improved spacer 751 is made of metal with a plastic insulative coating. The metal layer 752 is a layer between the two portions 757 and 750 that are insulated on the outer surfaces. The metal layer 752 is exposed in the middle to receive a contact. Thus, a contact wire 754 or other form of electrical contact maybe used to make contact with the developer roller 742 at the metal exposed portion 752 to provide a strong bias voltage to the improved spacer 751 which may then provide the improved strength electrical connection to the developer roller 740. The contact wire 754 has a bottom portion 755 which can be connected directly or indirectly to a printer and a top portion 753. The spacer 751 has multiple side edges where contact and engagement may alternately be made by a wire, spring or other device. One example of such a side edge is shown as reference numeral 756. With this new and improved spacer 751, you may make improved contact with less length of the developer roller required and less moving parts while reinforcing the plastic spacer 751 with a metal layer 752 underneath for a greater strength and more rigid spacer 752. This spacer has an advantage to an OEM who does not wish the toner cartridge to be remanufactured of causing the developer roller 740 to contact the photoreceptor 504 which means that the owner of a patent of this device may use the patent to either prevent anyone from causing intentional premature cartridge failure. It may be used to cause intentional premature cartridge failure or otherwise make remanufacturing very difficult and more costly to do. Although FIG. 96 shows the spacer 751 using a wire 754 to make electrical contact, it is not limited to a wire. The idea is that the spacer may both act as an insulator device between the developer roller 740 and the photoreceptor 504 and also act as the bias voltage supply device for the developer roller 740 while also optionally reinforcing the device with the metal layer. This has an additional benefit that the developer roller 740 does not have to be as long which may shorten the relative length of the toner cartridge with respect with the paper size. Thus, the toner cartridge is more efficient. With a strong bias contact device 751, as with all the electrical bias voltage embodiments showing the toner low sensor bar functions better, toner efficiency goes up, the toner darkness is increased, there is less waste toner in the waste toner hopper, half tones print more clearly, graphics prints better, higher resolution may be reached, manufacturing costs may be decreased, the shipping weight and cost of the toner cartridge may be decreased, with a shorter potential toner cartridge the printer may be made smaller for a more compact desktop, the dots per inch print resolution may be increased, and the spacing between the developer roller 740, the cost is decreased of the toner cartridge and the photoreceptor 504 may be more accurately controlled for a longer time period. It is a major enhancement to the image forming system 500 and toner cartridge 501.

In the embodiment of FIG. 96 showing the spacer-insulator-contactor 751, the metal layer which directly touches the outer surface of the developer roller 740, may be made of any metal including steel, stainless steel, hardened steel, soft steel, any alloy steel, any metal whatsoever, silver coated, gold coated, beryllium bronze, phosphor bronze, any bronze, any brass. It can even be made of conductive plastic. The metal may be replace with graphite, a sacrificial layer that gradually wears by makes excellent electrical contact. The insulative layer may be made of any plastic, any rubber, any ceramic, any mica mineral or any mixture thereof of these materials. Mica is one of the most highly insulative materials but also one of the most lubricative materials. So, a combination of a metal such as graphite, steel or bronze on the inner layer with an insulative layer of mica, rubber or plastic would be excellent, although the invention is not limited to that. Thus, a metal ring may be coated with insulative mica, a highly insulative material with dry lubricating properties, for excellent results but this is not the only material but an excellent material choice. Note that inventor Michlin has U.S. Pat. Nos. 5,308,515, 5,468,400 and 5,437,955 that use a mica mineral lubricant. So, the spacer-insulator-conactor 751 has many added benefits over prior art. It should be also pointed out that the conductive exposed portion 752 may be wider than just the wire 754 as any electrical contacting device may replace the wire with no limit and many examples have been shown in this patent application using wires, spring wires, coil springs with or without inserts, flat springs and other devices.

FIG. 97 shows a prior art endfelt 760 from inventor Michlin's U.S. Pat. No. 5,296,902 where, in simplified form, there is a resilient or foam layer 763 and a crush-resistant layer 762 and a surface 761 which rubs against the developer roller 505 in FIG. 2, which has a different endfelt 534 from the side view. An endfelt 324 is shown from an isometric view in a toner hopper 305 in FIG. 43, just to get an idea what the endfelt 760 is and where it goes. The crush resistant layer 762 can be anything from bronze to crush-resistant velvet, or other materials. The resilient layer 763 can be anything from foam, elastomeric material to any material with a resilient property. Inventor Michlin has more endfelts shown his U.S. Pat. No. 5,648,838, in that patent's FIGS. 8 and 9. This instant patent's FIG. 98 shows one of those prior art endfelts 764 with a resilient layer 765, a velvet layer 767, and a metal layer 768. The purpose of the metal layer 762 and 768 is so that the endfelts 760 and 764 can act as a bias voltage electrical contact and an endfelt at the same time. In the '902 patent, the crush resistant layer 762 was depicted optionally as a crush-resistant velvet material. The metal layer 768 has a top surface 766.

FIG. 99 shows an improvement over inventor Michlin's prior art endfelts already described. FIG. 99 shows an endfelt 770 with a resilient material layer 772, and a crush-resistant layer 773 with a top surface 771 that uses a new material for the crush-resistant layer 773. This new crush-resistant layer 773 may be composed of a plastic layer that has been flocked. Flocked means that the plastic layer has been coated with a flocking material that is glued on to the plastic. Flocking material resembles velvet but costs significantly less and has some added properties. In the '902 patent, a crush-resistant velvet was used with a sewn pattern along the edges. The sewn pattern along the edges was because real velvet is a woven material. A woven material when cut will have strands along the edges of the cut. So, for this reason, the sewn edges were helpful. However, with the real velvet, it was not possible to "die-cut" a complete shape of an endfelt 760 or you would get loose threads stranding from the woven material. However, with a flocked material (glued) on a plastic backing 773 may replace the velvet 762 with multiple advantages over the velvet 762. The first advantage is that the flocked material on a plastic film backing 773 is not a woven material. The second advantage is that the flocked material on a plastic film backing 773 may be die-cut to final shape without creating strands along the longitudinal edges and thus a clean cut may be made, and thus a better product may be made with greater versatility in shape and size and not require straight edges as some endfelts are shaped like an "L" and previously could not be made easily using actual velvet. But using the flocked material on a plastic film backing 773 for the layer 773, the shape desired may be directly and simply die-cut. It should be pointed out that inventor Michlin's company has been manufacturing such endfelts for over five years using real velvet at great expense. After all these years, inventor Michlin found that flocked material is superior to real velvet. Inventor Michlin all these years was limited in width of endfelt because of the sewn edges on the velvet. Now, other widths and shapes may be made easily by simple die-cut using flocked material. The process involves first laminating the flocked plastic onto foam tape. Then directly die-cut this to shape. Alternately, the flock may be flocked directly onto the foam tape. Then, just straight die-cutting is done.

Flocking is not a narrow method of simulating velvet. The most popular method of manufacturing a flocked material is electrostatics which makes each blade of pile material uniform in every way, length, height, equal spacing, parallel and more. However, conductive materials may also be flocked, so this opens doors for using the device as both an endfelt and an electrical bias voltage contact at the same time. Flocking may also be done using a mechanical method, not electrostatic. In one mechanical method, film material is vibrated on the underside while there is glue on the upside and as flock material is fed to the upside, the vibrations drive the flock fiber material into the glue in the film. There is a mechanical method called the windblown method that involves using an airstream to deliver fibers to an adhesive coated surface. The windblown method is well suited for surfaces that are not flat and is just mentioned as a sample method of flocking as many more methods exist as well. Flocking is largely used in automotive industry as well as many other industries. In a typical flocking operation, the following materials may be used including cotton, RAYON, acrylic, NYLON and polyester, as a few examples. Other fibers may be flocked such as TEFLON, CARBON and KEVLAR through special application procedures. Many other materials may also be flocked and used in flocking. One way of achieving crushed velvet effects is to use rayon flock by wet crushing the fabric through calendar rolls, usually against the direction of the pile. Another system is to treat the fabric to a hot embossing and brushing operations. The plastic film that is flocked may also be made to simulate the crushed velvet effect with a similar treatment and by doing this, the material most resembles crush-resistant velvet and may be diecut to shape for easy mass production of endfelt material. Flocking has another benefit over velvet because flocked materials may be made with friction or lack of friction in mind and can be made with sealing properties in mind as well. Flocking allows you to put a textile surface on non-textile surfaces and products. With flocking a desired surface effect may be achieved. In Europe, flocking onto metal surfaces is widely done, however, it is not limited to Europe.

FIG. 100 shows an endfelt 775 with a resilient layer 776, and a film layer 777 that holds the flock layer 778 with a top surface 779. This does not show the glue holding it together. The glue could be conductive and the flock layer 778 could be made of conductive carbon fibers or other conductive fibers. Thus, an endfelt 775 can also act as a bias voltage contact 775, and thus may be designed for efficiency. This can apply to any endseal whether a flexible one as described or even on a magnetic seal, all which may be flocked. Thus, the conductive carbon can first be antistatically conductive so toner will not stick to it as well, but also, it can be conductive to act as a bias voltage contact. It would have to be electrically connected to the power source. Note that use of conductive carbon fibers as flock material is only one example of a conductive flock material and that use of other conductive fiber materials would have the same effect. Also, note that fibers maybe treated or coated to be made conductive or antistatic. Also note that fibers may be treated or coated to be made slightly magnetic which also improves it further. It could be made conductive and slightly magnetic at the same time. Conductive would have the advantage of toner not sticking, but magnetic flock would have the advantage in an endseal the same as a magnetic seal, it would seal the toner from leaking through. Note, that this would have most of the same benefits as using the spacer as a bias voltage contact such as economizing the length of the developer roller and this decreasing the required length of the toner hopper, toner cartridge and printer. The advantage of flocking is that it maybe done to create the desired effect. However, the endfelts 770 and 775 are shown in flat form. If they were alternately manufactured to fit the contour of the toner hopper 305 as shown in FIG. 43, the flocking may be done to a curved surface. Thus, flocking is a versatile method and device for endfelts, magnetic, rigid and flexible. Also, FIG. 99 may be defined a second way. In the second way, the endfelt 770 could be made of a resilient layer of foam 772 or other resilient material 772 and the flock layer 773 can be done right over the foam layer 772 without the need for a plastic film layer as before. Thus the flock process is very versatile, easy and inexpensive to have done.

Figure 101:
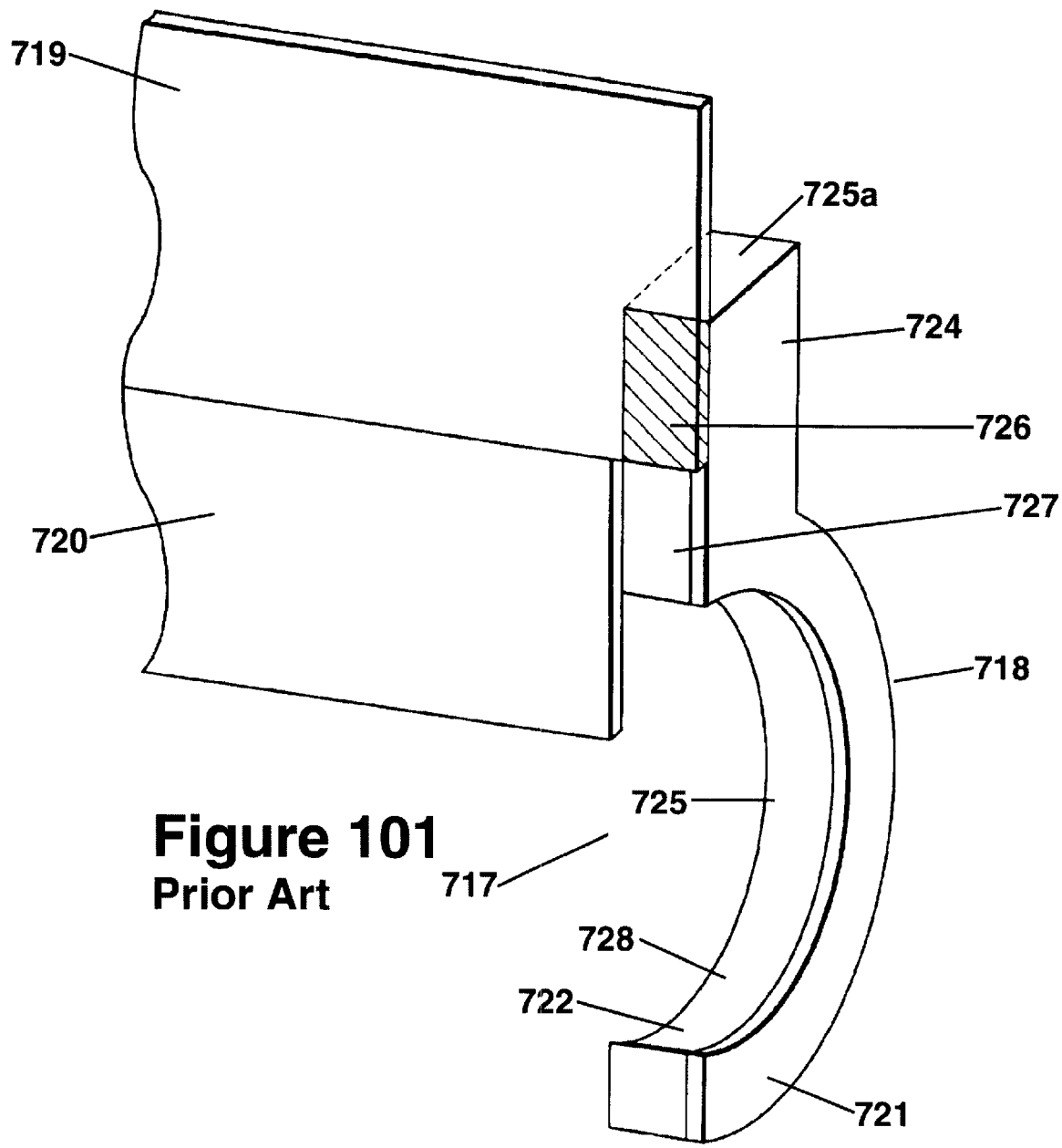
FIG. 101 shows an isometric view of a prior art magnetic endseal with a portion of a spreader blade.

FIG. 101 shows a prior art magnetic seal 717 or magnetic seal 717 that does the same function as an endfelt does. In the figure is a magnetic seal 717, a metal reinforcement structure 718 with a bottom portion 721, and a top portion 724, a magnet portion 725 with a bottom portion 722, a top portion 727, and a top surface 725a. Also in the figure is a cutout portion of a drum cleaning blade 720 with its frame 719. The magnetic seal 717 and cleaning blade are joined, bonded, glued or otherwise attached at reference numeral 726. The inner portion 728 is curved.

FIG. 102 shows another magnetic seal 790 showing the magnet portion 791 and a soft portion 792. The soft portion may consist of either flocking 792 directly on the magnetic seal 790 or flocking on a foam material 792 or just a foam material 792 or a foam material with a crushed velvet material 792 or a foam material with any pile material 792. If a flocked material is used, it may be made conductive as described or made magnetic using the correct fibers. Flocked fibers treated with or containing iron, nickel or compounds of iron or nickel or other magnetic or magnetic transferring material can be used. There are many different ways to do this.

Figure 105:
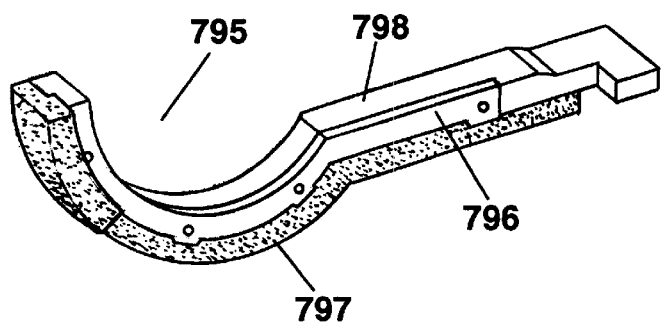
FIG. 105 shows an isometric view of a magnetic endseal with a material outside that may touch the toner hopper to form a better seal.
Figure 106:
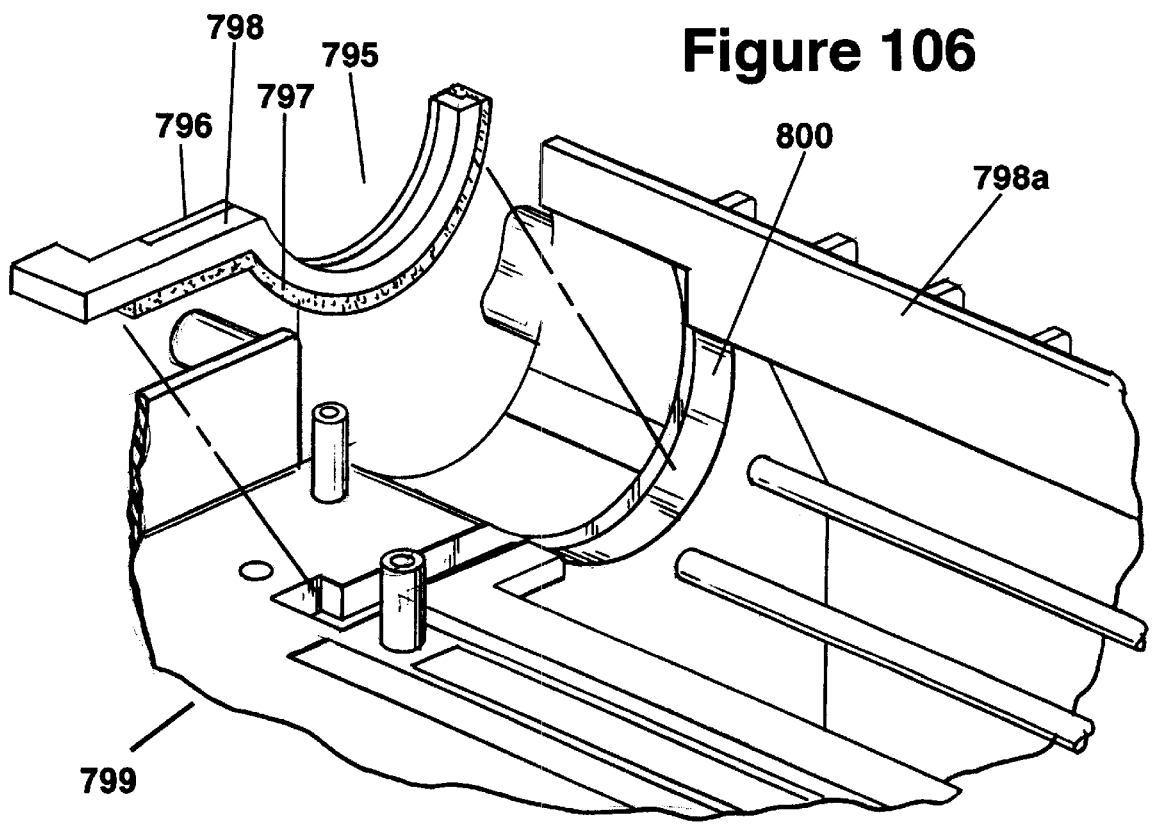
FIG. 106 shows an isometric view of a magnetic endseal with a material outside that may touch the toner hopper to form a better seal and also shows how the magnetic seal modularly snaps into the toner hopper.

FIGS. 103–105 show a magnetic seal 795 with a structural portion 796 and a magnet portion 798 with a soft portion 797. The soft portion 797 may consist of just flocking placed directly onto the magnet, or flocking on foam that is on the magnet, just foam on the magnet, or flocking on a film that is adhered to the magnet. FIG. 106 shows the magnetic seal 795 and how it literally snaps into a toner hopper 799 into the seal groove 800.

One could actually make an injection mold of the magnetic seal assembly 795. It could be made of plastic or conductive plastic and would snap in place nicely at reference position 800 in FIG. 106, just like the magnetic seal assembly 795. It could then be flocked on the inside. It would snap in place nicely. By letting the flock do the sealing, although you may still use magnetism, the flock on plastic would seal the toner adequately. The toner hopper assembly has an inside 798a.

FIGS. 107–110 show a prior art scraper device 810 which is used to scrape toner from the developer roller so that toner does not exit the toner chamber under the endseal 770 or magnetic endseal 795. The scraper device 810 has a hole 814, a scraper 811 thinner than the main portion of the scraping device 810 with a scraping edge 812, and 2 pegs 815 and 816. The scraper 811 joins the main portion of the reference numeral 813. The scraper device 810 fits onto a toner hopper 817 using the pegs 815 and 816 to lock into holes 818 and 819 in the spreader blade frame 821 on the toner hopper 817. The hole 814 lines up with hole 820 in the spreader blade frame 821 in the toner hopper 817 where a screw holds the scraper device 810 to the toner hopper. Note the metal guide 822 of the spreader blade frame 812 that will be used in later embodiments to guide the position of other scraper devices to be shown further on so as not to require the two pegs 815 and 816 which require an injection molding process to manufacture with extra costs in making the mold. With the device shown later, a die-cutting process may instead be used in manufacture but it will be less costly even if injection molded.

Figure 111:
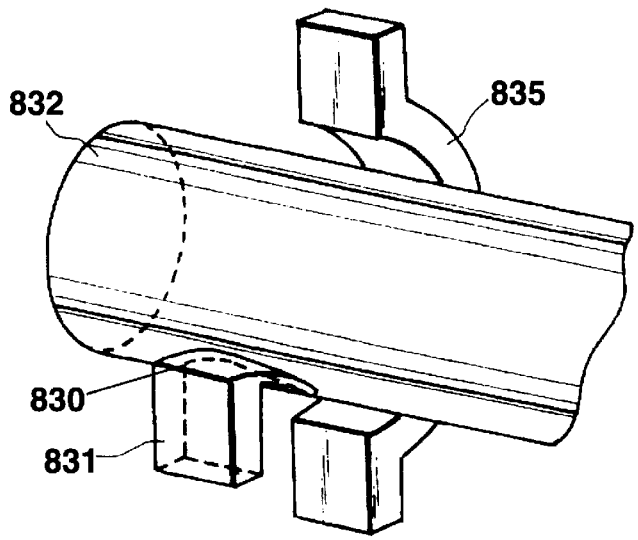
FIG. 111 shows an isometric view of a prior art scraper device used to help keep a developer roller clean in the vicinity of a magnetic endseal.
Figure 112:
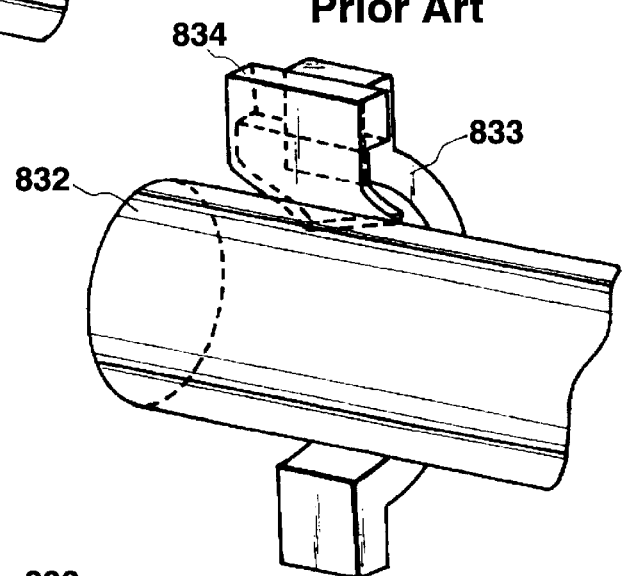
FIG. 112 shows an isometric view of a prior art scraper device used to help keep a developer roller clean in the vicinity of a magnetic endseal.
Figure 113:
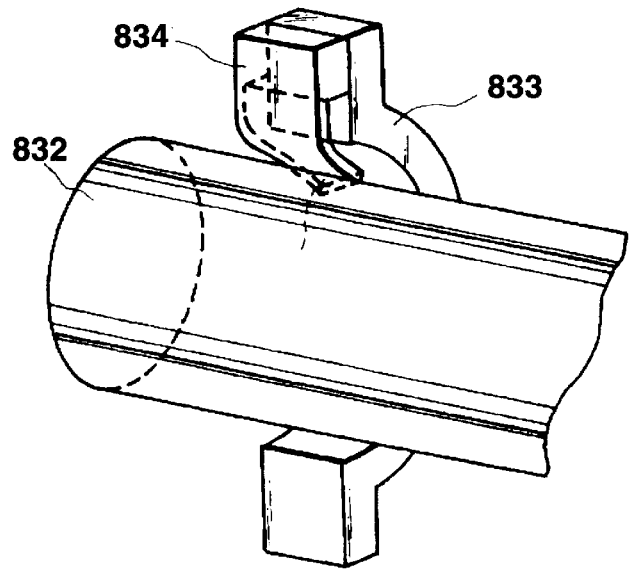
FIG. 113 shows an isometric view of a prior art scraper device used to help keep a developer roller clean in the vicinity of a magnetic endseal.

FIG. 111 show the prior art scraper device 830 in position with a developer roller 832 and a magnetic endseal 835. FIGS. 112–113 show the scraper device 834 in position with a developer roller 832 in different locations.

Figure 114:
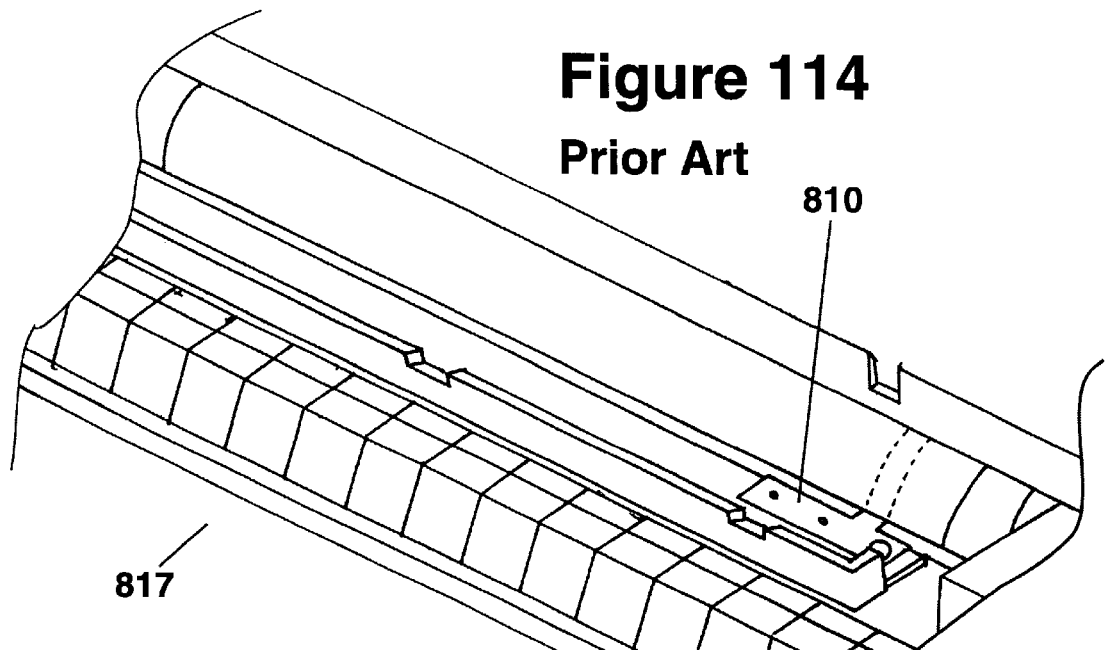
FIG. 114 shows an isometric view of a prior art scraper device used to help keep a developer roller clean in the vicinity of the endseals showing the position of the scraper assembly in a toner hopper.
Figure 115:
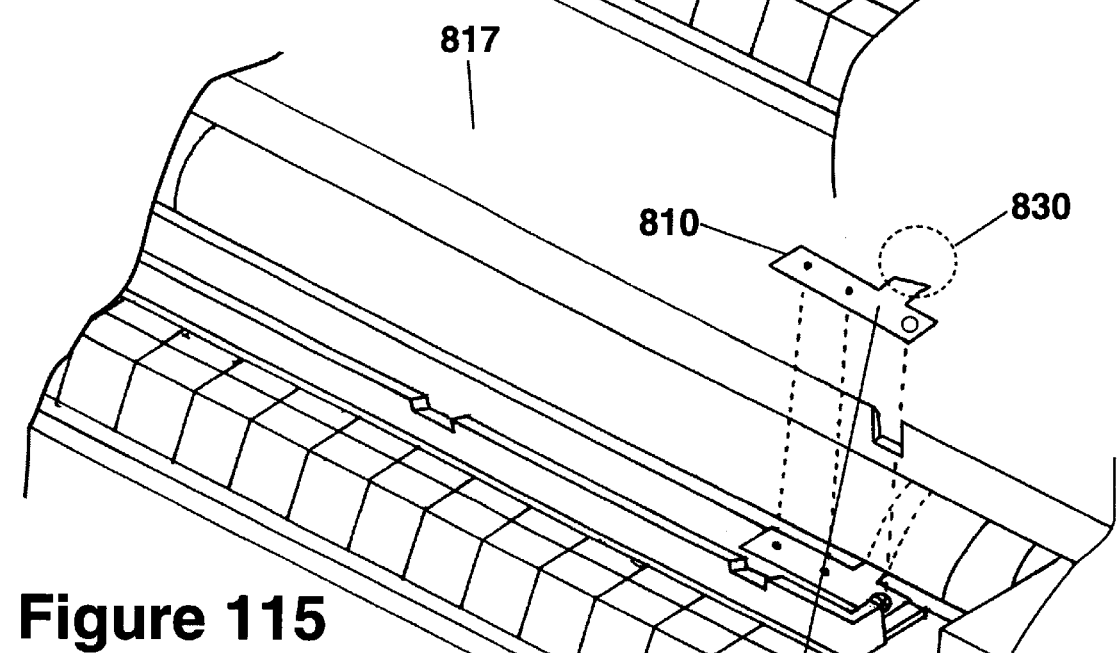
Figure 116:
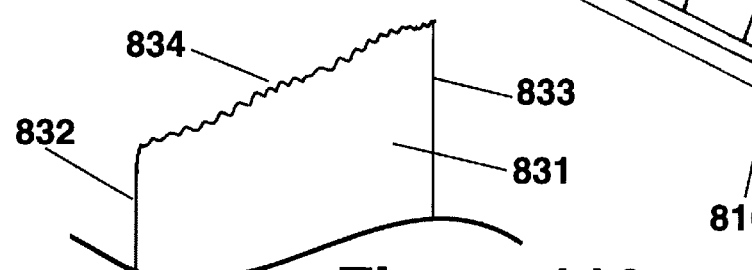

FIGS. 114–115 shows the prior art scraper device 810 installed in a toner hopper 817. FIG. 115 also shows the scraper device 810 outside the toner hopper 817 with a circle around a region that is exploded 830 in FIG. 116. The scraper 831 has a left edge 832, a right edge 833 and a scraping edge 834. But the point here that led to the embodiment is the jagged edge 834 that is supposed to be the scraping edge. Clearly, the OEM manufacturer did not choose a material that is suitable as a scraper 810 for long use as the cutting edge 834 gets jagged and becomes unsuitable for scraping. They have literally made many millions of toner cartridges without noticing this defect. Thus, inventors had made the next embodiment of the invention, a cutting edge overlay 840 as seen in FIGS. 117–119. The overlay 840 has a cutting edge 843 and two layers, a structural layer 841 and an adhesive or glue layer 842. Note that the position of the overlay 840 is such that the overlay's cutting edge 843 overlaps the cutting edge 834 of the scraper device 810 by about 1/32" at position 844. Note the release liner layer 845 of the overlay 840 is there to protect the adhesive until the overlay device 840 is installed. The materials of the overlay 840 have no limit. For example, the glue layer 842 or adhesive layer 842 or glue layer 842 may be made of any tape, glue, adhesive whatsoever. It is best to use a strong material for attachment as the forces against the scraper overlay 840 are continuous and relatively high. The upper layer 841 of the overlay 840 may be made of any rigid plastic, for example. It has been found that one material that works well is LEXAN, a polycarbonate plastic material which has strong material properties. It is advantageous to have some graphite, conductive carbon, or other material in the plastic make a conductive or antistatic plastic to prevent toner from sticking to it. Most plastic car bumpers here in Detroit are made of this plastic which has good mechanical properties all around. The plastic used in the OEM original scraper device 810 is inferior as described in FIG. 115 showing the jagged edge 834 created after use. The polycarbonate materials have much greater durability and spring properties than the materials of the OEM original equipment manufacturer which wear an pit too soon. This feature describes the utility of this invention as literally many millions of toner cartridges with such inferior scrapers have been sold worldwide with the problems described in FIG. 116. It has been found in tests that polycarbonate of 0.010" works well and has excellent spring properties, rigidity and resilience. That finding does not mean that a scraper insert layer 841 can not be made of thinner or thicker material, for example polycarbonate 0.004" to 0.030" thick. The limited life of the original scraper 810 led to this invention as an improvement had to be made. However, inventors can go further with this invention. Now and this is an important feature of the overlay upper layer 841. Not only may LEXAN or polycarbonate or other strong plastic be used for the upper layer 841 of the scraper insert 840 or overlay 840, but the plastic may be made conductive to avoid toner sticking. However, if it was made conductive, the scraper insert could also be used as a bias voltage contact 841 for the toner hopper. Furthermore, if the insert 840 had a layer 841 that was conductive, the material could be made of thin metal of any metal element or alloy. One good choice would be bronze or other copper alloy because copper is a relatively soft metal. Phosphorus bronze such as CDA 510 or other bronzes specified later or beryllium bronze could be used, although the phos-bronze is much less expensive. Just because these metals are recommended does not mean that other metals that conduct can not be used. The trade off is the wear of the aluminum sleeve 832 that the scraper rubs against. This sleeve 832 wear should be minimized and picking a metal for the scraper layer 841 should be done carefully to minimize aluminum dust that could be generated in the process. There is no limit on metal type for using the scraper layer 841 as a bias voltage contact simultaneous to scraping, since there are may kinds of metals and many types of metals that fit the criteria mentioned. Inventor does not want to limit the invention to the recommended criteria as there may be a reason that some manufacturers might not mind the dust generated or might even desire the dust generated. It would have to be electrically connected to the power source. Note that conductive plastic would also work. Note, that this would have most of the same benefits as using the spacer as a bias voltage contact such as economizing the length of the developer roller and this decreasing the required length of the toner hopper, toner cartridge and printer. Alternately, a conductive scraper, if not used as a bias voltage contact would prevent toner from sticking to the scraper device. It is appropriate to mention here that mentioned were the ideas of making a scraper conductive by using an all metal scraper and also by using a conductive plastic as a scraper. A plastic scraper may be made conductive in other ways. Among the other ways include but are not limited to coating the scraper material with a conductive material, flocking the scraper material with conductive flock, or using a metallized plastic as the scraper material. For example, and it is not limited to these examples, metallized plastic may be made by using a laminate of thin foil-like aluminum. Such a material may be purchased off the shelf from the insulation industry. It dulls die blades to die cut with aluminum, but the product can do wonders. Also, aluminum or other may be coated on plastic in a deposition process, an electrolysis process, a coating process and so on. Even a conductive ink may be coated onto plastic and conductive inks may be made in a number of ways and are common in the check printing industry for making MICR encoded checks. Using some of these techniques and/or coatings. One thing nice about using a material of equal or less hardness than aluminum is that it minimizes wear of the aluminum sleeve. Pressure of the scraper also must be properly controlled to minimize wear of the aluminum sleeve. However, an aluminized plastic scraper is not harder than the aluminum sleeve. If made with the correct pressure, without excessive pressure, it may be used as a scraper and bias voltage contact for supplying bias voltage to the developer roller. This is not the only plastic-metal combination that will work for this function.

By having the dual function of both scraping and providing the bias voltage, the scraper has a greater utility and it could decrease the size of a toner hopper required and so on as mentioned in other embodiments using a spacer on a sleeve as a bias voltage contact which would take up a lot of space to rewrite, so it will be referenced here instead of rewriting. All the materials mentioned for the scraper module 840 described above apply to any other overlay and scraper embodiments described further on so as to minimize writing the same thing over and over.

FIGS. 120–122 show a different overlay 846 which is like the overlay 840 but it also has 2 holes 847 where screws are used to screw in the overlay 846 so it will not come loose from the pressure of exertion of the overlay 846 against the developer roller 832. Note how the cutting edge region 851 of the overlay 840 overlaps the scraper portion 811 by about 1/32". Note the release liner layer 850 of the overlay 846 is there to protect the adhesive layer 849 until the overlay 846 is installed. The structural layer 848 is the top layer.

FIGS. 123–125 shows a new scraper device 860 with a base portion 861 that has a hole 863 and an overlay portion 862 with a structural layer 864, an adhesive layer 865 and a release liner layer 866. The base 861 is made of a pressure sensitive plastic or cardboard, thin metal, or any other material. The purpose of the hole 863 is to affix the device 860 to the toner hopper with a screw. One importance of the new improved scraper device 860 is that it does not require alignment pegs 815 and 816 (FIG. 108) and thus costs less to manufacture. The alignment pegs 815 and 816 are gone but it still uses a hole 863 to firmly affix in place. The edge 822 of the spreader blade frame 821 is to be used in alignment along the back edge 867 of the base 861. This greatly simplifies the alignment process and also decreases the costs as an injection molding process is no longer required in the manufacture. That is not to say that the device could not be injection molded as it could be manufactured that way with benefits over the prior art. If it was injection molded, the tape layer 865 and release liner layers would not be required as it would then be all one piece. It could be made pressure sensitive to hold in place and not use the screw and hole. The main layer is labeled as 872. Peterson numeral 879 refers to the scraping edge.

FIGS. 126–128 is a similar device 870 that is held in place with 2 holes 874 and 875 that have the dual function of holding the scraper device 871 to the scraper assembly base 876 which matches up with holes 877 and 878 in the base 876. Thus, there would be holes in the wiper blade frame to position the device 870 and position the scraper module 871 and optionally, the edge 822 of the spreader blade frame 821 could be also used in alignment. Screws (not shown) would hold things in position with the holes 874, 875, 877, 878. Because of this, although the device has a glue or tape layer 873 and a release liner layer 880, these layers, although shown, are not absolutely necessary.

FIGS. 129–131 show a scraper assembly 890 similar to the assembly 870. The main difference between the two versions of the embodiment appears that the scraper assembly 870 uses two holes 874 and 875 while the scraper assembly 890 uses only one hole 895 and is thus simple to make. But also the device 890 has a base 891 that is pressure sensitive with structural layer 897, glue, adhesive or tape layer 898 and release liner layer 899. With the pressure sensitive design, the holes 895 and 896 which are designed to hold the device onto the spreader blade frame 821 using screws (not shown), are not always necessary. The scraper subassembly 894 has a structural layer 892, a tape, adhesive or glue layer 893 and a protective release liner that protects the adhesive layer 898 prior to installation of the scraper subassembly 894 onto the base 891. There is a scraping region 900. Again, the device 890 could alternately be manufactured without tape layer 893 and without release liner layer 901 if it was made by injection molding or by chemically bonding the structural layer 897 of the scraper subassembly 894 to the base 891 or using ultrasonic welding. Again this device is installed by using the angle iron guide 822 of the spreader blade frame 821 for accurate positioning and screwing the device 890 through the holes 895 and 896 finalize the position if it is manufactured accurately combining the positioning where it is guided with the angle iron guide 822 of the spreader blade frame 821. FIG. 132 shows a breakdown of how it is placed after it is installed.

FIG. 133 shows another prior art scraper assembly 910 with holes 913–915. Holes 913 and 915 are for alignment with alignment pegs 921 and 922 (FIG. 135). Hole 914 is in lower level region 914a. The assembly 910 has a scraper 911 that, after use, gets a jagged edge 912 which looks like the edge 834 in FIG. 116, as already described, so it must be improved.

FIG. 134 shows one improvement in the scraper assembly 910 where a scraper module 916 or overlay 916 is placed over the assembly 910 and is either pressure sensitive or is bonded to the assembly 910. The scraper module 916 is specifically placed over the old scraper portion 911 or worn scraper portion 911 to reinforce it and to use a scraping edge 919 that is more durable than the OEM scraping edge 912. This scraper module device 916 may optionally have a handle 917 for easier install where there is a kiss-cut in the liner so that when the liner is removed to install the scraper module 916, some of the liner 918 remains on the handle portion 928 for easier install. After install, the handle portion 928 can be torn off of the scraper assembly 916 if desired.

FIG. 135 shows another such scraper assembly 910 where a screw 927 is screwed into the scraper subassembly 923 and scraper assembly 910 to hold it down better and prevent the scraper subassembly 923 from lifting up during use. This scraper subassembly 923 also has a handle 924 with a kiss-cut in the release liner 925 so that the installer will not get his hand sticky during the install process. Just like the previous version, the handle may be torn off after install. Notice again how the scraper portion 926 sticks out about 1/32" or so longer than the original edge 912 of the original scraper 911 for better functioning. Also notice that the holes 913 and 915 line up with alignment pegs 921 and 922 that are affixed to the spreader blade FIG. 136 shows the scraper assembly 910 with a scraper module 916 or overlay 916 or scraper subassembly 916. The scraper portion 916b of the module 916 has a scraping edge 917 that is positioned about 1/32" further out than the edge of the original scraper's 911 scraping edge (not visible). Now and this is an important and novel device and method. In FIG. 136 it is also shown with a foam support 916a that helps support the scraper portion 916b of the scraper module. With the foam support 916a, the scraper portion 916b is more rigid and is more firmly in place. This novel idea may be applied to other of the embodiments of the patent even though it is just mentioned here both in the aftermarket and in brand new cartridges. Also, please note that the foam 916a is pressing against the old scraper 911, but this limitation is just in this figure. The foam may press against any scraper shown with or without the use of a scraper module added to the device. This is a very novel approach to making scrapers last longer as they lose resilience over time. The other important approach in scrapers is to use a material that will withstand the scraping forces upon it and whereby the scraping edge will not pit, chip, wear or otherwise deteriorate.

FIGS. 136a to 136c show a scraperholder 970 or scraperclamp 970 that is used to hold down the scraper module 916 or scraper overlay 916 as shown in FIG. 136b. FIG. 136a shows the side view of the scraperclamp 970 while FIG. 136c shows the top view of the scraperclamp 970. The scraperclamp 970 has a top portion 971 and a bottom portion 972. The top portion 971 actually holds down the scraper module 916 and has an angle cut at edge 975 and a bend 973b. The bottom portion 972 has an end 974, a bore 976 and a bend 973a. FIG. 136c shows bends 973a and 973b from the top view as bend 973 although they are not required to be at 90 degree bends as shown. In FIG. 136b one can see the bend 973 in the scraperholder 970. One can also see in the figure below the scraperholder's angled edge 975 the scraper portion 916b of the scraper module 916. Clearly, it can be seen that the bottom portion 972 of the scraperholder 970 is held in the opening 914a by a screw 914b. Also, this figure shows at the bottom the developer roller 832 showing the black toner on the coated area 832a, the shiny region 832b where the scraper module 916 has scraped and the portion that is not scraped 832c. When combined, area 832b and 832c are the nonprint region of the developer roller 832 while region 832a is the print region. The pegs 921 and 922 can be seen as used in alignment of the scraper assembly 910. Also, the spreader blade 821a is seen on its metal frame 821. Please note how the spreader blade 821a is tucked under the developer roller 832 and is therefore not completely visible. Note that the developer roller 832 has been removed for this FIG. 136e and it thus shows the spreader blade 821a flexing upward where it is normally pressed against the developer roller 832 with a slight pressure. Also, note how the scraper area 916b is totally visible and you can even see the scraping edge 919 in FIG. 136e compared to FIG. 136b where the scraper edge 919 is not visible as it is scraping against the developer roller 832.

FIGS. 136d and 136e involve a scraperholder clip 980 or scraperclip 980 that has the same general function as the scraperclamp 970 only has a different geometry. The scraperclip 980 has a base 985 and two legs 981 and each leg has an end 982 and a bend 983. Opposite the base 985 is the base inside 984. Shown is a crater 914c generated in the assembly 910. The scraperclip 980 has one leg 981 that fits under the scraper assembly 910 and the other leg 981 fits over the scraper module 916 in such a way as to fit at least relatively tightly for the purpose of preventing the scraper module 916 from either lifting up or falling out. The scraper module 916 is preferably pressure sensitive, but not necessarily required if it is clamped in well. The scraperclip 980, like the scraperholder 970 is preferably made of metal but may also be made of plastic. A spring material is preferable. To install the scraperclip 980, slightly spread the legs 981 without causing an inelastic deformation. Then it will tightly fit over the assembly 910 and the scraper module 916. Note that the scraperclip 980 and the scraperholder 970 may be used to hold any form of scraper module shown or not shown, it may be used for a scraper overlay or for a new scraper device. It is not limited in this or any other way. Other forms of the scraperclip 980 and the scraperholder 970 may be manufactured and developed, but this is the pioneer version and as long as a clip or clamp hold on the scraper module 916, that is all that matters.

It should also be pointed out that a device may be made, looking at FIG. 136b that is a combination of scraper clamp 970 and scraper module 916. One simple way would be to include what is shown as the entire scraper clamp 970 and the scraper portion 916b that can be manufactured as one piece as shown in FIG. 136f as 970c. This device 970c, the all-in-one-scraper device 970c is a scraper module and a scraper clamp 970 all in one piece. It has a double bend 973c, just like the bends 973a and 973b of the scraperholder 970, a bottom portion 972c with a hole 976c and an end 974c, and a top portion 971c with a change in direction area 975c with a scraper portion 990 having a left side 991, a right side 992 and a scraping edge 993. The self clamping scraper 970c and the scraperholder 970 may be made in many shapes and sizes to fit the particular geometric configuration of the system, particularly the scraper assembly 910. Some scraper assemblies may have a deeper valley 914a and require a longer or shorter portion between bends 973a and 973b. Others different distances from the screw-hole 914 to the optimal position for the scraper, the position already described. Other geometries may have no valley 914a at all and thus will not require the bends 973a and 973b. Various bends, multiple bends and angular shapes and sizes may be required to fit the environment that these devices will be placed. It is assumed that the reader of this patent application keeps this in mind and application goes beyond the few examples shown. It would be too cumbersome on the reader of this patent application already lengthy to become more lengthy to describe every possible system, geometry and environment. For this reason, inventors want it known that this pioneer patent covers all possibilities beyond the limit of what is described here.

FIG. 136g shows a top view of another scraperclamp 995. This scraperclamp 995 has a hole 996, a bottom 997a, a left side 997b, a right side 997c and a top 997d. This scraperclamp 995 is simpler than the other scraperclamps and scraperclips as it does not require a bend in manufacturing. It simply involves a rectangle 995 with a hole 996. When the screw tightens through the hole 996, the scraperclamp 995 tightens any scraper module insert whether it goes over a worn scraper portion or whether it holds down an original first time user scraper module. This version 995 saves on costs in manufacturing with its simplicity of manufacture and simplicity of use. Of course, it is beneficial if the scraper module being held down has tape, adhesive or glue holding it to the device and optionally another layer of taper, adhesive or glue to hold it to the scraperclamp 995.

FIGS. 137–138 show another modular scraper device 932 used on a new scraper assembly 930. The scraper assembly 930 has a front side 931, a back side 942 that abuts against the guide bend 939 in the spreader blade frame 938 and lays against the crevice 939a in the guide 939. The scraper module 932 has a bend 940 and a perpendicular side 933 that is optional and can be either torn off at 941a or adhered to the guide 939 of the spreader blade frame 938. There is a peg 937 that is a remnant from the spreader blade frame 938. Since the guide 939 and the screw 936 guide the assembly 930 for accurate positioning, the peg 937 is redundant and not required. Alternately, the peg 937 could be broken off than the peg 937's hole shown is not required. However, there are multiple options. FIG. 138 shows where the side 933 of the module 932 is being torn off at 941 and 941a. The scraping edge 935 scrapes away the excess toner located on the scrap end 934 of the module 932. Inventors want to note that if a scraperholder 970 or the all-in-one-scraper device 970c was made for this environment, the bends 973a and 973b would not be required.

FIG. 139 shows a 960, a spreader blade assembly 958 with scraper assembly 950 that is not ideal for adhering pressure-sensitive material because the surface area to attach to is minimized. Nonetheless, a pressure sensitive scraper module 954 is shown that may be adhered with glue, tape, adhesive or be chemically or ultrasonically bonded to the assembly 950. The scraper module 954 has a non-scraping edge 952 and a scraping area 955 and a scraping edge 956. The assembly 950 is attached to a spreader blade frame 958 and requires the use of pegs to line up in holes 961 and 962, a locking screw 959 anchors the entire assembly to the frame of the spreader blade 958. The screw 959 goes through holes 951 and 953. This is an example where it would be advantageous to use a module such as scraper assembly 930 of FIGS. 137 and 138 to replace the original assembly 950. The spreader blade frame has a bent surface 957 and a bend-line 957a. Note that various embodiments of electrical contacts and contact systems have been shown to provide a bias voltage to a developer roller. Many of them have the benefits of not requiring as long of a toner hopper and therefore a shorter toner cartridge and therefore a shorter image forming system 500. Please also note that a combination of more than one of the bias electrical contacts for developer rollers may be combined and used at the same time, although each embodiment may also be used by itself. Also please note that a scraper device may also be made of plastic that is made conductive, for example, using conductive carbon, graphite or other material. Inventors want to note that if a scraperholder 970 or the all-in-one-scraper device 970c was made for this environment, the bends 973a and 973b would not be required and it could be made conductive or all metal as described above.

Please note that inventor Michlin has a U.S. Pat. No. 5,367,364 which was a pioneer patent on electrical contacts for PCRs. There will be some embodiments on electrical contact devices and methods to improve electrical contact to the PCR 1001 or primary charge roller 1001, as inventor Michiln coined this term PCR 1001 years ago in the trade journals which became an accepted term in the industry.

FIG. 140 shows a conventional primary charge roller (PCR) and PCR 1001 mount 1002. The mount 1002 fits into a toner cartridge assembly 501 for use in copiers, printers and facsimile machines, although in some machines, the PCR mount may fit directly in the machine rather than in a toner cartridge. The mount 1002 includes modular saddles 1003 for receiving the endposts 1004 at each end of the PCR 1001. The endposts 1004 of the PCR are often the actual end of a metal shaft 1005 that runs through the center of the PCR for the roller's entire length and beyond. The charge portion 1006 of the PCR is mounted on the metal shaft 1005.

The PCR 1001 is held in the mount 1002 by the saddles 1003. The saddles fit into a saddle holder of the mount 1002 which is cut out in FIG. 140 in order to see the interrelationship between the saddle 1003 and the PCR 1001. The mount 1002 is located in the toner cartridge assembly. The saddles 1003 are better shown in FIG. 141. The saddles 1003 include a plastic piece 1007 with a half-circular reception portion 1008 and a nub or protuberance 1009. The coil-spring 1010 fits over the nub 1009 and over an additional hub 1011 on each end of the mount 1002. A support (not shown) steadies each saddle 1003 in the mount 1002. The half-circular reception portions 1008 receive the endposts 1004 of the PCR 1001.

There is a clearance space 1012 between the PCR mount 1002 and each endpost 1004 of the PCR so the PCR may rotate freely. One of the saddles 1003 is connected to a conductive material, often a flat copper plate or contact 1013, by the coil-spring 1010. The plate 1013 is connected to a source of electricity by a conductive length of material 1014 extending through a PCR assembly arm 1015 on the mount 1002. The coil-spring 1010 conducts electricity from the plate 1013 to the plastic conductive saddle piece 1007 and then to the PCR endpost 1004. The conductive saddle piece 1007 on one side of the mount 1002, contacts the metal plate 1013 and assembly arm 1015 with a metal spring 1010, and is made of an electrically conductive plastic. The saddle 1003 on the opposite side of the mount 1002 and PCR 1001 is usually made of an insulative plastic material.

One problem is that the conductive plastic saddle 1003 at the side of the mount 1002 connected to the electrical source through the assembly arm 1015 does not function electrically as well as would be desired. The conductive plastic of the saddle 1003 on its own has some unwanted electrical resistance and does not provide a good enough electrical connection with the PCR 1001 for perfect erasure of the previous image, because it does not allow the PCR to charge the photoreceptor drum as well as it should. The previous image on the photoreceptor is erased by saturating over the previous image on the photoreceptor with electrostatic charge, thus overwriting the image with "white space" or erasing the image in a typical image forming system made in the year 2000. When the previous image is not completely erased or "whited out" with electrostatic charge, a "ghost" of the previous image remains on the photoreceptor which can show up on the output page one or more drum rotations later.

Some embodiments involving PCRs 1001 of this application is designed to overcome the above problems. A prior art spring-contact device 1016 is shown in FIG. 142 from the Michlin '364 patent. The device consists of a long portion 1017. The long portion 1017 has an end 1018 narrower in width than the long portion. The long portion 1017 is tapered to the end 1018 as shown. A short portion 1019 is bent such that it extends at approximately a right angle from the long portion 1017. The short portion 1019 has a hole 1020 punched or drilled or otherwise formed through it. The spring-contact device 1016 is made from a thin, flat piece of carbide, copper, or gold or platinum plated copper, so it is a good conductor of electricity. Gold, platinum, copper, brass, bronze, stainless steel, chrome plated metal, and spring-steel may all be used. A copper alloy with spring properties seems to be the most practical material to use from an economical and production point of view. The alloy is called CDA 510 bronze with a spring temper. The alloy is approximately 95 percent copper and five percent tin and is sometimes known as a phosphorous bronze because it contains traces of phosphorous to improve the material properties. A similar, readily available material is CDA 521 bronze with a spring temper. For even better properties, a beryllium copper alloy such as CDA 172 with a spring temper, often used in telecommunications applications, may be used, but, costs approximately five times as much as the CDA 510 material. For this reason, the increase in material cost using a beryllium alloy does not benefit the product proportional to the increased cost, so the CDA 510 was chosen. In original tests of the prior art device, a four thousandths of an inch stainless steel alloy was used with great success. In the tests, a thin stainless steel alloy was removed from the paper handling section of a CX printer. It was cut to the appropriate shape, and worked great. Later, another similar device was modified using a beryllium alloy spring copper, also from a paper handling section of a CX printer. The beryllium alloy was found to work optimally. This alloy is often used in components where spring tension and electrical properties are important. Then a phosphorous bronze of 95 percent copper and five percent tin was used called CDA 510 with a spring temper. Initial tests were done with material of twenty thousandths of an inch thick. This was a difficult material because of its spring properties, and in particular, its spring force was too great. Then CDA 510 at ten thousandths of an inch was used. A single-clip design was developed and functioned properly. Conductive grease had to be used to prevent an irritating squeaky sound from being generated. The single-clip design worked fine. It was slightly too tight, however, and this design did not prevent wear on the plastic end 1021 of the mount 1002. So, a two-clipped design was then made, once again. For the two clipped design the ten thousandths of an inch of CDA 510 had too much frictional resistance between the clip and the shaft, sometimes preventing the PCR 1001 from rotating because the spring force was too great. In order to use the two-clip design, it was found that the clip had to be made thinner. At four thousandths of an inch, just like the metal component of the old CX printer, the spring-force is reduced and the PCR 1001 is allowed to freely rotate with less frictional resistance. In all the tests, four thousandths of an inch beryllium copper performed the best, however, for economical reasons, CDA 510 with spring temper at four thousandths of an inch thick worked almost as well and was chosen for manufacturing. CDA 510 is a good material choice.

Modifications of the prior art spring-contact device 1016 have be made. For example, as illustrated in FIG. 144, a dimple 1022 may be stamped in the long portion 1017 where it touches the PCR endpost. On the nonconductive end this would be desirable to minimize contact. Although maximum contact is desired on the electrical contact end in surface area, punching a dimple in the long portion 1017 would minimize friction caused by the device. A smaller contact area between the long portion 1017 of the spring-contact device 1016 and the PCR endpost 1004 generates less friction. The long portion 1017 would not interfere as much with the rotation of the PCR 1001, but the spring-contact device 1016 would still perform its function. In differing operating environments, there can be benefits to each style. For example, when the space is too tight, placing a dimple in the long portion where it contacts the endpost 1004 could inadvertently increase the friction and hamper the operation of the PCR, unless a bend-away would be made. Also, a dimple may be made in the form of a bend-line 1023, as shown in the FIG. 145 side view of the spring contact device 1016, rather than a "spot". Please also note that the long portion 1017 does not have to be tapered as in FIG. 142. It is more economical to manufacture the device with square ends, without cutting the corners. This is how the product will initially be made to lower costs. Other variations may be made to this device that would give it the same effect without preventing it from functioning. Various bends, dimples, and other modifications in the shape of the spring clip 1016 may be made, to get similar results, however, at a greater cost.

On the electrical connection side of the PCR 1001 and mount 1002, the short portion 1019 of the prior art spring-contact device 1016 fits over the nub 1011 on the mount 1002 by use of the hole 1020 in the short portion 1019. There is surface-to-surface contact between the short portion 1019 of the spring-contact device 1016 and the conductive plate 1013, as shown in FIG. 143. One end of the coil-spring 1010 is then fit over the nub 1011 as before, so the short portion 1019 of the spring-contact device 1016 is sandwiched between the end of the coil-spring 1010 and the conductive plate 1013. The long portion 1017 of the spring-contact device 1016 extends up past the saddle 1003, outward of the saddle, and contacts the endpost 1004 of the PCR. It should be pointed out that the way this spring-contact device 1016 fits over the nub 1011 and is locked in place with the coil spring 1010. With this feature, it can be easily fit into place and may be used in PCR mounts 1002 that need the spring-contact device 1016 in recycled laser toner cartridges that have poor electrical connection.

To be precise, it is not that the previous image is not removed or erased. The PCR 1001 charges the photoreceptor drum. When the photoreceptor drum does not receive a full charge, part of the residual image leftover from the previous image is not saturated with electrostatic charge. So, in actuality, the erasure is not performed, but the photoreceptor drum receives a new charge over that image, and if not fully saturated, there are cases where the residual previous image remains. So, to the layman, erasure appears not to be performed. The image is removed by saturating over the residual previous image, with a full strength electrostatic charge. In other words, the uncharged areas that make up the residual image are intended to be recharged. When electrical contact is poor, as in this early design, the PCR is not always capable of providing a full electrostatic charge to the photoreceptor drum. By using the prior art spring-contact device 1016 or other devices to be shown the connection is improved so the erasure and charging capabilities are significantly improved and even perfected.

Certain prior art toner cartridge assemblies cause gray background, blasting and ghosting problems on the output paper. When the prior art spring-contact device 1016 is used, these problems, particularly the ghosting problem, are minimized and oftentimes prevented. A spring-contact device 1016 is used on each side of the PCR 1001, preventing wobbling and shifting of the PCR 1001. The spring-contact device 1016 on the contact side of the mount 1002 also increases the quality of the electrical connection and decreases the electrical resistance. These features in combination provide a better output image and reduce wear of the components. Inventor Michlin has had success with contact 1017 from '364 patent. However, the design of aftermarket saddles 1003 have changed in geometry in such a way as to make it difficult to install a contact device 1017. For example, FIG. 148 shows a newer prior art saddle 1056a that contains stops 1057 and 1058 that block the contact 1017 from making contact with the end of the endpost 1004 of the PCR 1001. Thus, an alternate device had to be developed. Also, in the meantime, new prior art had been released which will be shown.

FIGS. 146–147 show another prior art PCR contact 1042. This contact also acts as the coil spring that controls the pressure of the PCR saddle 1052 and therefore the pressure of the PCR 1053 on the photoreceptor 1054. The contact device 1042 has a coil spring portion 1044, an arm 1047, a hand 1048, a bend 1046 and a bottom 1045. The PCR saddle 1052 supports the shaft 1051 in which the PCR 1053 rotates. The contact device 1042 locks in a nub 1049 in the waste toner hopper and at the other end of the contact device 1042 in a nub 1050 that is a part of the saddle 1052. The saddle has snaps into a snap 1055 of the waste toner hopper.

FIGS. 148–149 show a prior art saddle system 1056. This system has three components, the spring contact 1063, the saddle 1056a and the carbide contact insert 1056b. The saddle 1056a has two guide ridges 1059, two carbide contact rod guides 1060, support 1062, two curved spring loaded receiving portions 1061, a nub 1065, a left stop 1057 and a right stop 1058. The carbide contact insert 1056b has two guide rods 1067 that fit in the two rod guides 1060, a spring locking area 1069 and two spring lockstops 1070. The spring 1063 locks onto the nub 1065 of the saddle 1056a and locks with spring portion 1064 between the lockstops 1070 on the carbide contact insert 1056b and the two lockstops 1070 prevent the locking portion 1064 of the spring 1063 from slipping out and since the insert 1056b is a contact, conductive and made of graphite or carbon, the locking portion 1064 of the spring contact 1063 makes an electrical connection to the graphite or carbon insert 1056b. The spring 1063 may have a path shown by reference numeral 1066, for example. This prior art device 1056 has a major problem that is solved in this invention. First, the carbide guide rods 1067 rub on the shaft 1051 of the PCR 1053 to make electrical contact to the PCR 1053. The graphite insert contact 1056b is a sacrificial device, i.e., it wears away until it no longer functions. When it stops functioning, the PCR 1053 is no longer supplied with electricity it needs and the imaging device 500 then fails. It is like a ticking time bomb waiting to go off. The question is not IF but WHEN will it go off? Further on it will be shown how inventors have developed a solution to the problem where the insert contact 1056b is not only fixed when it wears, but completely bypassed in its circuit so it becomes an unnecessary component. Inventors do not know whether or not the purpose of the insert contact 1056b was to intentionally fail after a certain amount of use to prevent remanufacturing of toner cartridges so they will sell more brand new toner cartridges or whether the insert contact 1056b fails as a result of an engineering error on the part of the original manufacturer. In any case, it fails and inventors have fixed it.

FIG. 150 shows this prior-art, short-lived failing contact system 1056 from a broader scope with the PCR 1075 in the diagram. The PCR 1075 has a shaft 1074 and inner layers 1076 and 1077. The saddle 1056a and the contact insert 1056b are shown with the spring contact 1063 that holds them together described also in the previous two figures. Clearly, the graphite rods 1071 of the insert 1056b wear out in time causing an eventual definite failure, as contact and engagement is made between the PCR shaft 1074 and the rods 1071. When the rods 1071 deteriorate from frictional wear, there is no engagement and thus, no contact. Also shown is the saddle 1072 and nonconductive spring 1073 that do not conduct electricity as the electricity is all handled on one side of the PCR 1075, reasonably so to avoid duplication of systems.

FIG. 151 shows a cutaway of another Prior art short lived electrical contact system 1083 for supplying electricity to the PCR 1086. The PCR 1086 has a shaft 1085 and layers 1087 and 1088. The saddle 1078 has a different self-destructing graphite insert 1079 that also rubs along the shaft 1085 of the PCR 1086 causing the insert to gradually deteriorate until it no longer functions. Note that portion reference as 1080 gradually wears until no engagement and no contact is made. The spring has a larger diameter portion 1089 and a smaller diameter portion 1090. Some embodiments of this invention will make this device also function and make the deteriorating insert 1079 obsolete. The insert 1079 has two rubbing contact portions 1080 that rub against the PCR shaft and it is these components 1080 that wear away. The insert 1079 has a nub 1081 with a smaller portion 1082 to make it easier to install the spring 1084. With this device, the worn insert 1079 in some cases would have to be left attached to the saddle 1078 for the device that will be shown to work. FIGS. 152–153 show a photoreceptor 1091 and PCR 1092. As the photoreceptor 1091 rotates, it causes the PCR 1092 to rotate, simply by the frictional force of outer surface 1093, as the outer surface of a PCR 1092 is an elastomeric or rubber derivative material. The PCR 1092 has a shaft 1095 and the photoreceptor 1091 has an outer surface 1091, and this photoreceptor, unlike some of the others has a shaft 1094. This shaft 1094 rides in a bearing 1097. These components fit in the waste toner hopper assembly 1100 which has an outer wall 1098. The photoreceptor has a gear 1096. It should be noted that the system in FIG. 153 the shaft 1095 of the PCR 1092 fits snugly in a lengthwise direction in the saddle 1099 as it can be seen that the end of the shaft 1095 touches the stop 1099a.

FIGS. 154–155 show what happens when you try to use a PCR 1092 from a different type of toner cartridge into an unmatching mate. It just doesn't fit. It is like putting a round peg in a square hole. It can be seen that the shaft 1095a does not touch the stop 1099a, causing a problem that the PCR 1092 will shift around in a longitudinal direction along the saddle 1099 which can cause problems in the print quality. This longitudinal wobbling problem is solved as shown in FIGS. 156–157. A spacer 1095c fits into the saddle 1099 alongside the PCR shaft 1095b and thus prevents the longitudinal shift in the PCR 1092. Now a PCR 1095 designed for one type of waste toner hopper 1100 maybe used in one of another style, if the PCR 1095 is too short as shown in FIG. 157. This can save a lot of money for remanufacturers because they can now interchange PCR's 1092. Making stops 1095c can be very easy to do. They must be manufactured in such a way that the stops 1095c do not fall out of the saddle 1099 during transportation.

The first cure to the problem of poor electrical connection for PCR assemblies that do not have good contacts or for those that do not have contacts at all is shown in FIGS. 158, 159, 162 and 163. The device 1101 will even function when there are stops 1057 or 1058 on the saddle 1056a (FIG. 148) that would obstruct the contact 1017. The device 1101 has two legs 1104, two legs 1105, a bottom swirl 1102 and a bottom flat 1103. It can be seen in FIG. 158 how the legs 1104 of the device 1104 rub against the shaft 1112 of the PCR 1111 in a waste toner hopper 1110. The PCR shaft 1112 rests in the saddle 1114 which is secured by the saddle holder 1162. It can be seen if you look carefully that the bottom swirl portion 1102 is locked down by the spring 1113 that presses against the saddle 1114 as shown if FIGS. 162 and 163.

FIGS. 160, 161, 175 and 176 show another device used to supply a bias voltage to a PCR. This device, when released will be called the UNICORN PCR CONNETION 1120, but in this application, it will be called the unicorn contact 1120 because it is a spring 1122 with a straight portion 1121 that resembles a unicorn. When the PCR 1111 is installed by placing the PCR shaft 1112 into the saddle 1114, the spike 1121 of the unicorn contact 1120 flexes to the side after which the spike 1121 retains a continuous pressure against the PCR shaft 1112 and thereby maintaining contact between the PCR 1111, the unicorn contact 1120 and the bottom plate 1137b. The unicorn contact 1120 has a straight portion that rubs against the side of the PCR shaft 1112 to make an electrical connection to provide the bias voltage to a PCR 1111. The unicorn contact 1120 has a bottom coil 1123 on the spring portion 1122 and the top coil 1124 and a bent portion 1125. The straight portion 1121 has a top portion 1126 and a bottom portion 1127. By changing the dimensions of the unicorn contact 1120, it may be used for multiple styles of toner cartridges. The PCR assembly 1115 houses the PCR saddles 1114, although the saddles are sometimes are housed on the waste toner hopper.

Another embodiment, shown in FIG. 164 is the round hairpin contact 1130. This contact 1130 has two legs 1131 with a top leg region 1132, a bottom leg region 1133, a neck portion 1135 and a base portion 1134. FIG. 165 shows the round hairpin contact 1130 installed in a PCR assembly 1137a with two missing ingredients to show how it fits. The two missing ingredients are the spring that locks down the base 1134 of the contact 1130 and the saddle that holds the shaft 1112 of the PCR 1111. In FIG. 165, the PCR is suspended in animation because without the saddle, the PCR would not be supported and would fall. FIG. 166, on the other hand, shows the system in real life with a saddle 1114 supporting the PCR shaft 1112 and a coil spring 1137 supporting the saddle 1114. The bottom 1136 of the coil spring 1137 presses on the base 1134 of the contact 1130 to both lock the contact 1130 in place and to make electrical connection between the contact 1130 and the bottom plate 1137b. The top 1139 of the coil spring 1137 attaches to a nub (not shown) on the saddle 1114. The legs 1131 of t the contact 1130 rub against the shaft 1112 of the PCR 1111 and this pressure is what makes electrical contact between the contact 1130 and the shaft 1112 to supply electricity to the PCR 1111. The contact 1130 can be press-fit over the nub 1136 to fit tightly. One problem that this contact has in some circumstances is that the spring 1137 does not always lock down properly on the base 1134 of the contact 1130. It will work much of the time but it depends on the diameter of the coil spring 1137 and if the diameter of the base is much smaller that the spring 1137 diameter, the contact spring 1130 does not lock down in every system, But when the spring is the correct size (large enough) it will always work.

FIGS. 167 to 174 show the diamond hairpin contact 1150. This contact 1150 was designed so that the coil spring 1137 can lock it down. It was found that by slightly changing the shape of the base 1134 of the contact 1130, there was a greater chance that the spring would lock it down and this involved making the base 1134 in the shape of a diamond 1155. FIG. 172 shows the contact 1150 by itself. The contact 1150 has legs 1151 with a top 1153 of leg 1151 and a bottom 1152 of leg 1151, a longer leg 1158, a neck 1154, and a base 1155 with an opening 1157, a bend 1156 and a flat portion 1155. There are two ways to install this contact 1150. In the first way, one first holds the longer leg 1158 in one's fingers and presses the base 1155 of the contact 1150 over the nub 1136. A press-fit tool can be used, a small cylinder with a bore just larger than the nub 1136 (FIG. 168). Then while still holding the device, grab the saddle 1114 with a needle nose pliers 1163 or other tool and line up the slot 1160 of the saddle 1114 with the slot 1161 of the saddle holder 1162 on the PCR assembly 1137a and slide the saddle 1114 in as in FIG. 169. The grooves 1160 and 1161 are tracks and can only go in one way, although there are other designs of other track configurations. Then keep pushing the saddle 1114 down until it snaps, locked in place. Other tools that may be used in place of a needle nose pliers 1163 include a locking tweasers, a medical grabber, a small vice grip pliers, or other tool used for grabbing.

FIG. 170 shows the installed saddle 1114, contact 1150 and spring 1137. After it is installed, the height of the legs 1151 can not exceed the height of the PCR, so cut the legs 1151 with a scissors 1164. If the legs 1151 are too high, the legs will touch the photoreceptor 1091 which would result in scratching the photoreceptor 1091 which would ruin the photoreceptor 1091. This is why the legs 1151 are cut for the universal style contact 1150 that may work in many style PCR/saddle assemblies because it will be too long in all cases and then cut shorter to size after installation.

FIGS. 171 to 174 show another way of installing the contact 1150. In this case the contact 1150 is installed from the nub 1171 of the saddle 1170. Then the coil spring 1137, when tightly in place will hold firmly the base 1155 of the contact 1150. Note in FIG. 173 how the neck 1154 of the contact 1150 has spread after installing the device on the nub 1171 of the saddle 1170. There may be some geometries where the neck 1154 does not spread, but the spreading indicates that the neck is tightly pressing on the nub 1171 under spring tension. This way of installing is novel and has never been done before in any way, the installation of a contact on the PCR's 1170 nub 1171. Note that the round hair-clip contact 1130 of FIG. 164 may also be installed as shown in FIG. 173. Also, both contacts 1130 and 1150 may be press-fit over the either the saddle-nub or the lower nub using a tool that is a thin cylinder with a bore that is just larger than the nub it is press-fit against. Similarly, the already described spring 1120 of FIG. 175 also has the flat portion 1121 of the spring 1120 that comes from the top, but in this case the spring 1120 and straight piece 1121 are all one piece.

FIGS. 177–181 show the next embodiment of a PCR contact 1180. The contact 1180 has an opening 1181 with an entrance 1182, two legs 1183, a bottom 1184 and a top 1185. The contact 1180 fits on the nub 1185 of a saddle 1114. Although it is not shown in the figures, a PCR shaft 1112 fits in the saddle 1114 and it can be seen from FIGS. 179–181 that when the PCR shaft 1112 fits into the mouth of the saddle 1114, it will press against the two legs 1183 with spring pressure and the legs 1183 of the contact 1180 will spread. Since the contact is made of a spring alloy, when the legs 1183 of the contact 1180 are spread, they 1183 will exert a pressure on the PCR shaft 1112 causing an electrical connection to be made. Also, when the contact 1180 is installed on the saddle 1114, the coil spring 1137 exerts a pressure on the legs 1183 of the contact 1180 also making an electrical connection. Thus, the contact 1180 makes an electrical connection from the coil spring 1137 to the PCR shaft 1112 through the contact 1180. This device works quite well, but to manufacture it requires a high tooling cost. Unless the quantities are very high, this is an expensive contact to manufacture also because there is a lot of flat metal waste, material that is trimmed away in the cutting process. Thus, this product is more expensive to make than the unicorn spring 1120 where there is very little waste.

FIGS. 182–212 involve some already described principles, devices and methods that have been shown for PCR contacts. Only this time, these contacts are used as contacts for developer roller systems instead of PCRs. Many of the same reference numerals will be reused but with the lower case "z" at the end. The reason the letter z is used instead of "a", is because the letter "a" is used many times and the only way to avoid it is to use a "z" which has not been used at all previously, so it will be easier to follow. In most cases the PCR shaft will be changed to cylindrical contact from a developer roller in these embodiments.

FIG. 182 shows a contact 1200 like that used as a PCR contact of this invention. However, this contact 1200 may also be used as a developer roller contact as well or for a contact in any industry. The contact 1200 has two legs 1201, and the legs have an end 1202, the device 1200 has a coil loop 1203, and arms 1204. FIGS. 183–185 shows a developer roller saddle 1230 in which the contact device 1241 of a developer roller 1240 rotates. While the developer roller 1240 rotates, the rotating contact device 1241 makes contact with the legs 1201 of the contact 1200. The coil spring 1209 locks the contact 1200 in place. Reference numeral 1220 represents either a toner hopper or an assembly that houses the developer roller. The saddle 1230 has an opening 1231 to receive the contact device 1241 of a developer roller 1240 as it rotates.

FIGS. 186–193 show a diamond hairpin contact that is the same as one of the PCR contacts, however, this contact 1300 is to be used to contact a bias voltage contact of a developer roller. The saddle 1330 has a groove 1331 to slide into the saddle holder 1332 which has a matching groove for sliding in place. A needle nose pliers 1350 or other holding device maybe useful in the installation process. FIG. 191 shows the contact 1300 with two legs 1303 that have a top portion 1301, a bottom portion 1302 and a grab portion 1305. The contact 1300 has a neck 1304, base 1306 with a bend 1307 and an opening 1308. In one version, the contact 1300 fits in the nub 1333 of a developer roller assembly 1360 while in another version, the contact 1300 fits in the nub 1341 of a developer roller saddle 1340. There is a spring 1370 of FIG. 192 that presses on the contact base 1306 to lock it in place while FIG. 188 shows the spring 1370 locking the contact into the nub 1333. FIG. 189 shows the contact 1300 in use providing contact to a developer roller 1240 contact 1241 while FIG. 193 shows the contact 1300 providing contact to a developer roller 1240 contact 1241 in a different way. A scissors 1351 or other cutting instrument may optionally be used to shorten the length of the contact 1300 in order to make a more universal contact 1300. However, it is best to precut the length of the legs. Note that in the contact made in FIG. 193, the diamond hairpin contact 1300 legs 1301 make contact with the contact 1241 of the developer roller 1240 at the small diameter portion of the contact 1241, however, may optionally make electrical contact with the large diameter portion of the mag roller contact 1241 (not shown in this figure). In FIG. 193, the saddle 1340 fits into a saddle holder 1342.

FIGS. 194–196 show another contact system to supply contact to a printer contact 1241 of a developer roller 1240. This involves use of an intermediary contact 1400, the round hairpin contact 1400, just like the contact shown earlier in this application for use in a PCR only now is used in a developer roller bias supply system. The contact 1400 has two legs 1401, a neck 1404 and a base 1405. The legs 1401 have a top 1403 and a bottom 1402. The legs 1401 make contact with the printer contact 1241 for a developer roller 1240. This contact like the others involve use of a coil spring 1370 as an intermediary and a contact plate 1410 that supplies contact to the base 1405 of the contact 1400.

FIGS. 197–200 show another contact 1500, the unicorn contact 1500 for use in contacting a developer roller 1240 contact 1241 as an intermediary. Like some of the others, this contact 1500 has also been described for use in this application for a PCR system. It works analogously here, only this is for use in a developer roller contact 1241 system. The contact 1500 has a coil 1501 with a top 1503 and a bottom 1502. The top coil 1504 joins the spike 1505. The contact 1500 also has a spike 1505 with a top 1507 and a bottom 1506. When the developer roller contact 1241 rides in the saddle 1340, the spike 1501 of the contact 1500 makes electrical with the rotating developer roller 1240 contact 1241.

FIGS. 201–205 show another contact 1600 for the developer roller 1240 contact 1241 that has also been shown also for use in a PCR saddle only here it is used in a developer roller saddle. FIG. 201 shows the contact 1600 with a center hole 1601, an entrance 1602, a top 1603 and two legs 1605. The contact 1600 attaches to a developer roller saddle 1340 and is pressed upon by the coil spring 1370 to make contact. When the developer roller contact 1241 rides in the saddle 1340, the legs 1605 of the contact 1600 rub against the developer roller contact 1241 to complete the contact between the coil spring 1370 and the small portion of the contact 1241 of the developer roller 1240.

FIG. 206 shows a prevalent problem in the assembly of toner cartridges where the drum axle shaft 1710 when it is placed in the bore 1701 get installed in a way that is not centered properly for good drum rotation. However, FIG. 207 shows the solution to the problem. By placing an o-ring 1711 on the shaft 1710 of the drum axle 1710, the drum axle essentially pops right into the hole 1701 with accurate alignment and is thereby properly installed. The shaft 1710 is part of a drum axle assembly (not shown) which attaches to the waste toner hopper 1700.

It should be pointed out that any embodiment or materials of any embodiments of this invention may be combined, grouped or utilized with any other embodiments. Any material of one embodiment may be used in any other embodiment of this patent application. Materials may be switched around between embodiments of this application.

Since minor changes and modifications varied to fit particular operating requirements and environments will be understood by those skilled in the art, the invention is not considered limited to the specific examples chosen for purposes of illustration. The invention includes all changes and modifications which do not constitute a departure from the true spirit and scope of this invention as claimed in the following claims and as represented by reasonable equivalents to the claimed elements. Any ideas or material shown in any embodiments may be incorporated into any other embodiments.

What is claimed is:

1. An electrical connection device
   for use in an image forming apparatus;
   whereby a developer roller is supplied a bias voltage through a chain of electrical components; and
   one electrical component in the chain is said electrical connection device; and
   wherein said electrical connection device also acts as a developer roller scraper device and said scraper device includes;
   a base portion that attaches to a metal frame of a spreader blade; and
   a scraping module that attaches to said base portion.

2. An electrical connection device
   for use in an image forming apparatus;
   whereby a developer roller is supplied a bias voltage through a chain of electrical components; and
   one electrical component in the chain is said electrical connection device; and
   wherein said electrical connection device also acts as a developer roller endseal; and
   whereby said endseal has a surface that includes a conductive and magnetic flock material that engages said developer roller and makes electrical contact with or near said developer roller.

3. An electrical connection device
   for use in an image forming apparatus;
   whereby a developer roller is supplied a bias voltage through a chain of electrical components; and
   one electrical component in the chain is said electrical connection device; and
   wherein said electrical connection device also acts as a developer roller magnetic seal; and
   whereby said magnetic seal includes a flocking material on at least one surface.

4. An electrical connection device for use in an image forming apparatus;
   whereby a developer roller is supplied a bias voltage through a chain of electrical components; and
   one electrical component in the chain is said electrical connection device; and
   wherein said electrical connection device also acts as a device for controlling the space between developer roller and photoreceptor.

5. An electrical connection device as
   for use in an image forming apparatus;
   whereby a developer roller is supplied a bias voltage through a chain of electrical components; and
   one electrical component in the chain is said electrical connection device; and
   wherein said electrical connection device is an electrobushing contact which acts as both a bearing and a contact; and
   whereby said electrobushing contact has a bore which receives a small diameter portion of a cylindrical member whereby a large diameter portion of the cylindrical member fits into the developer roller and makes contact with the developer roller.

6. An electrical connection device
   for use in an image forming apparatus;
   whereby a developer roller is supplied a bias voltage through a chain of electrical components; and
   one electrical component in the chain is said electrical connection device; and
   wherein said electrical connection device also acts as a device for positioning a developer roller drive gear so that the drive gear will stay in position on a small diameter portion of a cylindrical member contact device that has a larger diameter portion that fits into the developer roller and makes contact with the developer roller; and
   whereby said electrical connection device fits into a groove on the small diameter portion of the cylindrical member; and whereby a spring engages said electrical connection device and also makes electrical contact with said electrical connection device and the spring contacts a printer electrical contact.

7. An electrical connection device as in claim 6 wherein said electrical connection device has a c-shape or an e-shape.

8. A toner cartridge used in an image forming apparatus;
whereby said toner cartridge includes a toner hopper and an optional waste toner hopper;
whereby said waste toner hopper includes a photoreceptor, a cleaning blade, a charge roller and a container to receive waste toner; and
whereby said toner hopper includes a storage tank, a spreader blade and a developer roller; and
whereby said developer roller is supplied a bias voltage through a chain of electrical components; and
one electrical component in said chain is an electrical connection device; and
wherein said electrical connection device also acts as a developer roller scraper device and said scraper device includes;
a base portion that attaches to a metal frame of said spreader blade; and
a scraping module that attaches to said base portion.

9. A toner cartridge used in an image forming apparatus;
whereby said toner cartridge includes a toner hopper and an optional waste toner hopper; and
whereby said waste toner hopper includes a photoreceptor, a cleaning blade, a charge roller and a container to receive waste toner; and
whereby said toner hopper includes a storage tank and a developer roller, and
whereby said developer roller is supplied a bias voltage through a chain of electrical components; and
one electrical component in said chain is an electrical connection device
wherein said electrical connection device also acts as a developer roller endseal; and
whereby said endseal has a surface that includes a conductive and magnetic flock material that engages said developer roller and makes electrical contact with or near said developer roller.

10. A toner cartridge used in an image forming apparatus;
whereby said toner cartridge includes a toner hopper and an optional waste toner hopper; and
whereby said waste toner hopper includes a photoreceptor, a cleaning blade, a charge roller and a container to receive waste toner; and
whereby said toner hopper includes a storage tank and a developer roller; and
whereby said developer roller is supplied a bias voltage through a chain of electrical components; and
one electrical component in said chain is an electrical connection device; and
wherein said electrical connection device also acts as a developer roller magnetic seal; and
whereby said magnetic seal includes a flocking material on at least one surface.

11. A toner cartridge used in an image forming apparatus;
whereby said toner cartridge includes a toner hopper and an optional waste toner hopper, and
whereby said waste toner hopper includes a photoreceptor, a cleaning blade, a charge roller and a container to receive waste toner; and
whereby said toner hopper includes a storage tank and a developer roller; and
whereby said developer roller is supplied a bias voltage through a chain of electrical components; and
one electrical component in said chain is an electrical connection device; and
wherein said electrical connection device also acts as a device for controlling the space between said developer roller and said photoreceptor.

12. A toner cartridge used in an image forming apparatus;
whereby said toner cartridge includes a toner hopper and an optional waste toner hopper; and
whereby said toner cartridge includes a toner hopper and an optional waste toner hopper; and
whereby said waste toner hopper includes a photoreceptor, a cleaning blade, a charge roller and a container to receive waste toner; and
whereby said toner hopper includes a storage tank, a spreader blade and a developer roller; and
whereby said developer roller is supplied a bias voltage through a chain of electrical components; and
one electrical component in said chain is an electrical connection device; and
wherein said electrical connection device is an electrobushing contact which acts as both a bearing and a contact; and
whereby said electrobushing contact has a bore which receives a small diameter portion of a cylindrical member contact whereby a large diameter portion of said cylindrical member contact fits into said developer roller and makes contact with said developer roller.

13. A toner cartridge used in an image forming apparatus;
whereby said toner cartridge includes a toner hopper and an optional waste toner hopper; and
whereby said waste toner hopper includes a photoreceptor, a cleaning blade, a charge roller and a container to receive waste toner; and
whereby said toner hopper includes a storage tank and a developer roller; and
whereby said developer roller is supplied a bias voltage through a chain of electrical components; and
one electrical component in said chain is an electrical connection device; and
wherein said electrical connection device also acts as a device for positioning a developer roller drive gear so that said drive gear will stay in position on a small diameter portion of a cylindrical member contact device that has a larger diameter portion that fits into said developer roller and makes contact with said developer roller; and
whereby said electrical connection device fits into a groove on said small diameter portion of said cylindrical member; and
whereby a spring engages said electrical connection device and also makes electrical contact with said electrical connection device and said spring contacts a printer electrical contact.

14. A toner cartridge as in claim 13 wherein said electrical connection device has a c-shape or an e-shape.

15. An image forming apparatus;
whereby said image forming apparatus makes an image on media; and
whereby said image forming apparatus contains at least one toner storage container, a waste toner hopper, a photoreceptor, a cleaning blade, a fuser section, a photoreceptor charging device and a transfer section; and whereby said toner storage container has a storage tank and a developer roller; and whereby said developer roller is supplied a bias voltage through a chain of electrical components; and one electrical component in said chain is an electrical connection device and said scraper device includes;

a base portion that attaches to a metal frame of said spreader blade; and a scraping module that attaches to said base portion.

16. An image forming apparatus;

whereby said image forming apparatus makes an image on media; and whereby said image forming apparatus contains at least one toner storage container, a waste toner hopper, a photoreceptor, a cleaning blade, a fuser section, a photoreceptor charging device and a transfer section; and whereby said toner storage container has a storage tank and a developer roller, and whereby said developer roller is supplied a bias voltage through a chain of electrical components; and one electrical component in said chain is an electrical connection device; and wherein said electrical connection device also acts as a developer roller endseal; and whereby said endseal has a surface that includes a conductive and magnetic flock material that engages said developer roller and makes electrical contact with or near said developer roller.

17. An image forming apparatus;

whereby said image forming apparatus makes an image on media; and whereby said image forming apparatus contains at least one toner storage container, a waste toner hopper, a photoreceptor, a cleaning blade, a fuser section, a photoreceptor charging device and a transfer section; and whereby said toner storage container has a storage tank and a developer roller, and whereby said developer roller is supplied a bias voltage through a chain of electrical components; and one electrical component in said chain is an electrical connection device; and wherein said electrical connection device also acts as a developer roller magnetic seal; and whereby said magnetic seal includes a flocking material on at least one surface.

18. An image forming apparatus;

whereby said image forming apparatus makes an image on media; and whereby said image forming apparatus contains at least one toner storage container, a waste toner hopper, a photoreceptor, a cleaning blade, a fuser section, a photoreceptor charging device and a transfer section; and whereby said toner storage container has a storage tank and a rotating developer roller, and whereby said developer roller is supplied a bias voltage through a chain of electrical components; and one electrical component in said chain is an electrical connection device; and wherein said electrical connection device also acts as a device for controlling the space between developer roller and photoreceptor.

19. An image forming apparatus;

whereby said image forming apparatus makes an image on media; and whereby said image forming apparatus contains at least one toner storage container, a waste toner hopper, a photoreceptor, a cleaning blade, a fuser section, a photoreceptor charging device and a transfer section; and whereby said toner storage container has a storage tank and a developer roller, and whereby said developer roller is supplied a bias voltage through a chain of electrical components, and one electrical component in said chain is an electrical connection device; and wherein said electrical connection device is an electrobushing contact which acts as both a bearing and a contact; and whereby said electrobushing contact has a bore which receives a small diameter portion of a cylindrical member contact whereby a large diameter portion of said cylindrical member contact fits into said developer roller and makes contact with said developer roller.

20. An image forming apparatus:

whereby said image forming apparatus makes an image on media; and whereby said image forming apparatus contains at least one toner storage container, a waste toner hopper, a photoreceptor, a cleaning blade, a fuser section, a photoreceptor charging device and a transfer section; and whereby said toner storage container has a storage tank and a developer roller; and whereby said developer roller is supplied a bias voltage through a chain of electrical components; and one electrical component in said chain is an electrical connection device; and wherein said electrical connection device also acts as a device for positioning a developer roller drive gear so that said drive gear will stay in position on a small diameter portion of a cylindrical member contact device that has a larger diameter portion that fits into said developer roller and makes contact with said developer roller, and whereby said electrical connection device fits into a groove unsaid small diameter portion of said cylindrical member, and whereby a spring engages said electrical connection device and also makes electrical contact with said electrical connection device and said spring contacts a printer electrical contact.

21. An image forming apparatus as in claim 20 wherein said electrical connection device has a c-shape or an e-shape.

22. A method of providing a bias voltage to a developer roller whereby the developer roller is supplied a bias voltage through a chain of electrical components; and one electrical component in the chain is an electrical connection device; and wherein said method involves use of the electrical connection device which also acts as a developer roller scraper device and the scraper device includes;

a base portion that attaches to a metal frame of a spreader blade; and a scraping module that attaches to the base portion.

23. A method of providing a bias voltage to a developer roller whereby the developer roller is supplied a bias voltage through a chain of electrical components; and one electrical component in the chain is an electrical connection device; and wherein said method involves use of the electrical connection device which also acts as a developer roller endseal; and whereby the endseal has a surface that includes a conductive and magnetic flock material that engages the developer roller and makes electrical contact with or near the developer roller.

24. A method of providing a bias voltage to a developer roller whereby the developer roller is supplied a bias voltage through a chain of electrical components; and one electrical component in the chain is an electrical connection device; and wherein said method involves use of the electrical connection device which also acts as a developer roller magnetic seat; and whereby the magnetic seal includes a flocking material on at least one surface.

25. A method of providing a bias voltage to a developer roller whereby the developer roller is supplied a bias voltage through a chain of electrical components; and one electrical component in the chain is an electrical connection device; and wherein said method involves use of the electrical connection device which also acts as both a developer roller electrobushing contact and a bearing.

26. A method of providing a bias voltage to a developer roller;

whereby the developer roller is supplied a bias voltage through a chain of electrical components; and one electrical component in the chain is an electrical connection device; and wherein said method involves use of the electrical connection device which also acts as a device for controlling the space between developer roller and photoreceptor.

27. A method of providing a bias voltage to a developer roller whereby the developer roller is supplied a bias voltage through a chain of electrical components; and one electrical component in the chain is an electrical connection device; and wherein said method involves use of the electrical connection device which also acts as a device for positioning a developer roller drive gear so that the drive gear will stay in position on a small diameter portion of a cylindrical member contact device that has a larger diameter portion that fits into the developer roller and makes contact with the developer roller, and whereby the electrical connection device fits into a groove on the small diameter portion of the cylindrical member; and whereby a spring engages the electrical connection device and also makes electrical contact with the electrical connection device and the spring contacts a printer electrical contact.

28. A method of providing a bias voltage as in claim 27 wherein the electrical connection device has a c-shape or an e-shape.

29. An electrical connection device for use in an image forming apparatus;

whereby a developer roller is supplied a bias voltage through a chain of electrical components; and one electrical component in the chain is said electrical connection device; and wherein said electrical connection device also acts as a device for positioning a developer roller drive gear so that the drive gear will stay in position on a small diameter portion of a cylindrical member contact device that fits into the developer roller and makes contact with the developer roller; and whereby said electrical connection device fits into a groove on the small diameter portion of the cylindrical member; and whereby said electrical connection device includes a coil-spring which has a locking portion; and whereby said locking portion of said coil-spring has a bend portion that locks into the groove.

30. An electrical connection device for use in an image forming apparatus;

whereby a developer roller is supplied a bias voltage through a chain of electrical components; and one electrical component in the chain is said electrical connection device; and including a spacer device made of a conductive material that engages the developer roller; and whereby said spacer device includes at least some flock surface coating over at least a portion of said spacer device's surface to form an insulative portion over a portion of said spacer device.

31. An electrical connection device as in claim 30 wherein said spacer device includes at least a portion with a ring shape.

32. An electrical connection device as in claim 30 wherein said spacer device has a ring shape.

33. A toner cartridge used in an image forming apparatus;

whereby said toner cartridge includes a toner hopper and an optional waste toner hopper, and whereby said waste toner hopper includes a photoreceptor, a cleaning blade, a charge roller and a container to receive waste toner; and whereby said toner hopper includes a storage tank and a developer roller; and whereby said developer roller is supplied a bias voltage through a chain of electrical components, and one electrical component in said chain is an electrical connection device; and wherein said electrical connection device also acts as a device for positioning a developer roller drive gear so that said drive gear will stay in position on a small diameter portion of a cylindrical member contact device that fits into said developer roller and makes contact with said developer roller, and whereby said electrical connection device fits into a groove on said small diameter portion of said cylindrical member; and whereby said electrical connection device includes a coil-spring which has a locking portion; and whereby said locking portion of said coil-spring has a bend portion that locks into said groove.

34. A toner cartridge used in an image forming apparatus;

whereby said toner cartridge includes a toner hopper and an optional waste toner hopper; and whereby said waste toner hopper includes a photoreceptor, a cleaning blade, a charge roller and a container to receive waste toner; and whereby said toner hopper includes a storage tank and a developer roller; and whereby said developer roller is supplied a bias voltage through a chain of electrical components; and one electrical component in said chain is an electrical connection device; and including a spacer device made of a conductive material that engages said developer roller; and whereby said spacer device includes at least some flock surface coating over at least a portion of said spacer device's surface to form an insulative portion over a portion of said spacer device.

35. A toner cartridge as in claim 34 wherein said spacer device includes at least a portion with a ring shape.

36. A toner cartridge as in claim 34 wherein said spacer device has a ring shape.

37. An image forming apparatus;

whereby said image forming apparatus makes an image on media; and whereby said image forming apparatus contains at least one toner storage container, a waste toner hopper, a photoreceptor, a cleaning blade, a fuser section, a photoreceptor charging device and a transfer section and whereby said toner storage container has a storage tank and a developer roller, and whereby said developer roller is supplied a bias voltage through a chain of electrical components; and one electrical component in said chain is an electrical connection device; and wherein said electrical connection device also acts as a device for positioning a developer roller drive gear so that said drive gear will stay in position on a small diameter portion of a cylindrical member contact device that fits into said developer roller and makes contact with said developer roller, and whereby said electrical connection device fits into a groove on said small diameter portion of said cylindrical member; and whereby said electrical connection device includes a coil-spring which has a locking portion; and whereby said locking portion of said coil-spring has a bend portion that locks into said groove.

38. An image forming apparatus;

whereby said image forming apparatus makes an image on media and whereby said image forming apparatus contains at least one toner storage container, a waste toner hopper, a photoreceptor, a cleaning blade, a fuser section, a photoreceptor charging device and a transfer section; and whereby said toner storage container has a storage tank and a developer roller; and whereby said developer roller is supplied a bias voltage through a chain of electrical components; and one electrical component in said chain is an electrical connection device; and including a spacer device made of a conductive material that engages said developer roller; and whereby said spacer device includes at least some flock surface coating over at least a portion of said spacer device's surface to form an insulative portion over a portion of said spacer device.

39. An image forming apparatus as in claim 38 wherein said spacer device includes at least a portion with a ring shape.

40. An image forming apparatus as in claim 38 wherein said spacer device has a ring shape.

41. A method of providing a bias voltage whereby a developer roller is supplied a bias voltage through a chain of electrical components; and one electrical component in the chain is an electrical connection device; and wherein the electrical connection device also acts as a device for positioning a developer roller drive gear so that the drive gear will stay in position on a small diameter portion of a cylindrical member contact device that fits into the developer roller and makes contact with the developer roller; and whereby the electrical connection device is placed into a groove on the small diameter portion of the cylindrical member; and whereby the electrical connection device includes a coil-spring which has a locking portion; and whereby the locking portion of the coil-spring has a bend portion that is locked into the groove.

42. A method of providing a bias voltage whereby a developer roller is supplied a bias voltage through a chain of electrical components; and one electrical component in the chain is an electrical connection device; and including a spacer device made of a conductive material that engages the developer roller; and whereby the spacer device includes at least some flock surface coating over at least a portion of the spacer device's surface to form an insulative portion over a portion of the spacer device.

43. A method of providing a bias voltage as in claim 42 wherein the spacer device includes at least a portion with a ring shape.

44. A method of providing a bias voltage as in claim 42 wherein the spacer device has a ring shape.

45. A developer roller for use in an image forming apparatus;

whereby said developer roller has at least one region on its outside surface that acts as a spacer between said developer roller and a photoreceptor; and whereby said spacer region includes the use of a magnetic flock material.

46. A developer roller as in claim 45 whereby said flock material of said spacer region includes at least some insulative flock material to form an insulative barrier between said developer roller and the photoreceptor.

47. An endseal for use in an image forming apparatus;

whereby said endseal includes a flocked surface that engages a developer roller, and whereby said endseal includes some magnetic flocked material.

48. An endseal as in claim 47 whereby said flocked surface includes conductive flocked material; and whereby said flocked surface acts as an electrical connection device.

49. An endseal as in claim 47 whereby said endseal includes a resilient layer.

50. An endseal as in claim 47 whereby said endseal includes a rigid layer of molded plastic or metal.

51. An endseal as in claim 50 whereby said flocked surface includes conductive flocked material; and whereby said flocked surface acts as an electrical connection device.

52. An endseal as in claim 51 whereby said rigid layer includes conductive material.

53. An endseal as in claim 47 whereby said endseal includes a rigid layer of die-cut plastic or metal.

54. An endseal as in claim 53 whereby said flocked surface includes conductive flocked material; and whereby said flocked surface acts as an electrical connection device.

55. An endseal as in claim 54 whereby said rigid layer includes conductive material.

56. An endseal as in claim 47 whereby said endseal includes a resilient layer; and whereby said endseal includes a rigid layer of molded plastic or metal.

57. An endseal as in claim 47 whereby said endseal includes a resilient layer; and whereby said endseal includes a rigid layer of die-cut plastic or metal.

58. A toner cartridge used in an image forming apparatus;

whereby said toner cartridge includes a toner hopper and an optional waste toner hopper; and whereby said waste toner hopper includes a photoreceptor, a cleaning blade, a charge roller and a container to receive waste toner; and whereby said toner hopper includes a storage tank and a developer roller; and whereby said developer roller is supplied a bias voltage through a chain of electrical components; and whereby said developer roller has an endseal at or near each end; and whereby said endseal includes a flocked surface that engages the developer roller and whereby said endseal includes some magnetic flock material.

59. A toner cartridge as in claim 58 whereby said flocked surface includes conductive flocked material; and whereby said flocked surface acts as an electrical connection device.

60. A toner cartridge as in claim 58 whereby said endseal includes a resilient layer.

61. A toner cartridge as in claim 58 whereby said endseal includes a rigid layer of molded plastic or metal.

62. A toner cartridge as in claim 61 whereby said flocked surface includes conductive flocked material; and whereby said flocked surface acts as an electrical connection device.

63. A toner cartridge as in claim 62 whereby said rigid layer includes conductive material.

64. A toner cartridge as in claim 58 whereby said endseal includes a rigid layer of die-cut plastic or metal.

65. A toner cartridge as in claim 64 whereby said flocked surface includes conductive flocked material; and whereby said flocked surface acts as an electrical connection device.

66. A toner cartridge as in claim 65 whereby said rigid layer includes conductive material.

67. A toner cartridge as in claim 58 whereby said endseal includes a resilient layer; and whereby said endseal includes a rigid layer of molded plastic or metal.

68. A toner cartridge as in claim 58 whereby said endseal includes a resilient layer; and whereby said endseal includes a rigid layer of die-cut plastic or metal.

69. A toner cartridge used in an image forming apparatus;

whereby said toner cartridge includes a toner hopper and an optional waste toner hopper; and whereby said waste toner hopper includes a photoreceptor, a cleaning blade, a charge roller and a container to receive waste toner;

whereby said toner hopper includes a storage tank and a developer roller; and whereby said developer roller is supplied a bias voltage through a chain of electrical components; and whereby said developer roller has at least one region that acts as a spacer between said developer roller and a photoreceptor; and whereby said spacer region includes the use of a flock material.

70. A developer roller as in claim 69 whereby said flock material of said spacer region includes at least some insulative flock material to form an insulative barrier between said developer roller and the photoreceptor.

* * * * *